(12) United States Patent
Peng et al.

(10) Patent No.: US 12,542,016 B2
(45) Date of Patent: Feb. 3, 2026

(54) SMART DEVICE CONTROL METHODS AND SYSTEMS

(71) Applicant: YUNDING NETWORK TECHNOLOGY (BEIJING) CO., LTD., Beijing (CN)

(72) Inventors: Binghui Peng, Beijing (CN); Jiaming Pan, Beijing (CN); Tao Li, Beijing (CN); Yanpeng Lyu, Beijing (CN); Nancheng Liu, Beijing (CN); Yangyang Shi, Beijing (CN); Wenfeng Li, Beijing (CN); Xiancang Li, Beijing (CN)

(73) Assignee: YUNDING NETWORK TECHNOLOGY (BEIJING) CO., LTD., Beijing (CN)

( * ) Notice: Subject to any disclaimer, the term of this patent is extended or adjusted under 35 U.S.C. 154(b) by 536 days.

(21) Appl. No.: 18/146,986

(22) Filed: Dec. 27, 2022

(65) Prior Publication Data

US 2023/0140203 A1 May 4, 2023

Related U.S. Application Data

(63) Continuation of application No. PCT/CN2021/103621, filed on Jun. 30, 2021.

(30) Foreign Application Priority Data

Jun. 30, 2020 (CN) .......................... 202010617589.5
Sep. 22, 2020 (CN) .......................... 202010998858.7

(Continued)

(51) Int. Cl.
*G07C 9/00* (2020.01)
*G05B 15/02* (2006.01)
(Continued)

(52) U.S. Cl.
CPC ......... *G07C 9/00309* (2013.01); *G05B 15/02* (2013.01); *H04L 9/14* (2013.01); *H04L 9/3263* (2013.01); *G07C 2009/00412* (2013.01)

(58) Field of Classification Search
None
See application file for complete search history.

(56) References Cited

U.S. PATENT DOCUMENTS

2014/0040621 A1 2/2014 Klimke
2014/0165673 A1 6/2014 Tyner et al.
(Continued)

FOREIGN PATENT DOCUMENTS

CN 101029546 A 9/2007
CN 101030856 A 9/2007
(Continued)

OTHER PUBLICATIONS

The Extended European Search Report in European Application No. 21831982.0 mailed on Sep. 28, 2023, 8 pages.
(Continued)

*Primary Examiner* — Mohammad Ali
*Assistant Examiner* — Kelvin Booker
(74) *Attorney, Agent, or Firm* — METIS IP LLC

(57) ABSTRACT

A smart device control method and system is provided. The smart device control method may include obtaining a control command, the control command being used for instructing the smart device to perform a target operation; determining whether the control command satisfies a preset condition; and in response to determining that the control command satisfies the preset condition, controlling the smart device to perform the target operation.

17 Claims, 27 Drawing Sheets

(30) Foreign Application Priority Data

Sep. 22, 2020 (CN) .......................... 202010999569.9
Oct. 23, 2020 (CN) .......................... 202022386092.5
Nov. 24, 2020 (CN) .......................... 202011328475.5
Nov. 24, 2020 (CN) .......................... 202022748649.5

(51) Int. Cl.
*H04L 9/14* (2006.01)
*H04L 9/32* (2006.01)

(56) References Cited

U.S. PATENT DOCUMENTS

| | | | |
|---|---|---|---|
| 2016/0149908 A1 | 5/2016 | Unagami et al. | |
| 2017/0055148 A1 | 2/2017 | Zimmerman et al. | |
| 2017/0243425 A1 | 8/2017 | Meganck et al. | |
| 2018/0047232 A1* | 2/2018 | Sakumoto | G07C 9/00309 |
| 2018/0080250 A1* | 3/2018 | Martin | E05B 9/002 |
| 2018/0205539 A1 | 7/2018 | Le Saint | |
| 2019/0108703 A1 | 4/2019 | Meganck et al. | |
| 2019/0260578 A1 | 8/2019 | Le Saint | |
| 2019/0340856 A1* | 11/2019 | Gilbert | E05B 47/0012 |
| 2019/0362574 A1* | 11/2019 | Tang | G07C 9/00182 |
| 2019/0371105 A1* | 12/2019 | Ye | H04W 12/61 |
| 2020/0028672 A1* | 1/2020 | Tang | H04L 9/3297 |
| 2020/0123810 A1 | 4/2020 | Gao et al. | |
| 2020/0169550 A1 | 5/2020 | Xie | |
| 2020/0254878 A1* | 8/2020 | Pei | H04W 4/40 |
| 2020/0410795 A1* | 12/2020 | Peng | H04L 9/0825 |

FOREIGN PATENT DOCUMENTS

| | | | | |
|---|---|---|---|---|
| CN | 200946399 Y | | 9/2007 | |
| CN | 201250555 Y | | 6/2009 | |
| CN | 101719827 A | | 6/2010 | |
| CN | 201717885 U | | 1/2011 | |
| CN | 102831679 A | | 12/2012 | |
| CN | 105401798 A | | 3/2016 | |
| CN | 105451038 A | | 3/2016 | |
| CN | 205140035 U | | 4/2016 | |
| CN | 105715120 A | | 6/2016 | |
| CN | 105812142 A | | 7/2016 | |
| CN | 205591683 U | | 9/2016 | |
| CN | 106101159 A | | 11/2016 | |
| CN | 106161475 A | | 11/2016 | |
| CN | 205778402 U | | 12/2016 | |
| CN | 106485127 A | * | 3/2017 | ............ G06F 21/32 |
| CN | 106714274 A | | 5/2017 | |
| CN | 106789883 A | | 5/2017 | |
| CN | 206477681 U | | 9/2017 | |
| CN | 107316400 A | * | 11/2017 | ......... G07F 17/0057 |
| CN | 107798763 A | | 3/2018 | |
| CN | 108111300 | | 6/2018 | |
| CN | 108122118 A | | 6/2018 | |
| CN | 108280369 A | | 7/2018 | |
| CN | 108305369 A | * | 7/2018 | ............. E05B 65/02 |
| CN | 207944821 U | * | 10/2018 | ......... G07F 17/0057 |
| CN | 109252754 A | | 1/2019 | |
| CN | 109309568 A | | 2/2019 | |
| CN | 109441240 A | * | 3/2019 | ......... G07C 9/00563 |
| CN | 110080620 A | * | 8/2019 | ............... E05B 9/00 |
| CN | 110163598 A | | 8/2019 | |
| CN | 110163998 A | | 8/2019 | |
| CN | 110206406 A | | 9/2019 | |
| CN | 209482889 U | | 10/2019 | |
| CN | 110430055 A | | 11/2019 | |
| CN | 209670509 U | | 11/2019 | |
| CN | 210003062 U | * | 1/2020 | ............. G06F 21/32 |
| CN | 111010271 A | | 4/2020 | |
| CN | 111364845 A | | 7/2020 | |
| CN | 211287087 U | | 8/2020 | |
| CN | 112598821 A | | 4/2021 | |
| FR | 2535773 A1 | | 5/1984 | |
| JP | 2014224427 A | | 12/2014 | |
| JP | 2017120001 A | | 7/2017 | |
| JP | 2020084413 A | | 6/2020 | |
| WO | WO-2010088799 A1 | * | 8/2010 | ......... G07C 9/0182 |
| WO | WO-2014043986 A1 | * | 3/2014 | ......... G07C 9/00182 |
| WO | WO-2016092754 A1 | * | 6/2016 | ............ H04W 12/06 |
| WO | WO-2017006171 A2 | * | 1/2017 | ............. H04W 4/80 |
| WO | 2019228270 A1 | | 12/2019 | |

OTHER PUBLICATIONS

International Search Report in PCT/CN2021/103621 mailed on Aug. 26, 2021, 6 pages.
Written Opinion in PCT/CN2021/103621 mailed on Aug. 26, 2021, 8 pages.
First Office Action in Chinese Application No. 202010617589.5 mailed on Apr. 22, 2022, 21 pages.
First Office Action in Chinese Application No. 202010998858.7 mailed on Jul. 22, 2022, 18 pages.
First Office Action in Chinese Application No. 202010999569.9 mailed on Aug. 17, 2022, 19 pages.
The Second Office Action in Chinese Application No. 202010617589.5 mailed on Sep. 29, 2022, 28 pages.
Zhang, Nan et al., Research and Security Analysis on Open RFID Mutual Authentication Protocol, Journal of Computer Applications, 33(1): 131-134, 2013.
Yang, Yixian et al., 6.1 PKI System, Applied Cryptography (2nd Edition), 2013, 9 pages.

* cited by examiner

600

| 601 | The terminal device obtains a public key of a public- private key pair generated by a security device, and generates a session key based on a private key of the public-private key pair generated by the terminal device and the obtained public key |

| 602 | The terminal device encrypts a signature of the terminal device, first data of the terminal device, and a certificate of the terminal device by the session key to obtain verification data |

| 603 | The terminal device sends the authentication data and a public key of the public-private key pair generated by the terminal device to the security device |

| 604 | The terminal device obtains control data generated by the security device, and decrypts the control data by the session key, and obtain the control key and second data corresponding to the control data |

| 605 | The terminal device determines, based on the second data corresponding to the control data, whether the control key is used to perform control of the security device corresponding to the control key |

| 701 | The processor of the security device obtains verification data generated by a terminal device and a public key of a public-private key pair generated by the terminal device, and generates a session key based on a private key of a public-private key pair generated by the security device and the obtained public key |

| 702 | The processor of the security device decrypts the verification data by the session key, obtains a signature of the terminal device, first data of the terminal device, and a certificate of the terminal device, and verifies the signature of the terminal device and the certificate of the terminal device to obtain a verification result |

| 703 | The processor of the security device generates a control key if the verification result indicates that the signature of the terminal device and the certificate of the terminal device are legitimate, and encrypt the control key and the first data of the terminal device by the session key to obtain control data |

| 704 | The processor of the security device sends the control data to the terminal device |

FIG. 7

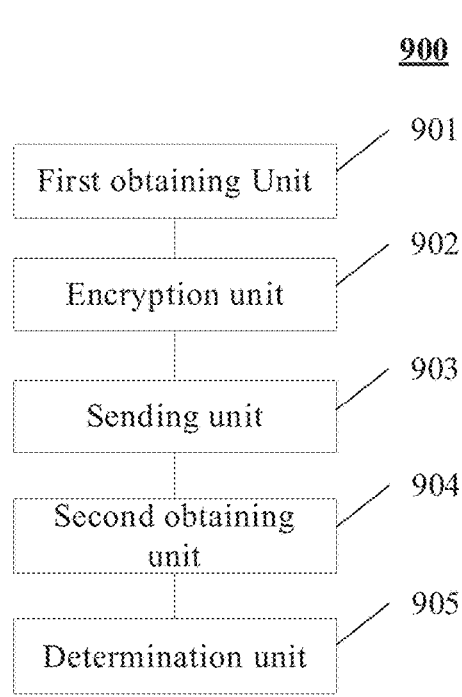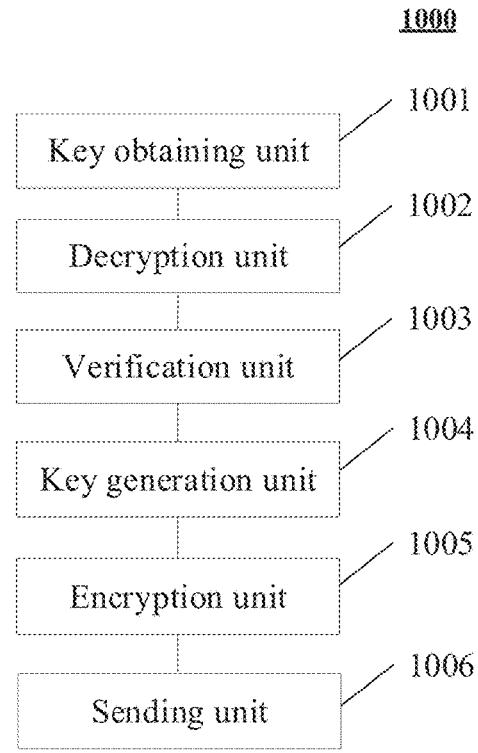
FIG. 9
FIG. 10
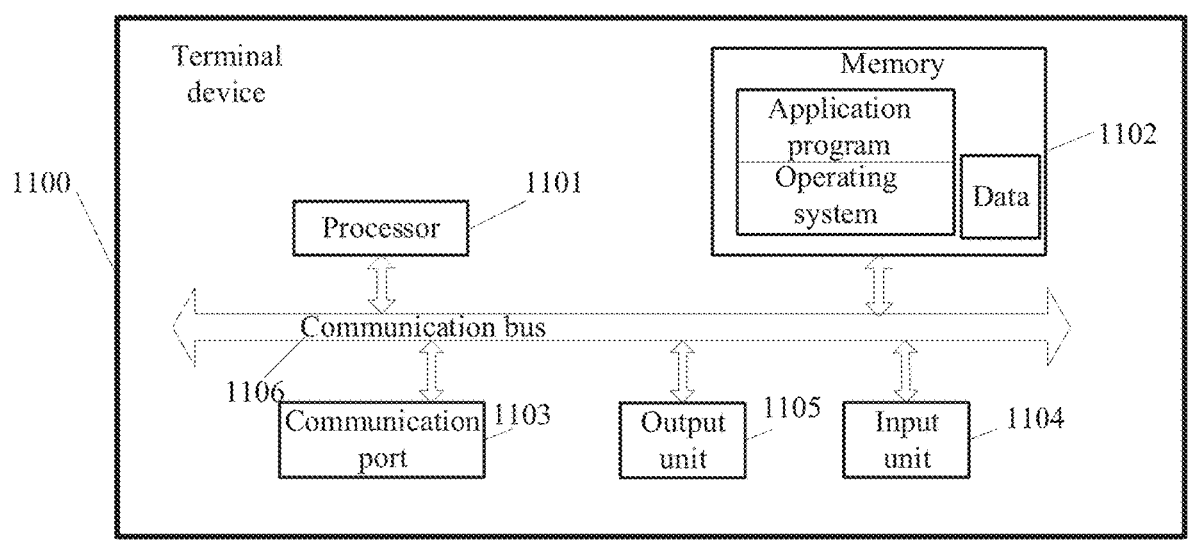
FIG. 11

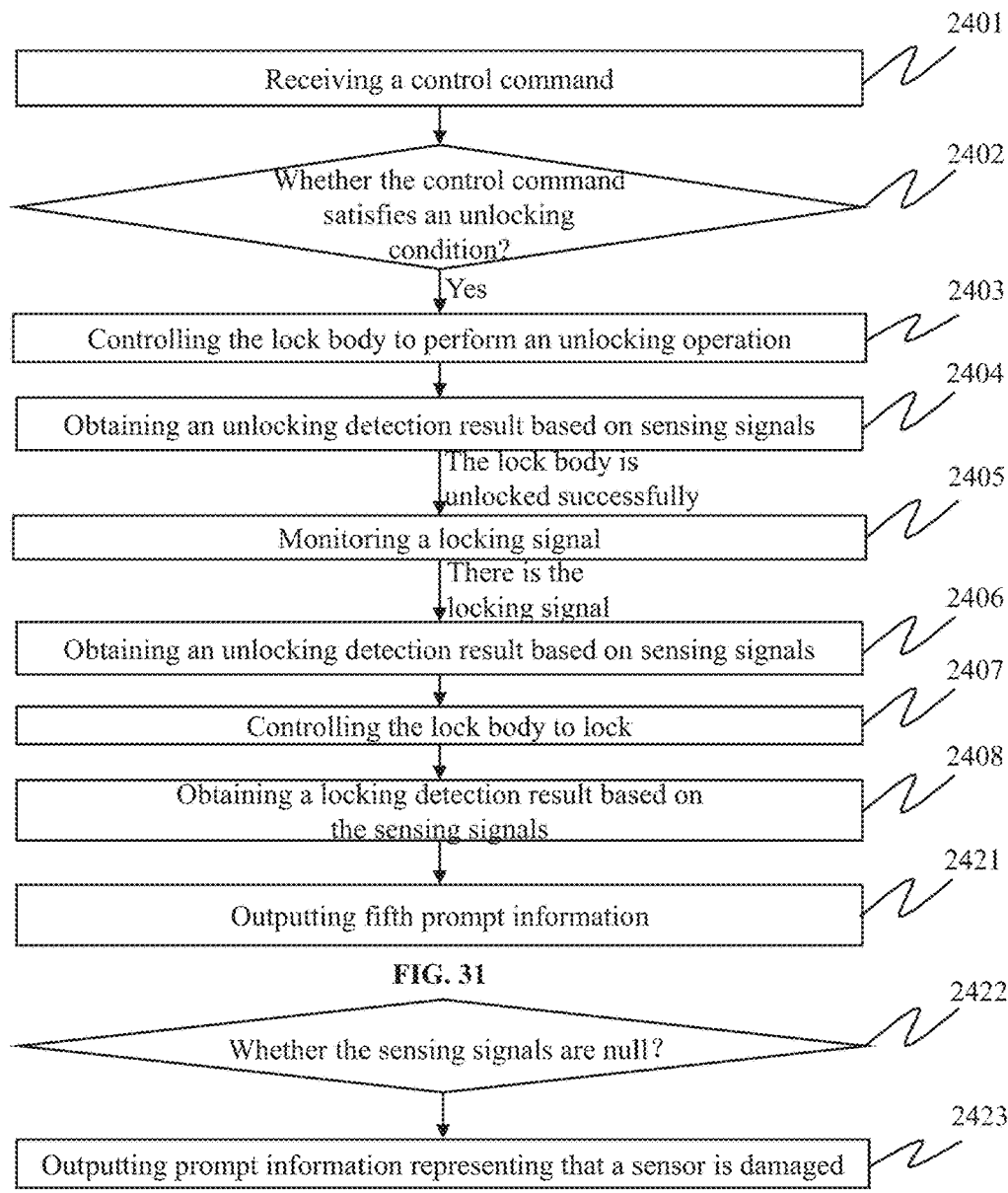
FIG. 31
FIG. 32
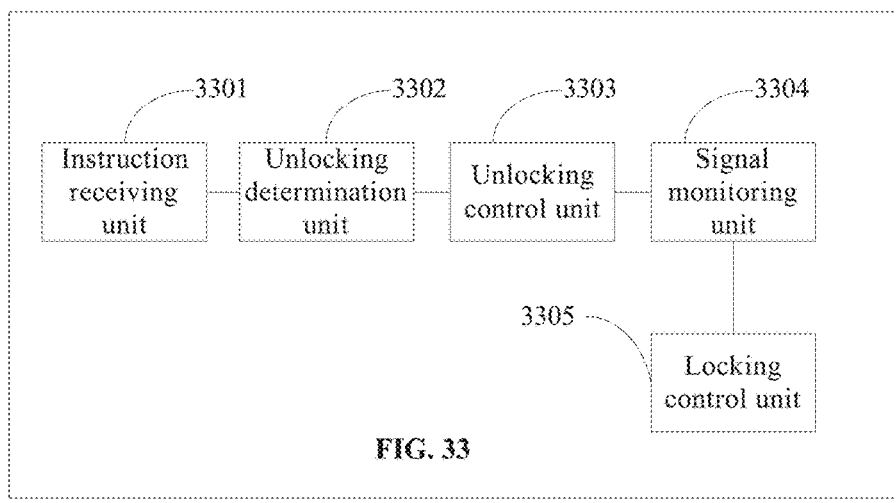
FIG. 33

SMART DEVICE CONTROL METHODS AND SYSTEMS

CROSS-REFERENCE TO RELATED APPLICATIONS

The present disclosure is a Continuation of International Application No. PCT/CN2021/103621, filed on Jan. 30, 2021, which claims priority of Chinese application No. 202010617589.5 filed on Jun. 30, 2020, priority of Chinese application No. 202010998858.7 filed on Sep. 22, 2020, priority of Chinese application No. 202010999569.9 filed on Sep. 22, 2020, priority of Chinese Application No. 202022386092.5 filed on Oct. 23, 2020, priority of Chinese Application No. 202011328475.5 filed on Nov. 24, 2020, priority of Chinese Application No. 202022748649.5 filed on Nov. 24, 2020, the entire contents of which are incorporated herein by reference.

TECHNICAL FIELD

The present disclosure relates to the technical field of smart devices, and in particular, to smart device control methods and systems.

BACKGROUND

With the continuous development of the Internet and communication technology, smart devices (e.g., involving technologies of intelligent/smart locks, gates, safes, smart appliances, etc.) have entered the daily life of the public. As people have higher and higher needs for personal and property safety, smart devices with multiple safety functions (e.g., identity verification, password verification, state monitoring, abnormality alarm, information reporting, etc.) and/or convenient operations are more likely to be favored by users.

Therefore, it is desirable to provide smart device control methods and systems with a more convenient operation and a higher safety.

SUMMARY

One embodiment of the present disclosure provides a smart device control system. The system may include: at least one storage device for storing instructions; and at least one processor in communication with the at least one storage device. When executing the instructions, the at least one processor may be configured to direct the system to perform operations. The operations may include: obtaining a control command, the control command being used for instructing a smart device to perform a target operation; determining whether the control command satisfies a preset condition; and in response to determining that the control command satisfies the preset condition, controlling the smart device to perform the target operation.

In some embodiments, the smart device may include an intelligent lock. The intelligent lock may include a lock body and one or more lock body sensors arranged in the lock body. The one or more lock body sensors may be configured to acquire sensing signals. The target operation may include an unlocking operation. The at least one processor may be further configured to direct the system to perform the operations including: obtaining an unlocking detection result based on the sensing signals, the unlocking detection result at least representing whether the lock body is unlocked successfully; in response to the unlocking detection result representing that the lock body is unlocked successfully, monitoring a locking signal, the locking signal being used to instruct the lock body to perform a locking operation; in response to monitoring the locking signal, controlling the lock body to perform the locking operation; and obtaining a locking detection result based on the sensing signals, the locking detection result at least representing whether the lock body is locked successfully.

In some embodiments, the intelligent lock may include a motor and a bolt that are arranged in the lock body. The controlling the lock body to perform the unlocking operation may include: controlling the motor to operate to drive the bolt to move, such that the lock body performs the unlocking operation. In response to the unlocking detection result representing that the lock body is unlocked successfully, the at least one processor may be further configured to direct the system to perform the operations including: controlling the motor to reset.

In some embodiments, the intelligent lock may include a motor drive circuit. The motor drive circuit may be arranged in the lock body. The controlling the motor to operate may include: controlling the motor to operate through the motor drive circuit.

In some embodiments, the unlocking detection result may further represent whether the motor is abnormal. A motor abnormality represented by the unlocking detection result at least may include: the unlocking detection result representing that the lock body fails to be unlocked, and/or a rotation duration of the motor exceeds a rotation duration threshold, and/or a load current of the motor exceeds a current threshold.

In some embodiments, in response to the unlocking detection result representing that the motor is abnormal, the at least one processor may be further configured to direct the system to perform the operations including: controlling the motor to reset; and recontroling the lock body to perform the unlocking operation until a count of times of the motor abnormality exceeding a threshold of times.

In some embodiments, the controlling the lock body to perform the locking operation may include: controlling the motor to operate to drive the bolt to move, such that the lock body performs the locking operation. In response to the unlocking detection result representing that the lock body is unlocked successfully, the at least one processor may be further configured to direct the system to: controlling the motor to reset.

In some embodiments, in response to the unlocking detection result representing that the lock body is unlocked successfully, the at least one processor may be further configured to direct the system to perform the operations including: obtaining an abnormality detection result at least based on the sensing signals, the abnormality detection result representing whether the intelligent lock is in an abnormal state; in response to the abnormality detection result representing that the intelligent lock is not in the abnormal state, starting to record an unlocking duration; and in response to the unlocking duration exceeding an unlocking duration threshold, generating a locking signal to control the lock body to perform the locking operation.

In some embodiments, the locking detection result may further represent whether the motor is abnormal. A motor abnormality represented by the locking detection result at least may include: the locking detection result representing that the lock body fails to be locked, and/or a rotation duration of the motor exceeds a rotation duration threshold, and/or a load current of the motor exceeds a current threshold.

In some embodiments, the at least one processor may be further configured to direct the system to perform the operations including: in response to the locking detection result representing that the motor is abnormal, controlling the motor to reset; and recontroling the lock body to perform the locking operation until a count of times of the motor abnormity exceeds a threshold of times.

In some embodiments, the intelligent lock may include a detection component and a first bolt that are arranged in the lock body. The first bolt may be compressed under an external force and may pop out after the external force is removed. The one or more lock body sensors may include a detection component sensor arranged in cooperation with the detection component and a locking block sensor arranged in cooperation with the first bolt. The monitoring the locking signal may include: monitoring whether the detection component sensor detects operation information of the detection component; detecting whether the locking block sensor detects the operation information of the first bolt; and in response to that the detection component sensor detects the operation information of the detection component and the locking block sensor detects the operation information of the first bolt, representing that the locking signal is monitored.

In some embodiments, the at least one processor may include one or more master chips, and at least one master chip of the one or more master chips may be arranged in the lock body.

In some embodiments, the one or more master chips may include a first master chip and a second master chip. The second master chip may be arranged in the lock body.

In some embodiments, the obtaining the control command may include: after preset unlocking information is received by the first main control chip, obtaining, by the second master chip, the control command that is sent by the first master chip.

In some embodiments, the obtaining the control command may include: obtaining an encrypted instruction, the encrypted instruction including an encrypted control key; and decrypting the encrypted instruction to obtain the control command.

In some embodiments, the encrypted instruction may be obtained by encrypting the control key and encryption parameters transmitted by the smart device, and the preset condition may include that the control key is a preset key and the encryption parameters are preset encryption parameters.

In some embodiments, the encryption instruction may be obtained via a terminal device. The decrypting the encryption instruction to obtain the control command may include: obtaining a public key of a public-private key pair generated by the terminal device; generating a session key based on a private key of a public-private key pair generated by the smart device and the obtained public key; and decrypting the encryption instruction by the session key to obtain the control command.

In some embodiments, before obtaining the encryption instruction, the at least one processor may be further configured to direct the system to perform the operations including: obtaining verification data generated by the terminal device and the public key of the public-private key pair generated by the terminal device; generating the session key based on the private key of the public-private key pair generated by the smart device and the obtained public key; decrypting the verification data by the session key to obtain a signature of the terminal device, first data of the terminal device, and a certificate of the terminal device; verifying the signature of the terminal device and the certificate of the terminal device to obtain a verification result; in response to the verification result indicating that the signature of the terminal device and the certificate of the terminal device are legitimate, generating the control key and encrypting the control key and the first data of the terminal device by the session key to obtain control data; and sending the control data to the terminal device, such that the terminal device is caused to decrypt the control data to obtain the control key.

In some embodiments, the generating the session key based on the private key of the public-private key pair generated by the smart device and the obtained public key may include: generating a shared key based on the private key of the public-private key pair generated by the smart device and the obtained public key; generating the session key based on the shared key and an identification of the terminal device.

The identification of the terminal device may be obtained through a device selection request.

In some embodiments, the verifying the signature of the terminal device and the certificate of the terminal device to obtain the verification result may include: obtaining a certificate digest and a certificate signature corresponding to the certificate of the terminal device; and verifying the certificate digest and the certificate signature by a public key of the certificate of the terminal device and verifying the signature of the terminal device by the public key obtained by the smart device to obtain the verification result.

In some embodiments, the control key may include an offline password value. The offline password value may correspond to a unique password identifier. The preset condition may include that: a target password value matching the offline password value exists in a first password pool and the target password value has not been used.

In some embodiments, the first password pool may include multiple offline password values. The offline password value of the control key may correspond to one of the multiple offline password values. The multiple offline password values may be generated through operations including: obtaining first time information, wherein the first time information is time data information obtained according to a preset rule; processing at least the first time information to obtain a target character string, the target character string containing multiple characters; grouping the characters of the target character string to obtain multiple character combinations, each of the multiple character combinations containing at least one character; and processing characters of each of the multiple character combinations separately to obtain an offline password value corresponding to each of the multiple character combinations.

In some embodiments, each of the multiple offline password values may correspond to a password identifier. The password identifier corresponding to each of the multiple password values may be generated through operations including: obtaining second time information, wherein the second time information is related to the first time information; and for each of the multiple offline password values, obtaining a password identifier corresponding to the offline password value at least based on a password order corresponding to the offline password value and the second time information.

In some embodiments, a granularity of a current time point represented by the first time information may be related to password configuration information of the smart device. The password configuration information may be generated based on a pre-configured operation.

In some embodiments, the at least one processor may be further configured to direct the system to perform the operations including: in response to determining that the offline password value satisfies the preset condition, transmitting the unique password identifier corresponding to the offline password value to a server when the intelligent lock has established a data connection with the server, such that the server determines, at least based on the unique password identifier, a target user corresponding to a terminal device that obtains the offline password value from the server.

In some embodiments, the control key may include an online password value, and the preset condition may include that: the online password value satisfies a usage restriction of the online.

In some embodiments, the smart device may include a control signal circuit and a controlled device. The control signal circuit may have at least one power supply interface to receive a power trigger signal. A control signal output interface of the at least one processor may be connected with a power control interface of the controlled device to control a power state of the controlled device.

In some embodiments, a level output interface of the control signal circuit may be connected with a first signal input interface of the at least one processor and a restart control signal may be output to the at least one processor through the first signal input interface.

In some embodiments, the restart control signal may include a high level signal or a low level signal.

In some embodiments, the power supply interface may include a USB power supply interface.

In some embodiments, the controlled device may include at least one of a wireless communication module, a touch module, a fingerprint module, an amplifier module, a radio frequency identification module, a voice module and a display module.

One embodiment of the present disclosure provides a smart device control method. The method may include: obtaining a control command, wherein the control command is used for instructing a smart device to perform a target operation; determining whether the control command satisfies a preset condition; and in response to determining that the control command satisfies the preset condition, controlling the smart device to perform the target operation.

One embodiment of the present disclosure provides a smart device control system. The system may include: a communication module, a processing module, and a control module. The communication module may be configured to obtain a control command. The control command may be used for instructing a smart device to perform a target operation. The processing module may be configured to determine whether the control command satisfies a preset condition. The control module may be configured to control the smart device to perform the target operation in response to determining that the control command satisfies the preset condition.

One embodiment of the present disclosure provides a non-transitory computer-readable storage medium, comprising executable instructions, when executed by a computing device, direct the computer device to perform a smart device control method. The smart device control method may include: obtaining a control command, wherein the control command is used for instructing a smart device to perform a target operation; determining whether the control command satisfies a preset condition; and in response to determining that the control command satisfies the preset condition, controlling the smart device to perform a target operation.

One embodiment of the present disclosure provides a method for processing a control key. The method may be applied in a terminal device. The method may include obtaining a public key of a public-private key pair generated by a security device; generating a session key based on a private key of a public-private key pair generated by the terminal device and the obtained public key; encrypting a signature of the terminal device, first data of the terminal device, and a certificate of the terminal device by the session key to obtain verification data; sending the verification data and a public key of the public-private key pair generated by the terminal device to the security device; obtaining control data generated by the security device; decrypting the control data by the session key to obtain a control key and second data corresponding to the control data; and determining, based on the second data corresponding to the control data, whether the control key is used to control the security device corresponding to the control key.

In some embodiments, the generating the session key based on the private key of the public-private key pair generated by the terminal device and the obtained public key may include generating a shared key based on the private key of the public-private key pair generated by the terminal device and the obtained public key; and generating the session key based on the shared key and an identification of the terminal device.

In some embodiments, the signature of the terminal device may be generated based on the public-private key pair generated by the terminal device and the identification of the terminal device.

In some embodiments, the generating the signature of the terminal device based on the public-private key pair generated by the terminal device and the identification of the terminal device may include generating a hash value based on the public key of the public-private key pair generated by the terminal device and the identification of the terminal device; and generating the signature of the terminal device based on the hash value and the private key of the public-private key pair generated by the terminal device.

In some embodiments, the method may further include storing the control key when the second data corresponding to the control data is the same as the first data of the terminal device.

One embodiment of the present disclosure provides a method for processing a control key. The method may be applied to a processor of a security device. The method may include obtaining verification data generated by a terminal device and a public key of a public-private key pair generated by a terminal device; generating a session key based on a private key of a public-private key pair generated by the security device and the obtained public key; decrypting the verification data by the session key to obtain a signature of the terminal device, first data of the terminal device, and a certificate of the terminal device; verifying the signature of the terminal device and the certificate of the terminal device to obtain a verification result; when the verification result indicates that the signature of the terminal device and the certificate of the terminal device are legitimate, generating the control key; encrypting the control key and the first data of the terminal device by the session key to obtain control data; and sending the control data to the terminal device.

In some embodiments, the verifying the signature of the terminal device and the certificate of the terminal device to obtain the verification result may include obtaining a certificate digest and a certificate signature corresponding to the certificate of the terminal device; and verifying the certificate digest and the certificate signature by the public key of the certificate of the terminal device, and verifying the signature of the terminal device by the obtained public key to obtain the verification result.

In some embodiments, the generating the session key based on the private key of the public-private key pair generated by the security device and the obtained public key may include generating a shared key based on the private key of the public-private key pair generated by the security device and the obtained public key; and generating the session key based on the shared key and an identification of the terminal device. The identification of the terminal device may be obtained through a device selection request.

One embodiment of the present disclosure provides a device for processing a control key. The device may be applied in a terminal device. The device may include a first acquisition unit configured to obtain a public key of a public-private key pair generated by a security device, and generate a session key based on a private key of a public-private key pair generated by the terminal device and the obtained public key; an encryption unit configured to encrypt a signature of the terminal device, first data of the terminal device, and a certificate of the terminal device by the session key to obtain verification data; a sending unit configured to send the verification data and a public key of the public-private key pair generated by the terminal device to the security device; a second acquisition unit configured to obtain control data generated by the security device, and decrypt the control data by the session key to obtain a control key and second data corresponding to the control data; and a determination unit configured to determine, based on the second data corresponding to the control data, whether the control key is used to control the security device corresponding to the control key.

One of the embodiments of the present disclosure provides a device for processing a control key. The device may be applied in a processor of a security device. The device may include a key acquisition unit configured to obtain verification data generated by a terminal device and a public key of a public-private key pair generated by the terminal device, and generate a session key based on a private key of a public-private key pair generated by the security device and the obtained public key; a decryption unit configured to decrypt the verification data by the session key, and obtain a signature of the terminal device, first data of the terminal device, and a certificate of the terminal device; a verification unit configured to verify the signature of the terminal device and the certificate of the terminal device to obtain a verification result; a key generation unit configured to generate a control key when the verification result indicates that the signature of the terminal device and the certificate of the terminal device are legitimate; an encryption unit configured to encrypt the control key and the first data of the terminal device by the session key to obtain control data; a sending unit configured to send the control data to the terminal device.

One embodiment of the present disclosure provides a system for processing a control key. The system may include a terminal device and a security device. The terminal device may be configured to obtain a public key of a public-private key pair generated by the security device; generate a session key based on a private key of a public-private key pair generated by the terminal device and the obtained public key; encrypt a signature of the terminal device, first data of the terminal device, and a certificate of the terminal device by the session key to obtain verification data; send the verification data and a public key of the public-private key pair generated by the terminal device to the security device; obtain control data generated by the security device; decrypt the control data by the session key to obtain the control key and second data corresponding to the control data; determine, based on the second data corresponding to the control data, whether the control key is used to control the security device corresponding to the control key. The security device may be configured to obtain verification data generated by the terminal device and the public key of the public-private key pair generated by the terminal device; generate the session key based on the private key of the public-private key pair generated by the security device and the obtained public key; decrypt the verification data by the session key to obtain the signature of the terminal device, the first data of the terminal device, and the certificate of the terminal device; verify the signature of the terminal device and the certificate of the terminal device to obtain a verification result; when the verification result indicates that the signature of the terminal device and the certificate of the terminal device are legitimate, generate the control key; encrypt the control key and the first data of the terminal device by the session key to obtain the control data; and send the control data to the terminal device.

One embodiment of the present disclosure provides a method for processing an offline password of a device. The method may include obtaining multiple offline password values of the device; and obtaining a password identifier corresponding to each of the multiple offline password values respectively. The password identifier may be unique such that in case an offline password value is obtained and used by a terminal device, the password identifier corresponding to the offline password value may correspond to a target user corresponding to the terminal.

In some embodiments, the obtaining multiple offline password values of the device may include obtaining first time information, wherein the first time information is time data information obtained according to a preset rule; processing at least the first time information to obtain a target character string, the target character string containing multiple characters; grouping the multiple characters of the target character string to obtain multiple character combinations, each character combination containing at least one character; and processing characters of each the character combination separately to obtain an offline password value corresponding to the each character combination.

In some embodiments, the obtaining the password identifier corresponding to each of the multiple offline password values respectively may include obtaining second time information, wherein the second time information is related to the first time information; and obtaining the password identifier corresponding to each of the multiple offline password values respectively at least according to a password order corresponding to each of the multiple offline password values and the second time information.

In some embodiments, the obtaining the password identifier corresponding to each of the multiple offline password values respectively at least according to the password order corresponding to each of the multiple offline password values and the second time information, may include obtaining the password identifier corresponding to each offline password value by using $I=((D-1)*24+T)*4+Index$. I represents a password identifier corresponding to an Indexth offline password value among the multiple offline password values that correspond to the first time information, D represents the number of days from January 1 to the current time point, and T represents a moment value under the granularity of the current time point characterized by the first time information to make the password identifier unique within the current year.

In some embodiments, the obtaining the password identifier corresponding to each of the multiple offline password values respectively at least according to the password order corresponding to each of the multiple offline password values and the second time information, may include obtaining an initial password identifier corresponding to each offline password value using I=((D−1)*24+T)*4+Index, I representing an initial identifier corresponding to an Indexth offline password value among the multiple offline password values that correspond to the first time information, D representing the number of days from January 1 to the current time point, and T representing a moment value under the granularity of the current time point characterized by the first time information; processing each initial identifier using the current year information, so that each password identifier is unique for the lifetime of the device.

In some embodiments, the granularity of the current time point characterized by the first time information may be related to password configuration information of the device. The password configuration information may be generated based on a pre-configured operation.

One embodiment of the present disclosure provides a method for processing an offline password of a device. The method may include receiving a password input operation from the target user. The password input operation may contain an input character string, and the input character string may contain at least one input character. The method may also include performing a password verification of whether the input character string meets an offline password verification rule based on multiple offline password values in the first password pool. Each offline password value in the first password pool may have a respective corresponding password identifier, the password identifier may be unique. The offline password verification rule may include that the first password pool exists a target password value matching the input character string and the target password value is used for the first time. The method may also include when the offline password value meets the preset condition, transmitting target information to a server when the device has established a data connection with the server. The target information may include password a target identifier corresponding to the target offline password value, so that the server, at least based on the target password identifier in the target information, determines a target user corresponding to the terminal device that obtains the offline password value from the server.

One embodiment of the present disclosure provides a method for processing an offline password of a device. The method may include receiving a password acquisition request transmitted by a terminal device. The password acquisition request may correspond to a target user corresponding to the terminal device. The method may also include obtaining, among multiple offline password values in a second password pool, a target password value meeting an offline password assignment rule. The offline password assignment rule may include that the target password value is used for the first time. Each offline password value of the second password pool may have a respective corresponding password identifier, and the password identifier may be unique. The method may also include transmitting the target password value to the terminal device and generating authorization information. The authorization information may include the password identifier corresponding to the target password value and information corresponding to the target user. The method may also include in a case of obtaining target information transmitted by the device while the device has a data connection with the server, determining, at least based on a target identifier of the target information and the authorization information, the target user corresponding to the target information.

One embodiment of the present disclosure provides a device for processing an offline password of a device. The method may include a password acquisition unit configured to obtain multiple offline password values of a lock; an identification acquisition unit configured to obtain a password identifier corresponding to each of the multiple offline password values respectively. The password identifier may be unique so that in case an offline password value is obtained and used by a terminal device, the password identifier corresponding to the offline password value may correspond to a target user corresponding to the terminal device.

One embodiment of the present disclosure provides a device for processing an offline password of a device. The device may include an operation receiving unit configured to receive a password input operation from a target user. The password input operation may contain an input character string, and the input character string may contain at least one input character. The device may also include a password verification unit configured to perform a password verification of whether the input character string meets an offline password verification rule based on multiple offline password values in the first password pool. Each of the multiple offline password values in the first password pool may have a respective corresponding password identifier, and the password identifier may be unique. The offline password verification rule may include an instance where the first password pool exists a target password value matching the input character string and the target password value is used for the first time. The device may also include an information transmission unit configured to transmit target information to a server in case the input character string meets the offline password verification rule and the target information has established a data connection between the device and the server. The target information may contain a target identifier corresponding to the target password value, so that the server determines, at least based on the target identifier of the target information, the target user corresponding to the terminal device that obtains the target password value from the server.

One embodiment of the present disclosure provides a device for processing an offline password of a device. The device may include a request receiving unit configured to receive a password acquisition request transmitted by a terminal device, and the password acquisition request may correspond to a target user corresponding to the terminal device. The device may also include a password acquisition unit configured to obtain, among multiple offline password values in a second password pool, a target password value meeting an offline password assignment rule. The offline password assignment rule may include that the target password value is used for the first time. Each of the multiple offline password values in the second password pool may have a respective corresponding password identifier and the password identifier may be unique. The device may also include an information transmission unit configured to transmit the target password value to the terminal device. The device may also include an information generation unit configured to generate authorization information, and the authorization information may include: a password identifier corresponding to the target password value and information corresponding to the target user. The device may further include a user determination unit configured to determine the target user corresponding to the target information, based at least on the target identifier of the target information and the authorization information, in case the information transmission unit obtains the target information that is transmitted by the device when the device has a data connection with the server.

One embodiment of the present disclosure provides a non-transitory computer-readable storage medium. The non-transitory computer-readable storage medium may include a set of instructions. When the set of instructions is executed by a processor, a method for processing an offline password of a device may be implemented.

One embodiment of the present disclosure provides a processor for running a program. When the program is run, a method for processing an offline password of a device may be implemented.

One embodiment of the present disclosure provides a device. The device may include one or more processors; a storage device having one or more programs stored thereon. When the one or more programs are performed by the one or more processors, the one or more processors may be caused to implement a method for processing an offline password of the device.

One embodiment of the present disclosure provides a server. The server may include one or more processors; a storage device having one or more programs stored thereon. When the one or more programs are performed by the one or more processors, the one or more processor may be caused to implement a method for processing an offline password of a device.

One of the embodiments of the present disclosure provides a method for controlling an electronic lock. The method may be applied to the electronic lock. The electronic lock may at least include a lock body. The lock body may be provided with one or more lock body sensors. The one or more lock body sensors may be used to acquire sensing signals. The method may include receiving a control command. The control command may be used to instruct the lock body to perform an unlocking processing. The method may include determining whether the control command satisfies an unlocking condition. The method may also include in response to determining that the control command satisfies the unlocking condition, controlling the lock body to be unlocked; and obtaining an unlocking detection result according to the sensing signals, the unlocking detection result at least representing whether the lock body is unlocked successfully. The method may also include when the unlocking detection result represents that the lock body is unlocked successfully, monitoring a locking signal. The locking signal may be used to instruct the lock body to perform a locking processing. The method may also include when the locking signal is monitored, controlling the lock body to be locked; and obtaining a locking detection result according to the sensing signals, the locking detection result at least representing whether the lock body is locked successfully.

In some embodiments, the unlocking detection result representing that the lock body is unlocked successfully may at least include: obtaining a detection result of unlocking completion based on sensing signals acquired by an unlocking sensor. The unlocking sensor may be a sensor arranged in cooperation with a first bolt (i.e., a first lock tongue in the lock body, and the first bolt may be a bolt that is compressed under the action of an external force and pops out after the action of the external force is removed.

In some embodiments, the locking detection result representing that the lock body is locked successfully may at least include: obtaining a detection result of locking completion based on sensing signals acquired by a locking sensor. The locking sensor may be a sensor arranged in cooperation with a second bolt in the lock body, and the second bolt may be a bolt arranged at a preset locking position.

In some embodiments, the control command may be obtained by decrypting an encrypted instruction transmitted to a panel of the electronic lock by the lock body, and the encrypted instruction may be obtained by the panel by encrypting encryption parameters transmitted by the lock body and an input password received by the panel.

In some embodiments, the controlling the lock body to be unlocked may include: controlling a motor in the lock body to rotate to drive a bolt in the lock body to move, so that the lock body is unlocked. When the unlocking detection result represents that the lock body is unlocked successfully, the method may further include: controlling the motor to reset.

In some embodiments, the controlling the motor in the lock body to rotate may include: controlling the motor in the lock body to rotate according to a slow-start mechanism. The slow-start mechanism may include that the motor rotates according to a pulsed electrical signal. The pulsed electrical signal may have an initial duty ratio, and as the motor rotates, the duty ratio of the pulsed electrical signal may increase on the basis of the initial duty ratio.

In some embodiments, after obtaining the unlocking detection result according to the sensing signals, the method may further include: when the unlocking detection result represents that the motor of the lock body is abnormal, controlling the motor to reset, and re-perform the following operations: controlling the lock body to be unlocked until the number of times of motor abnormalities exceeds a threshold of times. The unlocking detection result representing that the motor of the lock body is abnormal may at least include: the unlocking detection result representing that the lock body fails to be unlocked, and/or a duration of motor rotation exceeds a rotation duration threshold and/or a load current of the motor exceeds a current threshold.

In some embodiments, when the unlocking detection result represents that the lock body is unlocked successfully, the method may further include: outputting first prompt information. The first prompt information may be used to prompt a door opening action.

In some embodiments, when the unlocking detection result represents that the lock body is unlocked successfully, the method may further include: obtaining an abnormality detection result at least according to the sensing signals. The method may also include when the abnormality detection result represents that the electronic lock is in an abnormal state, outputting second prompt information. The second prompt information may be used to prompt that the electronic lock is abnormal. The abnormality detection result representing that the electronic lock is in the abnormal state may at least include: obtaining a detection result that a detection bolt protrudes based on sensing signals acquired by a detection bolt sensor, and obtaining a detection result of unlocking completion based on the sensing signals acquired by the unlocking sensor. The detection bolt sensor may be a sensor arranged in cooperation with the detection bolt in the lock body. The unlocking sensor may be a sensor arranged in cooperation with the first bolt in the lock body, and the first bolt may be a bolt that is compressed under the action of the external force and pops out after the action of the external force is removed.

In some embodiments, when the abnormality detection result represents that the electronic lock is not in the abnormal state, the method may further include: outputting third prompt information. The third prompt information may be used to prompt that the electronic lock is in an unlocked state.

In some embodiments, when the abnormality detection result represents that the electronic lock is not in the abnormal state, the method may further include: when the abnormality detection result represents that the electronic lock is not in the abnormal state, starting recording an unlocking duration; and when the unlocking duration exceeds an unlocking duration threshold, generating a locking signal to control the lock body to be locked.

In some embodiments, the method may further include: when the unlocking detection result represents that the lock body fails to be unlocked, outputting fifth prompt information. The fifth prompt information may be used to prompt that the electronic lock fails to be unlocked.

In some embodiments, the monitoring the locking signal may include: monitoring whether the detection bolt sensor detects action information of the detection bolt in the lock body. The monitoring the locking signal may also include: monitoring whether a locking block sensor detects action information of the first bolt. The detection bolt sensor may be a sensor arranged in cooperation with the detection bolt in the lock body, the locking block sensor may be a sensor arranged in cooperation with the first bolt, and the first bolt may be a bolt that is compressed under the action of the external force and pops out after the action of the external force is removed. The monitoring the locking signal may further include: when the detection bolt sensor detects the action information of the detection bolt in the lock body and the locking block sensor detects the action information of the first bolt in the lock body, representing that the locking signal is monitored.

In some embodiments, after obtaining the locking detection result according to the sensing signals, the method may further include: when the locking detection result represents that the motor of the lock body is abnormal, controlling the motor to reset, and re-performing following operations: controlling the lock body to be locked until the number of times of the motor abnormalities exceeds the threshold of times. The locking detection result representing the motor abnormality of the lock body may at least include that: a detection result of locking failure is obtained based on the sensing signals acquired by the locking sensor, the duration of motor rotation exceeds a rotation duration threshold, and/or the load current of the motor exceeds the current threshold. The locking sensor may be a sensor arranged in cooperation with a second bolt in the lock body, and the second bolt may be a bolt arranged at a preset locking position.

In some embodiments, the method may further include: when the locking detection result represents that the lock body fails to be locked, outputting fourth prompt information. The fourth prompt information may be used to prompt that the electronic lock fails to be locked.

In some embodiments, the fourth prompt information may be outputted in a preset output mode, and the preset output mode may represent a risk degree of locking failure of the lock body.

In some embodiments, when the locking detection result represents that the motor of the lock body is abnormal, the method may further include: outputting abnormality prompt information.

In some embodiments, the method may further include: when the sensing signals outputted by the lock body sensor are null, outputting prompt information that the lock body sensor is damaged.

One of the embodiments of the present disclosure provides a device for controlling an electronic lock. The device may be applied to an electronic lock. The electronic lock may at least include a lock body, and the lock body may be provided with one or more lock body sensors which are used to acquire sensing signals. The device may include an instruction receiving unit configured to receive a control command, and the control command may be used to instruct the lock body to perform an unlocking processing. The device may also include an unlocking determination unit configured to determine whether the control command satisfies an unlocking condition. The device may also include an unlocking control unit configured to control the lock body to be unlocked when the control command satisfies the unlocking condition; and obtain an unlocking detection result according to the sensing signals. The unlocking detection result may at least represent whether the lock body is unlocked successfully. The device may also include a signal monitoring unit configured to monitor a locking signal when the unlocking detection result represents that the lock body is unlocked successfully, and the locking signal may be used to instruct the lock body to be locked. The device may further include a locking control unit configured to control the lock body to be locked when the locking signal is monitored; and obtain a locking detection result according to the sensing signals. The locking detection result may at least represent whether the lock body is locked successfully.

One of the embodiments of the present disclosure provides a non-transitory computer-readable medium on which computer programs are stored. When the programs are executed by a processor, the method for controlling the electronic lock may be implemented.

One of the embodiments of the present disclosure provides a processor for running programs. When the programs are running, the method for controlling the electronic lock may be implemented.

One of the embodiments of the present disclosure provides an electronic lock. The electronic lock may at least include a lock body, and the lock body may be provided with one or more lock body sensors which are used to acquire sensing signals. The electronic lock may further include: one or more processors; a storage device on which one or more programs are stored. When the one or more programs are executed by the one or more processors, the one or more processors may be caused to implement the method for controlling the electronic lock.

One embodiment of the present disclosure provides an electronic lock system. The electronic lock system may include a control signal circuit, a system controller, and a controlled device. The control signal circuit may have at least one power supply interface to receive a power trigger signal. A level output interface of the control signal circuit may be connected with a first signal input interface of the system controller and a restart control signal may be output to the system controller through the first signal input interface. A control signal output interface of the system controller may be connected with a power control interface of the controlled device to control a powder state of the controlled device.

In some embodiments, the control signal circuit may include: a first resistor, a second resistor, a third resistor, a first capacitor and a first transistor. A first end of the first resistor may be the power supply interface. A first end of the second resistor, a first end of the first capacitor and an emitter of the first transistor may be ground ends. A second end of the second resistor, a second end of the first capacitor, and a base of the first transistor may be connected with a second end of the first resistor. A collector of the first transistor may be connected with a first end of the third resistor. The collector of the first transistor may be the level output interface of the control signal circuit. A second end of the third resistor may be a voltage input interface of the control signal circuit.

In some embodiments, when the power supply interface is connected with an external power source, the first transistor may conduct, causing the collector of the first transistor to change from a high level to a low level. The low level may be the restart control signal.

In some embodiments, the electronic lock system may further include: a reset circuit. A level output interface of the reset circuit may be connected with a second signal input interface of the system controller. The reset circuit may have at least one voltage input interface.

In some embodiments, the reset circuit may include: a fourth resistor, a fifth resistor, a reset switch, and a second capacitor. A first end of the fourth resistor may be a voltage input interface of the reset circuit. A second end of the fourth resistor may be connected with a first end of the fifth resistor. A second end of the fifth resistor may be connected with one end of the reset switch, and the other end of the reset switch may be a ground end. A first end of the second capacitor may be connected with a second end of the fourth resistor, and the first end of the second capacitor may be a level output interface of the reset circuit. A second end of the second capacitor may be a ground end.

In some embodiments, the power supply interface may be a USB power supply interface.

In some embodiments, the controlled device may include at least one of a wireless communication module, a touch module, a fingerprint module, an amplifier module, a radio frequency identification module, a voice module, and a display module.

In some embodiments, the electronic lock system may further include a lock body with a wireless communication unit. The controlled device may include a wireless communication module. The lock body may be communicatively connected with the wireless communication module.

In some embodiments, the electronic lock system may further include: an alarm module. The alarm module may be communicatively connected with the system controller to obtain and respond to an alarm instruction output by the system controller.

In some embodiments, the electronic lock system may further include a detection module and an anti-pry device. The detection module may be communicatively connected with the anti-pry device to obtain state information of the anti-pry device. The detection module may be communicatively connected with the system controller to send state information of the anti-pry device to the system controller, so that the system controller output alarm information to the alarm module based on the state information of the anti-pry device.

In some embodiments, the electronic lock system may further include a monitoring module. A signal input interface of the monitoring module may be connected with a powder state interface of the controlled device to obtain the powder state of the controlled device within a first time range. A signal output interface of the monitoring module may be connected with a power control interface of the controlled device to control the powder state of the controlled device.

One of the embodiments of the present disclosure provides an intelligent lock. The intelligent lock includes a first master chip and a lock body which are arranged in the intelligent lock. A mechanical structure of the lock body and a motor connected with the lock body mechanical structure are arranged in a housing cavity of the lock body; a second master chip and a motor drive circuit are also arranged in the housing cavity of the lock body, and the first master chip and the second master chip are connected through a communication interface; the second master chip is connected with the motor through the motor drive circuit, and controls the action of the motor through the motor drive circuit; when receiving preset unlocking information, the first master chip may send an unlocking instruction to the second master chip through the communication interface, so that the second master chip may control the motor to perform an unlocking action through the motor drive circuit.

In some embodiments, the housing cavity of the lock body may be further provided with a security chip that performs identity verification on the first master chip; the security chip is connected with the second master chip.

In some embodiments, the communication interface may include a UART interface, an IIC interface or an SPI interface.

In some embodiments, the lock body may be further provided with at least one sensor. The sensors are respectively connected with the second master chip and the lock body mechanical structure.

In some embodiments, the sensors may be directly or indirectly connected with the second master chip and the lock body mechanical structure.

In some embodiments, the sensors may include a detection switch.

In some embodiments, the first master chip is arranged in the housing cavity of a door lock panel of the intelligent lock.

In some embodiments, the first master chip and the second master chip may communicate through wireless communication.

In some embodiments, the first master chip and the second master chip may communicate through wired communication.

One of the embodiments of the present application provides a control method applied to an intelligent lock. The control method may be applied to a first master chip in the intelligent lock. The control method may include: receiving preset unlocking information. The control method may also include: sending an unlocking instruction to a second master chip through a communication interface, so that the second master chip may control a motor to perform an unlocking action through a motor drive circuit.

In some embodiments, the sending an unlock instruction to a second master chip through a communication interface, so that the second master chip may control a motor to perform an unlocking action through a motor drive circuit may include: sending an identity verification request to the second master chip. The sending an unlock instruction to a second master chip through a communication interface, so that the second master chip may control a motor to perform an unlocking action through a motor drive circuit may include receiving verification parameter information corresponding to the identity verification request fed back by the second master chip, encrypting the verification parameter information to obtain encrypted data, and sending the encrypted data to the second master chip. The sending an unlock instruction to a second master chip through a communication interface, so that the second master chip may control a motor to perform an unlocking action through a motor drive circuit may also include after receiving identity verification pass information fed back after the second master chip passes the identity verification on the encrypted data, sending the unlocking instruction to the second master chip, so that the second control chip may control the motor to perform the unlocking action through the motor drive circuit.

In some embodiments, the sending the unlock instruction to the second master chip through the communication interface, so that the second master chip may control the motor to perform the unlocking action through the motor drive circuit may further include: after the second control chip successfully controls the motor to perform the unlocking action, receiving unlocking success information sent by the second control chip.

In some embodiments, the control method may further include: obtaining upgrade package data of the second master chip. The control method may include sending the upgrade package data to the second master chip through the communication interface, so that the second master chip uses the upgrade package data to perform an upgrade operation. The control method may also include receiving upgrade success information returned after the second master chip completes the upgrade operation and outputting the upgrade success information to a preset terminal.

One of the embodiments of the present disclosure provides a control method applied to an intelligent lock. The control method may be applied to a second master chip in the intelligent lock. The control method may include: receiving an unlocking instruction sent by a first master chip when receiving preset unlocking information through a communication interface, and in response to the received unlocking instruction, controlling a motor to perform an unlocking action through a motor drive control circuit.

In some embodiments, the receiving an unlocking instruction sent by a first master chip when receiving preset unlocking information through a communication interface, and in response to the received unlocking instruction, controlling a motor to perform an unlocking action through a motor drive control circuit may include: receiving an identity verification request sent by the first master chip when receiving the preset unlocking information, obtaining verification parameter information corresponding to the identity verification request, and sending the verification parameter information to the first master chip. The receiving an unlocking instruction sent by a first master chip when receiving preset unlocking information through a communication interface, and in response to the received unlocking instruction, controlling a motor to perform an unlocking action through a motor drive control circuit may include receiving encrypted data obtained by encrypting the verification parameter information by the first master chip, performing an identity verification operation on the encrypted data, and after the identity verification is passed, sending identity verification pass information to the first master chip. The receiving an unlocking instruction sent by a first master chip when receiving preset unlocking information through a communication interface, and in response to the received unlocking instruction, controlling a motor to perform an unlocking action through a motor drive control circuit may also include receiving the unlocking instruction sent by the first master chip, and in response to the received unlocking instruction, controlling the motor to perform the unlocking action through the motor drive control circuit.

In some embodiments, the controlling the motor to perform the unlocking action through the motor drive control circuit may further include: after successfully controlling the motor to perform the unlocking action, sending unlocking success information to the first master chip.

In some embodiments, a housing cavity of the lock body may be further provided with a security chip that performs identity verification on the first master chip. The receiving an identity verification request sent by the first master chip when receiving the preset unlocking information, obtaining verification parameter information corresponding to the identity verification request, and sending the verification parameter information to the first master chip may include: receiving the identify verification request sent by the first master chip when receiving the preset unlocking information, and sending the identity verification request to the security chip, so that the security chip may obtain the verification parameter information corresponding to the identity verification request, and sending the verification parameter information to the first master chip through the second master chip; the receiving encrypted data obtained by encrypting the verification parameter information by the first master chip, performing an identity verification operation on the encrypted data, and after the identity verification is passed, sending identity verification pass information to the first master chip may include: receiving the encrypted data obtained by encrypting the verification parameter information by the first master chip, and sending the encrypted data to the security chip, so that the security chip may perform the identity verification operation on the encrypted data, and after the identity verification is passed, sending the identity verification pass information to the first master chip through the second master chip.

In some embodiments, the control method may further include: receiving upgrade package data of the second master chip sent by the first master chip through a communication interface. The control method may include using the upgrade package data to perform an upgrade operation. The control method may also include after the upgrade operation is completed, returning upgrade success information to the first master chip, so that the first master chip may output the upgrade success information to a preset terminal.

In some embodiments, the lock body may be further provided with at least one sensor. The sensors may be respectively connected with the second master chip and a lock body mechanical structure. The in response to the received unlocking instruction, controlling the motor to perform the unlocking action through the motor drive control circuit may include: in response to the received unlocking instruction, detecting a current lock body state of the lock body mechanical structure through the sensors. The in response to the received unlocking instruction, controlling the motor to perform the unlocking action through the motor drive control circuit may also include: when the current lock body state represents that the lock body is locked, controlling the motor to perform the unlocking action through the motor drive circuit.

In some embodiments, the control method may further include: when the sensors detect that a preset bolt of the lock body is in a compressed state, controlling the motor to perform a locking action through the motor drive circuit.

BRIEF DESCRIPTION OF THE DRAWINGS

The present disclosure will be further illustrated by means of exemplary embodiments, which will be described in detail by means of the accompanying drawings. These examples are non-limiting, and in these examples, the same number indicates the same structure, wherein:

FIG. 6 is a flowchart of an exemplary process of a method for processing a control key according to some embodiments of the present disclosure;

FIG. 7 is a flowchart of another process of a method for processing a control key according to some embodiments of the present disclosure;

FIG. 9 is a schematic structural diagram of an exemplary device for processing a control key according to some embodiments of the present disclosure;

FIG. 10 is a schematic structural diagram of an exemplary device for processing a control key according to some embodiments of the present disclosure;

FIG. 11 is a schematic structural diagram of an exemplary terminal device for processing a control key according to some embodiments of the present disclosure;

FIG. 31 an exemplary flowchart of a method for a smart device control system to control an intelligent lock according to some embodiments of the present disclosure;

FIG. 32 is an exemplary flowchart of a method for a smart device control system to control an intelligent lock according to some embodiments of the present disclosure;

FIG. 33 is a schematic structural diagram of an exemplary device for controlling an intelligent lock according to some embodiments of the present disclosure;

DETAILED DESCRIPTION

Figure 1:
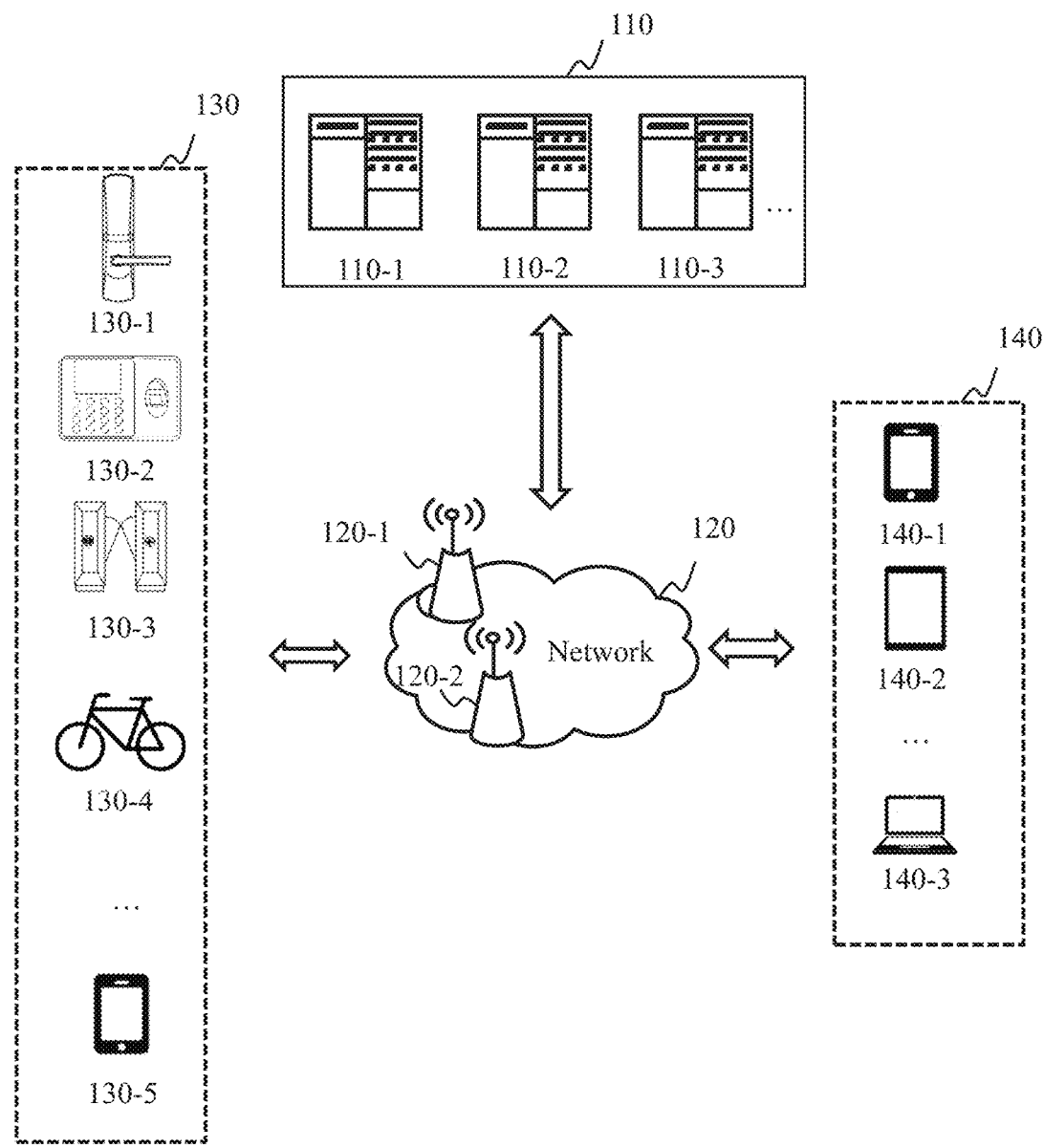
FIG. 1 is a schematic diagram of an application scenario of a smart device control system according to some embodiments of the present disclosure.

In order to more clearly illustrate the technical solutions of the embodiments of the present disclosure, the following briefly introduces the drawings that need to be used in the description of the embodiments. Obviously, the accompanying drawings in the following description are only some examples or embodiments of the present disclosure, and those skilled in the art may also apply the present disclosure to other similar scenarios. Unless otherwise apparent from context or otherwise indicated, like reference numerals in the figures represent similar structures or operations.

It should be understood that "system," "device," "unit," and/or "module" as used herein is a method for distinguishing different components, elements, parts, or assemblies of different levels. However, the words may be replaced by other expressions when other words may achieve the same purpose.

As shown in the present disclosure and claims, words such as "a," "an," and/or "the" are not specific to the singular and may include the plural, unless the context clearly indicates an exception. Generally speaking, the terms "include" and "comprise" only suggest the inclusion of clearly identified steps and elements, and these steps and elements do not constitute an exclusive list, and the method or device may also contain other steps or elements.

Among them, in the description of the embodiments of the present disclosure, unless otherwise specified, "/" indicates the meaning of "or," for example, A/B may mean A or B; "and/or" in the present disclosure is only a description of association relationship of associated objects. The association relationship indicates that there may be three kinds of relationships, for example, A and/or B may indicate: only A, both A and B, and only B. In addition, in the description of the embodiments of the present disclosure, the term "plurality" refers to two or more than two.

Hereinafter, the terms "first" and "second" are used for descriptive purposes only and cannot be understood as indicating or implying relative importance or implicitly specifying the quantity of indicated technical features. Thus, a feature defined as "first" and "second" may explicitly or implicitly include one or more of these features.

The flowchart is used in the present disclosure to illustrate the operations performed by the system according to some embodiments of the present disclosure. It should be understood that the preceding or following operations are not necessarily performed in the exact order. Instead, various steps may be processed in reverse order or simultaneously. At the same time, other operations may be added to these procedures, or a certain step or steps may be removed from these procedures.

FIG. 1 is a schematic diagram illustrating an exemplary application scenario of a smart device control system according to some embodiments of the present disclosure.

A smart device control scenario 100 (hereinafter referred to as a control scenario 100) may be widely used in a residential building, an office building, a factory, a warehouse, a shopping mall, a school, a hospital, a hotel, a bank, a rental house, an airport, a railway station, a subway station, and any other production and living field. As shown in FIG. 1, the control scenario 100 may include a server 110, a network 120, a smart device 130, and a terminal device 140.

The control scenario 100 may obtain a control command for instructing the smart device 130 to perform corresponding operations and determining whether the control command satisfies a preset condition. When the control command satisfies the preset condition, the smart device 130 may be controlled to perform a corresponding operation (e.g., a state switching operation). For example, the control scenario 100 may accept an operation input of a user of the smart device 130, and perform a safety verification (e.g., an authentication, a password recognition, etc.) on the operation input. After confirming that the safety verification is passed, the control scenario 100 may perform a corresponding operation (e.g., unlocking (also referred to as open), locking (also referred to as close), a reminding operation, switching a mode, etc.) on the smart device 130. In some embodiments, the operation input may include the control command and/or operation information. In some embodiments, the operation input may be an offline input or an online input. For example, a user may directly perform the operation input on a user interface (e.g., a panel) of the smart device 130. As another example, the user may perform the operation input through the terminal device 140.

In some embodiments, the control scenario 100 may be applied to a variety of different scenarios. For example, the control scenario 100 may be applied to an access control device (e.g., a lock, a gate). According to the control command of the user and/or operation information, the safety verification (e.g., whether the preset condition is satisfied) may be performed to determine whether the user is allowed to pass the access control device. Further, when the safety verification is passed (e.g., the preset condition is satisfied), it may be determined that the user is allowed to pass the access control device, and the control scenario 100 may control the access control device to unlock. As another example, the control scenario 100 may be applied to an item safekeeping device (e.g., a safe, a portable safe, a gun cabinet, a lockbox (e.g., a bank deposit box), an intelligent express cabinet, a luggage box, etc.) that requires a user identity authentication. According to the control command and/or the operation information of the user, the safety verification may be performed to determine whether the user has a permission to open the item safekeeping device. Furthermore, when the user has a permission to open the item safekeeping device, the smart device control system may control the opening of the item safekeeping device, so that the user may use the item safekeeping device to store or take out an item. As another example, the control scenario 100 may be applied to an attendance device (e.g., an attendance machine). According to the control command and/or the operation information of the user, the safety verification may be performed to determine whether the identity information of the user exists in a database corresponding to the attendance device. Furthermore, when the identity information of the user exists in the database corresponding to the attendance device, the control scenario 100 may record attendance information of the user at the current time. As another example, the control scenario 100 may be applied to a traffic device (e.g., a bicycle, an electric car, an automobile, etc.). The traffic device may be a private traffic device (e.g., a private car) or a shared traffic device (e.g., a shared car, a shared bicycle). According to the control command and/or the operation information of the user, the safety verification may be performed to determine whether the user is an owner or current renter of the traffic device, and then determine whether to open a lock of the traffic device. As another example, the control scenario 100 may be applied to an online service platform for Internet services, such as an online payment platform (e.g., an online shopping platform), an online banking, an online car hailing platform, an online meal ordering platform, etc. that require an identity authentication. According to the control command and/or the operation information of the user, the control scenario 100 may search and associate relevant accounts in the platform for a safety verification to determine whether a service request of the user is permitted. As another example, the control scenario 100 may also be applied to an electronic device (e.g., a mobile phone, a laptop, a tablet) that needs to be authenticated. According to the control command and/or the operation information of the user, the control scenario 100 may perform a safety verification to determine whether to allow operation request (e.g., switching on, entering the system, downloading software, etc.) of the electronic device and use permissions of the applications in the electronic device. As another example, the control scenario 100 may also be applied to an electrical device or a smart electrical device (e.g., a washing machine, a refrigerator, an air conditioner, an air purifier, a television, a heating device). According to the control command and/or the operation information of the user, a safety verification may be performed to determine whether a user is an owner or legal user of the electrical device, and then determine whether to switch a state of the electrical device (e.g., open a switch lock of the electrical device, switch the electrical device to different modes, etc.). It should be noted that the control scenario 100 may also be applied to other devices, scenarios and applications that require the safety verification, which is not limited here. Any devices, scenarios and/or applications that may use the control methods disclosed in the present disclosure are within the protection scope of the present disclosure.

The user may use the terminal device 140 to interact with the server 110 through the network 120 to receive or send messages (e.g., send an offline password acquisition request or receive an offline password), etc. The terminal device 140 may be installed with various client applications, such as a remote control application. In some embodiments, the network 120 may be any one of a wired network or a wireless network, or a combination thereof. Merely by way of example, the network 120 may include a cable network, a wired network, an optical fiber network, a remote communication network, an intranet, the Internet, a local area network (LAN), a wide area network (WAN), a wireless local area network (WLAN), a metropolitan area network (MAN), a wide area network (WAN), a public switched telephone network (PSTN), a Bluetooth network, a ZigBee network, a near-field communication (NFC) network, or the like, or any combination thereof. The smart device 130 and the server 110 may communicate directly through the network 120, or may be connected through an Internet of Things gateway (not shown). For example, the smart device 130 and the Internet of Things gateway may communicate based on a Zigbee protocol, and the Internet of Things gateway and the server 110 may communicate based on a cellular mobile network or a Wi-Fi network. The smart device 130 and the terminal device 140 may also communicate based on a short distance wireless communication, including but not limited to a Bluetooth protocol communication, a near-field communication (NFC), an infrared communication, etc.

The terminal device 140 may be hardware or software. When the terminal device 140 is hardware, the terminal device 140 may be various electronic devices with display screens, including but not limited to a smart phone 140-1, a tablet computer 140-2, a laptop computer 140-3, a desktop computer, a wearable device, etc. In some embodiments, the terminal device 140 may be an access card, an electronic key, etc., based on an NFC technology. When the terminal device 140 is software, the terminal device 140 may be installed in the electronic devices listed above. The terminal device 140 may be implemented as multiple software or software modules (e.g., to provide distributed services), or as a single software or software module, which is not limited herein.

The smart device 130 may obtain safety control information and the control command and/or the operation information of the user, and perform the safety verification on the control command and/or the operation information of the user according to the safety control information. After the safety verification is passed (e.g., the preset condition is satisfied), corresponding operations (e.g., unlocking, locking, mode switching, etc.) may be performed according to the control command and/or the operation information of the user. In some embodiments, the smart device 130 may include a lock device 130-1, an attendance device 130-2, a gate device 130-3, a traffic device 130-4, and a communication device 130-5. For example, when the smart device 130 is a lock device 130-1 (e.g., an intelligent lock), it may be determined whether the user is allowed to open the lock device 130-1 according to the control command and/or the operation information of the user. After the control command and/or the operation information of the user pass the safety verification, the lock device 130-1 may automatically unlock or remind the user to perform mechanical unlocking. For example, the mechanical unlocking may include a user unlocking by pressing a handle, or by a knob, a button, a key, or other mechanical methods. The lock device 130-1 may be applied to a door body, a parking space floor lock, an item safekeeping device (e.g., a safe, a portable safe deposit box, a gun cabinet, a lockbox (e.g., a bank deposit box), an intelligent express cabinet, a luggage base, etc.), etc. In some embodiments, by category, the lock device 130-1 may include a lock of button type, a lock of dial type, a lock of electronic key type, a lock of touch type, a lock of password identification type, a lock of remote-control type, a lock of card identification type (e.g., a magnetic card, an IC card, an NFC card), a lock of biological identification type (e.g., identification of fingerprint, finger vein, palm print, face, voice, iris, retina), or the like, or any combination thereof. As another example, when the smart device 130 is the attendance device 130-2, it may be determined whether the identity information of the user exists in a storage device corresponding to the attendance device 130-2 according to the control command and/or the operation information of the user. Furthermore, when the identity information of the user exists in the storage device corresponding to the attendance device 130-2, the attendance device 130-2 may record the identity information of the user and the attendance information at a current time (e.g., name, code number, attendance time, and position of the user). In some embodiments, the attendance device 130-2 may include a biometric attendance device and a mobile attendance device. In some embodiments, the biometric attendance device may include a fingerprint attendance device, a finger vein attendance device, a palm print attendance device, a facial appearance attendance device, a voice attendance device, an iris attendance device, a retina attendance device, or the like, or any combination thereof. In some embodiments, the mobile attendance device may refer to a mobile terminal (e.g., a mobile phone, a computer, a wearable device (e.g., a smart watch), etc.) that completes attendance by installing an attendance client (e.g., software, a mobile APP, etc.) thereon. As another example, when the smart device 130 is a gate device 130-3, it may be determined whether the user is allowed to pass through the gate device 130-3 by performing the safety verification according to the control command and/or the operation information of the user. Further, in response to determining that the user is allowed to pass through the gate device 130-3, the gate device 130-3 may be unlocked and release the user; on the contrary, the gate device 130-3 may not be unlocked. The gate device 130-3 may be applied in an airport, a subway station, a light rail station, a bus passenger station, a railway station, an office building, a residential area, and any other entrance or exit where the user's identity needs to be determined. In some embodiments, the gate device 130-3 may include a swing gate device, a wing gate device, a three-roller gate device, a rotary gate device, a translation gate device, or the like, or any combination thereof. As another example, when the smart device 130 is a traffic device 130-4 (e.g., a bicycle, an electric vehicle, a car, etc.), the traffic device 130-4 may be a private traffic device (e.g., a private car) or a shared traffic device (e.g., a shared car, a shared bicycle). According to the control command and/or the operation information of the user, the safety verification may be performed to determine whether the user is the owner or a current renter of the traffic device, and then determine whether to unlock the traffic device. When the traffic device 130-4 passes the safety verification of the control command and/or the operation information of the user, the traffic device 130-4 may unlock or start. When the smart device 130 is the communication device 130-5, the smart device 130 may perform the safety verification according to the control command and/or the operation information of the user. The communication device 130-5 may determine whether to permit operation requests (e.g., a mode switching (e.g., switching on or off, entering the system), downloading software, etc.) of the communication device 130-5 and use permissions of applications (e.g., an online payment platform) of the communication device 130-5. A specific form of the communication device 130-5 may refer to relevant descriptions of the terminal device 140 in the present disclosure.

It should be noted that the smart device 130 may be not limited to the lock device 130-1, the attendance device 130-2, the gate device 130-3, the traffic device 130-4, and the communication device 130-5 shown in FIG. 1, but also may be applied to other devices that require state switching (e.g., unlocking, locking, etc.) through control commands, which is not limited herein. Any device that may use the smart device control method disclosed in the present disclosure may be within the protection scope of the present disclosure. To facilitate understanding, the embodiments of the present disclosure take an intelligent lock applied to a door lock device as an example of the smart device 130. More descriptions of the intelligent lock may be found elsewhere in the present disclosure (e.g., FIGS. 23, 35, 39 to 42, 45 to 51, etc.). It should be noted that the embodiment of the intelligent lock applied to the door lock device in the present disclosure is only an example, and not intended to limit the scope of the present disclosure. For example, the intelligent lock may also be configured for the gate device, traffic device, communication device, etc.

The server 110 may be operable to process information and/or data related to the control of the smart device 130 to perform one or more of the functions described in the present disclosure. For example, in response to receiving the control command sent by the terminal device 140, the server 110 may analyze and process the control command to obtain a control request and send the control request to the smart device 130 to enable the user to control the smart device 130. As another example, the server 110 may send the control command to the smart device 130 in response to the control command sent by the terminal device. The smart device 130 may analyze and process the control command to obtain a control request to realize the control of the smart device 130 by the user. As another example, the server 110 may send an offline password to the terminal device 140 in response to receiving an offline password request sent by the terminal device 140. The user may input the offline password to the smart device 130 to control the smart device 130. As another example, the server 110 may receive signals of the control command and/or operation information sent by the terminal device 140 and send the control command to the smart device 130. As another example, the server 110 may obtain an execution of the control command and/or operation information by the smart device 130, and send the execution to the terminal device 140, or perform subsequent operations according to the execution (e.g., perform a locking operation on the smart device 130 according to an execution of the unlocking operation). It should be noted that the server 110 may be either hardware or software. When the server 110 is hardware, the server 110 may be implemented as a distributed server cluster composed of multiple servers or a single server. When the server 110 is software, the server 110 may be implemented as multiple software or software modules (e.g., to provide distributed services), or as a single software or software module, which is not limited herein.

It should be noted that the smart device control method applied to the smart device 130 provided in the embodiments of the present disclosure may be generally executed by the smart device 130 (e.g., one or more master chips in the smart device 130), and accordingly, a control device applied to the smart device may be generally set in the smart device 130. The smart device control method applied to the server provided by the embodiments of the present disclosure may be generally executed by the server 110, and accordingly, a smart device control device applied to the server may be generally set in the server 110. In some embodiments, the server 110 may be located inside the intelligent lock 130, and the intelligent lock 130 and the server 110 may be connected through an internal wired network. In some embodiments, the server 110 may also be located in a cloud and connected with the smart device 130 through a wireless network. Some or all operations of some modules in the smart device 130 may be completed by the server 110.

In some embodiments, the control scenario 100 may also include a control device. The control device may be a device or apparatus capable of issuing instructions to control the smart device 130 to perform corresponding operations. In some embodiments, the control device and the terminal device may be the same device (e.g., a smart phone, a smart handheld terminal, a smart wearable device, a laptop, a desktop computer, etc.) In some embodiments, the control device may establish a binding relationship with the smart device 130 and send a control command to the smart device 130 to control the smart device 130 to perform operations such as unlocking, locking, etc.

In some embodiments, the control scenario 100 may also include an input device. The input device may be a device or apparatus (e.g., a password keyboard, an image acquisition device, a voice acquisition device, a biometric acquisition device, a Bluetooth device, an NFC device, etc.) that receives one or more kinds of input information. In some embodiments, the input device and the terminal device may be the same device. The input device may receive various input information and send the various input information to the smart device 130. The various input information may include but not limited to text input information, image input information, voice input information, biometric input information, network data input information, etc.

It should be understood that the number of the terminal device, the network and the server as shown in FIG. 1 is only schematic. According to implementation needs, it may have any number of terminal devices, networks, and servers. In some embodiments, the control scenario 100 may also include one or more other devices. For example, the control scenario 100 may also include a storage device. The storage device may store data (e.g., safety control information) and/or instructions (e.g., lock unlocking/locking instructions, alarm instructions). In some embodiments, the storage device may store data acquired from the smart device 130 and/or the terminal device 140. In some embodiments, the storage device may store information and/or instructions for the server 110 to execute or use to execute exemplary methods described in the present disclosure. In some embodiments, the storage device may include a mass memory, a removable memory, a volatile read-write memory (e.g., a random-access memory (RAM)), a read-only memory (ROM), or the like, or any combination thereof. In some embodiments, the storage device may be implemented on a cloud platform. For example, the cloud platform may include a private cloud, a public cloud, a hybrid cloud, a community cloud, a distributed cloud, an internal cloud, or the like, or any combination thereof.

Figure 2:
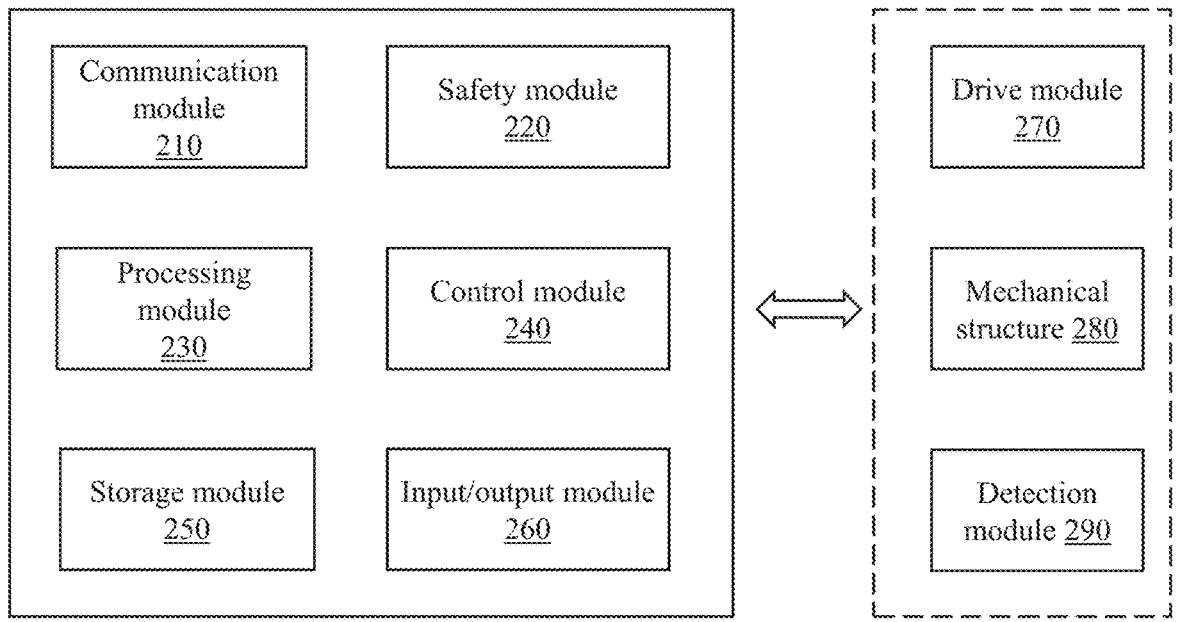
FIG. 2 is a schematic diagram of exemplary hardware and/or software of a smart device control system according to some embodiments of the present disclosure.

FIG. 2 is a schematic diagram of exemplary hardware and/or software of a smart device control system according to some embodiments of the present disclosure.

As shown in FIG. 2, the smart device control system (hereinafter referred to as the control system) 200 may include a communication module 210, a safety module 220, a processing module 230 (also referred to as a processor), a control module 240, a storage module 250, an input/output module 260, etc. In some embodiments, the smart device control device may also include a drive module 270, a mechanical structure 280, a detection module 290, etc. It should be noted that modules, units, and sub-units mentioned in the present disclosure may be implemented by hardware, software or combination of software and hardware. The hardware implementation may include an implementation using a circuit or structure composed of physical components; a software implementation may include storing corresponding operations of the modules, units, and sub-units in a memory in a form of codes, which may be executed by appropriate hardware, such as a microprocessor. When the modules, units, and sub-units in the present disclosure perform operations, unless otherwise specified, it may mean that software codes containing a function are executed, or hardware with the function is used. At the same time, the modules, units, and sub-units, which correspond to the hardware, in the present disclosure may not limit the hardware structures thereof, and the hardware that can realize the corresponding functions may be within the protection scope of the present disclosure. For example, different modules, units, and sub-units in the present disclosure may correspond to the same hardware structure. As another example, the same module, unit, and sub-unit in the present disclosure may also correspond to multiple independent hardware structures.

The communication module 210 may be configured for exchanging information or data. In some embodiments, the communication module 210 may be configured to control data transmission between various components of (e.g., the safety module 220, the processing module 230, the control module 240, the storage module 250, the input/output module 260, the drive module 270, etc.) the system 200. For example, the processing module 230 may send, through the communication module 210, prompt information (e.g., a successful unlocking/locking, a failed unlocking/locking, a device abnormality, an alarm, etc.) to the input/output module 260 for output through the communication module 210. As another example, the control module 240 may send, through the communication module 210, control information to the drive module 270 to perform corresponding operations. In some embodiments, the communication module 210 may also be configured to control data transmission between various components (e.g., the smart device 130, the network 120, the control device, the input device, the storage device, the server 110) of the scenario 100. For example, the control device may send the control command to the network 120 through the communication module 210. As another example, the smart device 130 may obtain data or information (e.g., the control command or operation information) from the network 120 through the communication module 210. In some embodiments, the communication module 210 may be configured to obtain safety control information through a secure connection. For example, the communication module 210 may obtain, from the network 120, authentication information sent by the server 110. The communication module 210 may employ wired, wireless, and wired/wireless hybrid technologies. The wired technology may be based on one or more combinations of optical cables, e.g., metal cables, hybrid cables, optical cables, etc. The wireless technology may include a Bluetooth, a Wi-Fi, a ZigBee, a near-field communication (NFC), a radio frequency identification (RFID), a cellular network (including GSM, CDMA, 3G, 4G, 5G, etc.), a narrow band Internet of Things (NBIoT) based on a cellular, etc. In some embodiments, the communication module 210 may use one or more encoding manners to encode the transmitted information. For example, the encoding manner may include phase encoding, non-return to zero coding, differential Manchester coding, etc. In some embodiments, the communication module 210 may select different transmission and coding manners according to a data type to be transmitted or network type. In some embodiments, the communication module 210 may include one or more communication ports for different communication modes. In some embodiments, each component (the smart device 130, the network 120, the control device, the input device, the storage device, the server 110) of the control scenario 100 may be distributed on a plurality of devices. In such cases, each module may respectively include one or more communication modules 210 for information transmission between modules. In some embodiments, the communication module 210 may include a receiver and a transmitter. In some embodiments, the communication module 210 may be a transceiver.

In some embodiments of the present disclosure, a unit or module with a function of receiving (obtaining) or transmitting information and/or data may be considered as the communication module 210 or a sub-module thereof. For example, the unit or module with a function of receiving (obtaining) or transmitting information and/or data may include an instruction receiving unit, a request receiving unit, an operation receiving unit, an information transmission unit, a transmission unit, a first acquisition unit, a second obtaining unit, a key obtaining unit, a wireless communication module, etc.

The safety module 220 may be configured to perform a data secure operation (e.g., a data encryption, a data decryption, a safety verification, etc.). In some embodiments, the safety module 220 may safely process information or data in some other modules (e.g., the communication module 210, the input/output module 260, etc.) of the control system 200. In some embodiments, the safety module 220 may safely process a data exchange of each component in the control scenario 100. For example, the safety module 220 may encrypt data transmitted in the network 120, making the data transmission more secure. In some embodiments, the safety module 220 may be configured to perform the safety verification based on safety control information and an operation input. For example, the safety module 220 may perform the safety verification on the operation information and/or the control command in the control scenario 100 based on the safety control information.

In some embodiments of the present disclosure, a unit or module with data encryption, data decryption or safety verification functions may be considered as the safety modules 220 or a sub-module thereof. For example, the unit or module with data encryption, data decryption, or safety verification functions may include an encryption unit, a decryption unit, a decryption module, a verification unit, a password verification unit, etc.

The processing module 230 may process data from various components (e.g., the communication module 210, the safety module 220, the control module 240, the storage module 250, the input/output module 260, the detection module 290, etc.) of the control system 200. For example, the processing module 230 may process safety authentication information from the safety module 220. As another example, the processing module 230 may process operation information or a control command from the input/output module 260. In some embodiments, the processed data may be stored in a memory or a hard disk. In some embodiments, the processing module 230 may transmit the processed data to one or more components in the control scenario 100 through the communication module 210 or the network 120. For example, the processing module 230 may send the determination result of the control command to the control module 240, and the control module 240 may execute subsequent operations or instructions based on the determination result. For example, when the determination result of the control command and/or operation information is successful, the control module 240 may send a command to the drive module 270 to control the smart device 130 to unlock. As another example, the processing module 230 may send monitoring results of the detection module 290 to the control module, and the control module may execute subsequent operations or instructions based on the detection results. For example, when the locking signal is detected, the control module may send a command to the drive module 270 to control the smart device 130 to lock. In some embodiments, the processing module 230 may be configured to establish a secure connection with the network. For example, the processing module 230 may establish a secure connection between the smart device 130 and the network 120. As another example, the processing module 230 may establish a secure connection between the server 110 and the network 120.

In some embodiments of the present disclosure, a unit or module with a data processing (e.g., a data generation, a result determination, etc.) function may be considered as the processing module 230 or a sub-module thereof. For example, the unit or module with the data processing function may include an unlocking judgment unit, a user determination unit, an information generation unit, a password acquisition unit, an identification obtaining unit, a key generation unit, a determination unit, a signal monitoring unit, a radio frequency identification module, etc.

The control module 240 may be configured to manage the data processing process and control an operation state of the device. The control module 240 may be associated with other modules in the control system 200. In some embodiments, the control module 240 may control an operation state of some other modules (e.g., the communication module 210, the safety module 220, the storage module 250, the input/output module 260, the drive module 270, etc.) in the control system 200. For example, control module 240 may control the drive module 270 to start or stop. As another example, the control module 240 may manage the data obtaining or transmission process in the communication module 210. As another example, the control module 240 may control the communication module 210 to transmit prompt information (e.g., the successful unlocking/locking, the failed unlocking/locking, the device abnormality, the alarm, etc.) to the input/output module 260 or the terminal device 140 to remind the user. In some embodiments, the control module 240 may be configured to perform corresponding operations based on the operation input when the safety authentication passes (e.g., the preset conditions are satisfied). For example, the control module 240 may control the smart device 130 to perform the unlocking operation after the user identity authentication is passed.

In some embodiments of the present disclosure, a module or unit with a function of managing a processing process of data and controlling a running state of the device may be considered as the control module 240 or a sub-module thereof. For example, the module or unit with a function of managing a processing process of data and controlling a running state of the device may include an unlocking control unit, a locking control unit, a system controller, etc.

The storage module 250 may be configured to store instructions and/or data of each module (e.g., the detection module 290, the processing module 230) of the control system 200. For example, the storage module 250 may store state information (e.g., unlocking time, locking time, user information corresponding to unlocking, etc.) of the smart device 130. In some embodiments, the storage module 250 may include a large capacity memory, a removable memory, a volatile read-write memory, a read-only memory (ROM), or the like, or any combination thereof. The exemplary large capacity memory may include a disk, an optical disk, a solid-state disk, etc. The exemplary removable memory may include a flash drive, a floppy disk, an optical disk, a memory card, a compressed disk, a magnetic tape, etc. The example volatile read-write memory may include a random-access memory (RAM). The exemplary RAM may include a dynamic random-access memory (DRAM), a double rate synchronous dynamic random-access memory (DDRS-DRAM), a static random-access memory (SRAM), a thyristor random-access accessor (T-RAM), a zero capacitance random-access accessor (Z-RAM), etc. The exemplary ROM may include a mask type read only memory (MROM), a programmable read only memory (PROM), an erasable programmable read only memory (EPROM), an electronically erasable programmable read only memory (EEPROM), a compressed disc read only memory (CD-ROM), a digital universal disk read only memory, etc. In some embodiments, the storage module 250 may be implemented on a cloud platform. Merely by way of example, the cloud platform may include a private cloud, a public cloud, a hybrid cloud, a community cloud, a distributed cloud, an internet cloud, a multi cloud, or the like, or any combination thereof.

The input/output module 260 may acquire, transmit, and send signals. Other modules in the control system 200 may be connected or communicated through the input/output module 260. The input/output module 260 may also connect or communicate with other components in the control scenario 100. In some embodiments, the input/output module 260 may be configured to obtain operation inputs (e.g., the control command and/or operation information). In some embodiments, the input/output module 260 may be a module located in a scenario where the smart device 130 is located for data input or output in the scenario where the smart device 130 is located. In some embodiments, a manner of data input may include, but be not limited to, a touch input, a scan input, a voice input, a close communication input, etc. For example, the manner of data input may include inputting data through a keyboard in the scenario. As another example, the manner of data input may include inputting data by scanning biometrics of the user. As another example, the manner of data input may include inputting data through a Bluetooth device etc. In some embodiments, the input/output module 260 may output data in the scenario through an output device (e.g., a display device, a microphone, etc.) of the smart device 130. For example, the display device of the smart device 130 may display information of whether the smart device 130 is successfully unlocked. In some embodiments, the input/output module 260 may also be a remote module for remote data input or output through the network 120. For example, the input/output module 260 may obtain data (e.g., the control command) from a remote device (e.g., a control device, a server 110) through the network 120, and transmit the obtained data to other modules of the control system 200 through the communication module 210. As another example, the input/output module 260 may output a control result of the control module 240 to a remote device (e.g., a control device). The input/output module 260 may be a wired interface (a USB interface, a serial communication port, a parallel communication interface), a wireless interface (Bluetooth, infrared, radio frequency identification (RFID), WLAN authentication and privacy infrastructure (WAPI), general packet radio service (GPRS), code division multiple access (CDMA), or the like, or any combination thereof. In some embodiments, the input/output module 260 may include VCC, GND, RS-232, RS-485 (e.g., RS485-A, RS485-B), a general network interface, or the like, or any combination thereof. In some embodiments, the input/output module 260 may transmit obtained operation information to the safety module 220 through the network 120. In some embodiments, the input/output module 260 may encode a transmitted signal using one or more encoding manners. The encoding manner(s) may include a phase encoding, a non-return to zero coding, a differential Manchester coding, or the like, or any combination thereof.

In some embodiments of the present disclosure, a module or unit with an input/output function may be considered as the input/output module 260 or a sub-module thereof. For example, the module or unit with an input/output function may include a touch control module, a fingerprint module, a voice module, a display module, etc.

The drive module 270 may be configured to drive the mechanical structure 280 to perform corresponding actions or operations. The drive module 270 may be operated under a control of the control module 240. In some embodiments, the drive module 270 may include one or more driving force sources or drive components. In some embodiments, the driving force source may include a drive motor driven by electricity (e.g., a motor driven by a driving circuit). In some embodiments, the drive motor may be a DC motor, an AC induction motor, a permanent magnet motor, a switched reluctance motor, or the like, or any combination thereof. In some embodiments, the drive module 270 may include one or more drive motors. The drive source of the drive module 270 may be configured according to the content of electrical signals (e.g., a motor in the drive module 270 may rotate at a specific speed per minute for a specific time through a drive circuit), and a rotation of the drive motor may drive a change of a state (e.g., unlocking, locking, starting) of the mechanical structure 280 connected with the drive motor.

The mechanical structure 280 may be configured to perform actions or operations. The mechanical structure 280 may be connected with the drive module 270 and perform actions or operations under a driving force of the drive module 270. For example, when the smart device 130 is applied to the lock device (e.g., the lock device 130-1), after an identity of the user is confirmed successfully, the drive module 270 may drive the mechanical structure 280 (e.g., a bolt) connected to the drive module 270 to complete the unlocking. As another example, when the smart device 130 is applied to the gate device (e.g., the gate device 130-3), after the identity of the user is confirmed successfully, the drive module 270 may drive the mechanical structure 280 (e.g., a roller shaft, a door) connected with the drive module 270 to provide a passage for the user. As another example, when the smart device 130 is applied to a traffic device (e.g., the traffic device 130-4), after the identity of the user is confirmed successfully, the drive module 270 may drive the mechanical structure 280 (e.g., the lock) connected to the drive module 270 to complete the unlocking. Alternatively, the drive module 270 may drive the mechanical structure 280 (e.g., an engine) connected with the drive module 270 to start. Specifically, the mechanical structure 280 may include mechanical components constituting the physical structure of the intelligent lock. The mechanical components may include a lock shell (e.g., a panel), a lock body (e.g., a lock cylinder, a bolt, a locking block, a detection bolt, etc.), a handle, etc. The mechanical structure 280 may also include any mechanical transmission component, such as a spring, a gear system, etc.

The detection module 290 may be configured to detect working states of other modules. The detection module 290 may include various sensors, which may include, but be not limited to, force sensors, infrared sensors, visible light sensors, displacement sensors, acoustic sensors, time sensors, etc. For example, the detection module 290 may include a lock body detection sensor (e.g., a detection bolt sensor, a locking block sensor, etc.), and the lock body detection sensor may detect a position of the bolt to determine whether the lock body is in an unlocked state or a locked state. As another example, the detection module 290 may detect the unlocking time or locking time of the intelligent lock and send the time information to the control module 240 to determine whether the automatic locking operation of the intelligent door lock is needed. In some embodiments, the detection module 290 may be connected with the mechanical structure 280 to detect the working state (e.g., the unlocking state, the locking state, etc.) of the mechanical structure 280. In some embodiments, the detection module 290 may be connected with the drive module 270 to detect the working state of the drive module 270 (e.g., whether the drive module 270 is started, whether the drive module 270 is abnormal, etc.). In some embodiments, the detection module 290 may send detection information to the control module 240 through the communication module 210. In some embodiments, the detection module 290 may also record the working state of the module to be detected (e.g., the bolt of the intelligent lock), and send the recorded information to other modules (e.g., the control module 240) through the communication module 210.

It should be noted that the control system 200 may also include other modules to maintain the operation of the control system 200. For example, the control system 200 may include a power supply module configured to provide power for other modules (e.g., the communication module 210, the safety module 220, the processing module 230, the control module 240, the storage module 250, the input/output module 260, the drive module 270, the mechanical structure 280, and the detection module 290) of the control system 200. For example, the power supply module may include an internal power supply such as a battery, a farad capacitor, a standby power supply, etc. As another example, the power supply module may include a power supply interface (an USB power supply interface). The power supply module may be temporarily charged by connecting the power supply interface with an external power supply (e.g., a user's portable electronic device (e.g., a mobile phone, a tablet, etc.), a charging bank, etc.) in an emergency (e.g., when the electric quantity of the power supply module is 0). In some embodiments, the power supply interface may be connected with a power control interface of one or more controlled devices (e.g., a wireless communication module, a touch control module, a fingerprint module, a power amplifier module, a frequency radio identification module, a voice module, a display module, etc.) of the smart device 130. When the controlled device is abnormal, a restart operation of the controlled device may be directly realized by connecting the power supply interface with the external power supply. For more description of controlling the restart operation of the controlled device, see FIGS. 45-48.

It should be noted that each module in the control system 200 may be applied to each component in the control scenario 100. The control system 200 may be implemented in the server 110, the control device, and the smart device 130. For example, the control module 240 may be a function module in the server 110, a function module in the control device, or a function module in the smart device 130. As another example, the safety module 220 may be implemented in the server 110, the control device, and the smart device 130. As another example, the processing module 230 may be implemented in the server 110, the control device, and the smart device 130.

It should be understood that the system and modules thereof shown in FIG. 2 may be implemented in various ways. For example, in some embodiments, the system and the modules thereof may be implemented by hardware, software, or a combination of software and hardware. The hardware part may be realized by a special logic. The software part may be stored in the memory and executed by an appropriate instruction execution system, such as a microprocessor or specially designed hardware. Those skilled in the art may understand that the above methods and systems may be implemented using computer executable instructions and/or included in processor control codes. For example, such codes may be provided on a carrier medium such as a disk, CD or DVD-ROM, a programmable memory such as a read-only memory (firmware), or a data carrier such as an optical or electronic signal carrier. The system and the modules thereof in one or more embodiments of the present disclosure may be implemented by not only hardware circuits of very-large-scale integration or gate arrays, semiconductors such as logic chips, transistors, etc., programmable hardware devices such as field programmable gate arrays, programmable logic devices, etc., but also software executed by various types of processors, or a combination (e.g., a firmware) of the hardware circuit and the software above.

It should be noted that the above description of the control system 200 and the modules thereof is only for the convenience of description and cannot limit one or more embodiments of the present disclosure to the scope of the embodiments. It may be understood that for those skilled in the art, after understanding the principle of the system, they may arbitrarily combine various modules, or form a subsystem to connect with other modules, or omit one or more modules without departing from this principle. In some embodiments, the communication module 210, the safety module 220, the processing module 230, the control module 240, the storage module 250 and the input/output module 260 disclosed in FIG. 2 may be different modules in a system, or a module that can realize functions of two or more of the above modules. For example, the communication module 210, the safety module 220 and the processing module 230 may be three modules, or one module may simultaneously have functions of the communication module 210, the safety module 220 and the processing module 230. For example, one processor may perform the functions of the safety module 220 and the processing module 230. In some embodiments, the storage module 250 may include a plurality of storage units, each of which is configured to store data of different modules. Such deformations are within the protection scope of one or more embodiments of the present disclosure.

Figure 3:
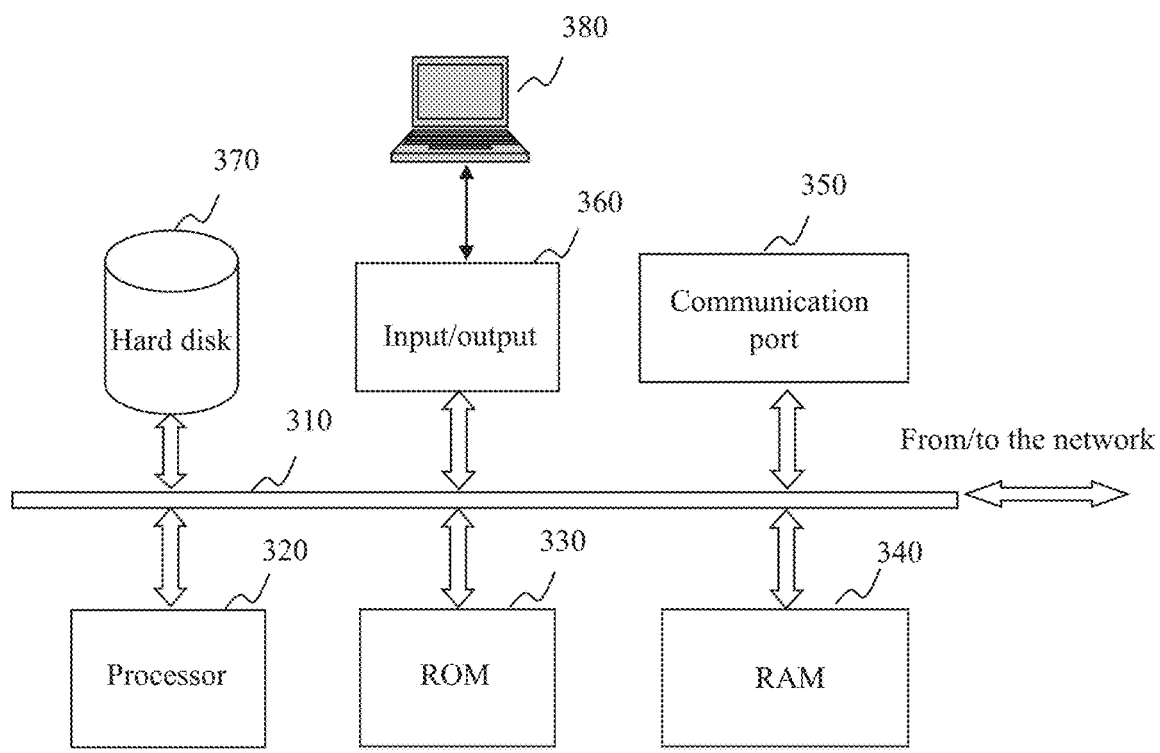
FIG. 3 is a schematic diagram of exemplary hardware and/or software of a computing device according to some embodiments of the present disclosure.

FIG. 3 is a schematic diagram illustrating exemplary hardware and/or software of a computing device according to some embodiments of the present disclosure. In some embodiments, the server 110, the smart device 130, and/or the terminal device 140 may be implemented on the computing device 300. As shown in FIG. 3, the computing device 300 may include an internal communication bus 310, a processor 320, a read-only memory 330, a random-access memory 340, a communication port 350, an input/output interface 360, a hard disk 370, and a user interface 380.

The internal communication bus 310 may realize data communication between components in the computing device 300. For example, the processor 320 may send data to other hardware such as memory or the input/output port 360 via the internal communication bus 310. In some embodiments, the internal communication bus 310 may be an industry standard (ISA) bus, an extended industry standard (EISA) bus, a video electronic standard (VESA) bus, an external component interconnection standard (PCI) bus, etc. In some embodiments, the internal communication bus 310 may be configured to connect various modules (e.g., the detection module 290, the processing module 230, the control module 240, the communication module 210, the input/output module 260, and the drive module 270) in the control system 200 shown in FIG. 2.

The processor 320 may execute calculation instructions (program codes) and perform functions of the control method described herein. The calculation instruction may include a program, an object, a component, a data structure, a process, a module, and a function (the function may refer to a specific function described in the present disclosure). For example, the processor 320 may process a control command obtained from the smart device 130 or/and the terminal device 140, and determine whether to perform corresponding operations (e.g., an unlocking operation, a locking operation, or a reminding operation) on the smart device 130 based on whether the control command satisfy a preset condition. In some embodiments, the processor 320 may include a microcontroller, a microprocessor, a reduced instruction set computer (RISC), an application specific integrated circuit (ASIC), an application specific instruction set processor (ASIP), a central processing unit (CPU), a graphics processing unit (GPU), a physical processing unit (PPU), a microcontroller unit, a digital signal processor (DSP), a field programmable gate array (FPGA), an advanced reduced instruction set computer (ARM), a programmable logic device, and any circuit and processor capable of performing one or more functions, or any combination thereof. For illustration purposes, the computing device 300 in FIG. 3 only describes one processor, but it should be noted that the computing device 300 in the present disclosure may also include multiple processors.

The memory of computing device 300 (e.g., the read-only memory (ROM) 330, the random-access memory (RAM) 340, the hard disk 370, etc.) may store data/information obtained from any other component of the control scenario 100. In some embodiments, a memory of computing device 300 may be positioned in the smart device 130 or the server 110. An exemplary ROM may include a mask ROM (MROM), a programmable ROM (PROM), an erasable programmable ROM (PEROM), an electrically erasable programmable ROM (EEPROM), an optical disc ROM (CD-ROM), a digital universal disc ROM, etc. An example RAM may include a dynamic RAM (DRAM), a double rate synchronous dynamic RAM (DDR SDRAM), a static RAM (SRAM), a thyristor RAM (T-RAM), a zero capacitance (Z-RAM), etc.

The input/output interface 360 may be configured to input or output signals, data, or information. In some embodiments, the input/output interface 360 may enable a user to interact with the control scenario 100. For example, the input/output interface 360 may include a communication module 210 to implement the communication and prompt functions of the control scenario 100. In some embodiments, the input/output interface 360 may include an input device and an output device. An exemplary input device may include a keyboard, a mouse, a touch screen, a microphone, or the like, or any combination thereof. The exemplary output device may include a display device, a speaker, a printer, a projector, or the like, or any combination thereof. An exemplary display device may include a liquid crystal display (LCD), a display based on a light emitting diode (LED), a flat panel display, a curved surface display, a television device, a cathode ray tube (CRT), or the like, or any combination thereof. The communication port 350 may be connected to a network for data communication. The connection may be a wired connection, a wireless connection, or a combination of both. The wired connection may include a cable, an optical cable, a telephone line, or the like, or any combination thereof. The wireless connection may include a Bluetooth, a Wi-Fi, a WiMax, a WLAN, a ZigBee, a mobile network (e.g., 3G, 4G or 5G, etc.), or the like, or any combination thereof. In some embodiments, the communication port 350 may be a standardized port, such as RS232, RS485, etc. In some embodiments, the communication port 350 may be a specially designed port.

The hard disk 370 may be configured to store information and data generated by or received from the server 110. For example, the hard disk 370 may store an operation input of the user. In some embodiments, the hard disk 370 may include a mechanical hard disk (HDD), a solid state hard disk (SSD), or a hybrid hard disk (HHD). In some embodiments, the hard disk 370 may be set in the server 110 or the smart device 130. The user interface 380 may realize an interaction and information exchange between the computing device 300 and the user. In some embodiments, the user interface 380 may be configured to present information and data generated by the control scenario 100 to users. For example, the user interface 380 may present operation detection results (e.g. a successful/failed unlocking, a successful/failed locking, a device anomaly, etc.) of the control scenario 100 to the user. In some embodiments, the user interface 380 may include a physical display, such as a display with a speaker, an LCD display, a LED display, an OLED display, an electronic ink display (E-Ink), etc.

Figure 4:
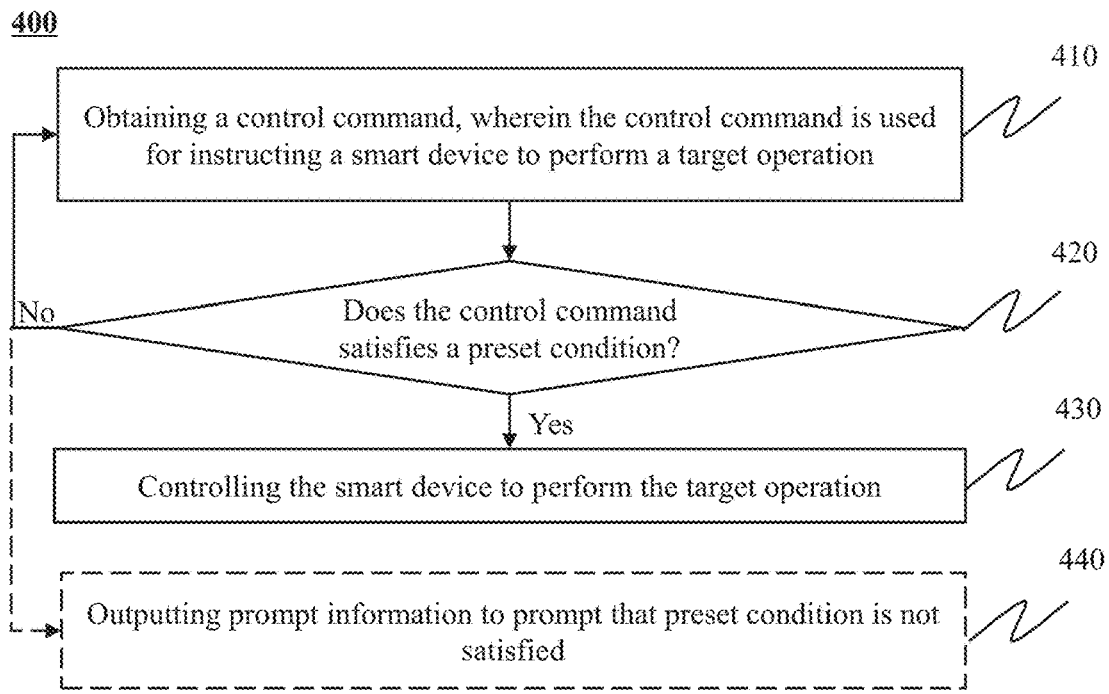
FIG. 4 is a flowchart of an exemplary process of a smart device control method according to some embodiments of the present disclosure.

FIG. 4 is a flowchart of an exemplary process of a smart device control method according to some embodiments of the present disclosure. In some embodiments, the process 400 may be executed by a processing logic, which may include hardware (e.g., a circuit, a special purpose logic, a programmable logic, a microcode, etc.), software (instructions running on a processing device to execute a hardware simulation), or the like, or any combination thereof. The process 400 may be implemented by the control system 200 shown in FIG. 2. For example, the process 400 may be stored in a storage device (e.g., the storage module 250) in a form of instructions, which are retrieved and/or executed by the modules shown in FIG. 2. The process 400 may be realized by the components of the application scenario 100 shown in FIG. 1. For example, the process 400 may be executed by the smart device 130 (e.g., one or more processors in the smart device 130) and/or the server 110.

As shown in FIG. 4, in some embodiments, the process 400 may include following operations.

In 410, a control command may be obtained. In some embodiments, operation 410 may be implemented by one or more modules (e.g., the communication module 210, the safety module 220, the processing module 230, and/or the input/output module 260) in the control system 200. In some embodiments, operation 410 may be implemented by the smart device 130 or the server 110.

In some embodiments, the control command may be used for instructing a smart device (e.g., the smart device 130) to perform a target operation. The target operation may include switching a state of the smart device. Taking the smart device 130 being an intelligent lock as an example, the target operation may include an unlocking operation, a locking operation, an unlocking detection operation (e.g., detecting whether the unlocking is successful), a locking detection operation (e.g., detecting whether the locking is successful), an abnormality detection operation, etc. Taking the smart device 130 being an electronic device as an example, the target operation may include power on, power off, entering the system, downloading software and other operation requests, logging in an application (e.g. an online payment platform), etc. Taking the smart device 130 being an intelligent appliance (e.g., a smart TV) as an example, the target operation may include a startup, a shutdown, a channel change, switching a mode (e.g., a sleep mode, a power saving mode, etc.), etc. For ease of understanding, the following description may take the smart device 130 including an intelligent lock (also referred to as an electronic lock) as an example, and the target operation being an unlocking operation as an example. It should be understood that the smart device 130 may be any other smart device except for the intelligent lock, and the target operation may also be other operations except for the unlocking operation, which is not limited herein. The intelligent lock described herein may be the intelligent lock described in FIG. 23, FIG. 35, FIG. 39-FIG. 42 and FIG. 45-FIG. 51, or an intelligent lock of any other structure, which is not limited herein.

In some embodiments, the intelligent lock may obtain an encryption instruction, and decrypt the encryption instruction to obtain the control command. The encryption instruction may include an encrypted control key. For example, when a user needs to unlock the intelligent lock, the user may input a control key (e.g., an offline password) through a control device (e.g., the terminal device 140 or a panel of the intelligent lock), and the control device may request encryption parameters (e.g., a challenge code) from the intelligent lock while receiving the control key. The control device may encrypt the control key and the encryption parameters to obtain the encryption instruction through an encryption algorithm (e.g. a symmetric encryption algorithm or an asymmetric encryption algorithm), and transmit the encryption instruction to the intelligent lock, so that the intelligent lock may use a decryption algorithm to decrypt the encryption instruction to obtain the control command. As another example, the terminal device 140 and the intelligent lock may have agreed on a public key and a private key in advance. The terminal device 140 may encrypt the control key and/or the encryption parameters using a stored private key to obtain the encryption instruction. The intelligent lock may use the stored private key to decrypt the encryption instruction to obtain the control command. As another example, the terminal device 140 (e.g., an NFC card) may generate a session key (e.g., a first session key) according to a private key in a public-private key pair generated by the terminal device and a public-private key pair generated by the intelligent lock, encrypt the control key through the first session key, and send the encryption instruction and a public key in the public-private key pair generated by the terminal device 140 to the intelligent lock. The intelligent lock may generate a session key (e.g., a second session key) according to a private key in the public-private key pair generated by the intelligent lock and the obtained public key, and decrypt the encryption instruction through the second session key to obtain the control command. As another example, the user may send a control key (e.g., an online password) to the server 110 through the terminal device 140. After receiving the control key, the server 110 may encrypt the control key to obtain the encryption instruction and transmit the encryption instruction to the intelligent lock, and the intelligent lock may decrypt the encryption instruction to obtain the control command. In this case, the intelligent lock may need to be online (e.g., the intelligent lock may communicate with the server 110). The control key described herein may include multiple types, such as a character (e.g., number, word, symbol, etc.) type, a voice type (e.g., a voice password), a biometric (e.g., fingerprint, face image, iris information, etc.) type, a graphic password type, a Bluetooth unlocking password or an NFC password type, etc. According to a type of the control key, a way for the user to input the control key may be not limited to a keyboard, a voice acquisition device, a biometric acquisition device, an image acquisition device, a Bluetooth device, an NFC device, etc. More description of obtaining the control command may be found in the description of operation 2401 in FIG. 24.

In some embodiments, the control key may include an offline password. For example, the offline password may be an offline password value corresponding to a unique password identifier, so that when the offline password value is acquired and used by the terminal device 140, the password identifier corresponding to the offline password value may correspond to a user corresponding to the terminal device 140, so as to distinguish the user using the offline password value. For example, the intelligent lock and/or the server 110 may generate multiple offline password values based on a same offline password generation algorithm, respectively. The user may transmit the password acquisition request to the server 110 through the terminal device 140. The server 110 may determine a target password value from the multiple offline password values and transmit the target password value to the terminal device 140. The user may input the target password value as the control key into the intelligent lock to instruct the intelligent lock to perform a corresponding operation. For more descriptions of the offline password values and corresponding password identifiers, see the descriptions in FIG. 13 through 15.

In some embodiments, the control key may be generated by the intelligent lock through an encryption and decryption algorithm. For example, before obtaining the encryption instruction, the terminal device 140 may obtain a public key in a public private key pair generated by the intelligent lock, generate a first session key based on the acquired public key and a private key in a public private key pair generated by the terminal device 140, and encrypt a signature, first data and a certificate of the terminal device 140 through the first session key to obtain verification data. The terminal device 140 may send the verification data and a public key in the public-private key pair generated by the terminal device 140 to the intelligent lock. The intelligent lock may generate a second session key based on the private key in the public-private key pair generated by the intelligent lock and the obtained public key, and decrypt the verification data through the second session key to obtain the signature, the first data (e.g., a random number) and the certificate of the terminal device 140. The intelligent lock may verify the signature and certificate obtained by decryption to obtain a verification result. When the verification result indicates that the signature and certificate are legal, the intelligent lock may generate the control key, and encrypt the control key and the first data by the session key to obtain control data, and send the control data to the terminal device 140. The terminal device 140 may decrypt the control data through the first session key to obtain the control key and second data, compare the first data with the second data. When the first data is consistent with the second data, the terminal device 140 may perform an operation corresponding to the control key on the intelligent lock through a decrypted control key. The safety may be improved by encrypting and decrypting the control key. For more description of the encryption and decryption of the control key by the session key, refer to the descriptions in FIG. 6 through FIG. 8.

In 420, whether the control command satisfies a preset condition may be determined. In some embodiments, operation 420 may be implemented by the processing module 230. In some embodiments, operation 420 may be implemented by the smart device 130 or the server 110.

In some embodiments, according to factors of different types of control keys, different encryption manners, different target operations, etc., there may be different preset conditions. A process of determining the preset condition may include a process of determining whether an identity authentication is passed. For example, when the encryption instruction is obtained by encrypting the control key and the encryption parameters, the preset condition may be that the control key is a preset key and the encryption parameters are preset encryption parameters. That is, when the control key is the preset key and the encryption parameters are the preset encryption parameters, it may be determined that the control command satisfies the preset condition, that is, the identity authentication is passed. As another example, when the control key is the offline password value corresponding to a unique password identifier, the preset condition may be whether there is a target password value matching the offline password value corresponding to the control key in a first password pool of the intelligent lock, and the target password value is used for a first time. That is, when there is a matching target password value in the first password pool and the target password value is used for the first time, it may be determined that the control command satisfies the preset condition, that is, the identity authentication is passed. As another example, when the control key is an online password (e.g., an online password value), the preset condition may be that the online password value satisfies use restrictions of the online password value. The use restrictions of the online password value may include a count of uses (e.g., the online password value may expire after the count of uses is exceeded), an effective time period (e.g., the online password value may expire after the effective time period is exceeded), and whether the online password value is frozen (e.g., a frozen online password value may expire). In some embodiments, taking the target operation being the unlocking operation as an example, the preset condition may include an unlocking condition. The unlocking condition may also include whether the intelligent lock is in the locked state. That is, when the intelligent lock is locked, it may be determined that the control command satisfies the preset condition. Similarly, taking the target operation being the locking operation as an example, the preset condition may include a locking condition. The locking condition may also include that the intelligent lock is in the unlocked state (e.g., through one or more lock body sensors). That is, when the intelligent lock is in the unlocked state, it may be determined that the control command satisfies the preset condition. For more descriptions of the preset condition (e.g., the unlocking condition) and the identity authentication, refer to the descriptions of operation 2402 in FIG. 24 through FIG. 31 and FIG. 45.

In some embodiments, when the control command satisfies the preset condition, operation 430 may be performed; when the control command does not satisfy the preset condition, operation 410 or operation 440 may be performed.

In 430, the smart device may be controlled to perform the target operation. In some embodiments, operation 430 may be implemented by the control module 240. In some embodiments, operation 430 may be implemented by the smart device 130 and/or the server 110.

In some embodiments, when the preset condition is satisfied, the control module 240 may control the smart device 130 to perform the target operation (e.g., the unlocking operation, etc.). In some embodiments, one or more subsequent operations may be performed after operation 430. For example, the target operation result may be detected, and the smart device 130 may be controlled to perform one or more subsequent operations based on a detection result of the target operation. Taking the unlocking operation of the intelligent lock as an example, the intelligent lock may detect a completion of the unlocking operation, record, and report information (e.g., unlocking time, whether the unlocking is successful, information of the user that sends a control command of the unlocking operation, etc.) related to the unlocking operation, and the intelligent lock may also perform an automatic locking operation after the unlocking is successful. More description of one or more subsequent steps and/or subsequent operations may be found in FIG. 24 through FIG. 31.

In 440, prompt information may be output to prompt that the preset condition is not satisfied. In some embodiments, operation 440 may be implemented by the input/output module 260. In some embodiments, operation 440 may be implemented by the smart device 130 and/or the server 110.

In some embodiments, the prompt information may be presented to the user through the smart device 130 (e.g., the panel of the intelligent lock) and/or the terminal device 140 related to the user in a form of a voice, a text, a picture, etc. For example, the prompt information may be a voice or a text that prompts a password error, or the prompt information may be a light prompt (e.g., a flash of a light of a specific color). In some embodiments, according to the setting of the user on the smart device 130, when the preset condition is not satisfied, a camera device (e.g., a camera or a smart cat's eye) that links with the intelligent lock may be called to record a scenario situation in real time. The smart device 130 may monitor whether there is any abnormal behavior (e.g., possible stealing acts such as deliberately covering the face, lingering for a long time, marking at the door, or malicious acts such as scribbling, violent smashing, and crowing) at the scenario based on images within an imaging range of the camera device. After detecting the abnormal behavior, the smart device 130 may record time of the abnormal behavior, save a relevant image, and upload the time and the relevant image to the server 110 to notify the abnormal situation to a manager of the smart device 130, so that the manager may take appropriate countermeasures remotely.

It should be noted that the above description of the process 400 is only for example and description, and does not limit the scope of the present disclosure. For those skilled in the art, various modifications and changes may be made to the process 400 under a guidance of the present disclosure. However, these amendments and changes are still within the scope of the present disclosure. In some embodiments, operation 440 may be omitted, that is, when it is determined that the preset condition is not satisfied, the prompt information may not be sent.

At present, a safety device may be controlled by the control key. The control key may be generated by the safety device and sent to a terminal device that uses the safety device. For example, the terminal device may be an electronic key or an access card. In this way, when a user controls the safety device through the terminal device, the control key may be sent to the safety device to achieve controlling the safety device through the control key.

The control key may be encrypted between the safety device and the terminal device through an asymmetric encryption algorithm, but the asymmetric encryption algorithm may cause a public key that encrypts the control key to be made public, which reduces the safety.

In the embodiments of the present disclosure, the inventor of the present disclosure has found, through research, that encryption of the control key through an asymmetric encryption algorithm will lead to the public key disclosure, and other users may forge to encrypt the control key using the public key, thereby reducing the safety. The inventor further studies and finds that the existing technology solves this problem by introducing certificates. The technical solution adopted by the present disclosure to solve this problem is described as follows.

A public-private key pair may be generated by the terminal device and the safety device. A session key may be generated on a terminal device side and a safety device side according to an obtained public key and a private key in a public-private key pair generated by itself. At the terminal device side, verification data may be obtained through the session key and control data may be decrypted through the session key to obtain a control key; at the safety device side, the verification data may be decrypted through the session key and the control key may be encrypted through the session key to generate the control data, which may realize the encryption and decryption of the control key through the session key. Although public keys on the terminal device side and the safety device side may be made public, the session key used to encrypt and decrypt the control key may be generated according to an own private key and a public key of the other party, so even when the public key is made public, a probability of obtaining the session key may be small, thus improving the safety while realizing the encryption and decryption of the control key through the session key.

The safety device may include a smart device (e.g., the smart device 130). For example, the safety device may include the intelligent lock, an access control device, a device that need to be authenticated, etc. The terminal device may include an access card, an electronic key, an identity authentication input device, etc. The access card and the electronic key may communicate with the safety device based on an NFC (near field communication) technology. For example, the terminal device may be an access card based on the NFC technology, and the safety device may be an intelligent lock. The access card based on the NFC technology may apply a method provided by the embodiments of the present disclosure to process a control key to unlock the intelligent lock.

In some embodiments, the safety device may be the electronic lock provided by some embodiments of the present disclosure (FIG. 23 through FIG. 39) and the intelligent lock provided by other embodiments of the present disclosure (FIG. 47 through FIG. 51). In some embodiments, the electronic lock provided in some embodiments of the present disclosure (e.g., FIG. 23 through FIG. 38) and the intelligent lock provided in other embodiments of the present disclosure (e.g., FIG. 47 through FIG. 51) may be unlocked by a method for processing the control key provided in the embodiments of the present disclosure.

In some embodiments, the method for processing the control key provided by the embodiments of the present disclosure may also be used in a process of password recognition (including an online password generation method and an offline password generation method).

The following is a detailed description of the method for processing the control key provided by the embodiments of the present disclosure.

Figure 5:
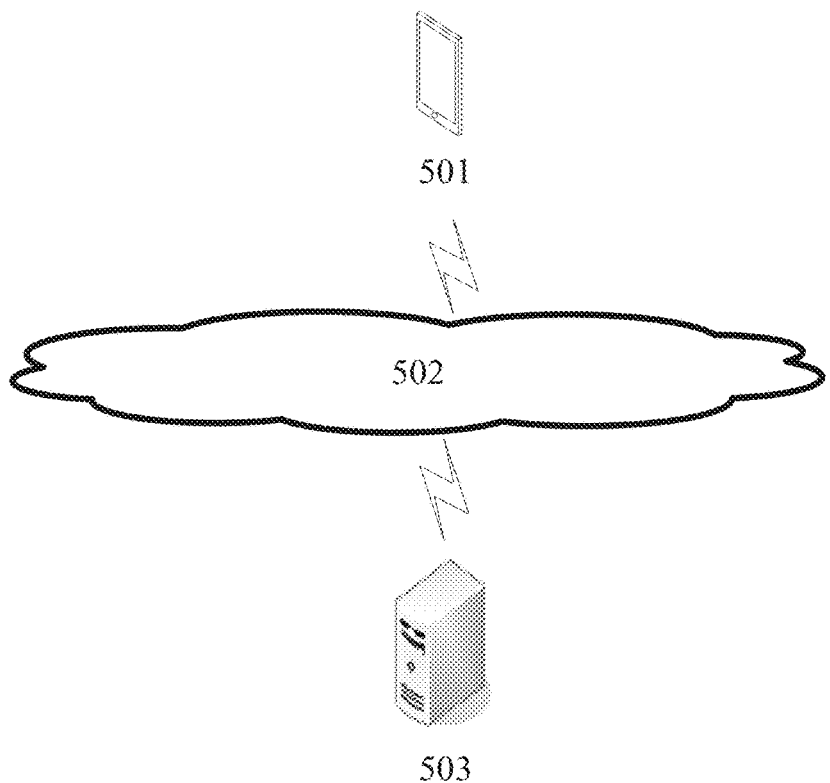
FIG. 5 is schematic diagram of an exemplary system architecture according to some embodiments of the present disclosure.

FIG. 5 is a schematic diagram illustrating an exemplary system architecture 500 that can be applied to a method or apparatus for processing a control key according to some embodiments of the present disclosure. In some embodiments, the system architecture 500 may be an embodiment of the scenario as shown in FIG. 1.

As shown in FIG. 5, the system architecture 500 may include a terminal device 501, a network 502, and a processor 503 of a security device. The network 502 may be configured to provide a medium of a communication link between the terminal device 501 and the processor 503 of the security device. The network 502 may include various wireless connection types, such as Bluetooth, near-field communication, or radio frequency communication, etc.

A user may use the terminal device 501 to interact with the processor 503 of the security device via the network 502 to receive or send information, etc. The terminal device 501 may be installed with various client applications, such as a lock control application, etc.

The terminal device 501 may be hardware or software. When the terminal device 501 is hardware, the terminal device may include a variety of electronic devices, including but not limited to smartphones, tablets, wearable devices, augmented reality (AR)/virtual reality (VR) devices, electronic keys, access cards, and gateways, and other terminal devices, such as NFC technology-based access cards and electronic keys. When the terminal device 501 is software, the terminal device 501 may be installed in the electronic devices listed above. The terminal device 501 may be implemented as multiple software or software modules, or as a single software or software module. Embodiments of the present disclosure do not limit the specific type of terminal device in any way. For more description about the terminal device 501, please refer to the relevant description of the terminal device 130 in FIG. 1.

The processor 503 of the security device may, in response to receiving a public key and verification data from the terminal device 501, verify the verification data based on a session key generated from the public key, obtain a verification result, and when the verification result indicates that it is legitimate, generate a control key and send the control key encrypted by the session key to the terminal device. For more description about the processor 503 of the security device, please refer to the control system 200 in FIG. 2, the processor 320 in FIG. 3, the master chip in FIGS. 39-40, and the system controller FIGS. 45-47 and relevant descriptions thereof.

It should be noted that the method for processing a control key provided by embodiments of the present disclosure may be capable of being performed by the terminal device 501 and the processor 503 of the security device, respectively. Methods for processing the control key performed by the terminal device 501 and the processor 503 of the security device may be slightly different, which may be described in detail subsequently. Accordingly, the device for processing the control key is provided in the terminal device 501 and the processor 503 of the security device, respectively may be slightly different devices for processing the control key provided in the terminal device 501 and the processor 503 of the security device, which may describe in detail subsequently.

It should be understood that the number of processors in the terminal devices, the network, and the security devices in FIG. 5 may be merely schematic. There may be any number of processors in the terminal devices, networks, and security devices as needed by the implementation.

FIG. 6 is a flowchart illustrates a process 600 of a method for processing a control key according to some embodiments of the present disclosure. The method for processing a control key may be applied to a terminal device (e.g., the terminal device 501). The process 600 includes the following operations.

In 601, the terminal device may obtain a public key of a public-private key pair generated by a security device, and generate a session key based on a private key of the public-private key pair generated by the terminal device and the obtained public key.

In 602, the terminal device may encrypt a signature of the terminal device, first data of the terminal device, and a certificate of the terminal device by the session key to obtain verification data. The first data may be data used in the terminal device to perform a verification, one representation of which may be a random number generated by the terminal device. The first data may be used to verify control data returned by the security device, and the verification process may be described in the following.

In 603, the terminal device may send the authentication data and a public key of the public-private key pair generated by the terminal device to the security device.

In 604, the terminal device may obtain the control data generated by the security device, decrypt the control data by the session key, and obtain the control key and second data corresponding to the control data.

In 605, the terminal device may determine, based on the second data corresponding to the control data, whether the control key is used to perform control of the security device corresponding to the control key (e.g., to perform a target operation corresponding to the control key). For example, when the security device is an intelligent lock and the control key directs to perform an unlocking operation on the intelligent lock, the terminal device may determine whether the control key is used to unlock the intelligent lock based on the second data corresponding to the control data. When the security device is a cell phone that needs identification, and the control key directs to switch the screen of the cell phone from a first state to a second state (e.g., opening the screen), the terminal device may determine whether the control key is used to switch the screen of the cell phone according to the second data corresponding to the control data.

In some embodiments, the second data, which is also data in the terminal device for performing verification, may also be represented as a random number, but unlike the random number as the first data. The random number as the second data may be obtained by decrypting the control data and associated with the control data, while the random number as the first data may be not associated with other data.

FIG. 7 illustrates a process 700 of a method for processing a control key according to some embodiments of the present disclosure. The method for processing a control key may be applied to a processor of a security device (e.g., the processor 502, etc.). The process 700 may include the following operations.

In 701, the processor of the security device may obtain verification data generated by a terminal device and a public key of a public-private key pair generated by the terminal device, and generate a session key based on a private key of a public-private key pair generated by the security device and the obtained public key.

In 702, the processor of the security device may decrypt the verification data by the session key, obtain a signature of the terminal device, first data of the terminal device, and a certificate of the terminal device, and verify the signature of the terminal device and the certificate of the terminal device to obtain a verification result.

In 703, the processor of the security device may generate a control key when the verification result indicates that the signature of the terminal device and the certificate of the terminal device are legitimate, and encrypt the control key and the first data of the terminal device by the session key to obtain control data.

In 704, the processor of the security device may send the control data to the terminal device.

Figure 8:
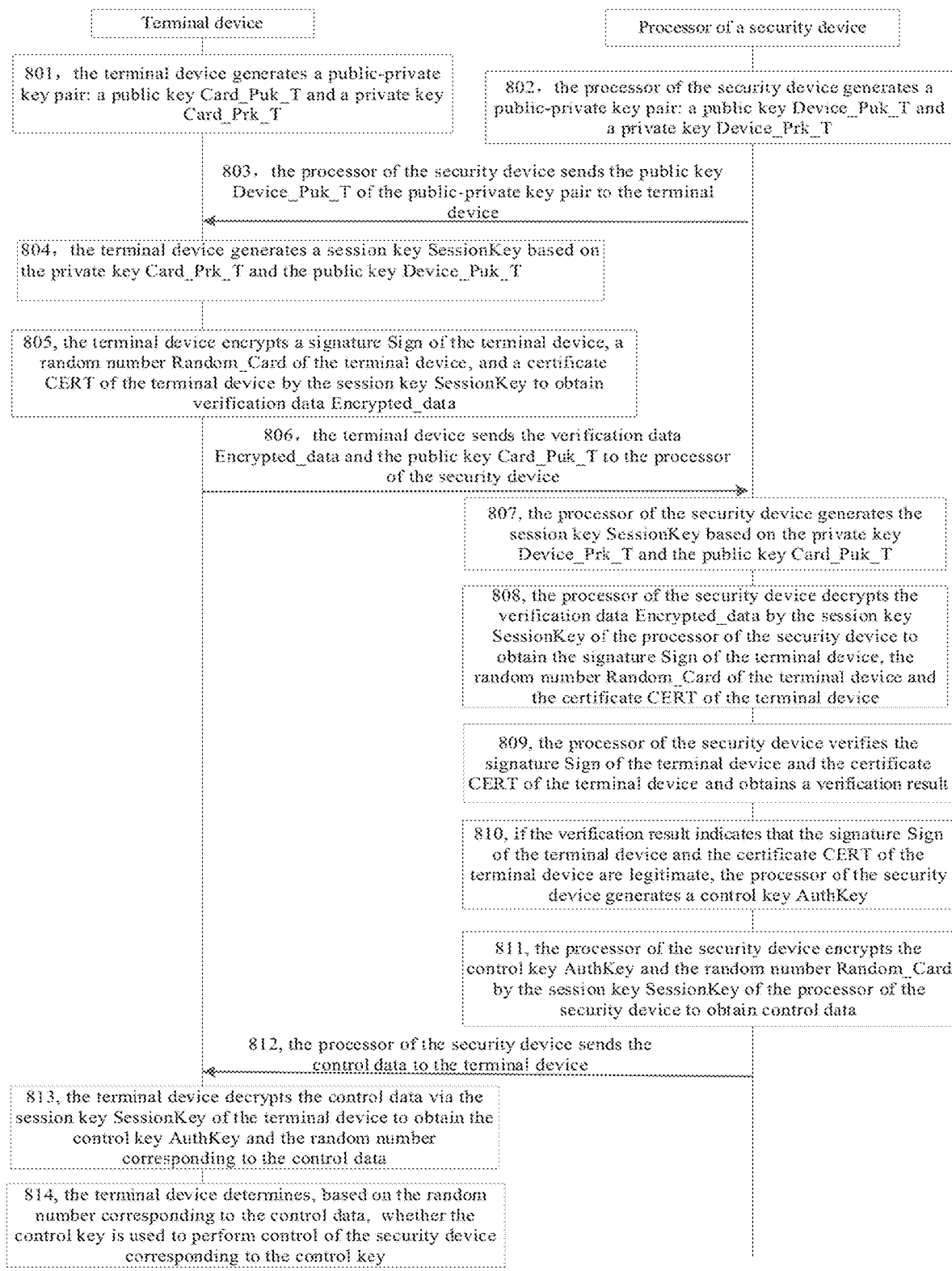
FIG. 8 is a sequence diagram of an exemplary process of a method for processing a control key according to some embodiments of the present disclosure.

In order to better understand the above method for processing a control key provided by embodiments of the present disclosure, FIG. 8 illustrates the above method for processing a control key in terms of the interaction between the terminal device and the processor of the security device, and FIG. 8 may include the following operations.

In 801, the terminal device may generate a public-private key pair: a public key Card_Puk_T and a private key Card_Prk_T. The public key Card_Puk_T may be made public and the private key Card_Prk_T may be reserved for use by the terminal device. The terminal device may generate the public-private key pair by an existing algorithm, such as an ECC (elliptic cryptography algorithm), and the public-private key pair may be a temporary public-private key pair generated by the terminal device through ECC.

The temporary public-private key pair may indicate that the public-private key pair generated by the terminal device is time-dependent and is valid for a certain period of time. For example, the public-private key pair may be valid for a certain period of time (e.g., a preset valid time) starting from the time the terminal device generates the public-private key pair. When the time from the time the terminal device generates the public-private key pair exceeds the certain period of time, the terminal device may generate a temporary public-private key pair again and the previously generated public-private key pair may be invalid (i.e., invalidated).

In 802, the processor of the security device may generate a public-private key pair: a public key Device_Puk_T and a private key Device_Prk_T. Similarly, for the processor of the security device, the public key Device_Puk_T may be made public and the private key Device_Prk_T may be reserved for use by the processor of the security device. The processor of the security device may generate the public-private key pair by existing algorithms, which is not described herein. The public-private key pair generated by the processor of the security device may also be a temporary public-private key pair, as described in 801, which is not described herein.

In 803, the processor of the security device may send the public key Device_Puk_T of the public-private key pair to the terminal device.

In some embodiments, the processor of the security device and the terminal device may follow a mutually agreed protocol for transmitting data when interacting with each other, so the processor of the security device may transmit the public key Device_Puk_T to the terminal device using the mutually agreed protocol for transmitting the public key Device_Puk_T. For example, the processor of the security device and the terminal device may follow a near-field communication protocol. When the security device sends the public key Device_Puk_T to the terminal device, the processor of the security device may send the public key Device_Puk_T under an encapsulate need of the near-field communication protocol.

It should be noted that operations 801 and 802 may be executed at the same time. Alternatively, operation 802 may be executed first and then operation 801 may be executed, and in this order of execution, operations 803 and 801 may be executed at the same time.

In 804, the terminal device may generate a session key SessionKey based on the private key Card_Prk_T and the public key Device_Puk_T.

In 805, the terminal device may encrypt a signature Sign of the terminal device, a random number Random_Card of the terminal device, and a certificate CERT of the terminal device by the session key SessionKey to obtain verification data Encrypted_data. The random number Random_Card may be a way of the first data.

From operations 804 and 805, it is clear that although the terminal device generates the public key Card_Puk_T and the private key Card_Prk_T, the terminal device may encrypt using the session key SessionKey generated from the private key Card_Prk_T and the public key Device_Puk_T generated by the processor of the security device, so that even when the public keys generated by the terminal device and the processor of the security device are public, the session key may also have very low chances of being obtained. Step back even when other devices obtain the private keys generated by the terminal device and the processor of the security device, the generation of session keys SessionKey may be generated in many ways, and other devices may need to try in turn to generate the session key SessionKey. Therefore, the session key SessionKey that is used by the terminal device for encryption may have very low chances of being obtained.

For example, the terminal device may generate the session key SessionKey by, but not limited to, any one of an ECDH (Elliptic Curves Diffie-Hellman, Key Negotiation) algorithm and a message digest algorithm. For example, the terminal device may generate the session key SessionKey by an HAMC (Hash Message Authentication Code) algorithm to generate the session key SessionKey.

In some embodiments, the certificate CERT of the terminal device may be written to the terminal device when the terminal device is in factory, and the certificate CERT of the terminal device may be issued by a certificate center authority and unique (the certificate CERT of different terminal devices being different); the signature Sign of the terminal device and the random number Random_Card of the terminal device may be generated by the terminal device and used to assist for identification.

After the terminal device obtains the certificate, the signature and the random number, the terminal device may use a symmetric encryption algorithm for encryption. The reason why the symmetric encryption algorithm is used may be that the private key of the public-private key pair generated by the terminal device is used to generate the session key, and the encryption is performed by the session key, rather than the private key is directly used for encryption, which means that the terminal device and the processor of the security device do not use the public-private key pair generated by the terminal device for encryption and decryption, indicating that asymmetric encryption algorithms are not applicable to the session key. Therefore, the terminal device in this embodiment may use symmetric encryption algorithms for encryption. For example, the terminal device may use, but not limited to, an AES (Advanced Encryption Standard) algorithm and a DES (Data Encryption Standard) algorithm for encryption, e.g., verification data Encrypted_data=AES (SessionKey, Sign+CERT+Random_Card).

Compared to the existing asymmetric encryption algorithm, the number of bits of the session key SessionKey used by the terminal device when the terminal device uses the symmetric encryption algorithm may be smaller than the key used by the terminal device when the terminal device uses the asymmetric encryption algorithm. In this way, the terminal device can use fewer resources when calculating and saving the session key SessionKey, making the present disclosure applicable to the resource-limited terminal device.

In 806, the terminal device may send the verification data Encrypted_data and the public key Card_Puk_T to the processor of the security device. Similarly, the terminal device may send the verification data Encrypted_data and the public key Card_Puk_T to the processor of the security device following the agreed protocol.

In 807, after receiving the verification data Encrypted_data and the public key Card_Puk_T, the processor of the security device may generate the session key SessionKey based on the private key Device_Prk_T and the public key Card_Puk_T.

In some embodiments, the processor of the security device may generate the session key SessionKey via an existing key generation algorithm. For example, the processor of the security device may generate the session key SessionKey via, but not limited to, any of the ECDH algorithm and the message digest algorithm. For instance, the processor of the security device may generate the session key SessionKey via the HAMC algorithm.

In 808, the processor of the security device may decrypt the verification data Encrypted_data by the session key SessionKey of the processor of the security device to obtain the signature Sign of the terminal device, the random number Random_Card of the terminal device, and the certificate CERT of the terminal device.

In some embodiments, according to the algorithm which the terminal device uses for encrypting the signature Sign of the terminal device, the random number Random_Card of the terminal device, and the certificate CERT of the terminal device, the processor of the security device may use the same algorithm for decrypting the verification data Encrypted_data. From the above analysis, it can be seen that in this embodiment, the terminal device uses the symmetric encryption algorithm for encryption, and the corresponding processor of the security device uses the symmetric encryption algorithm for decryption. When the terminal device uses the AES algorithm for encryption, the processor of the security device may use the AES algorithm for decryption, e.g., Sign+CERT+Random_Card=AES (SessionKey, Encrypted_data).

Similarly, for the security device, although the processor of the security device generates the public key Device_Puk_T and the private key Device_Prk_T, the processor of the security device may encrypt using a session key SessionKey generated from the private key Device_Prk_T and the public key Card_Puk_T generated by the terminal device, so that even when the public keys generated by the terminal device and the processor of the security device are public, chances of the session key being obtained remain very low. Taking a step back, even when other devices obtain the private keys generated by the terminal device and the processor of the security device, the session key SessionKey may be generated in many ways, and other devices may need to try in turn to generate the session key SessionKey. Therefore, the chances of obtaining the session key SessionKey that the processor of the security device uses to encrypt may be very low.

In 809, the processor of the security device may verify the signature Sign of the terminal device and the certificate CERT of the terminal device and obtain a verification result to improve security by double verification of the signature Sign of the terminal device and the certificate CERT of the terminal device.

In 810, when the verification result indicates that the signature Sign of the terminal device and the certificate CERT of the terminal device are legitimate, the processor of the security device may generate a control key AuthKey.

When the verification result indicates that the signature Sign of the terminal device and the certificate CERT of the terminal device are legitimate, it means that the signature Sign of the terminal device and the certificate CERT of the terminal device obtained by the processor of the security device through decryption belong to the terminal device, at which point the processor of the security device may generate the control key AuthKey.

In some embodiments, one way of generating the control key AuthKey by the processor of the security device may be obtaining an identification CID of the terminal device and a true random number MK of the processor of the security device, and generating the control key AuthKey based on the identification CID of the terminal device and the true random number MK of the processor of the security device, e.g., generating the control key AuthKey by an existing key generation algorithm, e.g., control key AuthKey=HAMC (MK, CID).

It should be noted that: the processor of the security device may have only one true random number MK, and different security devices may have different true random numbers MK. For the above-mentioned terminal device, the terminal device may have more than one random number Random_Card, and the random numbers Random_Card between different terminal devices may be the same.

In 811, the processor of the security device may encrypt the control key AuthKey and the random number Random_Card of the terminal device by the session key SessionKey of the processor of the security device to obtain control data.

In some embodiments, the processor of the security device may also use a symmetric encryption algorithm to encrypt the control key AuthKey and the random number Random_Card of the terminal device, for why the processor of the security device may use the symmetric encryption algorithm, please refer to the above description. For example, the control data=AES (SessionKey, AuthKey+Random_Card).

In 812, the processor of the security device may send the control data to the terminal device.

In 813, the terminal device may decrypt the control data via the session key SessionKey of the terminal device to obtain the control key AuthKey and the random number corresponding to the control data. The random number corresponding to the control data may be as a way of the second data.

Similarly, according to the algorithm used by the processor of the security device to encrypt the control data, the terminal device may use the same algorithm to decrypt. For example, the processor of the security device may use the AES algorithm to encrypt, control data=AES (SessionKey, AuthKey+Random_Card), the terminal device may also use the AES algorithm to decrypt, AuthKey+Random_Card=AES (SessionKey, control data). It should be noted that the SessionKey used by the terminal device for decryption may be the SessionKey of the terminal device.

In 814, the terminal device may determine, based on the random number corresponding to the control data, whether the control key is used to perform control of the security device corresponding to the control key. One way for the terminal device to determine whether the control key is used to perform control of the security device corresponding to the control key may include comparing the second data corresponding to the control data with the first data generated by the terminal device, e.g., comparing the random number corresponding to the control data with the random number generated by the terminal device. When the two data is consistent, the second data corresponding to the control data may be the first data generated by the terminal device, which means that the terminal device can control the security device with the control key corresponding to the control key. In addition, the method provided in the present disclosure for processing a control key may also include: when the second data corresponding to the control data is the same as the first data of the terminal device, storing the control key.

When the terminal device determines that the control key is used to control the security device corresponding to the control key, the terminal device may further send a success instruction to the security device. The success instruction may direct that the control key is valid/the terminal device is able to employ the control key to control the security device corresponding to the control key. The security device may store an identification of the terminal device, e.g., adding the identification of the terminal device to a whitelist, such that after the terminal device subsequently triggers a control operation corresponding to the control key against the security device, the security device may perform the control operation corresponding to the control key.

When the terminal device determines that the control key cannot be used to control the security device corresponding to the control key, the terminal device may discard the control key, at which point the terminal device may send a failure instruction to the security device, and the security device may add the identification of the terminal device to a blacklist.

In some embodiments, an optional implementation of the above-mentioned terminal device generating a session key may include that the terminal device generates a shared key based on the private key in the public-private key pair generated by the terminal device and the obtained public key; and the terminal device generates a session key based on the shared key and the identification of the terminal device. The key generation algorithm used by the terminal device to generate the shared key and the session key may be not limited in this embodiment, for example, an optional implementation of the terminal device generating the shared key may include that: the shared key of the terminal device ShareKey=ECDH (Device_Puk_T, Card_Prk_T); the session key of the terminal device SessionKey=HMAC (ShareKey+CID).

Similarly, for the security device, the processor of the security device may generate the session key in a similar manner to the terminal device. A difference may be that the processor of the security device and the terminal device generate the session keys based on different data. For example, an optional implementation of the processor of the security device generating the session key may be as follows.

The processor of the security device may generate a shared key based on the private key in the public-private key pair generated by the processor of the security device and the obtained public key. The processor of the security device may generate a session key based on the shared key and the identification of the terminal device. The identification of the terminal device may be obtained by a device selection request, i.e., the processor of the security device may send a device selection request to the terminal device, and the terminal device may send back the identification of the terminal device to the processor of the security device.

From the above process of generating a session key by the terminal device and generating a session key by the processor of the security device, it can be seen that the terminal device and the processor of the security device may generate a session key based on the private key generated by themselves, the public key generated by the other side and the identification of the terminal device. The key generation algorithm used by the terminal device and the processor of the security device to generate the session key may be not limited in the present disclosure.

In some embodiments, an optional implementation of the terminal device generating a signature may include that the terminal device generates a signature based on a public-private key pair generated by the terminal device and the identification of the terminal device. An optional way may that: the terminal device generates a hash value, such as a hash value HASH=SHA256 (Card_Puk_T+CID), based on the public key in the public-private key pair generated by the terminal device and the identification of the terminal device, SHA being a secure hashing algorithm that generates 256 as a hash value among existing secure hashing algorithms; the terminal device then generates a signature based on the hash value and the public-private key pair generated by the terminal device to generate the signature of the terminal device. For example, the terminal device may use the existing signature algorithm to generate the signature, such as the signature Sign=ECDSA (Card_Prk_LT, HASH), and ECDSA may be an elliptic curve digital signature algorithm in the existing signature algorithms.

In some embodiments, an optional implementation of the processor of the security device verifying the signature of the terminal device and the certificate of the terminal device to obtain the verification result may be as follows.

The processor of the security device may obtain a certificate digest and a certificate signature corresponding to the certificate of the terminal device. The processor of the security device may verify the certificate digest and the certificate signature through a public key of the certificate of the terminal device. The processor of the security device may verify the signature of the terminal device through the obtained public key to obtain the verification result.

The certificate of the terminal device may include: the public key of the certificate, a private key of the certificate, the certificate digest, the certificate signature, the identification of the terminal device, and the residual data. The residual data may be understood as a combination of special fields introduced by the certificate center authority in accordance with the certificate specification defined by the EMV (Europay Master Card Visa) standard. The certificate digest may be obtained through the residual data and the public key in the public-private key pair generated by the terminal device. The certificate signature may be obtained through the certificate digest and the private key of the certificate in the following process.

Certificate digest Cert_HASH=SHA256(Card_Puk_LT+residual data).

Certificate Signature CERT_Sign=Sign (CA_PRK, Cert_HASH), wherein CA_PRK is the private key of the certificate.

After the terminal device obtains the certificate digest and the certificate signature, the terminal device may be verified by the existing signature algorithm, e.g., the verification process may be that Verify=ECDSA (CA_PUK, CERT_Sign, Cert_HASH). The same terminal device may also verify the signature in the terminal device through the existing signature algorithm, and the verification process may be that Verify=ECDSA (Card_Puk_LT, Sign, HASH), where HASH=SHA256 (Card_Puk_T+CID). Of course, HASH may also be obtained in other ways, which is not limited by this implementation.

From the above technical scheme, it can be seen that the method for processing a control key provided by the embodiment of the present disclosure may include generating a public-private key pair by the terminal device and a public-private key pair by the security device; generating a session key on the terminal device side and the security device side according to the obtained public key and the private key in the self-generated public-private key pair; obtaining the verification data by the session key and decrypting the control data by the session key in the terminal device side to obtain the control key; decrypting the verification data by the session key and encrypting the control key by the session key in the security device side to generate control data, which achieves the encryption and decryption of the control key through the session key. For the terminal device side and the security device side, the data interacted with both sides in addition to the control data may also include the public key and verification data. The role of the public key may be used to obtain the session key, and the verification data may be used to verify the security device. Although the control data, the public key and the verification data are public, the session key corresponding to encryption and decryption may not be obtained through these data, thereby improving security.

In studying the method for processing a control key provided in the present disclosure, the inventors of this application found that the most used communication method between a security device and a terminal device is short-range RF communication, under which the security device and the terminal device are vulnerable to man-in-the-middle attacks, replay/flooding attacks, and dictionary attacks.

In the present disclosure, the processor of the security device and terminal device may generate a secure pair of session keys for the control key. For other devices, the processor of the security device and terminal device may disclose limited null packet data, such as the respective public keys, the verification data, and the control data of the processor of the security device and terminal device as described above, and the session keys may be not disclosed and secure, thereby improving security. And for man-in-the-middle attacks, replay/flooding attacks and dictionary attacks, the present disclosure may resolve as follows.

Man-in-the-middle attack: the signature of the terminal device may be engaged by the public-private key pair of the terminal device, and the man-in-the-middle attack may be defended against at the security device side by the dual verification of the certificate of the terminal device and the signature of the terminal device.

Replay/flooding attack: the public-private key pair generated by the processor of the security device and the terminal device may be a temporary public-private key pair, and the replay/flooding attack may be defended against by a random number generated by the terminal device.

Dictionary attack: the dictionary attack may be defended against by a random number generated by the terminal device and by a dual verification of the certificate of the terminal device and the signature of the terminal device at the security device side.

The method for processing a control key provided by the present disclosure may be described below in conjunction with an application scenario. For example, the security device may be an intelligent lock, and the terminal device may be an access card based on NFC technology. The access card and the intelligent lock communicate with each other through the NFC protocol. The access card may store a control key to control the unlocking of the intelligent lock, and the control key can control the unlocking of the intelligent lock when the access card is in contact with the intelligent lock. The intelligent lock and the access card apply the method for processing a control key provided by the present disclosure to generate a control key and control the unlocking of the intelligent lock as follows.

The intelligent lock and the access card may generate a public-private key pair respectively and send the public key in their respectively generated public-private key pair to each other. The access card may generate a session key based on its own generated private key and the public key of the intelligent lock, and then encrypt the signature of the access card, the random number generated by the access card, and the certificate of the access card by the session key to obtain a verification data. The verification data may be sent to the intelligent lock along with the public key of the access card.

In case the intelligent lock receives the verification data and the public key of the access card, the intelligent lock may also generate a session key based on its own private key and the public key of the access card, and decrypt the verification data using the self-generated session key to obtain the signature of the access card, the random number generated by the access card, and the certificate of the access card. When the intelligent lock verifies that the signature of the access card and the certificate of the access card are legitimate, the intelligent lock may generate a control key, encrypt the control key and the random number generated by the access card to generate control data, and send the control data to the access card.

After the access card obtains the control data, the access card may decrypt the control data through the session key of the access card to obtain the control key and the random number corresponding to the control data. When the random number corresponding to the control data and the random number generated by the access card are the same, the access card may have the authority to unlock the intelligent lock, and the intelligent lock may be opened at this time.

The access card may directly use the control key when controlling the unlocking of the intelligent lock again. For example, the access card may communicates with the intelligent lock based on NFC technology, the control data previously verified by the access card and the intelligent lock may be sent to the access card, and the access card may verify the random number corresponding to the control data in order to control the unlocking of the intelligent lock when the verification is the same as the random number generated by the access card. Alternatively, after the access card unlocks the intelligent lock via the control key, the intelligent lock may store the identification of the access card. When the access card controls the intelligent lock to unlock again, the intelligent lock may verify whether the identification of the access card is stored in the intelligent lock, and when the identification of the access card is stored in the intelligent lock, the intelligent lock may be controlled to unlock.

The method for processing a control key provided in the present disclosure can be applied to other devices in addition to the intelligent lock and the access card based on NFC technology described above. For example, the security device may be a device that requires authentication, such as a home device that requires identification (also referred to as Device 1, such as a TV), and the terminal device may be an identification input device (also referred to as Device 2, such as a microphone), through the microphone to collect the user's voice data for identification. Device 1 may refer to the above process of the intelligent lock to generate control data, and Device 2 may refer to the above process of the access control card to decrypt the control data. When the decrypted random number is the same as the random number generated by Device 2, the decrypted control key may be used to control Device 1 to switch the state. For example, the state switching may include a preset switching, e.g., Device 1 may be controlled to change the station or shutdown, etc. The state switching may be changed according to the user's demand. In the process of state switching, Device 1 may also store the identification of Device 2 (such as voice data of the user corresponding to device 2). When Device 2 controls Device 1 to perform such state switching again, Device 1 may verify whether the identification of Device 2 is stored in Device 1, and when the identification of Device 2 is stored in Device 1, Device 1 may be controlled to perform the state switching.

In some embodiments, the present disclosure may also provide a method for offline unlocking of multiple security devices via a single NFC (Near Field Communication) card. As used herein, the offline unlocking may refer to that the security device may be offline (i.e., unable to communicate with the server) during the unlocking process. For description purposes, taking an electronic lock as an example, the method may include the following phases.

Factory card manufacturing phase: when the factory manufactures the NFC card, the NFC card may be written to a public key of the server, a public-private key pair of the card, and the corresponding certificate to the NFC card.

Electronic lock manufacturing phase: before the electronic lock is manufactured in the factory, the public key of the server and the public-private key pair of the electronic lock may be written to the electronic lock.

Electronic lock binding phase: the server may issue the group number and project number belonging to the electronic lock to the electronic lock.

Permission entry phase: before the manufactured NFC card is used to open the door, the electronic lock opening permission corresponding to the NFC card may be written to the NFC card on an entry device. The permission information may include: a permission expiration date, a project number and group number list of the electronic lock corresponding to the NFC card.

Data security communication stage: the permission information may be encrypted on the server using the private key of the server, and then written to the NFC card relying on the entry device. The NFC card may decrypt the permission information using the public key of the server.

Door activation phase: when the NFC card is close to a reading area of the electronic lock, the NFC card verification and the electronic lock verification may be completed first, and the communication secret key exchange may be realized. The NFC card may encrypt its permission information by the communication secret key and then passes encrypted permission information to the electronic lock. For example, when the NFC card is close to the reading area of the electronic lock, the NFC card may obtain the public key of the electronic lock, and the NFC card may generate a first session key according to the private key of the NFC card and the public key of the electronic lock. The NFC card may encrypt the certificate of the NFC card and a first random number generated by the NFC card through the first session key and then pass the encrypted certificate and the encrypted first random number to the electronic lock together with the private key of the NFC card. The electronic lock may generate a second session key through the private key of the electronic lock and the public key received from the NFC card. The second session key may be used for decryption to obtain the certificate of the NFC card and the random number generated by the NFC card. The electronic lock may generate the control key after verifying that the certificate of the NFC card is passed, and encrypt the control key and the random number of the NFC card to obtain control data. The NFC card may decrypt the control data according to the second session key to obtain the control key and the second random number. The NFC card verification and the electronic lock verification may be completed after the first random number and the second random number are determined to be consistent. Then, the NFC card may encrypt the decrypted permission information through the first session key for transmitting to the electronic lock, and the electronic lock may decrypt the permission information of the NFC card through the second session key. Further, the electronic lock may determine, from the obtained permission information, whether the group number of the electronic is in the group number list, whether the item numbers are the same, whether the permission is within the validity period. When they all match, the door may be opened directly; otherwise, the door may be prompted to fail to be opened.

NFC card removal phase: the server may remotely send the ID (identifier) to be removed of the card corresponding to the electronic lock and the corresponding expiration date to the electronic lock, and the electronic lock may maintain the ID in a local blacklist. In the next time the NFC card is intended to open the electronic lock, the ID of the NFC card may be firstly checked to verify whether the ID exists in the blacklist, and the NFC card in the blacklist may be not allowed to open the electronic lock.

In some embodiments, the electronic lock may rely on the expiration date information issued by the server to automatically maintain the ID of the NFC card ID in the blacklist, and automatically remove the ID of the NFC card from the blacklist when the expiration date is exceeded.

The above method can achieve the effect of unlocking multiple electronic locks through one NFC card, so that staff can flexibly manage multiple electronic locks through one NFC card.

FIG. 9, as an implementation of the method shown in some of the above figures, provides an embodiment of a device for processing a control key. The embodiment of the device may correspond to the embodiment of the method shown in FIG. 6. The device may be specifically applied in various terminal devices.

As shown in FIG. 9, the device 900 for processing a control key may include: a first obtaining unit 901, an encryption unit 902, a sending unit 903, a second obtaining unit 904, and a determination unit 905. In some embodiments, the first obtaining unit 901, the sending unit 903, and the second obtaining unit 904 may be part of the communication module 210 shown in FIG. 2. In some embodiments, the encryption unit 902 may be part of the security module 220 shown in FIG. 2. In some embodiments, the determination unit 905 may be part of the processing module 230 shown in FIG. 2.

The first obtaining unit 901 may be configured to obtain a public key in ae public-private key pair generated by the security device, generate a session key based on a private key in a public-private key pair generated by the terminal device and the obtained public key.

The encryption unit 902 may be configured to encrypt a signature of the terminal device, first data of the terminal device, and a certificate of the terminal device by the session key to obtain verification data.

The sending unit 903 may be configured to send the verification data and a public key of the public-private key pair generated by the terminal device to the security device.

The second obtaining unit 904 may be configured to obtain control data generated by the security device, decrypt the control data through the session key, and obtain the control key and second data corresponding to the control data.

The determination unit 905 may be configured to determine whether the control key is used to control the security device corresponding to the control key based on the second data corresponding to the control data.

In some embodiments, the specific processing of the first obtaining unit 901, the encryption unit 902, the sending unit 903, the second obtaining unit 904, and the determination unit 905 and the technical effects thereof may refer to the relevant descriptions of operations 601 to 605 in the corresponding embodiment of FIG. 6 and the relevant descriptions of the operations in the corresponding embodiment of FIG. 8, respectively, which is not repeated herein.

In some optional implementations of this embodiment, the first obtaining unit 901 may specifically be configured to generate a shared key based on the private key in the public-private key pair generated by the terminal device and the obtained public key; and generate a session key based on the shared key and the identification of the terminal device.

The signature of the terminal device to be encrypted in the encryption unit 902 may be generated based on the public-private key pair generated by the terminal device and the identification of the terminal device. The signature of the terminal device being generated based on the public-private key pair generated by the terminal device and the identification of the terminal device may include: generating a hash value based on the public key in the public-private key pair generated by the terminal device and the identification of the terminal device; and generating the signature of the terminal device based on the hash value and the private key in the public-private key pair generated by the terminal device.

In some optional implementations of this embodiment, the device 900 for processing a control key may further include: a storage unit configured to store the control key when the second data corresponding to the control data is the same as the first data of the terminal device, which is as described in the method embodiment above and not repeated herein.

FIG. 10, as an implementation of the method shown in some of the above figures, provides an embodiment of a device for processing a control key. The embodiment of the device may correspond to the embodiment of the method shown in FIG. 7. The device may be applied specifically to processors of various security devices.

As shown in FIG. 10, the device 1000 for processing a control key of this embodiment may include: a key obtaining unit 1001, a decryption unit 1002, a verification unit 1003, a key generation unit 1004, an encryption unit 1005, and a sending unit 1006. In some embodiments, the key obtaining unit 1001 and the sending unit 1006 may be part of the communication module 210. In some embodiments, the decryption unit 1002, the verification unit 1003, and the encryption unit 1005 may be part of the security module 220 shown in FIG. 2. In some embodiments, the key generation unit 1004 may be part of the processing module 230 shown in FIG. 2.

The key obtaining unit 1001 may be configured to obtain verification data generated by the terminal device and a public key in a public-private key pair generated by the terminal device, generate a session key based on a private key in a public-private key pair generated by the security device and the obtained public key.

The decryption unit 1002 may be configured to decrypt the verification data by the session key to obtain a signature of the terminal device, first data of the terminal device, and a certificate of the terminal device.

The verification unit 1003 may be configured to verify the signature of the terminal device and the certificate of the terminal device and obtain a verification result.

The key generation unit 1004 may be configured to generate a control key when the verification result indicates that the signature of the terminal device and the certificate of the terminal device are legitimate.

The encryption unit 1005 may be configured to encrypt the control key and the first data of the terminal device by the session key to obtain control data.

The sending unit 1006 may be configured to send the control data to the terminal device.

In some embodiments, the specific processing of the key obtaining unit 1001, the decryption unit 1002, the verification unit 1003, the key generation unit 1004, the encryption unit 1005, and the sending unit 1006 and the technical effects thereof may refer to the relevant descriptions of the embodiments of operations 701 to 704 in the corresponding embodiment of FIG. 7, and the relevant descriptions of the operations in the corresponding embodiment of FIG. 8, respectively, which is not repeated herein.

In some optional implementations of this embodiment, the verification unit 1003 may be configured to obtain a certificate digest and a certificate signature corresponding to the certificate of the terminal device; verify the certificate digest and the certificate signature by a public key of the certificate of the terminal device, and verify the signature of the terminal device by the obtained public key to obtain the verification result.

In some optional implementations of this embodiment, the key generation unit 1004 may be specifically configured to generate a shared key based on the private key in the public-private key pair generated by the security device and the obtained public key; and generate the session key based on the shared key and the identification of the terminal device. The identification of the terminal device may be obtained through a device selection request.

It should be noted that at least one of the device 900 for processing a control key and the device 1000 for processing a control key may include a chip, a component or a module. The device 900 for processing a control key may include a processor and a memory. The first obtaining unit 901, the encryption unit 902, the sending unit 903, the second obtaining unit 904, the determination unit 905, or the like may be stored in the storage as program units, and the processor may execute the above-mentioned program units stored in the memory to perform the corresponding functions.

The processor may contain a kernel, and the kernel may retrieve the corresponding program units from the memory. There may be one or more kernels, and the security may be improved by adjusting kernel parameters. The memory may include a computer readable medium, in the form of a volatile memory, a random access memory (RAM) and/or a non-volatile memory, such as read-only memory (ROM) or flash memory (flash RAM). The memory may include at least one memory chip.

Similarly, the device 1000 for processing a control key may include a processor and a memory. The key obtaining unit 1001, the decryption unit 1002, the verification unit 1003, the key generation unit 1004, the encryption unit 1005, and the sending unit 1006 may be stored in the memory as program units, and the processor may execute the above-mentioned program units stored in the memory to implement the corresponding functions.

The processor may contain a kernel, and the kernel retrieve the appropriate program units from the memory. There may be one or more kernels, and the security may be improved by adjusting kernel parameters. The memory may include a computer readable medium, in the form of a volatile memory, a random access memory (RAM) and/or a non-volatile memory, such as read-only memory (ROM) or flash memory (flash RAM). The memory may include at least one memory chip.

The above embodiment of the present disclosure provides a device for processing a control key. The device may generate a public-private key pair by a terminal device and a public-private key pair by a security device; generating a session key on the terminal device side and the security device side based on the obtained public key and the private key in the self-generated public-private key pair; in the terminal device side, obtaining verification data by the session key on the terminal device side and decrypting control data by the session key to obtain the control key; in the security device side, decrypting the verification data by the session key and encrypting the control key by the session key to generate the control data, which achieves the encryption and decryption of the control key through the session key. For the terminal device side and the security device side, the two sides interact with data, the data may include, in addition to the control data, the public key and verification data. The role of the public key may be used to obtain the session key, the verification data may be used to verify the security device. Although the control data, the public key and verification data are public, the session key corresponding to encryption and decryption may not be obtained through these data, thereby improving security.

Further, the present disclosure illustrates a system for processing a control key. The system for processing the control key may include: a terminal device and a security device, as shown in FIG. 5, and as illustrated in FIG. 5, the terminal device 501 and the processor 503 of the security device may be described as examples.

The terminal device may be configured to obtain the public key in a public-private key pair generated by the security device; generates a session key based on a private key in a public-private key pair generated by the terminal device and the obtained public key; encrypt a signature of the terminal device, first data of the terminal device, and a certificate of the terminal device by the session key to obtain verification data; send the verification data and the public key in the public-private key pair generated by the terminal device public key to the security device; obtain control data generated by the security device; decrypt the control data by the session key; and obtain a control key and second data corresponding to the control data; determine whether the control key is used to control the security device corresponding to the control key according to the second data corresponding to the control data.

The security device may be configured to obtain the verification data generated by the terminal device and the public key in the public-private key pair generated by the terminal device; generate a session key based on the private key in the public-private key pair generated by the security device and the obtained public key; decrypt the verification data by the session key to obtain the signature of the terminal device, the first data of the terminal device, and the certificate of the terminal device; verify the signature of the terminal device and the certificate of the terminal device to obtain a verification result; when the verification result indicates that the signature of the terminal device and the certificate of the terminal device are legitimate, generate the control key; encrypt the control key and the first data of the terminal device by the session key to obtain the control data; and send the control data to the terminal device.

A timing diagram of the terminal device and the security device may refer to FIG. 4, which is not repeated herein.

FIG. 11 is a schematic diagram illustrating a structure of a terminal device 1100 suitable for implementing some embodiments of the present disclosure. The terminal device illustrated in FIG. 11 is only an example and should not impose any limitations on the functionality and scope of use of embodiments of the present disclosure. The terminal device 1100 illustrated in FIG. 11 may be a specific embodiment of the terminal device 501 illustrated in FIG. 5 and/or the terminal device 140 illustrated in FIG. 1.

As shown in FIG. 11, the terminal device 1100 may include a processor 1101, a memory 1102, a communication port 1103, an input unit 1104, an output unit 1105, and a communication bus 1106. The processor 1101 and the memory 1102 may be connected to each other via the communication bus 1106. The communication port 1103, the input unit 1104, and the output unit 1105 may also be connected to the communication bus 1106.

The communication port 1103 may be an interface of a communication module, such as an interface of a GSM module. The communication port 1103 may be used to send verification data and a public key of a public-private key pair generated by a terminal device to a security device, and the communication port 1103 may also be configured to receive control data generated by the security device. More description of the communication port 1103 can be found in the related description of the communication port 350 in FIG. 3.

In the embodiment of the present disclosure, the processor 1101 may be a central processing unit (CPU), an application-specific integrated circuit (ASIC), a digital signal processor (DSP), an application-specific integrated circuit (ASIC), off-the-shelf programmable gate array (FPGA), or other programmable logic device, etc. More detailed description of the processor 1101 can be found in the related description of processor 320 in FIG. 3.

In one possible implementation, the memory 1102 may include a program storing area and a data storing area. The program storing area may store an operating system, and applications required by at least one function (e.g., an encryption and decryption function, an authentication function, etc.), etc. The data storing area may store data, e.g., a public key, a private key, a first data, a second data, and control data, etc., that is created during the use of the computer.

In addition, the memory 1102 may include a high-speed random access memory and a non-volatile memory, such as at least one disk memory device or other volatile solid state memory device. More detailed descriptions of the memory 1102 can be found in the related description of read-only memory 330 and random access memory 340 in FIG. 3.

The processor 1101 may invoke the program stored in the memory 1102. Specifically, the processor 1101 may execute the method for processing the control key shown in any of the embodiments of FIG. 6 and FIG. 8 above.

The memory 1102 may be used to store one or more programs, and the programs may include program codes. The program codes may include a computer operating instruction. In the embodiment of the present disclosure, the memory 1102 may at least store programs for performing the following operations including:

obtaining a public key in a public-private key pair generated by the security device, generating a session key based on a private key in a public-private key pair generated by the terminal device and the obtained public key;

encrypting a signature of the terminal device, first data of the terminal device, and a certificate of the terminal device by the session key to obtain verification data;

sending the verification data and the public key of the public-private key pair generated by the terminal device to the security device;

obtaining control data generated by the security device, decrypting the control data by the session key, and obtaining the control key and second data corresponding to the control data;

determining, based on the second data corresponding to the control data, whether the control key is used to perform control of the security device corresponding to the control key.

The present disclosure may also include an input unit 1104, which may include at least one of a touch sensing unit that senses touch events on the touch display panel, a keyboard, a mouse, a camera, a pickup, and other devices.

The output unit 1105 may include at least one of: a display, a speaker, a vibration mechanism, a lamp, and other devices. The display may include a display panel, such as a touch display panel, etc. In one possible case, the display panel may be configured in the form of a liquid crystal display (LCD), an organic light-emitting diode (OLED), or the like. The vibration mechanism may displace the electronic device 1100 during operation. In one possible implementation, the vibration mechanism may include an electric motor and an eccentric oscillator, and the electric motor may drive the eccentric oscillator to rotate and thereby generate vibration. The brightness and/or color of the lamp may be adjustable, and in one possible implementation, different information may be reflected by at least one of on/off, brightness, and color of the lamp. For example, an alarm message may be represented by the lamp emitting a red light. More description of the input unit 1104 and/or the output unit 1105 can be found in the related description of input/output 360 in FIG. 3.

Of course, the structure of the terminal device 1100 shown in FIG. 11 does not constitute a limitation of the terminal device in the embodiments of the present disclosure, and in practical applications the terminal device may include more or fewer components than those shown in FIG. 11, or a combination of certain components.

Embodiments of the present disclosure provide a computer readable medium having a computer program stored thereon, wherein the program, when executed by a processor, implements the method for pushing information described in the method embodiments above.

Embodiments of the present disclosure provide a processor for operating a program, wherein the program, when operated, implements the method for processing a control key as described in the method embodiments above.

The present disclosure also provides a computer program product that, when executed on a data processing device, causes the data processing device to implement the method for processing a control key as described in the method embodiments above.

The terminal device, processor, computer readable medium, or computer program product provided by the above embodiments of the present disclosure may all be used to perform the corresponding methods provided above, and thus the beneficial effects that can be achieved may refer to the beneficial effects in the corresponding methods provided above, which is not repeated herein.

At present, intelligent locks are generally provided with network control functions, which communicate (e.g., distribute passwords, etc.) with external devices and cloud servers through common wireless transmission methods (including: ZigBee/Wifi/433/NB-IoT/BLE, etc.). In order to cope with the situation without network, when the password cannot be sent down normally, some intelligent locks may use an offline password generation method, by interacting with the device for a specific sequence of input to generate a fixed password that is valid within a certain time range locally in the lock.

And one of the most commonly used offline password implementation schemes for intelligent locks is to agree on a specified algorithm to generate a fixed password value within the same time range. However, the password value in this implementation scheme is fixed within a certain time range and can be repeatedly input multiple times, which cannot effectively limit the range of password usage.

Another common offline password generation scheme is to generate different password values according to different times, with a small probability of password repetition relative to a fixed password value of a certain time range. However, the generated password values in this scheme are long, and the password values themselves cannot effectively reflect the information of authorized users, and all users can obtain the same password values, which cannot make the distinction between the unlocking behavior of different users.

According to the above deficiencies in the existing schemes, the inventor further researched and found that a unique password identifier can be configured for an offline password, which can establish a correspondence between the password identifier and the user when the user requests the offline password for unlocking through the terminal device, thereby distinguishing different users.

In a method and device for processing an offline password of a device provided in an embodiment of the present disclosure, by obtaining multiple offline password values of the device, a password identifier corresponding to each offline password value may be also obtained. The password identifier may be unique. When an offline password value is obtained and used by a terminal device, the password identifier corresponding to the offline password value may correspond to a target user corresponding to the terminal device. Thus, the purpose of the present disclosure of distinguishing the users who use the offline password value may be achieved by configuring a unique password identifier for the offline password value.

In embodiments of the present disclosure, the method for processing an offline password of a device may be used in an electronic lock provided in some embodiments of the present disclosure (e.g., FIG. 23-FIG. 39) and in an intelligent lock provided in some other embodiments of the present disclosure (e.g., FIG. 47-FIG. 52), by which an offline password may be provided for the electronic lock and the intelligent lock for unlocking.

The following is a detailed description of the method for processing an offline password of a device provided by embodiments of the present disclosure.

Figure 12:
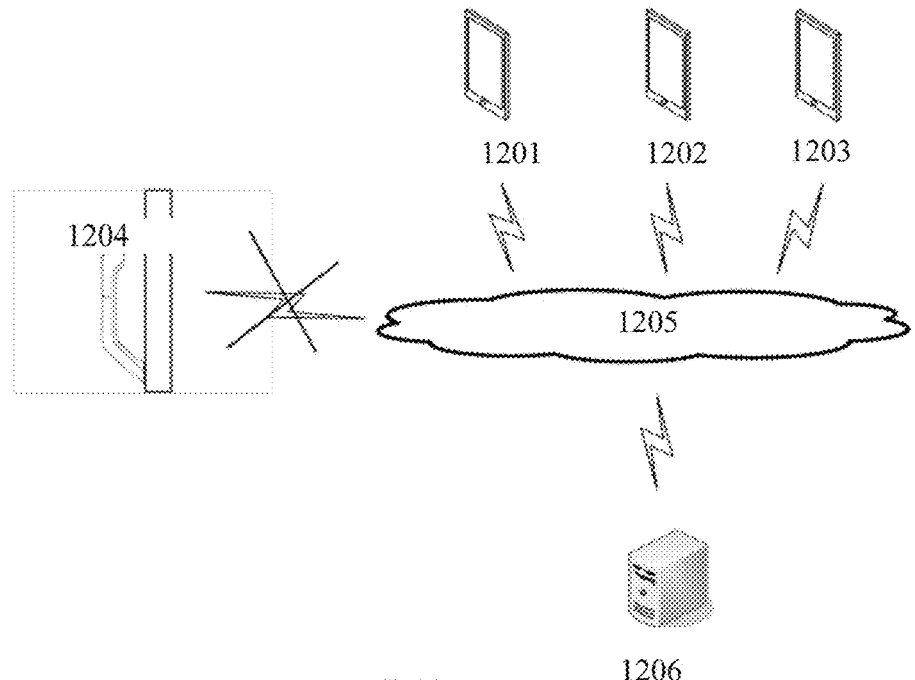
FIG. 12 is a schematic diagram of an exemplary system architecture according to some embodiments of the present disclosure.

FIG. 12 illustrates an exemplary system architecture 1200 that can be applied to a method for processing an offline password of a device or a device for processing an offline password of a device according to some embodiments of the present disclosure. The system architecture 1200 may be a specific embodiment of the application scenario shown in FIG. 1.

As shown in FIG. 12, the system architecture 1200 may include a terminal device 1201, a terminal device 1202, a terminal device 1203, a device 1204, a network 1205, and a server 1206. The network 1205 may be used to provide a medium for a communication link between the terminal device 1201, the terminal device 1202, the terminal device 1203, and the server 1206. The network 1205 may include various connection types, such as wireless communication links, or the like.

Different users may use the terminal devices 1201, 1202, 1203, respectively, to interact with the server 1206 via the network 1205 to receive or send information, etc. The terminal devices 1201, 1202, 1203 may lock be installed with a client application related to a lock, and various other client applications, such as shopping applications, search applications, social platform software, etc.

The terminal devices 1201, 1202, 1203 may be hardware or software. When the terminal devices 1201, 1202, and 1203 are hardware, the terminal devices 1201, 1202, and 1203 may include various electronic devices, including, but not limited to, a smartphone, a tablet, a wearable device, a vehicle-mounted device, an augmented reality (AR)/virtual reality (VR) device, an ultra-mobile personal computer (UMPC), a netbook, a personal digital assistant (PDA), an e-book reader, an MP3 (Moving Picture Experts Group Audio Layer III) player, and an MP4 (Audio Layer 3) player, an MP4 (Moving Picture Experts Group Audio Layer IV, Moving Picture Experts Group Audio Layer 4) player, a laptop, a desktop computer, a smart electric meter, a smart water meter, a smart cat's eye, a gateway and other electronic devices. When the terminal devices 1201, 1202, and 1203 are software, the terminal devices 1201, 1202, and 1203 may be installed in the electronic devices listed above. The terminal devices 1201, 1202, and 1203 may be implemented as multiple software or software modules (e.g., for providing distributed services), or as a single software or software module. The embodiments of the present disclosure do not limit the specific type of electronic device. For more description about the terminal devices 1201, 1202 and/or 1203 may refer to the relevant description of the terminal device 140 in FIG. 1.

The device 1204 may be a smart device (e.g., an intelligent electronic lock, etc.) capable of being controlled or processed by an offline password. The intelligent electronic lock may be configured with devices such as a processor and memory capable of processing instructions to achieve corresponding functions. The following is described in detail by taking the device 1204 being an electronic lock 1204 as an example. For more description about the device 1204, please refer to the relevant description of the smart device 130 in FIG. 1.

The server 1206 may be a server that provides services related to offline passwords for electronic locks, and the server 1206 may also be capable of providing various other types of services. For example, the server 1206 may be a backend server that provides offline password support to the terminal devices 1201, 1202, and 1203. The backend server may be responsive to receiving a password acquisition request sent by the terminal devices 1201, 1202, and 1203, analyzing and processing the request to obtain a processing result (e.g., information to be pushed), and returning the processing result, such as transmitting the offline password value to the terminal device.

It should be noted that the server may be either hardware or software. When the server is hardware, the server may be implemented as a distributed server cluster of multiple servers or as a single server. When the server is software, the server may be implemented as multiple software or software modules (e.g., for providing distributed services), or as a single software or software module, which is not limited herein. For more descriptions about the server 1206, please refer to the related description of the server 110 in FIG. 1.

It should be noted that the method for processing an offline password of a device provided in this embodiment may be executed by the electronic lock 1204 and the server 1206, respectively, and the device for processing an offline password of a device may be generally provided in the electronic lock 1204 and the server 1206. The method for processing an offline password of a device may be executed at both ends of the electronic lock 1204 and the server 1206, respectively, and correspondingly, the device for processing a device offline may be generally provided in the electronic lock 1204 and the server 1206.

It should be understood that the number of terminal devices, networks, and servers in FIG. 12 is merely schematic. There may be any number of terminal devices, networks, and servers as required by the implementation.

The offline password in the present disclosure may be used to control the electronic lock for corresponding processing, such as controlling the electronic lock for unlocking. Other characters may also be added to the offline password to form a function code, which in turn may control the electronic lock to enter a setting state to facilitate setting of parameters, etc., of the electronic lock, etc.

Figure 13:
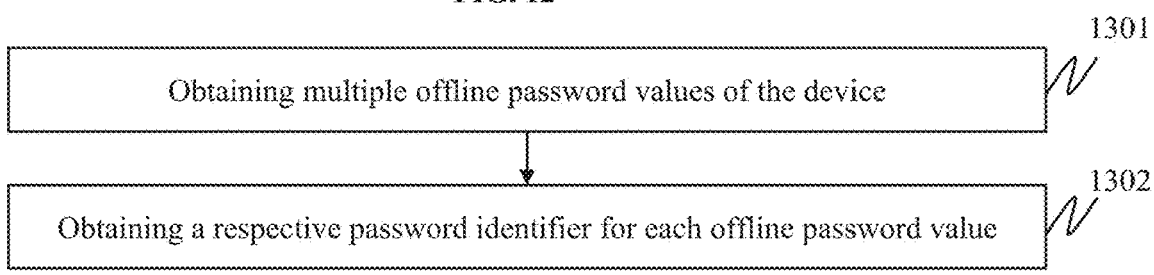
FIG. 13 is a flowchart of an exemplary process of a method for processing offline passwords of a device according to some embodiments of the present disclosure.

FIG. 13 is a flowchart illustrating an exemplary method for processing an offline password of a device according to some embodiments of the present disclosure. The method for processing the offline password of the device may be performed on an electronic lock and a server, respectively, that is, the execution subjects of the method for processing the offline password of the device in this embodiment may be the electronic lock and the server, respectively, such as the electronic lock 1204 and the server 1206 in the offline state in FIG. 12, such that the offline password values of the electronic lock may be generated on each side of the electronic lock and the server, respectively. The offline state refers to a state in which the electronic lock 1204 and the server 1206 cannot be connected to each other via the network.

Specifically, the method may include the following operations.

In 1301, multiple offline password values of the device may be obtained.

In some embodiments, the corresponding multiple offline password values may be generated based on current time information. For example, the current time information may be used as a data base, and then the corresponding multiple offline password values may be calculated out by combining the device information of electronic lock and other contents. Of course, in addition to generating the corresponding multiple offline password values based on the current time information, the multiple offline password values may be generated based on other information such as a device code or a random number.

In 1302, a respective password identifier for each offline password value may be obtained.

In some embodiments, the password identifier may be unique. The unique means that a plurality of password identifiers are not duplicated or are not duplicated within a certain time range or a certain number. For example, the multiple offline password values within a year may correspond to different password identifiers; or, the first 1000 offline password values generated or used may correspond to different password identifiers; or, password identifier the offline password values corresponding to a declaration cycle of the electronic lock may correspond to different password identifiers, etc.

Based on this, both sides of the electronic lock and the server may use the above scheme to generate multiple offline password values, and each offline password value may have a unique corresponding password identifier. After a certain user requests the server through its terminal device, the server may send an offline password value to the terminal device through the network, and after the user of the terminal device learns the offline password value, the user may use the offline password value on the electronic lock. Since the electronic lock is possible to know the used offline password value and the password identifier corresponding to the offline password value, and the server may establish a correspondence between the target user corresponding to the terminal device that sends the request and the password identifier corresponding to the sent offline password value, the target user using the offline password value may be distinguished by the unique password identifier.

According to the above embodiment, the method for processing an offline password of a device is provided. The method may include obtaining multiple offline password values of the device, and obtaining the password identifier corresponding to each offline password value. The password identifier may be unique. When the offline password value is obtained and used by a terminal device, the password identifier corresponding to the offline password value may correspond to the target user corresponding to the terminal device. Thus, in this embodiment of the present disclosure, by configuring a unique password identifier for an offline password value, the purpose of the present disclosure to distinguish the user of the terminal device may be achieved using the offline password value.

Figure 14:
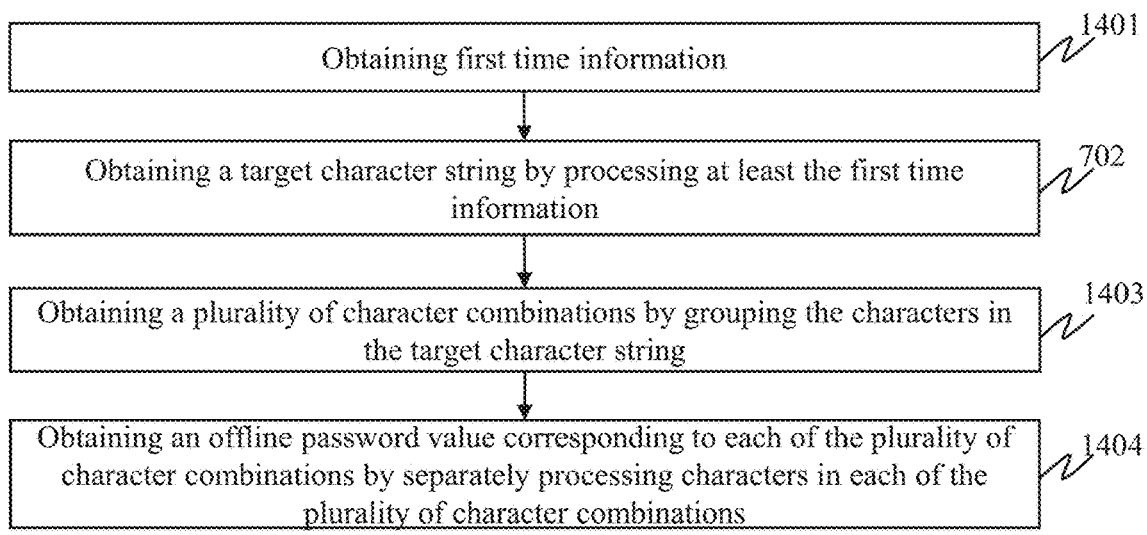
FIG. 14 is a flowchart of an exemplary process of a method for obtaining multiple offline password values of a device according to some embodiments of the present disclosure.

In some optional implementations of this embodiment, operation 1301 may be achieved by process as shown in FIG. 14.

In 1401, first time information may be obtained.

In some embodiments, the first time information may be time data information obtained according to a preset rule. For example, a current time point may be used as the first time information, or a preset time point may be used as the first time information. Specifically, a time point may be characterized by year, month, day, hour, minute, and second.

The first time information herein may be set with a corresponding time granularity according to the demand for password generation. The granularity may be different electronic lock product demand set at the factory, of course, may also be modified after the factory by the user in accordance with demand. The time granularity may be understood as a basic unit of the first time information. For example, time information of "January 5" may be with the basic unit of days. As another example, "12 o'clock on January 5" may be with the basic unit of hours. As still another example, "12:34 a.m. on January 5." may be with the basic unit of minutes.

It should be noted that the granularity of the current time point characterized by the first time information may be related to password configuration information of a device such as an electronic lock. The password configuration information may be generated based on a pre-configuration operation. That is, the password configuration information may be adjusted accordingly to changes in requirements after the device leaves the factory, which in turn adjusts the time granularity of the first time information.

In 1402, a target character string may be obtained by processing at least the first time information.

The target character string may contain/include multiple characters.

In some embodiments, the first time information may be processed by using a preset algorithm to obtain the target character string.

In some embodiments, the first time information, feature information of the device and key information of the device may be firstly composed of raw data. The feature information of the device may be a device serial number of the electronic lock and/or a universal unique identification UUID (Universally Unique Identification) of the electronic lock, etc. After that, a digest algorithm may be used to calculate the raw data to obtain a string of digest data. The security of the key information in the raw data may be ensured by using the irreversibility of the digest algorithm, however the characters in the digest data may be too long or too short. Therefore, after the digest data is obtained, a hash algorithm may be used to calculate the digest data to obtain a target character string, and the length of the target character string at this time may be in accordance with a preset fixed length condition, such as a 16-byte target character string.

In 1403, a plurality of character combinations may be obtained by grouping the characters in the target character string.

In some embodiments, each character combination may contain at least one character. For example, the characters in the 16-byte target character string may be divide four adjacent characters into a character combination to obtain four character combinations. Each of the four character combinations may contain four characters.

In 1404, an offline password value corresponding to each of the plurality of character combinations may be obtained by separately processing characters in each of the plurality of character combinations.

In some embodiments, the characters in each character combination may be processed separately to obtain the offline password value corresponding to each character combination based on the preset password length. The password length of each offline password value may be consistent and matched to the preset password length.

In some embodiments, the preset password length may be a 6-bit password length or an 8-bit password length, etc. Of course, the preset password length may be set to be a password length with other digits as needed. Specifically, the preset password length may depend on the user's needs for unified configuration in the electronic lock and the server, respectively.

For example, each character combination may be modelled according to the preset password length to obtain the offline password value corresponding to each character combination. For example, when the password length is 6 bits, a modulo operation may be performed on 1000000 ($10^6$), while when to the password length is 8 bits, the modulo operation may be performed on 100000000 ($10^8$). When an obtained result is less than the number of password bits, the obtained result may be preceded by 0, so that each group may generate a final password value of a specific length.

Taking the 4 character combinations divided by the 16-byte target character string as an example, the password length may be 6 bits. One of the 4 character combinations may be 0x0001869f, i.e., 99999 in decimal, then this implementation may make up 0 in front of 99999, i.e., the password is actually 099999. One of the 4 character combinations may be 0x82E28AA7, i.e., 2195884711 in decimal, then this implementation may divide 2195884711 by 1000000 to take the remainder, i.e., the password is actually 884711. Furthermore, when the password length is 8 bits, 2195884711 in decimal may be taken the modulus, that is, divided by 100000000 to take the remainder, i.e., the password is 95884711.

Based on the above implementation scheme for generating an offline password value, the number of passwords that are generated in this embodiment depends on two factors:

(1) the time granularity of the first time information. For example, the passwords may be generated every 1 minute, or every 1 hour. Thus, different time granularities may be used, although the number of offline password values generated each time is the same, a total number of offline password values generated in a fixed period of time, such as a day, are different. The finer the time granularity is, the more the total number of offline password values that can be generated in a day may be.

(2) algorithm parameters of the hash algorithm used. For example, when the MD5 algorithm is used, 16 bytes of hash data may be generated, and eventually 4 groups of offline password values may be generated. Each offline password value may contain 4 password characters. When the SHA256 algorithm is used, 32 bytes of hash data may be generated, and eventually 8 groups of offline password values may be generated. Each offline password value may contain 4 password characters. Of course, the number (e.g., 6 bits, 8 bits, etc.) of password characters contained in each offline password value may be set according to different requirements.

Therefore, assuming that offline password values are pre-configured to be generated once per hour on both sides of the electronic lock and the server, and the MD5 hash algorithm is used, 4 dynamic offline password values may be generated each time, resulting in 96 dynamic offline password values in 1 day.

Figure 15:
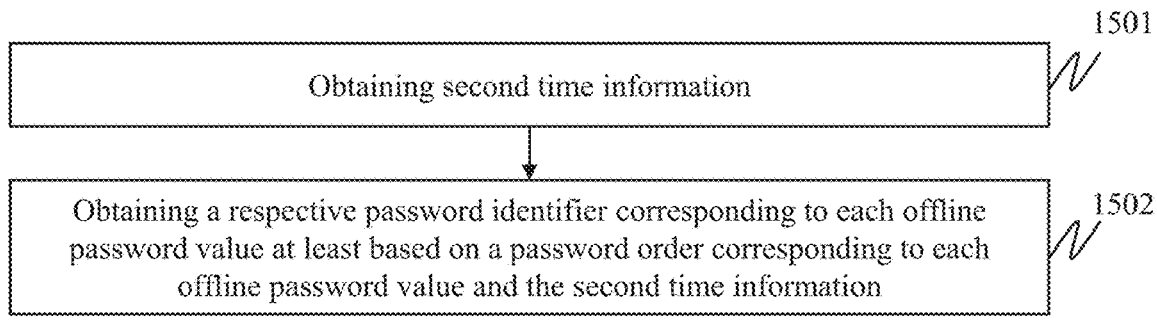
FIG. 15 is a flowchart of an exemplary process of a method for obtaining a password identification corresponding to each offline password value according to some embodiments of the present disclosure.

In some optional implementations of this embodiment, operation 1302 may be implemented in the following operations as shown in FIG. 15.

In 1501, second time information may be obtained.

In some embodiments, the second time information may be related to the first time information. The second time information may be time range information associated with the first time information, and the second time information may contain the first time information itself. For example, the second time information may contain a duration of time between a certain starting moment and a moment corresponding to the first time information, such as four days from January 1 to January 5. As another example, the second time information may also contain a time point corresponding to the time granularity corresponding to the first time information, such as 12:00 p.m. on January 5, etc.

In 1502, a respective password identifier corresponding to each offline password value may be obtained at least based on a password order corresponding to each offline password value and the second time information password identifier.

In some embodiments, the password order corresponding to each offline password value may be understood to be an order (such as the first or the fourth) of each offline password value among the offline password values generated by the corresponding character combination.

In some embodiments, for each offline password value, a calculation may be performed using the password order corresponding to the offline password value and the second time value to obtain the password identifier corresponding to the offline password value.

In some embodiments, operation 1502 may be achieved as follows.

I=((D−1)*24+T)*4+Index may be used to obtain the respective password identifier corresponding to each offline password value. Where I represents the password identifier corresponding to an Indexth offline password value among the multiple offline password values corresponding to the first time information, and D represents the number of days from January 1 to the current time point, and T represents a time point value (e.g., an hour or minute value) under the granularity of the current time point characterized by the first time information, to make the password identifier unique within the current one-year period. Thus, the password identifier obtained by the device may be unique for the duration of the year.

In some embodiments, operation 1502 may be achieved as follows.

I=((D−1)*24+T)*4+Index may be used to obtain an initial identifier corresponding to each respective offline password value. Where I represents the initial identifier corresponding to an Index offline password value of the multiple offline password values corresponding to the first time information, D represents the number of days from January 1 to the current time point, and T represents a point time value under the granularity of the current time point characterized by the first time information. After that, each initial identifier may then be processed using the current year information to make each password identifier unique over the lifetime of the device.

Figure 16:
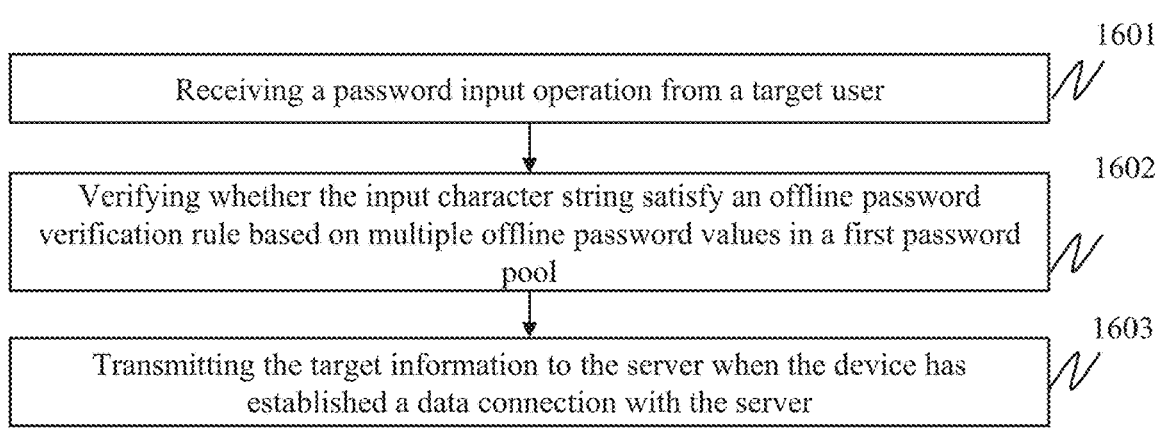
FIG. 16 is a flowchart of an exemplary process of a method for processing an offline password of a device according to some embodiments of the present disclosure.

FIG. 16 is a flowchart illustrating a method for processing an offline password of a device according to some embodiments of the present disclosure. The method for processing the offline password of the device may be performed on an electronic lock, that is, the execution subject of the method for processing the offline password of the device in this embodiment may be an electronic lock, such as the electronic lock 1204 in FIG. 12 which is in an offline state. The offline state may be a state in which the electronic lock 1204 cannot be connected to the server 1206 via the network.

Specifically, the method may include the following operations.

In 1601, a password input operation may be received from a target user.

In some embodiments, the password input operation may include an input character string, and the input character string may include at least one input character.

In some embodiments, the password input operation may be an operation generated by a password input performed by the target user at a panel of the electronic lock. Based on this, the password input operation received on the electronic lock may contain an input character string input by the target user, and the input character string may contain input characters input by the target user.

It should be noted that the input character string input by the target user to the panel may be an offline password value returned by the server to the terminal device of the target user after the target user requests it from the server via its terminal device.

In 1602, whether the input character string satisfies an offline password verification rule may be verified based on multiple offline password values in a first password pool.

In some embodiments, each of the offline password values in the first password pool may have a respective corresponding password identifier, and the password identifier may be unique. The offline password values in the first password pool may be generated by the electronic lock in accordance with the method for generating offline passwords as shown in FIG. 13.

In some embodiments, the offline password verification rule may include that there is a target password value in the first password pool that matches the input character string and the target password value is used for the first time.

For example, the input character string may be verified against each offline password value in the first password pool in sequence or simultaneously to obtain a verification result that characterizes whether the input character string satisfies the offline password verification rule, i.e., a target password value may exist in the first password pool that matches the input character string, and the target password value may be used for the first time.

In 1603, in the case that the input character string satisfies the offline password verification rule, the target information may be transmitted to the server when the device has established a data connection with the server.

In some embodiments, the input character string satisfying the offline password verification rule may indicate that the input character string input by the current target user is a legitimate offline password value, and the input character string is also used by the user for the first time in the first password pool of the electronic lock and has not been previously input by any user for verification.

In some embodiments, in the case where the electronic lock has established a data connection with the server, i.e., where the electronic lock is converted from an offline state to an online state, the target identifier containing the target password value corresponding to the target password value may be transmitted to the server, such that the server side can position at least the target password value corresponding to the target identifier based on the target identifier in the target information, and can also position the target user corresponding to the target password value based on the target identifier. Then, the target user corresponding to the terminal device that obtains the target password value from the server may be determined.

According to the above embodiment, in the method for processing an offline password of a device provided in this embodiment, when the offline password value is needed in the offline state of the electronic lock, the electronic lock may receive an input character string from the target user and verify the input character string against the offline password values in the first password pool generated by the electronic lock. After the verification is passed, the password identifier of the target password value in the first password pool corresponding to the input character string may be transmitted to the server, so that the server can match the password identifier with the target password value, and the target user using the target password value can be distinguished, thereby achieving the purpose of this application.

Figure 17:
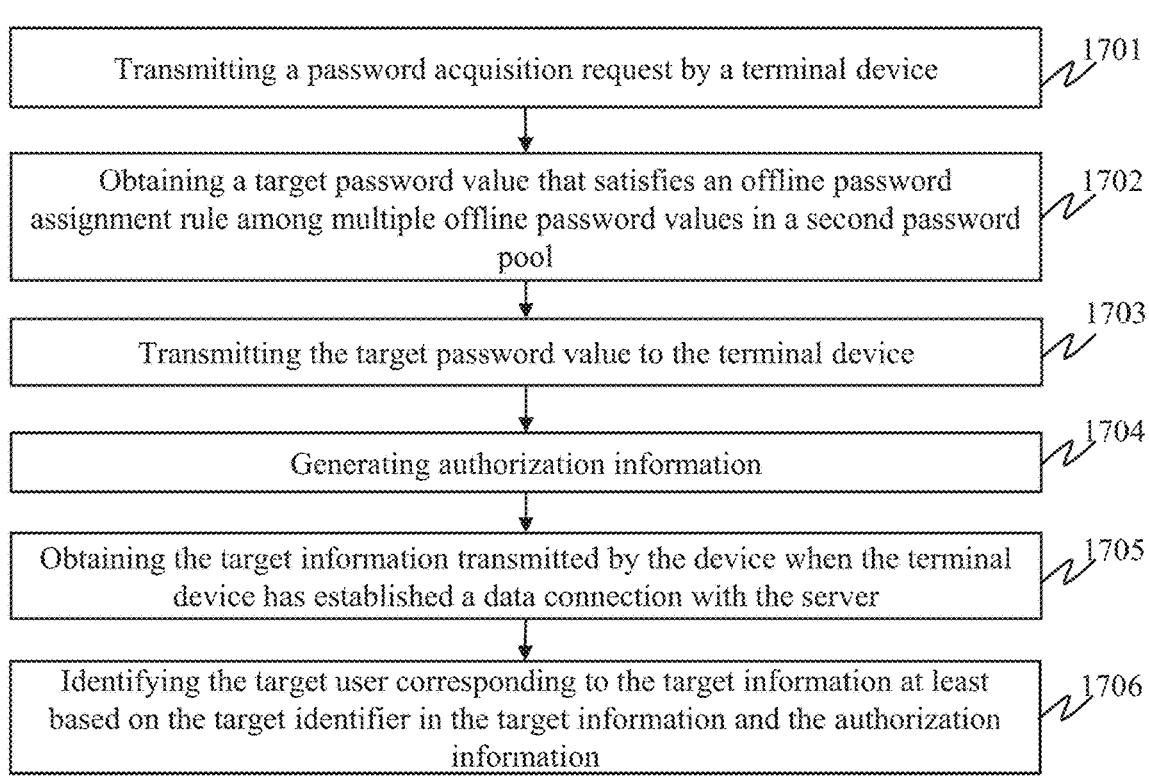
FIG. 17 is a flowchart of an exemplary process of a method for processing an offline password of a device according to some embodiments of the present disclosure.

FIG. 17 is a flowchart illustrating a method for processing an offline password of a device according to some embodiments of the present disclosure. The method for processing the offline password of the device may be performed on a server, that is, the execution subject of the method for processing the offline password of the device in this embodiment may be a server, such as the server 1206 in an offline state as shown in FIG. 12. The offline state may be a state in which the electronic lock 1204 and the server 1206 cannot be connected to each other via a network.

Specifically, the method may include the following operations.

In 1701, a password acquisition request may be transmitted by a terminal device.

In some embodiments, the password acquisition request corresponds to a target user corresponding to the terminal device.

For example, the target user may transmit the password acquisition request to the server via the terminal device to request the server to issue one or more offline password values.

In 1702, a target password value that satisfies an offline password assignment rule may be obtained among multiple offline password values in a second password pool.

In some embodiments, the offline password assignment rule may include that the target password value is used for the first time, i.e., in this embodiment, a target password value in the second password pool that has not been used before may be assigned after receiving the password acquisition request transmitted by the terminal device.

It should be noted that each offline password value in the second password pool may have a respective corresponding password identifier, and the password identifier may be unique. The offline password values in the second password pool may be generated by the server in accordance with the method of generating the offline passwords as shown in FIG. 13.

In 1703, the target password value may be transmitted to the terminal device.

In some embodiments, the target password value may be transmitted to the terminal device over the network on the server side to provide to the target user of the terminal device as a password input reference. Based on this, the target user of the terminal device may input the target password value to the panel of the electronic lock. After receiving the password input operation of the target user, the electronic lock may verify the input character string in the password input operation against the offline password values in the first password pool of the electronic lock. When the verification is passed, then the electronic lock may transmit the target information containing the target identifier to the server. The target information transmitted to the server may contain the target identifier corresponding to the target password value in the first password pool that matches the input character string input by the target user.

In 1704, authorization information may be generated.

In some embodiments, the authorization information may include: a password identifier corresponding to the target password value corresponding to the target user. That is, after the target password value is transmitted to the terminal device, an authorization record may be generated. The authorization record may characterize that the target password value is authorized to the target user and the target password value corresponds to the target identifier.

It should be noted that the execution order of operations 1704 and 1703 may not be limited by the order in the accompanying drawings. The operation 1703 may be executed before operation 1704, or operation 1703 and operation 1704 may be executed simultaneously.

In 1705, the target information transmitted by the device may be obtained when the terminal device has established a data connection with the server.

In some embodiments, the device, i.e., the electronic lock, may upload the target information of the electronic lock when a well data connection is established between the device and the server. The target information may include the target identifier. The target identifier may be the password identifier of the target password value used by the electronic lock.

In 1706, the target user corresponding to the target information may be identified at least based on the target identifier in the target information and the authorization information.

In some embodiments, a relation between the target identifier in the target information and the target identifier in the authorization information may be established, such that the target user using the target password value corresponding to the target identifier may be located.

According to the above embodiment, in the method for processing an offline password of a device, when an offline password value is needed in the case of an offline state of the electronic lock, the server may return a target password value in the second password pool to the terminal device and record authorization information containing the target identifier corresponding to the target password value and the target user associated with the target user requesting the target password value. After the input character string is received from the target user, the input character string may be verified with the offline password value in the first password pool generated by the electronic lock, and the password identifier of the target password value in the first password pool may be transmitted to the server after the verification is passed, so that the server can match the password identifier with the target password value, and the target user using the target password value can be distinguished, which achieves the purpose of this application.

Based on the above implementations, the following are examples of the technical schemes in the present disclosure, wherein:

On the server side, the server may match an authorized user in the following manner.

(1) The server and the terminal device such as the user's cell phone may generate M groups of passwords based on the time information and the valid time range, i.e., the first time information and the second time information in the preceding paragraph. M may be a positive integer greater than or equal to 2. The M groups of passwords may be combined into a password pool.

(2) When an authorized user performs a dynamic password acquisition through a page or an app on a cell phone, the server may return to the user a password that has not been used in the password pool, and at the same time record in the server the information of the authorized user and the unique ID of the obtained password value.

(3) When an authorized user enters the password value on a lock, when the password value has not been entered yet, the electronic lock may pass the verification and the unlocking record is saved.

(4) The electronic lock may report the unlocking record containing the unique ID of the password for unlocking, at which point the server can match the matching authorized user for that unlocking behavior by querying the authorization record and the reported unlocking record.

Figure 18:
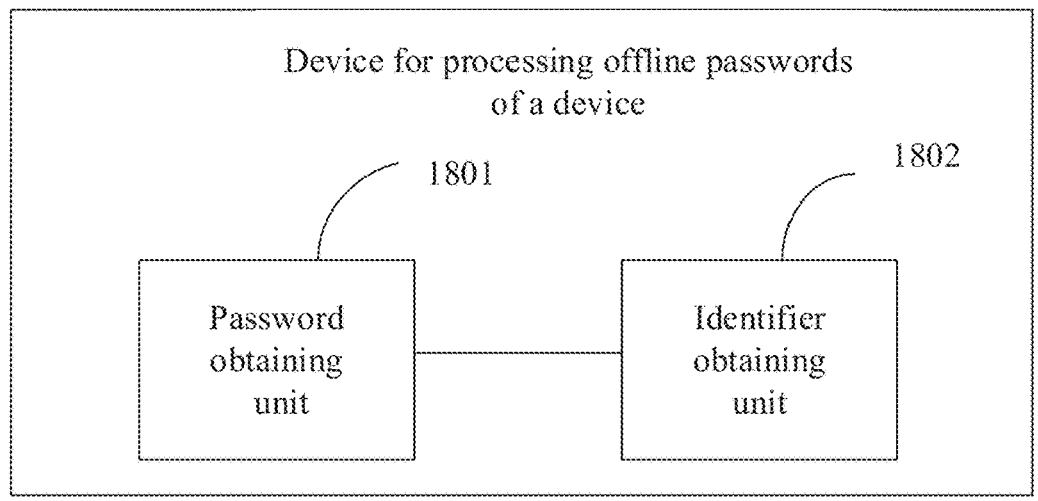
FIG. 18 is a schematic structural diagram of an exemplary apparatus for processing an offline password of a device according to some embodiments of the present disclosure.

FIG. 18, as an implementation of the method shown in some of the above figures, illustrates a device for processing an offline password of a device according to some embodiments of the present disclosure. The embodiment of the device may correspond to the embodiment of the method as shown in FIG. 13. The device may be applied specifically in an electronic lock and a server. The device shown in FIG. 18 may be a specific embodiment of the system shown in FIG. 2.

As shown in FIG. 18, the device for processing an offline password of a device of this embodiment may include: a password obtaining unit 1801 and an identification obtaining unit 1802. In some embodiments, the password obtaining unit 1801 and the identification obtaining unit 1802 may be part of the processing module 230 as shown in FIG. 2.

The password obtaining unit 1801 may be configured to: obtain multiple offline password values of the lock.

The identification obtaining unit 1802 may be configured to: obtain a respective password identifier corresponding to each of the offline password values.

In some embodiments, the password identifier may be unique, such that when the offline password value is obtained and used by a terminal device, the password identifier corresponding to the offline password value may correspond to the corresponding target user of the terminal device.

In this embodiment, the specific processing of the password obtaining unit 1801 and the identification obtaining unit 1802 and the technical effects thereof may refer to the relevant descriptions of the embodiments of operations 1301 and 1302 in FIG. 13, respectively, which is not repeated herein.

In some optional implementations of this embodiment, the password obtaining unit 1801 may specifically be configured to: obtain first time information, the first time information characterizing a current time point; process at least the first time information to obtain a target character string, the target character string containing multiple characters; group the characters in the target character string to obtain multiple character combinations, each character combination containing at least one character; process the characters in each character combination separately to obtain an offline password value corresponding to the each character combination.

In some optional implementations of this embodiment, the identification obtaining unit 1802 may specifically be configured to: obtain second time information, the second time information being related to the first time information; obtain a password identifier corresponding to each of the offline password values at least based on the password order corresponding to each of the offline password values and the second time information.

In some embodiments, the identification obtaining unit 1802 may use I=((D−1)*24+T)*4+Index to obtain the password identifier corresponding to each offline password value. Where I represents the password identifier corresponding to an Index offline password value among the multiple offline password values corresponding to the first time information, D represents the number of days from January 1 to the current time point, and T represent a time point value (e.g., an hour or minute value) under the granularity of the current time point characterized by the first time information, so that the password identifier may be unique within the current year.

In some embodiments, the identification obtaining unit 1802 may obtain an initial identifier corresponding to each offline password value by using I=((D−1)*24+T)*4+Index. Each initial identifier may be processed by using the current year information to make each obtained password identifier unique within the life cycle of the device. Where I represents the initial identifier corresponding to the first time information corresponds to the initial identifier corresponding to an Index offline password value of the multiple offline password values, D represents the number of days from January 1 to the current time point, and T represents a point time value under the granularity of the current time point characterized by the first time information.

In some optional implementations of this embodiment, the granularity of the current time point characterized by the first time information may be associated with password configuration information of the device. The password configuration information may be generated based on a pre-configuration operation.

It should be noted that the device for processing the offline password of the device may be a chip, a component or a module. The device for processing the offline password of the device may include a processor and a storage. The password obtaining unit 1801 and the identification obtaining unit 1802, etc. may be stored in the storage as program units. The processor may execute the program units stored in the storage to implement the corresponding functions.

The processor may contain a kernel, the kernel may retrieve the corresponding program units from the memory. There may be one or more kernels, and the security may be improved by adjusting kernel parameters to: obtain multiple offline password values for the device; obtain a password identifier corresponding to each of the offline password values each; wherein the password identifier is unique such that in case the offline password values are obtained and used by a terminal device, the password identifier corresponding to the offline password values corresponds to the corresponding target user of the terminal device.

The memory may include a computer readable medium, in the form of a volatile memory, a random access memory (RAM) and/or a non-volatile memory, such as read-only memory (ROM) or flash memory (flash RAM). The memory may include at least one memory chip.

The device for processing an offline password of a device provided in the above-described embodiment of the present disclosure may obtain, a password identifier corresponding to each offline password value after obtaining multiple offline password values of the device. The password identifier may be unique. In case the offline password value is obtained and used by a terminal device, the password identifier corresponding to the offline password value can correspond to the target user corresponding to the terminal device. Thus, in this embodiment, by configuring a unique password identifier for the offline password value, the user of the terminal device who uses the offline password value may be distinguished, which achieves the purpose of the present disclosure.

Figure 19:
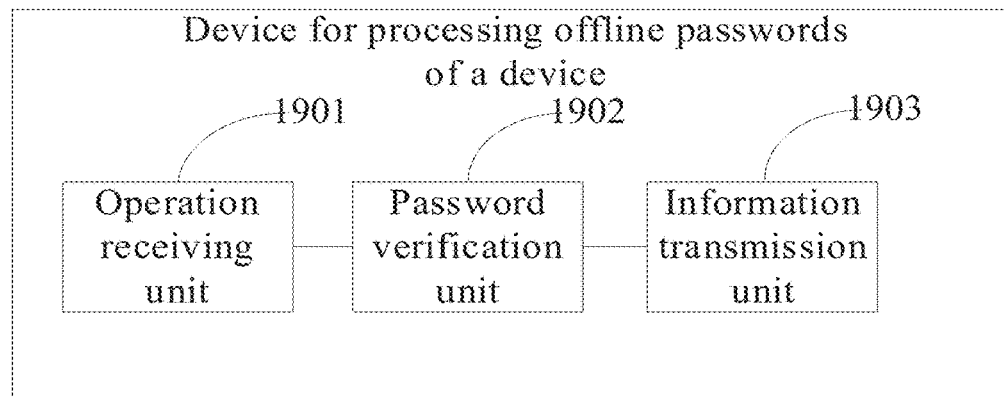
FIG. 19 is a schematic diagram of results of another exemplary apparatus for processing an offline password of a device according to some embodiments of the present disclosure.

FIG. 19, as an implementation of the method shown in some of the above figures, provides an embodiment of a device for processing an offline password of a device. The embodiment of the device may correspond to the embodiment of the method shown in FIG. 16. The device may be applied specifically in an electronic lock. The device shown in FIG. 19 may be a specific embodiment of the system shown in FIG. 2.

As shown in FIG. 19, the device embodiment for processing an offline password of a device may include: an operation receiving unit 1901, a password verification unit 1902, and an information transmission unit 1903. In some embodiments, the operation receiving unit 1901 and the information transmission unit 1903 may be part of the communication module 210 as shown in FIG. 2. In some embodiments, the password verification unit 1902 may be part of the security module 220 as shown in FIG. 2.

The operation receiving unit 1901 may be configured to: receive a password input operation from a target user. The password input operation may contain an input character string. The input character string may contain at least one input character.

The password verification unit 1902 may be configured to: perform a password verification of whether the input character string satisfies an offline password verification rule based on multiple offline password values in a first password pool. Each offline password value in the first password pool may have a respective corresponding password identifier. The password identifier may be unique. The offline password verification rule may include that: a target character matching the input character string exists in the first password pool and the target password value is used for the first time.

The information transmission unit 1903 may be configured to in case the input character string satisfies the offline password verification rule, transmit the target information to the server in case the device has established a data connection with the server. The target information may contain a target identifier corresponding to the target password value, so that the server may determine, at least on the basis of the target identifier in the target information, the target user corresponding to the terminal device that obtains the target password value from the server.

In this embodiment, the specific processing of operating the receiving unit 1901, the password verification unit 1902, and the information transmission unit 1903 and the technical effects thereof may refer to the relevant descriptions of the embodiments of operations 1601, 1602, and 1603 in FIG. 16, respectively, which is not repeated herein.

It should be noted that the device for processing the offline password of the device may include a chip, a component, or a module. The device for processing the offline password of the device may include a processor and a storage, and the operation receiving unit 1901, the password verification unit 1902, the information transmission unit 1903, etc. may be stored in the storage as program units, and the processor may execute the above-mentioned program units stored in the storage to achieve the corresponding functions.

The processor may contain a kernel, and the kernel may retrieve the corresponding program units from the memory. There may be one or more kernels, and the security may be improved by adjusting kernel parameters to:

receive a password input operation from a target user, the password input operation including an input character string, the input character string containing at least one input character;

verify whether the input character string satisfies an offline password verification rule based on multiple offline password values in a first password pool, each the offline password value in the first password pool having a respective corresponding password identifier, and the password identifier being unique; the offline password verification rule comprising: a target password value matching the input character string exists in the first password pool and the target password value is used for the first time;

in case the input character string satisfies the offline password verification rule, transmit target information to the server in case the device has established a data connection with the server, the target information contain a target identifier corresponding to the target password value, so that the server may determine, at least based on the target identifier in the target information, the target user corresponding to the terminal device that obtains the target password value from the server.

The memory may include a computer readable medium, in the form of a volatile memory, a random access memory (RAM) and/or a non-volatile memory, such as read-only memory (ROM) or flash memory (flash RAM). The memory may include at least one memory chip.

In the device for processing an offline password of a device provided in the above embodiment of the present disclosure, in a case that an offline password value is required when the electronic lock is in an offline state, the electronic lock, after receiving an input character string from the target user, may verify the input string against the offline password values in the first password pool generated by the electronic lock. After the verification, the password identifier of the target password value in the first password pool corresponding to the input character string may be transmitted to the server, so that the server can match the password identifier with the target password value, and the target user using the target password value can be distinguished, thereby achieving the purpose of the present disclosure.

Figure 20:
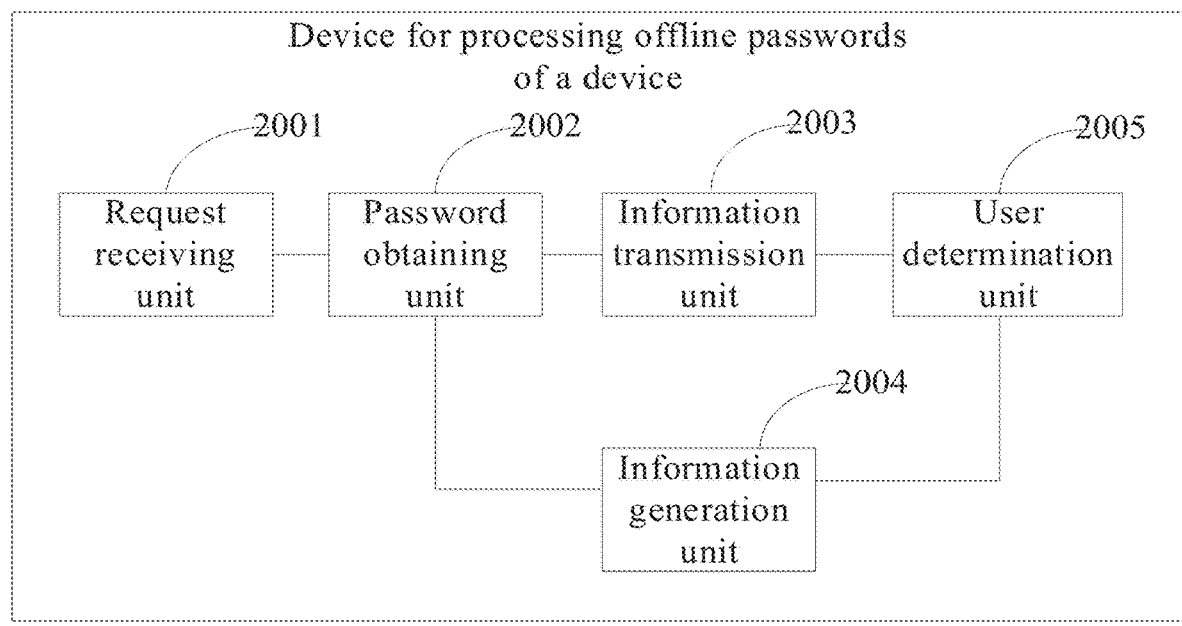
FIG. 20 is a schematic diagram of results of another exemplary apparatus for processing an offline password of a device according to some embodiments of the present disclosure.

FIG. 20, as an implementation of the method shown in some of the above figures, provides an embodiment of a device for processing an offline password of a device. The embodiment of the device may correspond to the embodiment of the method as shown in FIG. 17. The device may be applied specifically in a server. The device shown in FIG. 20 may be a specific embodiment of the system shown in FIG. 2.

As shown in FIG. 20, the device for processing an offline password of a device of this embodiment may include: a request receiving unit 2001, a password obtaining unit 2002, an information transmission unit 2003, an information generation unit 2004, and a user determination unit 2005. In some embodiments, the request receiving unit 2001 and the information transmission unit 2003 may be part of the communication module 210 as shown in FIG. 2. In some embodiments, the password obtaining unit 2002, the message generation unit 2004, and the user determination unit 2005 may be part of the processing module 230 as shown in FIG. 2.

The request receiving unit 2001 may be configured to: receive a password acquisition request transmitted by a terminal device. The password acquisition request may correspond to a target user corresponding to the terminal device.

The password obtaining unit 2002 may be configured to: obtain, among multiple offline password values in a second password pool, a target password value satisfying an offline password assignment rule. The offline password assignment rule may include: the target password value being used for the first time. Each offline password value in the second password pool may have a respective corresponding password identifier, and the password identifier may be unique.

The information transmission unit 2003 may be configured to: transmit the target password value to the terminal device.

The information generation unit 2004 may be configured to: generate authorization information. The authorization information may include: a password identifier corresponding to the target password value corresponding to the target user.

The user determination unit 2005 may be configured to: determine a target user corresponding to the target information based at least on the target identifier in the target information and the authorization information, in case the information transmission unit 2003 obtains the target information transmitted by the device when the device has established a data connection with the server.

In this embodiment, the specific processing of the request receiving unit 2001, the password obtaining unit 2002, the information transmission unit 2003, the information generation unit 2004, and the user determination unit 2005 and the technical effects thereof may be referred to embodiments of operations 1701, 1702, 1703, 1704, 1705 and 1706, which is not repeated herein.

It should be noted that the device for processing the offline password of the device may include a chip, a component, or a module. The device for processing the offline password of the device may include a processor (e.g., the processor 320) and a memory (e.g., the random access memory 340 or the read-only memory 330), a request receiving unit 2001, a password obtaining unit 2002, an information transmission unit 2003, an information generation unit 2004, and a user determination unit 2005 may be stored in the memory as program units, and the processor may execute the above-mentioned program units stored in the memory to achieve the corresponding functions.

The processor may contain a kernel, and the kernel may retrieve the corresponding program units from the memory. There may be one or more kernels, and the security may be improved by adjusting kernel parameters to:

receive a password acquisition request transmitted by a terminal device. The password acquisition request may correspond to a target user corresponding to the terminal device;

obtain, among multiple offline password values in a second password pool, a target password value satisfying an offline password assignment rule; the offline password assignment rule including: the target password value being used for the first time; each the offline password value in the second password pool having a respective corresponding password identifier, and the password identifier being unique;

transmit a target password value to the terminal device and generating authorization information, the authorization information including: a password identifier corresponding to the target password value corresponding to the target user;

in the case of obtaining the target information transmitted by the device when it has a data connection with the server, determine the target user corresponding to the target information, based at least on the target identifier in the target information and the authorization information.

The memory may include a computer readable medium in the form of a volatile memory, a random access memory (RAM) and/or a non-volatile memory, such as read-only memory (ROM) or flash memory (flash RAM). The memory may include at least one memory chip.

The above-described embodiment of the present disclosure provides a device for processing an offline password of a device. When an offline password value is required in the case of an offline state of the electronic lock, the server may return a target password value in the second password pool to the terminal device and record authorization information related to the target identifier. The authorization information may contain the target password value corresponding to that target password value and the target user requesting that target password value. After the electronic lock receives the input character string from the target user, the input character string may be verified with the offline password values in the first password pool generated by the electronic lock. After the verification is passed, the password identifier of the target password value in the first password pool corresponding to the input character string may be transmitted to the server, so that the server can match the password identifier with the target password value, and the target user using the target password value can be distinguished, which achieves the purpose of the present disclosure.

Embodiments of the present disclosure provide a schematic diagram illustrating a structure of one embodiment of a device. The device, such as an electronic lock, may contain one or more processors, and a storage device. One or more programs may be stored in the storage device. When the one or more programs are executed by the one or more processors, the one or more processors may be directed to implement a method for processing an offline password of a device.

Embodiments of the present disclosure provide a schematic diagram illustrating a structure of one embodiment of a server. The device, such as a server connected to an electronic lock and terminal device, may contain one or more processors, and a storage device on which one or more programs are stored. When the one or more programs are executed by the one or more processors, the one or more processors may be directed to implement a method for processing an offline password of the device.

Figure 21:
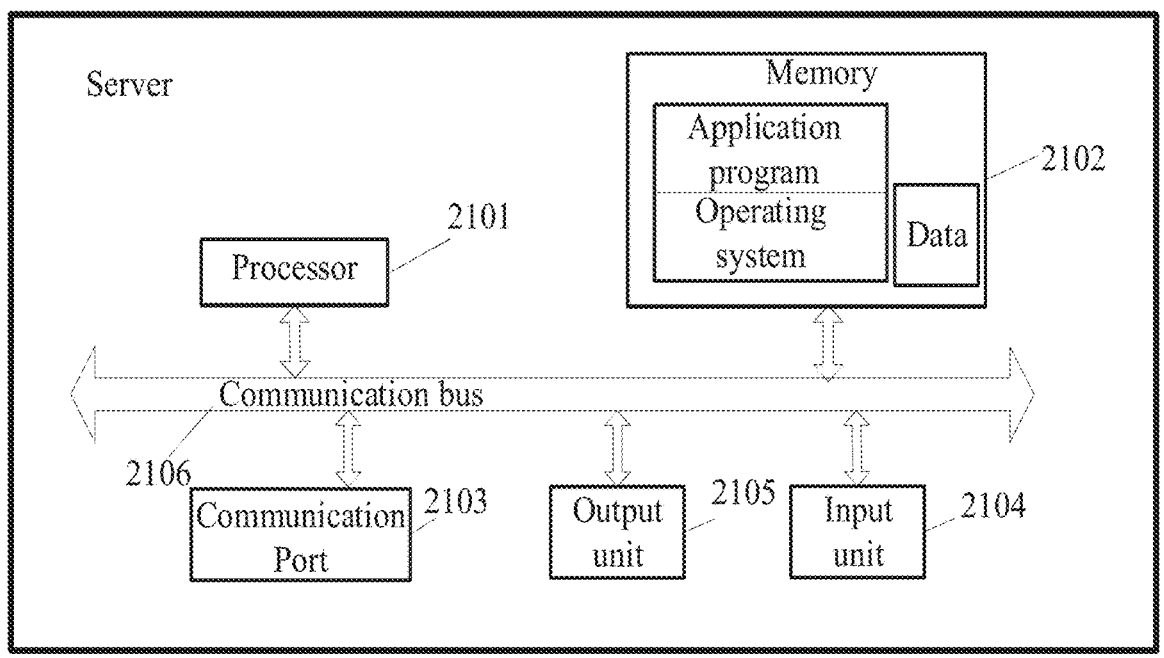
FIG. 21 is a schematic diagram of results of an exemplary server according to some embodiments of the present disclosure.

Taking a server as an example, FIG. 21 illustrates a schematic diagram illustrating a structure of a server according to some embodiments of the present disclosure. The server as illustrated in FIG. 21 may be only an example and should not impose any limitations on the functionality or scope of use of embodiments of the present disclosure.

As shown in FIG. 21, the server may include a processor 2101, a memory 2102, a communication interface 2103, an input unit 2104, an output unit 2105, and a communication bus 2106. The processor 2101 and the memory 2102 may be connected to each other via the communication bus 2106. The communication interface 2103, the input unit 2104, and the output unit 2105 may also be connected to the communication bus 2106.

The communication interface 2103 may be an interface of a communication module (e.g., communication module 210), such as an interface to a GSM module. The communication interface 2103 may be used to obtain data such as a password acquisition request sent by the terminal device. The communication interface 2103 may also be used to transmit the target password value to the terminal device, and also used to receive an unlocking record, i.e., target information, sent by the electronic lock when a connection is established between the electronic lock and the server. For more description about the communication interface 3203, please refer to FIG. 3 for more description of the communication port 350.

In embodiments of the present disclosure, the processor 2101 may include a central processing unit (CPU), an application-specific integrated circuit (ASIC), a digital signal processor (DSP), a specialized integrated circuit (ASIC), off-the-shelf programmable gate array (FPGA), or other programmable logic device, etc. For more description about the processor 2101, please refer to FIG. 3 for a more detailed description of the processor 320.

In one possible implementation, the memory 2102 may include a program storing area and a data storing. The program storing area may store an operating system, and applications required for at least one function (e.g., password generation and password finding, etc.), etc.; and the data storing may store data (e.g., an offline password value, etc.) created based on the use of the computer.

In addition, the memory 2102 may include a high-speed random access memory and may also include a non-volatile memory, such as at least one disk memory device or other volatile solid state memory device. For more description about the memory 2102, please refer to FIG. 3 for more descriptions of the read-only memory 330 and/or the random access memory 340.

The processor 2101 may invoke a program stored in the memory 2102. Specifically, the processor 2101 may perform the operation performed by the server in FIGS. 13 through 17 above.

The memory 2102 may be used to store one or more programs, and the programs may include a program code. The program code may include a computer operation instruction. In this embodiment of the present disclosure, the memory 2102 may contain at least the program for implementing the above functions for processing the offline password of the device.

The present disclosure may also include an input unit 2104, and the input unit 2104 may include at least one of a touch sensing unit that senses touch events on the touch display panel, a keyboard, a mouse, a camera, a pickup, and other devices.

The output unit 2105 may include at least one of: a display, a speaker, a vibration mechanism, a lamp, and other devices. The display may include a display panel, such as a touch display panel, etc. In one possible case, the display panel may be configured in the form of a liquid crystal display (LCD), an organic light-emitting diode (OLED), or the like. The vibration mechanism may also displace the server during operation. In one possible implementation, the vibration mechanism may include an electric motor and an eccentric oscillator, and the motor drives the eccentric oscillator to rotate and thereby generate vibration. The brightness and/or color of the lamp may be adjustable, and in one possible implementation, different information may be reflected by at least one of the lamp's illumination, brightness, and color, such as alarm information reflected by the lamp emitting a red light. For more description about the input unit 2104 and/or the output unit 2105 refer to FIG. 3 for more description of the input/output 360.

Of course, the structure of the server shown in FIG. 21 does not constitute a limitation of the server in embodiments of the present disclosure, and in practical applications the server may include more or fewer components than those shown in FIG. 21, or a combination of certain components.

Embodiments of the present disclosure provide a computer readable medium having a computer program stored thereon, wherein the program, when executed by a processor, may implement the method described in the method embodiments above for processing an offline password of a device.

Embodiments of the present disclosure provide a processor for running a program, wherein the program, when run by the processor, may implement the method for processing an offline password of a device as described in the method embodiments above.

The present disclosure also provides a computer program product that, when executed on a data processing device, causes the data processing device to implement the method for processing an offline password of a device as described in the method embodiments above.

The server, device, computer-readable medium, or computer program product provided by the above embodiments of the present disclosure may all be used to perform the corresponding methods provided above, and thus the beneficial effects that can be achieved can be referred to the beneficial effects in the corresponding methods provided above, which will not be repeated herein.

The technical scheme of the present disclosure is exemplified by taking the lock being an electronic lock as an example.

The present application provides a one-time offline dynamic password generation scheme is proposed and the generation scheme may be capable of generating a unique password identifier ID (Identity document) for matching authorized user information.

Figure 22:
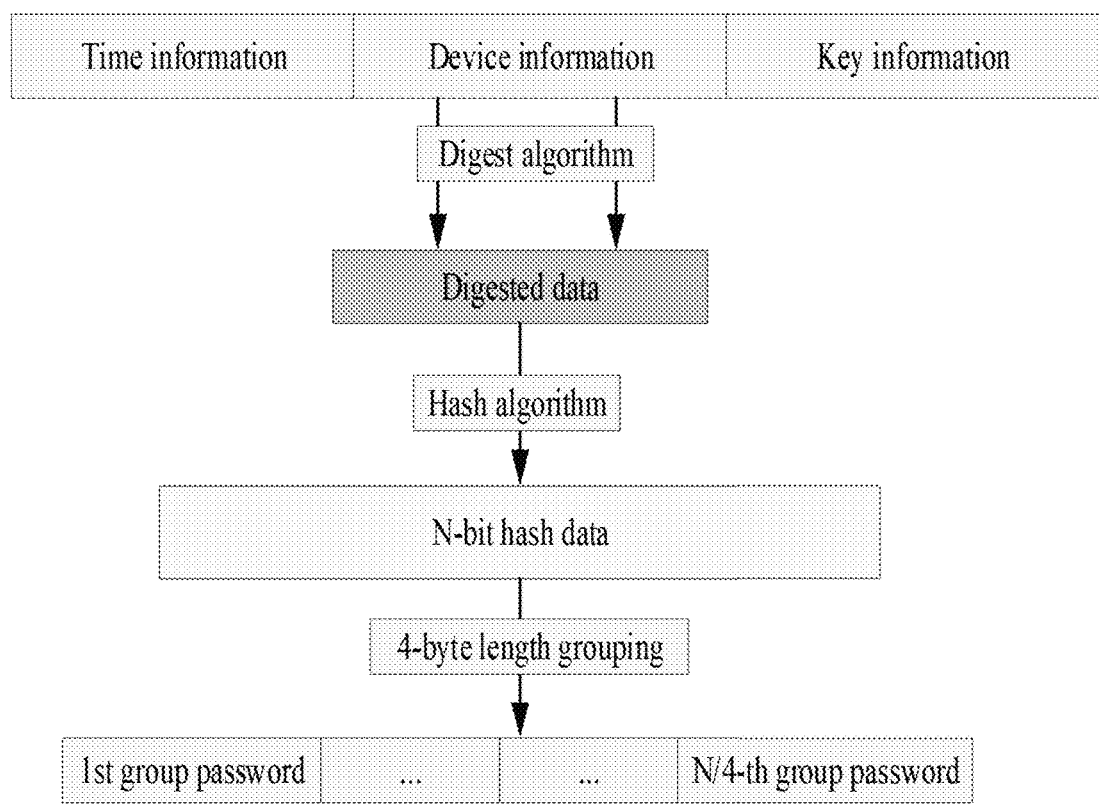
FIG. 22 is a reference schematic diagram of an exemplary generation algorithm of a dynamic password according to some embodiments of the present disclosure.

The dynamic password generation algorithm may be shown with reference to FIG. 22, and the lock side and the server side may respectively perform the following operations including:
1) converting the time information into a fixed-length character string, e.g., 11:05:00 on Apr. 28, 2020 is converted to a character string of "204200428110500".
2) combining the time information character string from operation 1) with device-specific information (e.g., a device serial number, unique non-sensitive information of a UUID, etc.) and key information (also unique per device) into raw data, and then calculating the raw data using a digest algorithm to obtain a string of digest data, wherein the digest algorithm may include one or a combination of the following algorithms (without limiting the common ones listed): MD (Message Digest)/SHAR (Secure Hash Algorithm)/MAC (Message Authentication Codes), etc.
3) using the string of digest data generated in operation 2) as the original text, and then calculation using a hash algorithm to obtain N-byte data, i.e., the target character string, wherein the hash algorithm may include, but are not limited to, (without limiting the listed common algorithms): MD/SHAR/MAC, etc. N is a positive integer greater than or equal to 2.
4) generating N/4 groups of integer values from the N-byte data generated in operation 3) according to a group of 4 bytes, e.g., when the data length is 32 bytes, 8 groups of integer values may be generated.
5) performing a specific operation on each of the N/4 groups of integer values generated in operation 4) according to a required number of password bits (i.e., the length of the password in the previous section) to generate a specific password value. Taking a modulo calculation as an example, when a 6-bit password is to be generated, the modulo operation may be performed on 1000000 ($10^6$), and when an 8-bit password is to be generated, the modulo operation may be performed on 100000000 ($10^8$). When the obtained result is less than the number of password bits, then the obtained result may be preceded by 0, so that each group of passwords may generate final password values with a specific length.

Based on the algorithm described above, the number of passwords that can be generated for the lock in this embodiment depends on two factors: (1) the granularity of the time information (e.g., a minimum unit of the time information, such as a minute, an hour, or a day); and (2) the length of the N bytes obtained by the hash algorithm employed.

Further, a unique password ID may be generated for each final password value, respectively, using the following method, which in turn enables that the user can be positioned by correlating the password ID with specific authorized user information when the password value is used.

The password ID may be used to be correlated with specific authorized user information to facilitate querying the door opening record and other functions. The password ID may correspond to the password value one by one, which avoids leakage of the password value.

For the lock itself, the password ID may be generated in two ways: a generation of the password ID being unique for a period of time (number); and a generation of the password ID being unique for the life cycle of the lock.

For the first way:
1) The lock and the server may agree in advance, e.g., agreeing that ID may be reversed to 0 (or an agreed starting value) after one year (or after 100 passwords).
2) A basic ID value may be generated using an agreed formula, e.g., using the formula of ((D−1)*24+T)*4+ Index. D represents the number of days from January 1 of this year. T may have a specific different meaning depending on the unit of a granularity. For example, when the granularity is 1 hour, T may be a value of the current hour. Index represents a sequence (1~N) of N groups of passwords generated each time. Assuming that the granularity of 1 hour is used and 4 groups of passwords are generated each time, the 4 groups of generated password IDs may be 417/418/419/420 when the current time is 8:00 on January 5.
3) For example, according to the agreement in 1) and using the formula in 2), at 23:00 after 364 days, the last ID may be 35039, and at 0:00 after 365 days, the ID may revert to 0.

For the second way:
1) On the basis of 2) in the first way, the generated ID and time related information may be combined to generate a unique ID value. For example, a final ID of 200417/200418/200419/200420 may be generated by combing a password at 8:00 on January 5 and 200000 (this value may be agreed in advance by the lock and the server, without changing, starting from 0 is also possible, the feature of which is which this value will increase with time such as year month, etc.).
2) Based on the basic ID value generated in operation 1), a final unique ID value may be generated by combining the basic ID value with the year information in a specific way, for example, using the basic ID+last 2 digits of the year information*10000. Then, for the 4 groups of password IDs of 1) above, for example, when obtained in 2020, the final password ID of 200417/200418/200419/200420 may be after conversion. The calculation of the extended IDs may be different for different granularities.

It can be seen that, according to the above algorithm, for the dynamic password IDs, even when the basic IDs are the same, the final IDs obtained may be different in different years.

Then, the server may perform the matching and positioning of authorized users as follows.
(1) Based on the time information and a valid time range, N groups of passwords may be generated and combined into a password pool. It should be noted that the generation of the password pool may be performed separately on both sides of the server and the lock.
(2) When an authorized user performs a dynamic password acquisition through a page on the terminal device or the application APP (Application) side, the server may return the password that has not been used in the password pool, and also record information of the authorized user and a unique ID of the acquired password value in the server.
(3) When the authorized user inputs a password value on the lock, when the password value has not been input before, the lock may pass the verification and save the unlocking record.
(4) The lock may report the unlocking record which contains the unique ID of the password for unlocking. At this time, the server may match the matching authorized user for the unlocking behavior by querying the authorization record and the reported unlocking record.

It can be seen that the security of the offline dynamic password in the present disclosure may be ensured by the following ways:
(1) The offline password generation scheme in the present disclosure may increase the number of bits of password values to reduce the probability of repetition. For example, in the password generation method described above, the final password value generated for each group of passwords may use 8 or 10 bits of password length.
(2) The hash algorithm may be used in the offline password generation scheme in the present disclosure, and since the hash algorithm obtains a fixed length mapping data of the input sequence, others cannot obtain the original input sequence by means of reverse operation.
(3) The offline password generation scheme in this application may set a valid time range for each password according to the time granularity. For example, when the granularity is 1 hour, the valid time range for that password may be set to 1 hour or 2 hours.
(4) The lock may record the password input record to ensure that the password cannot be repeatedly inputted, i.e., the password is valid once.

It can be seen that in the present disclosure, different numbers of secure dynamic offline passwords may be generated according to the demand by adding different granularity of timestamp information through a specific algorithm; and the generated dynamic offline passwords use a unique password ID through a specific calculation, so that the authorized user (the user who obtains the dynamic password) can uniquely match the ID. When a user performs the unlocking behavior, different users can be effectively distinguished. Moreover, the dynamic password in the present disclosure may be valid for a one time by recording and saving the input information, which achieves effective monitoring purposes.

And the intelligent lock and other products realized based on the technical scheme of the present disclosure may have the following characteristics.
(1) In the case that the intelligent lock is offline, the one-time dynamic password may be obtained through the web side or the APP side, and the corresponding intelligent lock may be unlocked when the password is input on the panel of the intelligent lock within a specified time range. The same password can only be used once.
(2) The input password may have a unique ID that is generated according to a specific calculation method. When the user obtains the password and input the password to unlock the door, the operator of the unlocking behavior can be uniquely matched based on the user information and the password ID information.

The present disclosure is described with reference to flowcharts and/or block diagrams of methods, devices (systems), and computer program products according to embodiments of the present disclosure. It should be understood that each or a combination of a flowchart and/or a process in a block diagram and/or a block may be implemented by computer program instructions. These computer program instructions may be provided to a processor of a general purpose computer, a specialized computer, an embedded processor, or other programmable data processing device to produce a machine, such that the instructions executed by the processor of the computer or other programmable data processing device may produce a device for implementing the functions specified in one process or multiple processes in the flowchart and/or one block or multiple blocks in the block diagram.

These computer program instructions may also be stored in a computer readable memory capable of directing a computer or other programmable data processing device to operate in a particular manner, such that the instructions stored in that computer readable memory may produce an article of manufacture comprising an instruction device that implements a function specified in one process or multiple processes of a flowchart and/or one block or multiple blocks of a block diagram.

These computer program instructions may also be loaded onto a computer or other programmable data processing device such that a series of operational steps are performed on the computer or other programmable device to produce computer-implemented processing such that the instructions executed on the computer or other programmable device provide instructions for implementing the functions specified in the flowchart one process or a plurality of processes and/or the block diagram one box or multiple boxes steps for implementing the functions specified in the flowchart one or more processes and/or the block diagram one or more boxes.

In an exemplary configuration, the computing device may include one or more processors (CPUs), input/output interfaces, network interfaces, and memory.

The memory may include a computer readable media, in the form of a volatile memory, a random access memory (RAM), and/or non-volatile memory, such as read-only memory (ROM) or flash memory (flash RAM). The memory may be an example of a computer readable medium.

The computer readable medium may include non-volatile and volatile, removable and non-removable media and may be implemented by any method or technique for storing information. The information may be computer-readable instructions, data structures, modules of programs, or other data. Examples of storage media for computers may include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disc only Read Memory (CD-ROM), Digital Versatile Disc (DVD) or other optical storage, magnetic cartridge tape, magnetic tape disk storage or other magnetic storage device, or any other non-transport medium that can be used to store information that can be accessed by a computing device. As defined herein, the computer readable medium may do not include transient computer readable media (transitory media), such as modulated data signals and carriers.

It should be understood by those skilled in the art that embodiments of the present disclosure may be provided as methods, systems, or computer program products. Accordingly, the present disclosure may take the form of an entirely hardware embodiment, an entirely software embodiment, or an embodiment combining software and hardware aspects. Further, the present disclosure may take the form of a computer program product implemented on one or more computer-usable storage media (including, but not limited to, disk memory, CD-ROM, optical memory, etc.) that contains computer-usable program code therein.

The intelligent lock generally includes a panel, a lock body, a handle, and other structures. The lock body may be configured with multiple bolts, such as a detection bolt, a locking block, a scissor bolt, a main bolt, or the like. A drive mechanism (e.g., a motor) may be set to drive the bolt, or the like, to move automatically, such that the intelligent lock is caused to be in a locked state or an unlocked state. For example, when the user opens the door, the user may input the password or fingerprint of the intelligent lock. After the intelligent lock is unlocked, the user may need to press down the handle of the intelligent lock to open the door. When the user closes the door, the user may also need to lift the handle in order to lock the intelligent lock. Therefore, the current intelligent lock requires the user to perform operations such as pressing down the handle, lifting the handle and other operations to unlock or lock the intelligent lock, there may be a high degree of operation complexity, and there may also be a case that the door is not closed as the user forgets to manually lift the handle, thereby existing security risks.

Some embodiments of the present disclosure provide a smart device control system and method (e.g., a control system 200 and a control method 400). The control system and the control method may be applied to control an intelligent lock. The intelligent lock may include a lock body and one or more lock body sensors arranged in the lock body. The one or more lock body sensors may be configured to acquire sensing signals. In some embodiments, target operations of the control system 200 may include an unlocking operation and/or a locking operation. In some embodiments, a preset condition may include an unlocking condition. In some embodiments, at least one processor (e.g., the processor 320) of the control system 200 may be configured to direct the system to: obtain an unlocking detection result according to sensing signals. The unlocking detection result may at least represent whether the lock body is unlocked successfully. The at least one processor of the control system may be configured to direct the system to: in response to the unlocking detection result representing that the lock body is unlocked successfully, monitor a locking signal. The locking signal may be used to direct the lock body to perform a locking operation. The at least one processor of the control system may be configured to direct the system to: in response to monitoring the locking signal, control the lock body to perform the locking operation. The at least one processor of the control system may be further configured to direct the system to: obtain a locking detection result according to the sensing signals. The locking detection result may at least represent whether the lock body is locked successfully.

In some embodiments, after receiving the control command for directing the intelligent lock to perform the unlocking operation, the smart device control system may control the lock body to be unlocked by determining whether the control command satisfies the unlocking condition. The smart device control system may obtain the unlocking detection result representing whether the lock body is unlocked successfully through the lock body sensors on the lock body. In response to that the unlocking is successful, the lock body may be controlled to perform the locking operation by monitoring the locking signal, and a locking detection result representing whether the lock body is locked successfully may be obtained through the lock body sensors on the lock body. The present disclosure realizes the unlocking and locking control of the lock body through the real-time monitoring of the control command and the locking signal on the lock body, and the results of the unlocking and locking of the lock body may be monitored by the sensors on the lock body. The user does not need to perform other operations during the unlocking and locking process, thereby reducing the complexity of the operation and realizing the automatic control of the intelligent lock.

Figure 23:
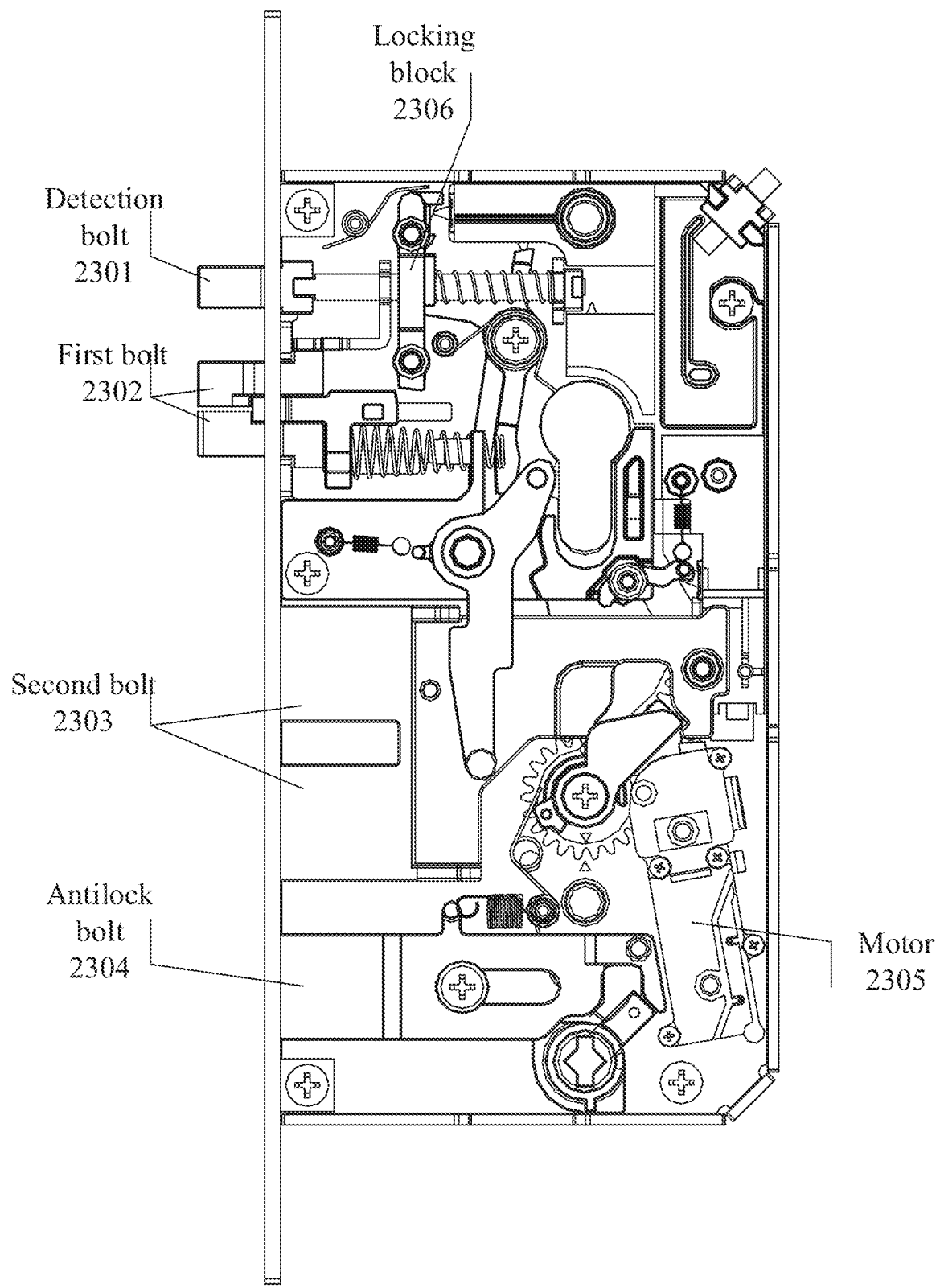
FIG. 23 is a schematic structural diagram of an exemplary intelligent lock according to some embodiments of the present disclosure.

FIG. 23 is a schematic structural diagram illustrating an exemplary intelligent lock according to some embodiments of the present disclosure. FIG. 23 presents an unlocked state.

In some embodiments, as shown in FIG. 23, the lock body of the intelligent lock 2300 may be provided with a detection bolt 2301, a first bolt 2302 and a second bolt 2303. The first bolt 2302 may a bolt that can be compressed under an external force and pop out after the external force is removed. For example, the first bolt 2302 may include a scissors bolt, a locking bolt, etc. The second bolt 2303 may be a bolt at a preset locking position. For example, the second bolt 2303 may include a main bolt, etc. In some embodiments, the lock body may also be provided with an antilock bolt 2304. Taking a scenario where the intelligent lock 2300 is configured on a door as an example, the detection bolt 2301, the first bolt 2302, and the second bolt 2303 may be arranged in sequence along a length direction of the door. In some embodiments, the specific arrangement positions of the detection bolt 2301, the first bolt 2302 and the second bolt 2303 may be changed based on an adjustment of an internal dynamic coordination structure.

In some embodiments, the intelligent lock 2300 may detect the state of the intelligent lock 2300 (e.g., a locked state, an unlocked state, etc.) through other detection components other than the detection bolt 2301. For example, in addition to the detection bolt 2301, the detection components may also include a magnet (e.g., a door magnetism, a geomagnetism, etc.), a gyroscope, etc. The state of the detection components may be detected by detection component sensors, thereby determining the state of the intelligent lock according to the state of the detection components.

In some embodiments, a motor 2305 may be arranged in the lock body of the intelligent lock 2300. A driving force for automatic locking and unlocking functions may be provided by the motor 2305, and a power transmission may be implemented through a transmission assembly. In some embodiments, the intelligent lock 2300 may include a motor drive circuit arranged in the lock body, and the motor 2305 may be controlled to operate by the motor drive circuit. In some embodiments, other drive mechanisms, such as an electric cylinder, an electric oil cylinder, etc., may also be arranged in the lock body. In some embodiments, an automatic drive mechanism may not be arranged in the lock body and locking and unlocking operations may be performed manually.

In some embodiments, the first bolt 2302 may be switched between an unlocking operation position and a locking operation position. Further, a locking block 2306 used for locking the first bolt 2302 (such as the scissors bolt) may also be arranged in the lock body. The locking block 2306 may switch between the unlocking operation position and the locking operation position relative to the lock body. When the locking block 2306 switches to the locking operation position, the first bolt 2302 may be in the locked state, and the locking block 2306 may restrict a telescopic action of the first bolt 2302. When the locking block 2306 switches to the unlocking operation position, the first bolt 2302 may be in the unlocked state, and the first bolt 2302 may perform the telescopic action freely.

In some embodiments, the lock body may also be provided with one or more lock body sensors that are arranged in cooperation with the detection bolt 2301, the first bolt 2302 and the second bolt 2303, respectively. The lock body sensors may be configured to acquire sensing signals representing the state of the detection bolt 2301, the first bolt 2302 and/or the second bolt 2303. For example, the lock body sensors may include one or any combination of a detection bolt sensor arranged in cooperation with the detection bolt 2301, a locking block sensor arranged in cooperation with the first bolt 2302 (the locking block 2306), a locking sensor arranged in cooperation with the second bolt 2303, an unlocking sensor arranged in cooperation with the first bolt 2302, a motor sensor arranged in cooperation with the motor 2305, etc. In some embodiments, the sensor signals acquired by the lock body sensors may be analyzed to determine whether corresponding operation information occurs to the corresponding bolt. In some embodiments, the operation information may include information of the position change of the bolt, such as telescoping, rotating, moving, etc.

In some embodiments, the unlocking detection result may be obtained according to the sensing signals. The unlocking detection result may at least represent whether the lock body is unlocked successfully. In some embodiments, the sensing signals may include position information of a bolt, e.g., the position of the locking block 2306 of the first bolt 2302. In some embodiments, the locking block sensor arranged in cooperation with the locking block 2306 of the first bolt 2302 may detect the position of the locking block 2306. By analyzing the positions of the locking block 2306 obtained at different times, whether the first bolt 2302 switches from the locked state to the unlocked state may be determine, such that whether the lock body has completed the unlocking operation may be determined. For example, the locking block sensor may detect that the locking block 2306 is in the locking operation position at a first moment, and the locking block 2306 is in the unlocking operation position at a second moment (e.g., a moment after the first moment), representing that telescopic operation information may occur to the first bolt 2302 between the first moment and the second moment, and the lock body may be unlocked successfully.

In response to the unlocking detection result representing that the lock body is unlocked successfully, the locking signal may be monitored through the sensor signals, and the locking signal may be used to direct the lock body to perform the locking operation. In some embodiments, the monitoring the locking signal may include: monitoring whether the detection bolt sensor detects the operation information of the detection bolt 2301; monitoring whether the locking block sensor detects the operation information of the first bolt 2302. When the detection bolt sensor detects the operation information of the detection bolt 2301, and the locking block sensor detects the operation information of the first bolt 2302, it may represent that the locking signal is monitored, and the lock body may be directed to perform the locking operation. When the detection bolt sensor does not detect the operation information of the detection bolt 2301, and/or the locking block sensor does not detect the operation information of the first bolt 2302, it may represent that the locking signal is not monitored.

Figure 24:
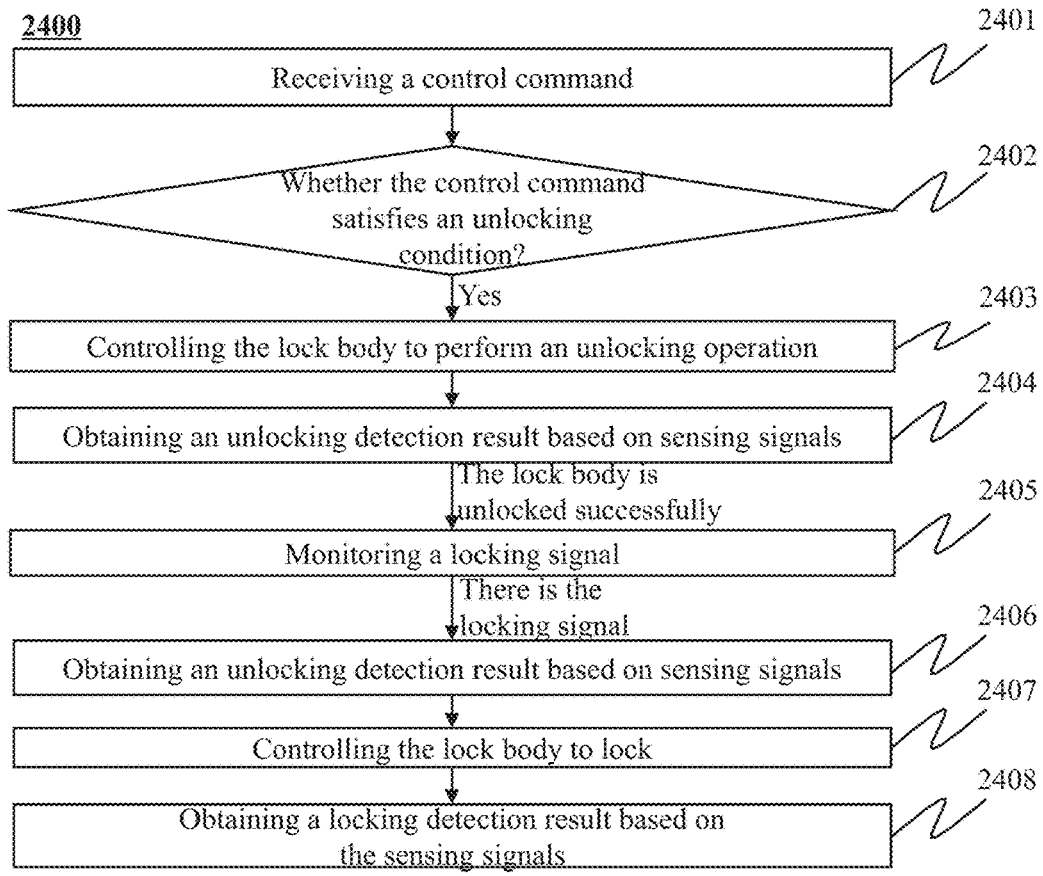
FIG. 24 is a flowchart of an exemplary method for controlling an intelligent lock according to some embodiments of the present disclosure.

FIG. 24 is a flowchart illustrating an exemplary method for controlling an intelligent lock according to some embodiments of the present disclosure. The process 2400 may be implemented by one or more modules or processors of the smart device control system 200 in the present disclosure. For example, the process 2400 may be implemented by a lock body (e.g., one or more processors included in the lock body) in an intelligent lock (e.g., the intelligent lock as shown in FIG. 23) or a server (e.g., a server 110) that may communicate with the lock body. For the convenience of description, the following description takes the intelligent lock as the execution subject of the process 2400.

In 2401, a control command may be received. In some embodiments, one or more modules or processors (e.g., a communication module 210, a security module 220, or a processor 320) of the control system 200 may receive the control command. The control command may be used to direct the lock body of the intelligent lock to perform an unlocking operation.

In some embodiments, the control command may be obtained by obtaining an encrypted instruction and then decrypting the encrypted instruction. The encrypted instruction may include an encrypted control key. The control key may include an input password, such as an offline password (e.g., an offline password value corresponding to a unique password identifier), an online password (e.g., an online password value sent by a user to the server 110 through the terminal device 140), etc. In some embodiments, the encrypted instruction may be obtained by encrypting the control key and encryption parameters transmitted by the lock body of the intelligent lock (e.g., intelligent lock 2300). For example, the encrypted instruction may be obtained by a panel to encrypt the encryption parameters transmitted by the lock body and the input password received by the panel (e.g., via a symmetric encryption algorithm or an asymmetric encryption algorithm). The encryption parameters may be composed of one or more characters, such as a challenge code. The lock body may decode the encrypted instruction transmitted by the panel of the intelligent lock to obtain the control command.

For example, when the user needs to unlock the intelligent lock in the locked state, the user may perform a password input operation on the panel of the intelligent lock. When the panel receives the input password, the panel may also request the challenge code from the lock body and receive the challenge code transmitted by the lock body. Thus, the panel may encrypt the challenge code transmitted by the lock body and the input password received by the panel through an encryption algorithm to obtain the encrypted instruction. After the encrypted instruction is transmitted to the lock body by the panel, the lock body may use a decryption algorithm to decrypt the encrypted instruction to obtain the control command. As another example, by means of a session key, the control key may be obtained, the control key may be encrypted, and/or the encrypted instruction may be decrypted. In some embodiments, the user may perform remote unlocking. For example, a remote unlocking control command may be sent to the server 110 through the terminal device 140. The server 110 may send the control command to the intelligent lock, or may directly send the remote unlocking control command to the intelligent lock through the terminal device 140. The remote unlocking may require the intelligent lock to be in an online state, otherwise the intelligent lock may not receive the control command. For more descriptions about obtaining the control key, and encrypting and decrypting the encrypted instruction, please refer to the related descriptions in FIG. 4, FIG. 7, FIG. 8, FIGS. 13-15, and FIG. 17, which is not repeated herein.

In some embodiments, the input password may include any type of password, e.g., a biometric type password such as a voiceprint password, a fingerprint password, a facial feature password, a vein feature password, etc., a digital password, a graphic password, a Bluetooth unlock password, a Near Field Communication (NFC) password, etc.

In 2402, whether the control command satisfies an unlocking condition may be determined. When the control command satisfies the unlocking condition, operation 2403 may be performed. In some embodiments, one or more modules or processors (e.g., the processing module 230 or the processor 320) of the control system 200 may determine whether the control command satisfies the unlock condition.

In some embodiments, the control command may include the input password and the challenge code. The control command satisfying the unlocking conditions may refer that: the input password matches a preset password, and the challenge code satisfies a playback control condition, such as whether the challenge code is consistent with the challenge code transmitted to the panel by the lock body and is not used, etc.

For example, whether the input password in the control command matches the preset password may be determined, and whether the challenge code in the control command satisfies the playback control condition may be determined. When the input password matches the preset password and the challenge code satisfies the playback control condition, it may represent that the control command satisfies the unlocking conditions, and at this time, the subsequent operation 2403 may be performed. When the input password does not match the preset password or the challenge code does not satisfy the playback control condition, it may represent that the control command does not satisfy the unlocking condition, and then the subsequent operation 2403 may not be performed. In some embodiments, when the control command does not satisfy the unlocking condition, prompt information of an incorrect password or prompt information of a replay alarm may be outputted to the panel or other terminals on the lock body, i.e., the prompt information that the password input by the user does not match an agreed valid password or the challenge code does not satisfy the playback control condition, so as to remind the user (e.g., remind the user of the incorrect input password).

In some embodiments, when the input password is the offline password value corresponding to the unique password identifier, the unlocking condition may include whether there is a target password value matching the input password in a first password pool of the intelligent lock and the target password value is used for the first time. In some embodiments, when the input password is the online password value, the unlocking condition may be whether the online password value satisfies a use restriction condition. In some embodiments, the unlocking condition may further include determining that the intelligent lock is in the locked state. In some embodiments, the unlocking condition may further include calibrating a switch position of the intelligent lock before controlling unlocking and locking.

In 2403, the lock body may be controlled to perform the unlocking operation, and operation 2404 may be performed. In some embodiments, one or more modules or processors (e.g., the control module 240 or the processor 320) of the control system 200 may control the lock body to perform the unlocking operation.

In some embodiments, a motor may be controlled to operate to drive a bolt to move, so that the lock body performs the unlocking operation. For example, the motor 2305 in the lock body may be controlled to rotate by a motor drive circuit, thereby driving the locking block 2306 of the first bolt 2302 to move to the unlocking operation position, causing the lock body to complete the unlocking operation.

In some embodiments, the motor in the lock body may be controlled to rotate according to a slow start mechanism. The slow start mechanism of the motor may specifically include that: the motor may rotate with a pulsed electrical signal, and the pulsed electrical signal may have an initial duty cycle. As the motor rotates, the duty cycle of the pulsed electrical signal may increase on the basis of the initial duty cycle.

For example, when the motor is controlled to rotate, the motor may initially output the pulsed electrical signal with the duty cycle of a first value, and after a certain time period, the motor may output the pulsed electrical signal with the duty cycle of a second value. The size of the second value may exceed the size of the first value by a preset value. Then, the motor may output the pulsed electrical signal with the duty cycle of a third value after a certain time period, and the size of the third value may exceed the size of the second value by the preset value, and so on, until the duty cycle of the pulsed electrical signal outputted by the motor reaches 100%. Therefore, in the slow start mechanism, the duty cycle of the pulsed electrical signal outputted by the motor may be increased according to the time, thereby ensuring smooth motor rotation and unlocking of the lock body.

In 2404, an unlocking detection result may be obtained based on the sensing signals. In some embodiments, one or more modules or processors (e.g., the communication module 210, the processing module 230, or the processor 320) of the control system 200 may acquire the sensing signals, and obtain the unlocking detection result based on the sensing signals.

In some embodiments, the unlocking detection result may at least represent whether the lock body is unlocked successfully. In response to the unlocking detection result representing that the lock body is unlocked successfully, it may represent that the intelligent lock is in the unlocked state, e.g., a door on which the intelligent lock is assembled may be in an opened state. At this time, operation 2405 may be performed.

Analysis results may be obtained by performing signal analysis on the sensing signals. These analysis results may represent operation information performed by one or more bolts in the lock body. In some embodiments, when the unlocking detection result is obtained according to the sensing signals, the unlocking detection result representing whether the lock body is unlocked successfully may be obtained according to the operation information performed by one or more bolts represented by the sensing signals.

In some embodiments, a control chip (e.g., the first master chip in FIG. 39 and FIG. 40) in the intelligent lock or a control chip (e.g., the second master chip in FIG. 39 and FIG. 40) in the lock body may implement signal analysis and processing of the sensor signals and obtain the analysis results to obtain the unlocking detection result. Specifically, for more contents about the control chip, please refer to the relevant contents of FIG. 39 and FIG. 40 of the present disclosure, which is not repeated herein.

In some embodiments, the unlocking detection result representing that the lock body is unlocked successfully may include: obtaining a detection result of unlocking completion based on the sensing signals acquired by an unlocking sensor. For example, the unlocking sensor may be a sensor arranged in cooperation with a first bolt (e.g., the first bolt 2302), such as a sensor directly connected to the first bolt, or a sensor indirectly connected to the first bolt through other components, or a sensor arranged on a motion trajectory stroke of the first bolt and capable of acquiring the sensing signals by contacting the moving first bolt.

Further, the obtaining the detection result of unlocking completion based on the sensing signals acquired by the unlocking sensor may specifically include: detecting by the unlocking sensor that the first bolt or a locking block (e.g., the locking block 2306) used for locking the first bolt performs the operation information related to unlocking completion. This operation information may be obtained by analyzing the sensing signals acquired by the unlocking sensor.

In some embodiments, the unlocking sensor may be implemented by an unlocking switch. Unlocking information acquired by the unlocking switch, i.e., the sensing signals, may represent an operation position of the locking block that locks the first bolt (such as the scissors bolt). Correspondingly, the unlocking sensor may detect the unlocking completion, i.e., the unlocking switch may acquire the unlocking information representing that the locking block is in the unlocking operation position. When the locking block is in the unlocking operation position, the scissors bolt may be in a state capable of performing a free telescopic action, i.e., the intelligent lock may be in the unlocked state.

In some embodiments, the unlocking sensor may be implemented by a normally-off switch. The unlocking sensor may be connected with the locking block of the scissors bolt through a switch contact block. When the locking block is in the unlocking operation position, the switch contact block may trigger the unlocking switch. At this time, the unlocking switch may detect the unlocking completion.

In some embodiments, in response to the unlocking detection result representing that the lock body is unlocked successfully, the motor may also be controlled to reset to facilitate the locking operation. For example, in response to the unlocking detection result representing that the lock body is unlocked successfully, the motor may be first controlled to stop rotating, i.e., the motor brakes. Then, the motor may be controlled to return to an initial position after a certain period of delay after braking.

In some embodiments, the motor drive circuit corresponding to the motor may be provided with at least one power supply interface to receive a power trigger signal. A level output interface of the motor drive circuit may be connected with a first signal input interface of at least one processor (e.g., at least one processor in the intelligent lock) of the control system 200, and may output a restart control signal to the at least one processor through the first signal input interface. A control signal output interface of the at least one processor may be connected with a power control interface of the motor to control a power state of the motor. In some embodiments, when the motor is abnormal, the power supply interface of the motor drive circuit may be connected to an external power supply, so that the control system 200 may send the restart control signal to the motor to control the motor to reset and restart. In some embodiments, the intelligent lock system may include a reset circuit corresponding to the motor. A level output interface of the reset circuit may output the restart control signal to the at least one processor of the intelligent lock to restart the motor. Specifically, for the relevant contents about the restart control, please refer to the relevant contents of FIGS. 45-48 in this disclosure, which is not repeated herein.

In 2405, a locking signal may be monitored, and in response to monitoring the locking signal, operation 2406 may be performed. In some embodiments, one or more modules or processors (e.g., the detection module 290 or the processor 320) of the control system 200 may monitor the locking signal. The locking signal may be used to direct the lock body to perform a locking processing.

In some embodiments, the locking signal may be generated when the lock body detects that the detection bolt in the intelligent lock is compressed and the first bolt pops out after being compressed, thereby directing the lock body to perform the locking processing. At this time, operation 2406 may be performed.

In some embodiments, when the lock body does not detect the locking signal all the time, it may represent that the intelligent lock may be continuously in the unlocked state. In order to ensure safety, in this embodiment, timing may be started when the intelligent lock is unlocked successfully. Prompt information may be outputted through an output module (e.g., the input/output module 260) when the timing exceeds a preset time period, thereby prompting that the intelligent lock is in the unlocked state for a certain time period and prompting the user to close the door for ensuring safety. For example, after the intelligent lock is unlocked successfully for more than 3 minutes, an alarm prompt message may be outputted to a user's mobile phone or an intelligent lock server to prompt that the intelligent lock is in a risk state. Specifically, the message may be outputted on the mobile phone in full screen with a red background to prompt the user of the risk state of the intelligent lock.

In some embodiments, the detection bolt sensor may monitor the operation information of the detection bolt. The locking block sensor may monitor the operation information of the first bolt. The locking signal may be monitored by monitoring whether the detection bolt sensor detects the operation information of the detection bolt in the lock body, and monitoring whether the locking block sensor detects the operation information of the first bolt in the lock body. In some embodiments, when the detection bolt sensor detects the operation information of the detection bolt in the lock body, and the locking block sensor detects the operation information of the first bolt in the lock body, it may represent that the locking information is monitored. In some embodiments, when the detection bolt sensor does not detect the operation information of the detection bolt in the lock body and/or the locking block sensor does not detect the operation information of the first bolt in the lock body, it may represent that the locking signal is not monitored.

That is to say, the locking signal may be represented by a signal that the detection bolt sensor detects the operation information of the detection bolt in the lock body, and the locking block sensor detects the operation information of the first bolt in the lock body.

In some embodiments, when the detection bolt sensor detects the operation information of the detection bolt in the lock body, and the locking block sensor detects the operation information of the first bolt in the lock body, it may be determined that the user closes the door and presses the lock body into a door frame. At this time, the locking signal may be monitored.

In 2406, the lock body may be controlled to be locked, and operation 2407 may be performed. In some embodiments, one or more modules or processors (e.g., the control module 240 or the processor 320) of the control system 200 may control the lock body to be locked.

In some embodiments, the motor may be controlled to operate (e.g., the motor 2305 in the lock body may be controlled to rotate) to drive the bolt in the lock body to move, so that the lock body may perform the locking operation. For example, the motor in the lock body may be controlled to rotate according to a slow start mechanism, thereby driving the second bolt (e.g., a main bolt) in the lock body to move to realize locking. In some embodiments, in response to the unlocking detection result representing that the lock body is unlocked successfully, the motor may also be controlled to reset.

In 2407, the locking detection result may be obtained based on the sensing signals. In some embodiments, one or more modules or processors (e.g., the detection module 290 or the processor 320) of the control system 200 may acquire the sensing signals, and obtain the locking detection result based on the sensing signals.

The locking detection result may at least represent whether the lock body is locked successfully. In response to the locking detection result representing that the lock body is locked successfully, it may represent that the intelligent lock is in the locked state, i.e., a door on which the intelligent lock is assembled may be in the closed state, and automatic locking may be completed.

In some embodiments, after the intelligent lock completes the automatic locking, whether the control command is received may be continuously monitored. That is, the process may return to operation 2401, and after the control command is received, subsequent operations may be continuously performed to implement automatic unlocking of the intelligent lock. Therefore, the intelligent lock may continue to receive the control command and monitor the locking signal, perform the unlocking operation after receiving the control command, and perform the locking operation after monitoring the locking signal.

In some embodiments, signal analysis may be performed on the sensing signals to obtain analysis results. These analysis results may represent operation information performed by one or more bolts. Accordingly, in this embodiment, when the locking detection result is obtained based on the sensing signals, the locking detection result representing whether the lock body is locked successfully may be obtained according to the operation information performed by one or more bolts represented by the sensing signals.

In some embodiments, the signal analysis and processing of the sensor signals may be implemented by a control chip in the intelligent lock or a control chip in the lock body, and the analysis results may be obtained. Then, the locking detection result may be obtained.

For example, the locking detection result representing that the lock body is locked successfully may include: obtaining a detection result of locking in-place based on the sensing signals acquired by the locking sensor. The locking sensor may be a sensor arranged in cooperation with a second bolt in the lock body. The second bolt may be a bolt arranged at a preset locking position, such as a main bolt.

Further, the obtaining the detection result of locking in-place based on the sensing signals acquired by the locking sensor specifically may include: detecting by the locking sensor that the second bolt performs operation information related to successful locking. The operation information may be obtained by analyzing the sensing signals detected by the locking sensor.

For example, the locking sensor may be implemented by a locking switch. The locking information (i.e., the sensing signals) acquired by the locking switch may represent an operation position of the main bolt. Accordingly, the detecting the locking in-place by locking sensor may include that: when the locking switch acquires the locking information representing that the main bolt switches to the locking operation position, the main bolt may be in the locking operation position, and the main bolt may be locked. At this time, the intelligent lock may be in the locked state.

Figure 25:
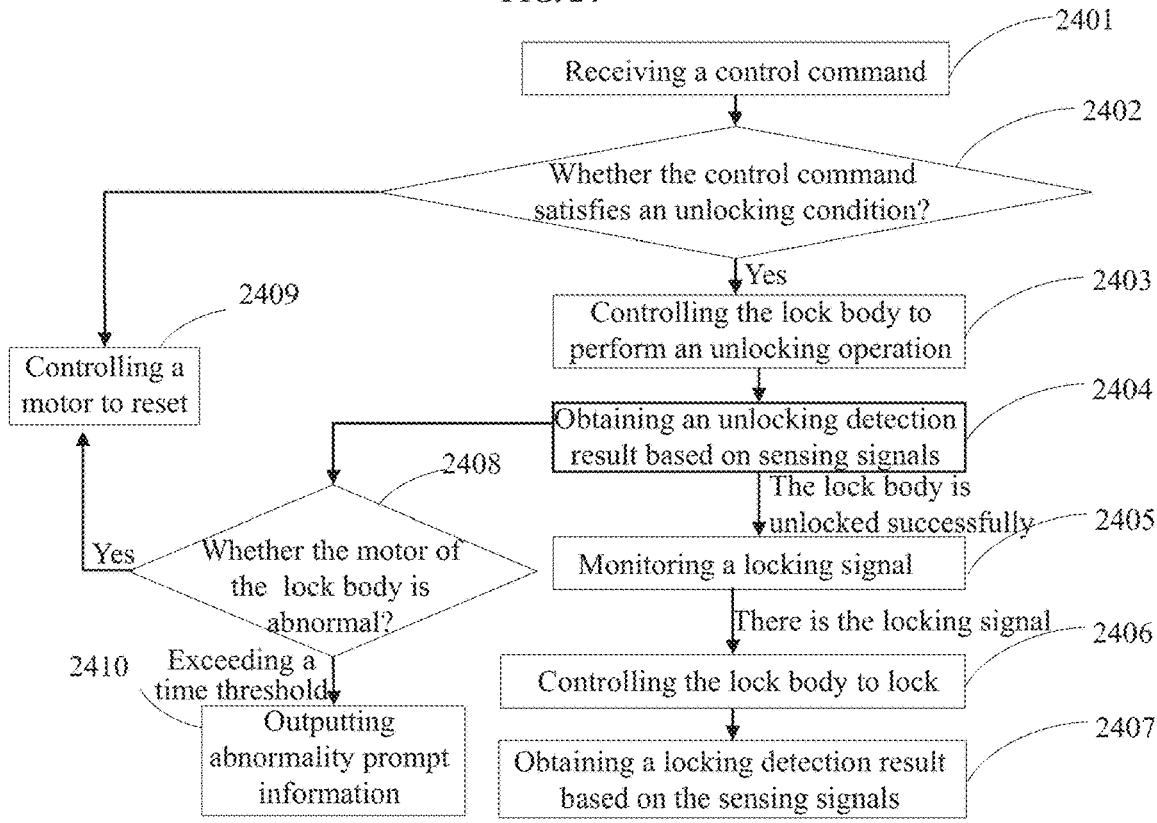
FIG. 25 is a flowchart of an exemplary method for controlling an intelligent lock according to other embodiments of the present disclosure.

FIG. 25 is a flowchart illustrating an exemplary method for controlling an intelligent lock according to other embodiments of the present disclosure. The process shown in FIG. 25 may be implemented by one or more modules or processors of the smart device control system 200 in this disclosure. For example, the process shown in FIG. 25 may be implemented by a lock body (e.g., one or more processors included in the lock body) in the intelligent lock (e.g., the intelligent lock 2300 as shown in FIG. 23) or a server (e.g., server 110) that may communicate with the lock body.

As shown in FIG. 25, based on the flowchart as shown in FIG. 24, after the unlocking detection result is obtained according to the sensing signals in operation 2404, the method in some embodiments of the present disclosure may further include the following operations.

In 2408, whether the unlocking detection result represents that the motor of the lock body is abnormal may be determined. When the unlocking detection result represents that the motor of the lock body is abnormal, operation 2409 may be performed. In some embodiments, operation 2408 may be implemented by one or more modules or processors of the control system 200 (e.g., the processing module 230 or the processor 320).

In some embodiments, the unlocking detection result representing that the motor of the lock body is abnormal may include at least one or any of the following situations: the unlocking detection result representing that the lock body fails to be unlocked, the rotation duration of the motor exceeds a rotation duration threshold, and a load current of the motor exceeds a current threshold.

In some embodiments, the unlocking detection result representing that the lock body fails to be unlocked may include that: obtaining a detection result of unlocking failure based on the sensing signals acquired by the unlocking sensor. For example, the unlocking sensor may detect that the first bolt and/or the locking block used to lock the first bolt do not perform the operation information related to the unlocking operation, or the unlocking sensor may detect that the operation related to the unlocking operation performed by the first bolt and/or the locking block used to lock the first bolt is not completely completed, which may represent that the unlocking has failed.

In some embodiments, the unlocking sensor may be implemented by the unlocking switch, and the unlocking information (i.e., the sensing signals) acquired by the unlocking switch may represent an operation position of the locking block that locks the first bolt, such as the scissors bolt. Correspondingly, the detection result of unlocking failure may be obtained based on the sensing signals acquired by the unlocking sensor, i.e., the unlocking operation information representing that the locking block is in the locked operation position may be acquired by the unlocking switch, but the unlocking operation information representing that the locking block is in the locked operation position may be not acquired. When the locking block is in the locked operation position, the first bolt (e.g., the scissors bolt) may not freely extend and retract, representing that the motor of the lock body does not drive the lock bolt in the lock body to rotate to the unlocking operation position, i.e., the motor is abnormal.

In some embodiments, the rotation duration threshold may be set according to requirements. For example, when a higher unlocking reliability is required, a larger rotation duration threshold may be set, and when a higher unlocking sensitivity is required, a smaller rotation duration threshold may be set. Correspondingly, when the rotation duration of the motor exceeds the preset rotation duration threshold and does not stop, it may represent that the motor may occur a stalling, i.e., the motor may be abnormal.

In some embodiments, the current threshold may be set according to requirements, i.e., a current threshold of the stall of the motor. Correspondingly, when the load current of the motor continues to rise and rises to exceed the current threshold, it may represent that the motor may occur a stalling, i.e., the motor may be abnormal.

In 2409, the motor may be controlled to reset, and operation 2403 may be returned until the number of times of the motor abnormality exceeds a number threshold of times. In some embodiments, operation 2408 may be implemented by one or more modules or processors of the control system 200 (e.g., the control module 240 or the processor 320).

In some embodiments, in response to determining that the motor is abnormal (e.g., the motor occurs a stalling) in step 2408, the motor may be controlled to reset first, and then operation 2403 may be returned to re-control the motor to rotate and then control the lock body to unlock until the number of times of the motor abnormality exceeds the number threshold of times. In some embodiments, controlling the motor to reset may include: firstly, controlling the motor to stop rotating (i.e., controlling the motor to brake), and then controlling the motor to return to an initial position after a delay for a certain period of time. In some embodiments, when the number of times of the motor abnormality exceeds the number threshold of times, the motor may be controlled to stop rotating. After a delay for a certain period of time, the motor may be controlled to return to the initial position, and the unlocking operation may be no longer performed.

That is to say, in this embodiment, the intelligent lock may be automatically unlocked repeatedly by resetting the motor. When the number of times of the motor abnormality (i.e., the number of unlocking times) exceeds the threshold and the unlocking is still not successful, then it may not attempt to continue the unlocking.

In some embodiments, in response to the unlocking detection result representing that the motor of the lock body is abnormal in operation 2408, the method of this embodiment may further include the following operations.

In 2410, abnormality prompt information may be outputted.

In some embodiments, the abnormality prompt information may be outputted through a sound prompt device and/or a light prompt device (e.g., the input/output module 260 of the control system). For example, prompt information of "motor abnormality" may be outputted through a speaker, and/or a red light on a display screen, a light-emitting diode, or a flashing or a small light bulb may be used to prompt the abnormality.

In some embodiments, the abnormality prompt information may also be outputted to a terminal or server (such as a user's mobile phone (e.g., the terminal device 140) or the server (e.g., the server 110), etc.) connected to the intelligent lock to prompt the user and record the abnormality. For example, in some embodiments, the prompt information may be outputted to the user's mobile phone in a corresponding output manner according to a preset risk level corresponding to the prompt information. Taking the motor abnormality as an example, in some embodiments, the prompt information of the motor abnormality may be outputted according to an output mode corresponding to a lower risk level, e.g., by controlling the mobile phone to vibrate and outputting the prompt information of the motor abnormality on the screen of the mobile phone in the form of a short message to prompt the user of the motor abnormality during the unlocking process and to handle the motor abnormality in time.

Figure 26:
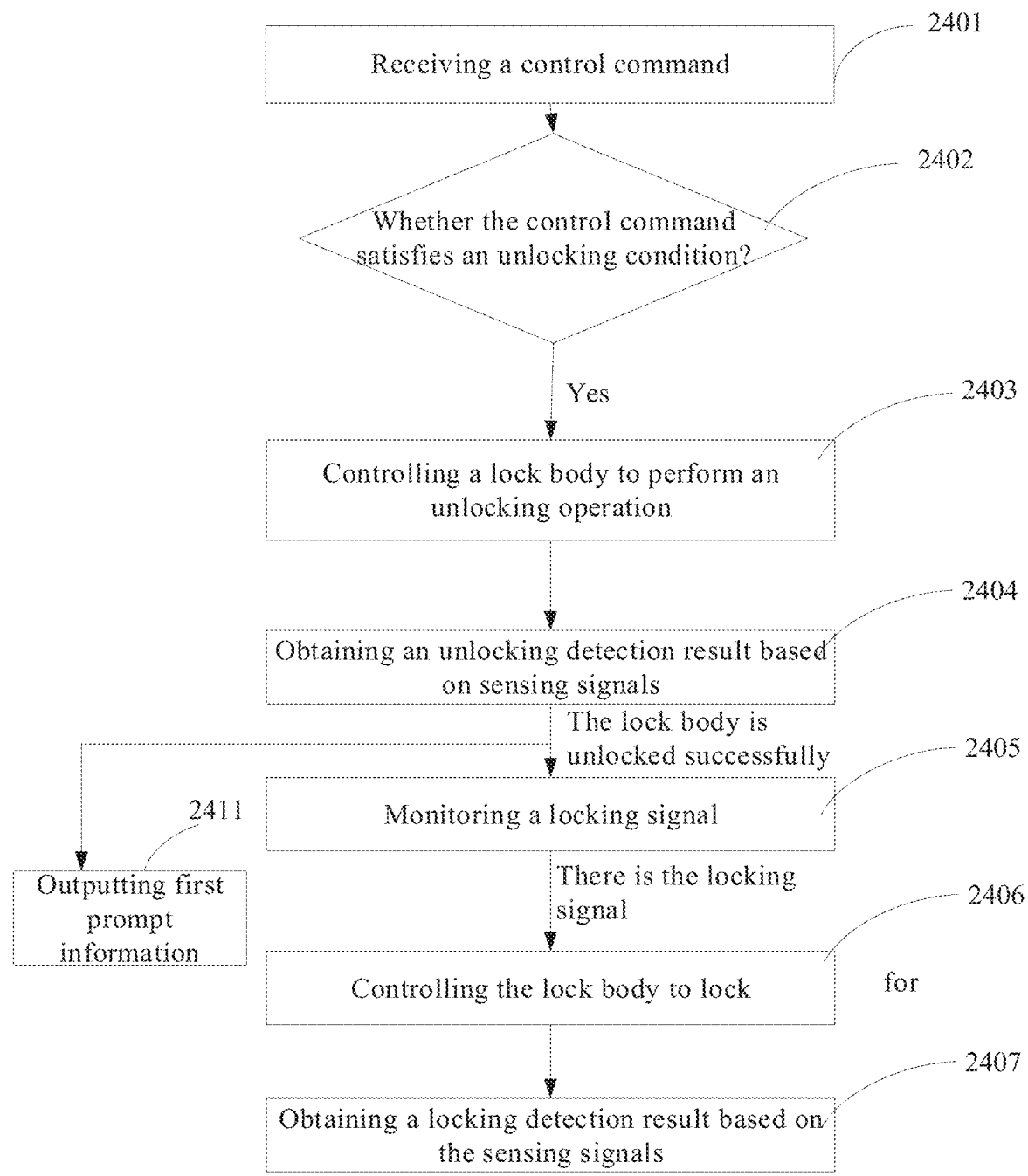
FIG. 26 is an exemplary flowchart of a method for controlling an intelligent lock according to other embodiments of the present disclosure.

FIG. 26 is an exemplary flowchart of a method for controlling an intelligent lock according to other embodiments of the present disclosure. The process shown in FIG. 26 may be implemented by one or more modules or processors in the smart device control system 200 in the present disclosure. For example, the process shown in FIG. 26 may be implemented by a lock body (e.g., one or more processors included in the lock body) of an intelligent lock (the intelligent lock 2300 as shown in FIG. 23) or a server (e.g., the server 110) that can communicate with the lock body.

As shown in FIG. 26, based on the flowchart as shown in FIG. 24, in response to the unlocking detection result obtained in operation 2404 representing that the lock body is unlocked successfully, the method of some embodiments may further include the following operations.

In 2411, first prompt information may be outputted. The first prompt information may be used to prompt to perform a door opening operation.

In some embodiments, the first prompt information may be outputted through the sound prompt device and/or the light prompt device (e.g., the input/output device 260). For example, a message of "please open the door" may be outputted through the speaker, and/or the display screen, the light-emitting diode, or the small light bulb with a normally green light may be used to prompt that the door can be opened.

In some embodiments, the first prompt information may also be outputted to the terminal or server (such as the user's mobile phone (e.g., the terminal device 140) or the server (e.g., the server 110), etc.) connected to the intelligent lock to prompt the user and record the specific information related to door opening, such as a user opening the door and opening time. For example, in some embodiments, the prompt information may be outputted to the user's mobile phone in a corresponding output manner according to the preset risk level corresponding to the prompt information. Taking the prompt of door opening as an example, in some embodiments, the prompt information of opening the door may be outputted according to the output mode corresponding to the lowest risk level. For example, the prompt information of opening the door may be outputted to the mobile phone in the form of a short message to prompt the user to open the door.

Figure 27:
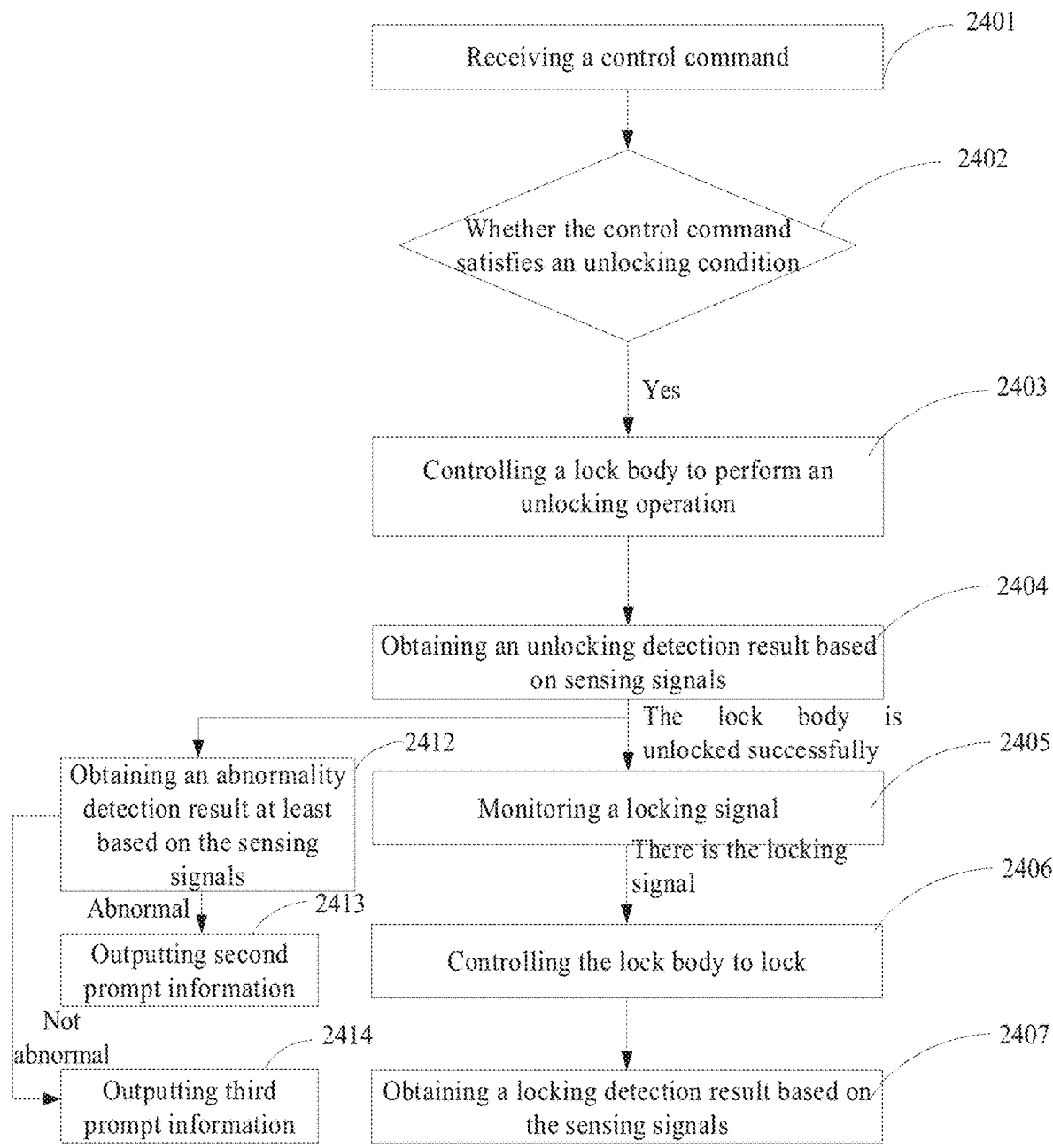
FIG. 27 is an exemplary flowchart of a method for controlling an intelligent lock according to some embodiments of the present disclosure.

FIG. 27 is an exemplary flowchart of a method for controlling an intelligent lock according to other embodiments of present disclosure. The process shown in FIG. 27 may be implemented by one or more modules or processors of the smart device control system 200 of present disclosure. The process shown in FIG. 27 may be implemented by a lock body (e.g., one or more processors included in the lock body) of an intelligent lock (the intelligent lock 2300 as shown in FIG. 23) or a server (e.g., the server 110) that can communicate with the lock body.

As shown in FIG. 27, based on the flowchart as shown in FIG. 24, in response to the unlocking detection result obtained in operation 2404 representing that the lock body is unlocked successfully, the method of some embodiments may further include the following operations.

In 2412, an abnormality detection result may be obtained at least based on the sensing signals.

In some embodiments, the abnormality detection result may represent whether the intelligent lock is in an abnormal state, such as an unlatched state.

In some embodiments, the sensing signals may be analyzed according to a preset abnormality detection rule to obtain the abnormality detection result. When the sensing signals satisfy the abnormality detection rule, the obtained abnormality detection result may represent that the intelligent lock is in an abnormal state; and when the sensing signals do not satisfy the abnormality detection rule, the obtained abnormality detection result may represent that the intelligent lock is in a normal state.

In some embodiments, the abnormality detection rule, i.e., the abnormality detection result representing that the intelligent lock is in the abnormal state, may include the following situations including: obtaining a detection result of detection bolt protruding based on the sensing signals acquired by the detection bolt sensor, and obtaining a detection result of unlocking completion based on the sensing signals acquired by the unlocking sensor.

The obtaining the detection result of detection bolt protruding based on the sensing signals acquired by the detection bolt sensor may refer to that: the detection bolt sensor detects the operation information of detection bolt protruding. The operation information may be obtained by analyzing the sensing signals acquired by the detection bolt sensor.

That is to say, in some embodiments, after the unlocking information representing that the locking block is in the unlocking operation position is acquired by the unlocking sensor and the operation information representing the detection bolt protruding is acquired by the detection bolt sensor, the intelligent lock may be determined to be in the abnormal state, for example, the intelligent lock may be unlatched (i.e., although the unlocking is successful, the intelligent lock is in the unlatched state). At this time, operation 2413 may be performed. When the abnormality detection result represents that the intelligent lock is not in the abnormal state, operation 2414 may be performed.

In 2413, second prompt information may be outputted. The second prompt information may be used to prompt that the intelligent lock is abnormal.

In some embodiments, the second prompt information may be outputted through a sound prompt device and/or a light prompt device (e.g., the input/output device 260). For example, the prompt information of "the intelligent lock is unlatched" is outputted through a speaker, and/or green light flashing through the light-emitting diode or the small light bulb to prompt the unlatched state, so as to prompt the user to open or close the door in time. For example, the unlatched state may be a state between the locked state and the unlocked state.

In some embodiments, the second prompt information may also be outputted to a terminal or server connected to the intelligent lock, such as a user's mobile phone (e.g., terminal device 140) or a server (e.g., server 110), etc., to prompt the user and record the unlatched state. For example, in some embodiments, the prompt information may be outputted to the user's mobile phone in a corresponding output manner according to the preset risk level corresponding to the prompt information. Taking the unlatched state of the intelligent lock as an example, in some embodiments, the prompt information of the unlatched state of the intelligent lock may be outputted according to an output mode corresponding to a higher risk level. For example, the prompt information of the unlatched state may be outputted to the mobile phone in full screen and the mobile phone screen may be controlled to be always on, to prompt the user of the unlatched state of the intelligent lock and to close the door in time. The user may need to operate the always-on screen of the mobile phone to ensure that the user has obtained the prompt information.

In 2414, third prompt information may be outputted. The third prompt information may be used to prompt that the intelligent lock is in the unlocked state, i.e., a state that the door is not closed.

In some embodiments, the third prompt information may be outputted through a sound prompt device and/or a light prompt device (e.g., the input/output device 260). For example, the prompt information representing the "door is open" may be outputted through a speaker, and/or, the information representing the door is opened successfully may be prompted through a display screen, a light-emitting diode, or yellow light flashing of a small light bulb.

In some embodiments, the third prompt information may also be outputted to a terminal or server (such as the user's mobile phone (e.g., the terminal device 140) or the server (e.g., the server 110), etc.) connected to the intelligent lock to prompt the user and record the specific information related to unlocking and opening the door, such as the user of the unlocking and the unlocking time. For example, in some embodiments, the prompt information may be outputted to the user's mobile phone in a corresponding output manner according to the preset risk level corresponding to the prompt information. Taking the unlocking of the intelligent lock as an example, in some embodiments, the prompt information that the intelligent lock has been unlocked and the door has been opened may be outputted according to the output mode corresponding to the lower risk level. For example, the prompt information representing that the intelligent lock has been unlocked and the door has been opened may be outputted in the middle area of the mobile phone screen in a short message and the mobile phone may be controlled to vibrate to prompt the user that the door has been opened and pay attention to safety.

Figure 28:
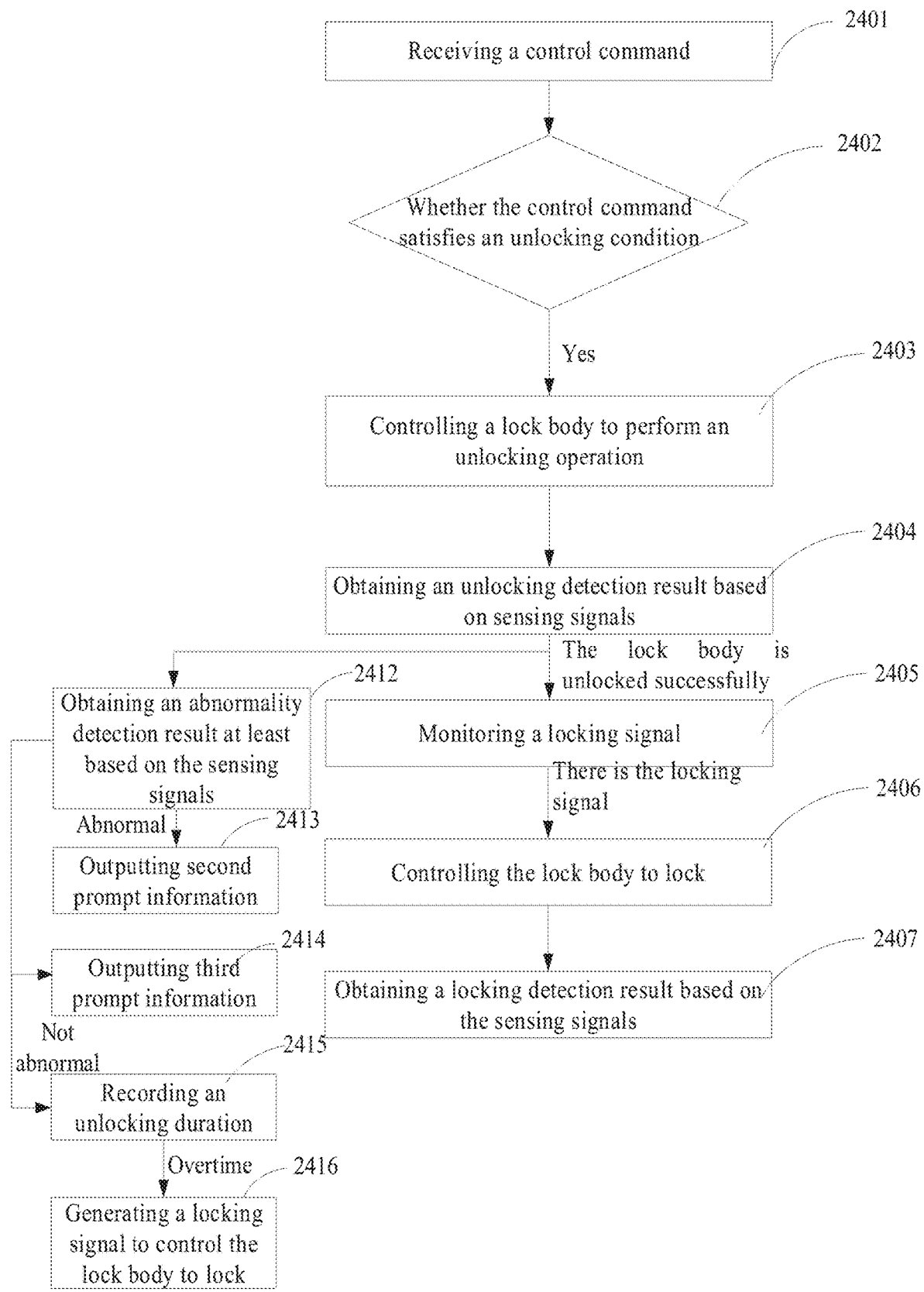
FIG. 28 is an exemplary flowchart of a method for a smart device control system to control an intelligent lock according to other embodiments of the present disclosure.

FIG. 28 is an exemplary flowchart of a method for controlling an intelligent lock by a smart device control system according to other embodiments of present disclosure. The process shown in FIG. 28 may be implemented by one or more modules or processors in the intelligent device control system 200 in this application. For example, the process shown in FIG. 28 may be implemented by a lock body (e.g., one or more processors included in the lock body) of an intelligent lock (the intelligent lock 2300 as shown in FIG. 23) or a server (e.g., the server 110) that can communicate with the lock body.

As shown in FIG. 28, based on the flowchart as shown in FIG. 27, in response to the abnormality detection result obtained in operation 2412 representing no abnormal state, the method of some embodiments may further include the following operations.

In 2415, in response to the abnormality detection result representing no abnormal state, an unlocking duration may start to be recorded. In case that the unlocking duration exceeds the unlocking duration threshold, operation 2416 may be performed.

In some embodiments, a preset timer may be used to time the duration of the unlocked state of the intelligent lock to obtain the unlocking duration, and whether the unlocking duration exceeds the unlocked duration threshold may be continuously monitored. When the unlocking duration exceeds the unlocking duration threshold, operation 2416 may be performed to ensure indoor safety.

In 2416, a locking signal may be generated to control the lock body to be locked.

In some embodiments, after the locking signal is generated, the lock body may be controlled to be locked and whether the lock body is locked successfully may be monitored by the process as shown in FIG. 24.

In some embodiments, in response to the detection that the intelligent lock is unlocked and not in the abnormal state (e.g., not in the unlatched state), the unlocking duration may start to be recorded, the locking signal may be generated when the unlocking duration exceeds the unlocking duration threshold, and the automatic locking may be performed, e.g., the door may be controlled to be automatically closed and the motor in the intelligent lock may be controlled to automatically start to rotate to drive the lock body to be locked.

In other embodiments, in response to the detection that the intelligent lock is unlocked and not in the abnormal state such as the unlatched state, and the door where the intelligent lock is located has not been pushed open and is still in the closed state, the unlocking duration may start to be recorded, the locking signal may be generated when the unlocking duration exceeds the unlocking time threshold, and the automatic locking may be performed, e.g., the motor in the intelligent lock may be controlled to automatically start to rotate to drive the lock body to be locked.

Figure 29:
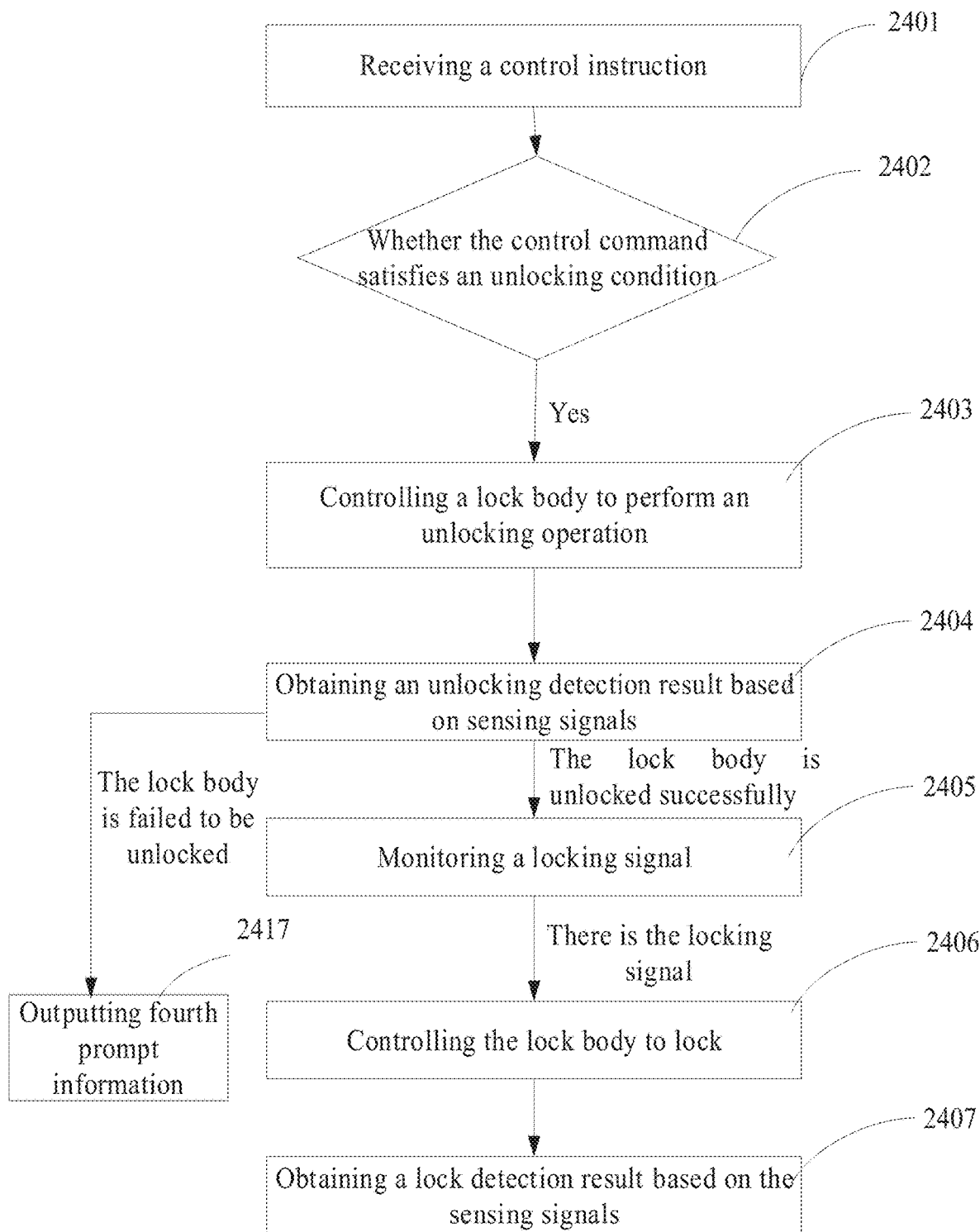
FIG. 29 is an exemplary flowchart of a method for controlling an intelligent lock according to some embodiments of the present disclosure.

FIG. 29 is an exemplary flowchart of a method for controlling an intelligent lock according to other embodiments of present disclosure. The process shown in FIG. 29 may be implemented by one or more modules or processors in the smart device control system 200 in present disclosure. For example, the process shown in FIG. 29 may be implemented by a lock body (e.g., one or more processors included in the lock body) of an intelligent lock (the intelligent lock 2300 as shown in FIG. 23) or a server (e.g., the server 110) that can communicate with the lock body.

As shown in FIG. 29, based on the flowchart as shown in FIG. 24, in response to the unlocking detection result obtained in operation 2404 representing that the lock body fails to be unlocked, the method of some embodiments may further include the following operations.

In 2417, fifth prompt information may be outputted. The fifth prompt information may be used to prompt that the intelligent lock fails to be unlocked.

In some embodiments, the fifth prompt information may be outputted through the sound prompt device and/or the light prompt device. For example, the prompt information representing "the door cannot be opened" may be outputted through the speaker, and/or, the information representing unlocking failure may be prompted through the display screen, the light-emitting diode, or red light flashing of the small light bulb.

In some embodiments, the fifth prompt information may also be outputted to the terminal or the server (such as the user's mobile phone (e.g., the terminal device 140) or the server (e.g., the server 110), etc.) connected to the intelligent lock to prompt the user and record the specific information (such as the user who failed to unlock and the unlocking time) representing the unlocking failure. For example, the prompt information may be outputted to the user's mobile phone in a corresponding output manner according to the preset risk level corresponding to the prompt information. Taking the unlocking failure as an example, the prompt information representing the unlocking failure may be outputted according to the output mode corresponding to the lowest risk level. For example, the prompt information representing the unlocking failure may be outputted to the mobile phone in the form of a text message to prompt the user of the unlocking failure and to check the password or the intelligent lock.

Figure 30:
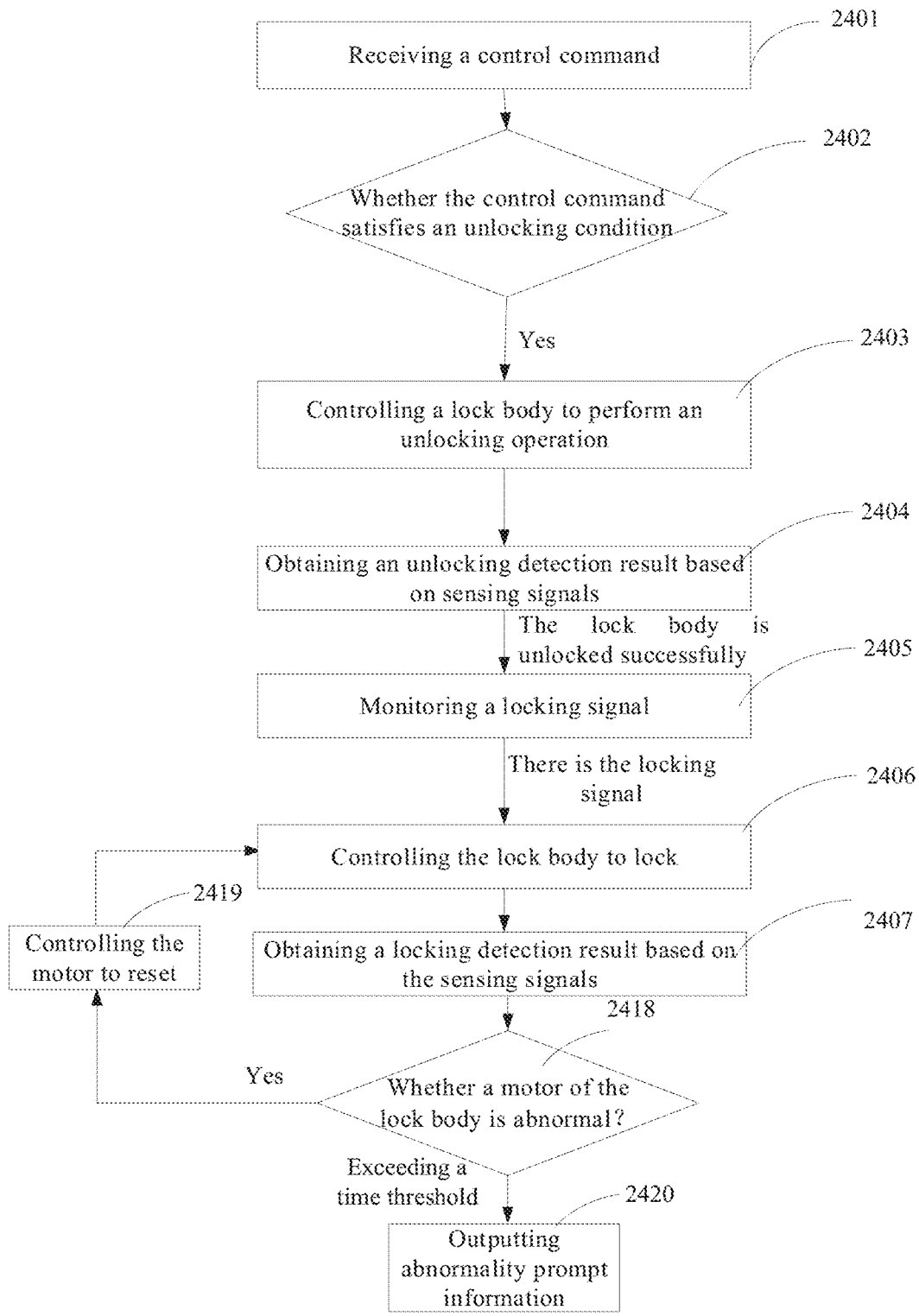
FIG. 30 is an exemplary flowchart of a method for a smart device control system to control an intelligent lock according to some embodiments of the present disclosure.

FIG. 30 is an exemplary flowchart of a method for controlling an intelligent lock by a smart device control system according to other embodiments of the present disclosure. The process shown in FIG. 30 may be implemented by one or more modules or processors in the smart device control system 200 in present disclosure. For example, the process shown in FIG. 30 may be implemented by a lock body (e.g., one or more processors included in the lock body) of an intelligent lock (the intelligent lock 2300 as shown in FIG. 23) or a server (e.g., the server 110) that can communicate with the lock body.

As shown in FIG. 30, based on the flowchart as shown in FIG. 24, after obtaining the locking detection result based on the sensing signals in operation 2407, the method of some embodiments may further include the following operations.

In 2418, whether the locking detection result represents that the motor of the lock body is abnormal may be determined. When the lock detection result represents that the motor of the lock body is abnormal, operation 2419 may be performed.

In some embodiments, the locking detection result representing that the motor of the lock body is abnormal may at least includes one or any of the following situations including: obtaining the detection result representing the locking failure based on the sensing signals acquired by the locking sensor, the motor rotation duration exceeding the rotation duration threshold, and the load current of the motor exceeding the current threshold.

In some embodiments, obtaining the detection result representing the locking failure based on the sensing signals acquired by the locking sensor may include that: the locking sensor detects that the locking is not in place. The locking sensor detecting that the locking is not in place may specifically include that: the locking sensor detects that the second bolt does not perform the operation information related to the successful locking, or the lock sensor detects the operation information of operation incompletion related to the successful locking performed by the second bolt. For example, the locking sensor may be implemented by the locking switch, and the locking information (i.e., the sensing signals) acquired by the locking switch may represent the operation position of the locking block that locks the first bolt, such as the scissors bolt. In some embodiments, the locking detection result representing that the lock body fails to be locked may include that: the locking switch acquires the locking information representing that the locking block is in the unlocking operation position, but does not acquire the locking information representing that the locking block is in the locking operation position. When the locking block is in the unlocked operation position, the first bolt (e.g., the scissors bolt) may freely extend and retract, representing that the motor of the lock body may not drive the bolt in the locking body to rotate to the locked operation position, i.e., the motor may be abnormal.

In some embodiments, the rotation duration threshold may be set according to requirements. For example, when a higher unlocking reliability is required, a larger rotation duration threshold may be set; and when higher unlocking sensitivity is required, a smaller rotation duration threshold may be set. In some embodiments, when the motor rotation duration exceeds a preset rotation duration threshold and still does not stop, it may represent that the motor may occur a stalling, i.e., the motor may be abnormal.

In some embodiments, the current threshold may be set according to requirements, i.e., the current threshold of the motor stalling. Correspondingly, when the load current of the motor continues to rise and rises to exceed the current threshold, it may represent that the motor may occur a stalling, i.e., the motor may be abnormal.

In 2419, the motor may be controlled to reset, and operation 2406 may be performed again until the number of times of the motor abnormality exceeds the number threshold of times.

In some embodiments, the intelligent lock may be automatically locked repeatedly by resetting the motor. When the number of times of the motor abnormality (i.e., the number of locking times) exceeds the number threshold of times, the locking may still be not in place, and then the locking may not be attempted.

In addition, when the locking detection result represents that the motor of the lock body is abnormal in operation 2418, the method of some embodiments may further include the following operations.

In 2420, abnormality prompt information may be outputted.

In some embodiments, the abnormality prompt information may be outputted through a sound prompt device and/or a light prompt device (e.g., the input/output device 260). For example, the prompt information representing "motor abnormality" may be outputted through the speaker, and/or, the abnormality may be prompted through the display screen, the light-emitting diode, or red light flashing of the small light bulb.

In some embodiments, the abnormality prompt information may also be outputted to the terminal or the server (such as the user's mobile phone (e.g., the terminal device 140) or the server (e.g., the server 110), etc.) connected to the intelligent lock to prompt the user and record the abnormality.

FIG. 31 is an exemplary flowchart of a method for controlling an intelligent lock by a smart device control system according to other embodiments of the present disclosure. The process shown in FIG. 31 may be implemented by one or more modules or processors in the smart device control system 200 in present disclosure. For example, the process shown in FIG. 31 may be implemented by a lock body (e.g., one or more processors included in the lock body) of an intelligent lock (the intelligent lock 2300 as shown in FIG. 23) or a server (e.g., the server 110) that can communicate with the lock body.

As shown in FIG. 31, based on the flowchart as shown in FIG. 24, in response to the locking detection result obtained in operation 2407 representing that the lock body fails to be locked, the method of some embodiments may further include the following operations.

In 2421, fourth prompt information may be outputted. The fourth prompt information may be used to prompt that the intelligent lock fails to be locked.

In some embodiments, the fourth prompt information may be outputted through the sound prompt device and/or the light prompt device (e.g., the input/output device 260). For example, the prompt information representing "locking failure" may be outputted through the speaker, and/or, the information representing locking failure may be outputted through the display screen, the light-emitting diode, or red light flashing of the small light bulb.

In some embodiments, the fourth prompt information may also be outputted to the terminal or the server (such as the user's mobile phone (e.g., the terminal device 140) or the server (e.g., the server 110), etc.) connected to the intelligent lock to prompt the user and record the specific information representing the locking failure. For example, in some embodiments, the prompt information may be outputted to the user's mobile phone in a corresponding output manner according to the preset risk level corresponding to the prompt information. Taking the locking failure of the intelligent lock as an example, the prompt information representing the locking failure of the intelligent lock may be outputted according to the output manner corresponding to the higher risk level. For example, the prompt information representing the locking failure may be outputted to the mobile phone in full screen and the mobile phone screen may be controlled to be always on, to prompt the user that the intelligent lock is not successfully locked and needs to be relocked.

FIG. 32 is an exemplary flowchart of a method for controlling an intelligent lock by a smart device control system according to other embodiments of present disclosure. The process shown in FIG. 32 may be implemented by one or more modules or processors in the smart device control system 200 in present disclosure. For example, the process shown in FIG. 32 may be implemented by a lock body (e.g., one or more processors included in the lock body) of an intelligent lock (the intelligent lock 2300 as shown in FIG. 23) or a server (e.g., the server 110) that can communicate with the lock body.

As shown in FIG. 32, the method of some embodiments may further include the following operations.

In 2422, whether the sensing signals outputted by the lock body sensor are null may be monitored. When the sensing signals outputted by the lock body sensor are null, operation 2423 may be performed.

In some embodiments, whether the sensing signals are a value other than 0 and 1 may be determined. When the value of the sensing signals is neither 0 nor 1, then in some embodiments, operation 2423 may be performed.

In 2423, prompt information representing that a sensor is damaged may be outputted.

In some embodiments, the prompt information representing that the sensor is damaged may be outputted through the sound prompt device and/or the light prompt device (e.g., the input/output device 260). For example, the prompt information representing that "the *th sensor is damaged" may be outputted through the speaker, and/or the prompt information representing that "the *th sensor is damaged" may be outputted through the display screen, the light-emitting diode, or the small light bulb.

In some embodiments, the prompt information representing that the sensor is damaged may also be outputted to the terminal or the server (such as the user's mobile phone (e.g., the terminal device 140) or the server (e.g., the server 110), etc.) connected to the intelligent lock to prompt the user. For example, the prompt information may be outputted to the user's mobile phone in a corresponding output manner according to the preset risk level corresponding to the prompt information. Taking sensor damage as an example, the prompt information representing that the sensor is damaged may be outputted according to the output manner corresponding to the lowest risk level. For example, the prompt information representing that the sensor is damaged may be outputted to the mobile phone in a short message to prompt the user that the sensor in the intelligent lock is damaged and the intelligent lock needs to be repaired.

Figure 39:
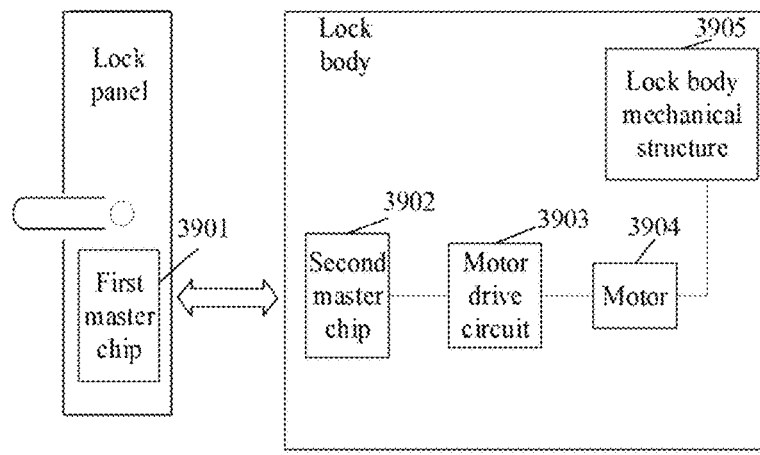
FIG. 39 is a schematic structural diagram of an exemplary intelligent lock according to some embodiments of the present disclosure.
Figure 40:
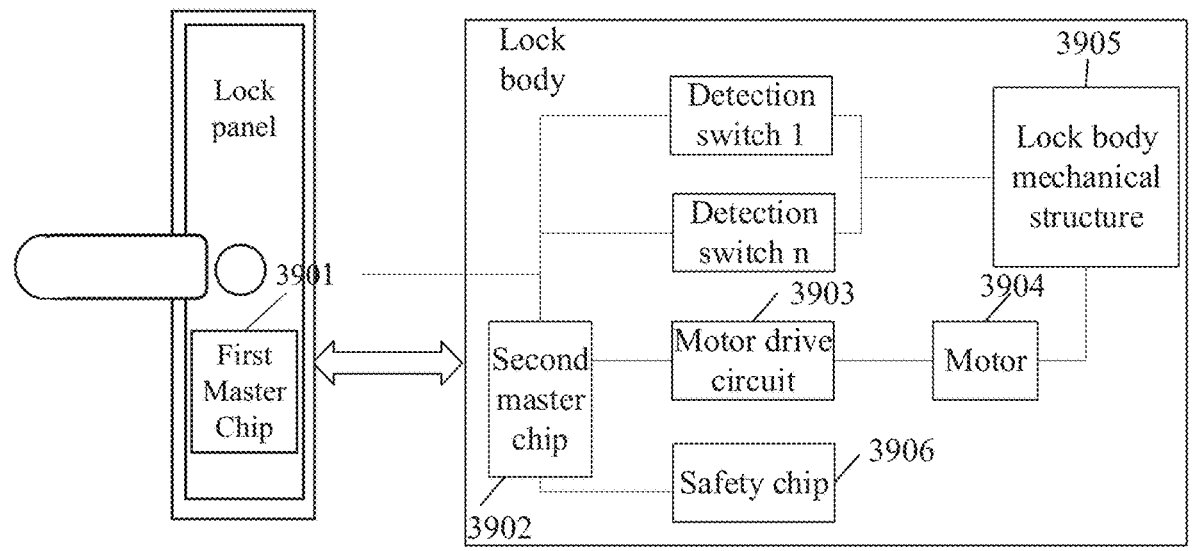
FIG. 40 is a schematic structural diagram of an exemplary intelligent lock according to some embodiments of the present disclosure.

It should be noted that the above processing of the sensing signals acquired by each lock body sensor and the corresponding control operations, such as outputting the prompt information to the intelligent lock panel, the mobile phone or the background server, etc., may be implemented by a control chip (e.g., the second master chip in FIG. 39 and FIG. 40), and may also be implemented by a control chip of the intelligent lock panel (e.g., the first master chip in FIG. 39 and FIG. 40). Different solutions implemented by analyzing and determining signals in different chips are all within the protection scope of present disclosure.

FIG. 33 is a schematic structural diagram of a device for controlling an intelligent lock according to some embodiments of present disclosure.

As an implementation of the methods shown in the above figures, FIG. 33 provides an embodiment of a device for controlling an intelligent lock. The device may correspond to the method as shown in FIG. 24. The device may be applied in various electronic devices.

As shown in FIG. 33, the device for controlling the intelligent lock may include: an instruction receiving unit 3301, an unlocking determination unit 3302, an unlocking control unit 3303, a signal monitoring unit 3304, and a locking control unit 3305.

In some embodiments, the instruction receiving unit 3301 may be part of the communication module 210 in the control system 200 as shown in FIG. 2. In some embodiments, the unlock determination unit 3302 may be part of the processing module 230 in the control system 200 as shown in FIG. 2. In some embodiments, the unlocking control unit 3303 may be part of the control module 240 in the control system 200 as shown in FIG. 2. In some embodiments, the signal monitoring unit 3304 may be part of the detection module 290 in the control system 200 as shown in FIG. 2. In some embodiments, the locking control unit 3305 may be part of the control module 240 in the control system 200 as shown in FIG. 2.

In some embodiments, the instruction receiving unit 3301 may be configured to: receive a control command. The control command may be used to direct the lock body to perform an unlocking processing. The unlocking determination unit 3302 may be configured to: determine whether the control command satisfies unlocking conditions. The unlocking control unit 3303 may be configured to: control the lock body to be unlocked in response to the control command satisfying the unlocking conditions, and obtain an unlocking detection result based on sensing signals. The unlocking detection result may at least represent whether the lock body is unlocked successfully. The signal monitoring unit 3304 may be configured to: monitor a locking signal in response to the unlocking detection result representing that the lock body is unlocked successfully. The locking signal may be used to direct the lock body to perform a locking processing. The locking control unit 3305 may be configured to: control the lock body to be locked in response to monitoring the locking signal, and obtain a locking detection result based on the sensing signals. The lock detection result may at least represent whether the lock body is locked successfully.

In some embodiments, for the specific processing of the instruction receiving unit 3301, the unlocking determination unit 3302, the unlocking control unit 3303, the signal monitoring unit 3304 and the locking control unit 3305 and resulting technical effects, please refer to FIG. 24 for the related descriptions of operations 2401-2407, which is not repeated herein.

In some embodiments, the unlocking detection result representing that the lock body is unlocked successfully may at least include: obtaining a detection result of unlocking completion based on the sensing signals acquired by an unlocking sensor. The unlocking sensor may be a sensor arranged in cooperation with a first bolt in the lock body, and the first bolt may be a bolt that can be compressed under an external force and can pop out after the external force is removed.

In some embodiments, the locking detection result representing that the lock body is locked successfully may at least include: obtaining a detection result of locking in-place based on the sensing signals acquired by a locking sensor. The locking sensor may be a sensor arranged in cooperation with a second bolt in the lock body, and the second bolt may be a bolt at a preset locking position.

In some embodiments, the control command may be obtained by decrypting an encrypted command that is transmitted by the lock body to a panel of the intelligent lock. The encrypted command may be obtained by the panel encrypting encryption parameters transmitted by the lock body and an input password received by the panel.

In some embodiments, when the unlocking control unit 3303 controls the lock body to be unlocked, the unlocking control unit 3303 may specifically control the motor in the lock body to rotate to drive the bolt in the lock body to move, so that the lock body may be unlocked. In some embodiments, in response to the unlocking detection result representing that the lock body is unlocked successfully, the unlocking control unit 3303 may also control the motor to reset.

In some embodiments, the unlocking control unit 3303 controlling the motor in the lock body to rotate may specifically include: controlling the motor in the lock body to rotate according to a slow start mechanism. The slow start mechanism may include that the motor rotates with a pulse electrical signal. The pulse electrical signal may have an initial duty ratio, and as the motor rotates, the duty ratio of the pulse electrical signal may increase on the basis of the initial duty ratio.

In some embodiments, after obtaining the unlocking detection result based on the sensing signals, the unlocking control unit 3303 may also be configured to: control the motor to reset in response to the unlocking detection result representing that the motor of the lock body is abnormal, and re-perform the step of controlling the lock body to be unlocked until the number of times of the motor abnormality exceeds the number threshold of times.

In some embodiments, the unlocking detection result representing that the motor of the lock body is abnormal may at least include: the unlocking detection result representing that the lock body fails to be unlocked, and/or a motor rotation duration exceeding a rotation duration threshold, and/or a load current of the motor exceeding a current threshold.

In some embodiments, in response to the unlocking detection result representing that the motor of the lock body is abnormal, the unlocking control unit 3303 may be further configured to: output abnormality prompt information.

In some embodiments, in response to the unlocking detection result representing that the lock body is unlocked successfully, the unlocking control unit 3303 may be further configured to: output first prompt information. The first prompt information may be used to prompt a door opening operation.

In some embodiments, in response to the unlocking detection result representing that the lock body is unlocked successfully, the unlocking control unit 3303 may be further configured to: obtain an abnormality detection result at least based on the sensing signals; in response to the abnormality detection result representing that the intelligent lock is in an abnormal state, output second prompt information. The second prompt information may be used to prompt that the intelligent lock is abnormal.

In some embodiments, the abnormality detection result representing that the intelligent lock is in the abnormal state may at least include: obtaining a detection result of detection bolt protruding based on the sensing signals acquired by a detection bolt sensor, and obtaining a detection result of unlocking completion based on the sensing signals acquired by an unlocking sensor. The detection bolt sensor may be a sensor arranged in cooperation with the detection bolt in the lock body, the unlocking sensor may be a sensor arranged in cooperation with the first bolt in the lock body, and the first bolt may be a bolt that can be compressed under the external force and can pop out when the external force is removed.

In some embodiments, in response to the abnormality detection result representing that the intelligent lock is not in the abnormal state, the unlocking control unit 3303 may be further configured to: output third prompt information. The third prompt information may be used to prompt that the intelligent lock is in an unlocked state.

In some embodiments, in response to the abnormality detection result representing that the intelligent lock is not in the abnormal state, the unlocking control unit 3303 may be further configured to: in response to the abnormality detection result representing that the intelligent lock is not in the abnormal state, start to record an unlocking duration; when the unlocking duration exceeds an unlocking duration threshold, generate a locking signal to control the lock body to be locked. The unlocking duration may be a duration recorded when the abnormality detection result represents that the intelligent lock is not in the abnormal state.

In some embodiments, the unlocking control unit 3303 may be further configured to: in response to the unlocking detection result representing that the lock body fails to be unlocked, output fifth prompt information. The fifth prompt information may be used to prompt unlocking failure of the intelligent lock.

In some embodiments, the signal monitoring unit 3304 may specifically be configured to: monitor whether the detection bolt sensor detects the operation information of the detection bolt in the lock body; and monitor whether the locking block sensor detects the operation information of the first bolt in the lock body.

In some embodiments, the detection bolt sensor may be a sensor arranged in cooperation with the detection bolt in the lock body. The locking block sensor may be a sensor arranged in cooperation with the first bolt, and the first bolt can be compressed under the external force and can pop out after the external force is removed. When the detection bolt sensor detects the operation information of the detection bolt in the lock body and the locking block sensor detects the operation information of the first bolt in the lock body, it may represent that the locking signal may be monitored.

In some embodiments, after obtaining the locking detection result based on the sensing signals, the locking control unit 3305 may also be configured to: in response to the locking detection result representing that the motor of the lock body is abnormal, control the motor to reset, and re-perform the operations of controlling the lock body to be locked until the number of times of the motor abnormality exceeds the number threshold of times.

In some embodiments, the locking detection result representing that the motor of the lock body is abnormal may at least include: obtaining a detection result of locking failure based on the sensing signals acquired by the locking sensor, and/or, the motor rotation duration exceeding the rotation duration threshold, and/or the load current of the motor exceeding the current threshold. The locking sensor may be a sensor arranged in cooperation with the second bolt in the lock body, and the second bolt may be a bolt at the preset locking position.

In some embodiments, the locking control unit 3305 may also be configured to: in the response to the locking detection result representing that the lock body fails to be locked, output fourth prompt information. The fourth prompt information may be used to prompt that the intelligent lock fails to be locked.

In some embodiments, the fourth prompt information may be outputted in a preset output mode, and the preset output mode may represent a risk degree of the locking failure of the lock body.

In some embodiments, the locking control unit 3305 may also be configured to: in response to the locking detection result representing that the motor of the lock body is abnormal, output abnormality prompt information.

In some embodiments, the unlocking control unit 3303 or the locking control unit 3305 may also be configured to output prompt information that the sensor is damaged when the sensing signals outputted by the lock body sensor are null.

It should be noted that the device for controlling the intelligent lock may be a chip, a component or a module. The device for controlling the intelligent lock may include a processor and a memory, the instruction receiving unit 3301, the unlocking determination unit 3302, the unlocking control unit 3303, the signal monitoring unit 3304 and the locking control unit 3305 may be stored in the memory as program units, and the processor may execute the above program units stored in the memory to realize corresponding functions.

The processor may include a kernel, and the kernel may call the corresponding program units from the memory. There may be one or more kernels, and kernel parameters may be adjusted to: receive the control command, the control command being used to direct the lock body to be unlocked; determine whether the control command satisfies the unlocking conditions; when the control command satisfies the unlocking conditions, control the lock body to be unlocked, and obtain the unlocking detection result based on the sensing signals, the unlocking detection result at least representing whether the lock body is unlocked successfully; in response to the unlocking detection result representing that the lock body is unlocked successfully, monitor the locking signal, the locking signal being used to directing the lock body to perform the locking processing; and when the locking signal is monitored, control the lock body to be locked, and obtain the locking detection result based on the sensing signals, the locking detection result at least representing whether the lock body is locked successfully.

The memory may include a computer-readable medium, in the form of a volatile memory, a random access memory (RAM) and/or a non-volatile memory, such as a read-only memory (ROM) or a flash memory (flash RAM). The memory may include at least one memory chip.

According to the device for controlling the intelligent lock provided by the embodiments of present disclosure, after receiving the control command for directing the intelligent lock to be unlocked, the lock body may be controlled to be unlocked by determining whether the control command satisfies the unlocking conditions, and the unlocking detection result representing whether the lock body is unlocked successfully may be obtained through the lock body sensor on the lock body. In response to the successful unlocking, the lock body may be controlled to be locked by monitoring the locking signal that is used to direct the lock body to perform the locking processing, and the locking detection result representing whether the lock body is locked successfully may be obtained through the lock body sensor on the lock body. It can be seen that in present disclosure, the unlocking and locking control of the lock body may be realized by monitoring the control command and the locking signal on the lock body in real time, and the unlocking and locking results of the lock body may be monitored by the sensors on the lock body. There is no need for the user to perform other operations in the process of unlocking and locking, thereby reducing the operation complexity and realizing the full-automatic control of the intelligent lock.

According to the intelligent lock as shown in FIG. 23, in addition to the lock body and the lock body sensors, the intelligent lock may be also provided with a storage device and one or more processors, and one or more programs may be stored on the storage device. When the one or more programs are executed by the one or more processors, the one or more processors may implement the methods as shown in FIGS. 24-32.

In the embodiment of present disclosure, the processor may include a central processing unit (CPU), an application-specific integrated circuit (ASIC), a digital signal processor (DSP), an application-specific integrated circuit (ASIC), a field programmable gate array (FPGA) or other programmable logic devices, etc.

In some embodiments, the storage device may include a program storing area and a data storing area. The program storing area may store an operating system, and an application program required for at least one function (e.g., password comparison, motor control, etc.). The data storing area may store data (for example, a user input password and a preset password) created according to the use of the computer.

Further, the storage device may include a high-speed random access memory, and may also include a non-volatile memory, such as at least one magnetic disk storage device or other volatile solid-state storage device.

The processor may call the program stored in the storage device, and specifically, the processor may execute the operations performed by the lock body as shown in FIGS. 24-32.

The storage device may be used to store one or more programs, and the programs may include program codes. The program codes may include computer operation instructions. In the embodiment of this application, the storage device may at least store programs for realizing the following functions:

receiving the control command, the control command being used to direct the lock body to perform the unlocking processing; determining whether the control command satisfies the unlocking conditions; when the control command satisfies the unlocking conditions, controlling the lock body to be unlocked, and obtaining the unlocking detection result based on the sensing signals, the unlocking detection result at least representing whether the lock body is unlocked successfully; when the unlocking detection result represents that the lock body is unlocked successfully, monitoring the locking signal, the locking signal being used to direct the lock body to perform the locking processing; and in response to monitoring the locking signal, controlling the lock body to be locked, and obtaining the locking detection result based on the sensing signals, the locking detection result at least representing whether the lock body is locked successfully.

The intelligent lock of present disclosure may further include an input component and an output component (e.g., the input/output module 260). The input component may include a touch sensing unit that senses a touch event on a touch display panel, and the output part may include at least one of a display, a speaker, a light, and the like. The display may include a display panel, such as the touch display panel, or the like. In a possible case, a liquid crystal display (LCD), an organic light-emitting diode (OLED) and other forms may be used to configure the display panel. The brightness and/or color of the light may be adjusted. In some embodiments, different information may be represented by at least one of on/off, brightness, and color of the light, e.g., the red light emitted by the light may be used to represent alarm information.

It should be noted that the structure of the intelligent lock as shown in FIG. 23 does not constitute a limitation on the electronic device in this embodiment of the present disclosure. In practical applications, the electronic device may include more or less components than those shown in FIG. 23, or combine certain components.

The embodiments of the present disclosure provide a non-transitory computer-readable medium storing computer programs. When the programs are executed by a processor, the method for controlling the intelligent lock described in the embodiments of each method above may be implemented.

The embodiments of the present disclosure provide a processor for running programs. When the programs are run, the method for controlling the intelligent lock described in the embodiments of each method above may be implemented.

The embodiments of the present disclosure also provide a computer program product, when executed on a data processing device, causing the data processing device to implement the method for controlling the intelligent lock described in the embodiments of each method above.

The electronic device, the processor, the non-transitory computer-readable medium, or the computer program product provided by the above-mentioned embodiments of the present disclosure may all be used to execute the corresponding methods provided above. Therefore, the beneficial effects that can be achieved may refer to the beneficial effects of the corresponding method provided above, which is not repeated herein.

Figure 34:
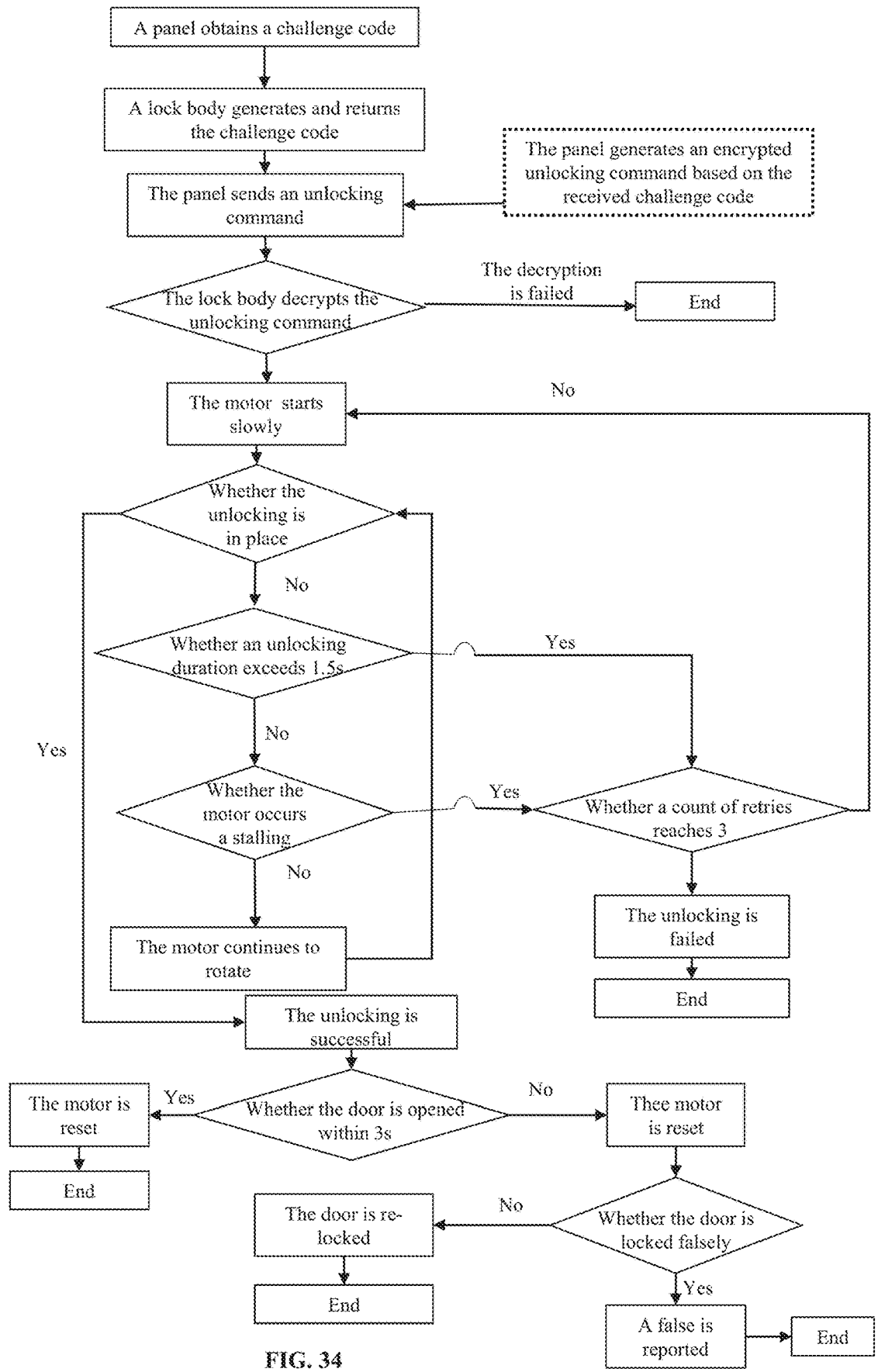
FIG. 34 is an exemplary flowchart of controlling unlocking of an intelligent lock according to some embodiments of the present disclosure.
Figure 35A:
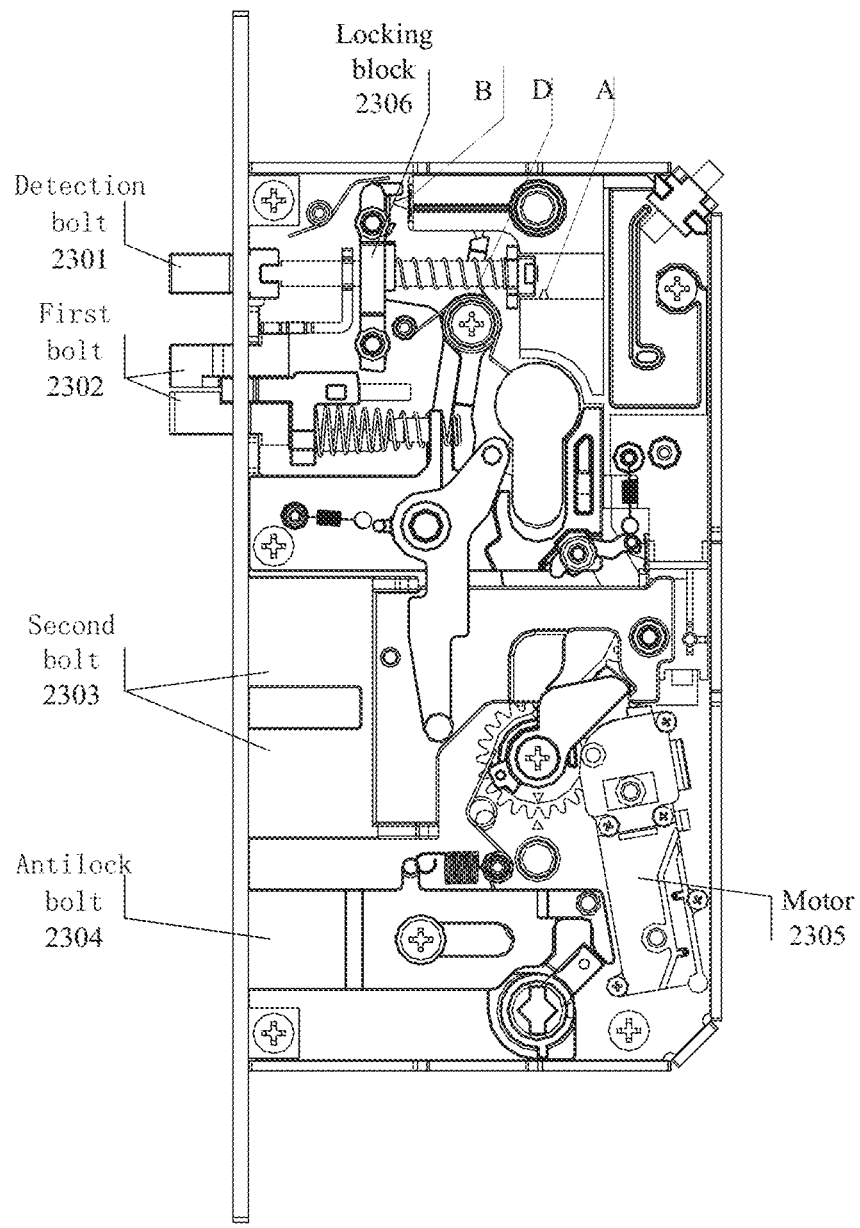
FIG. 35A and FIG. 35B are structural schematic diagrams of intelligent locks according to some embodiments of the present disclosure.
Figure 35B:
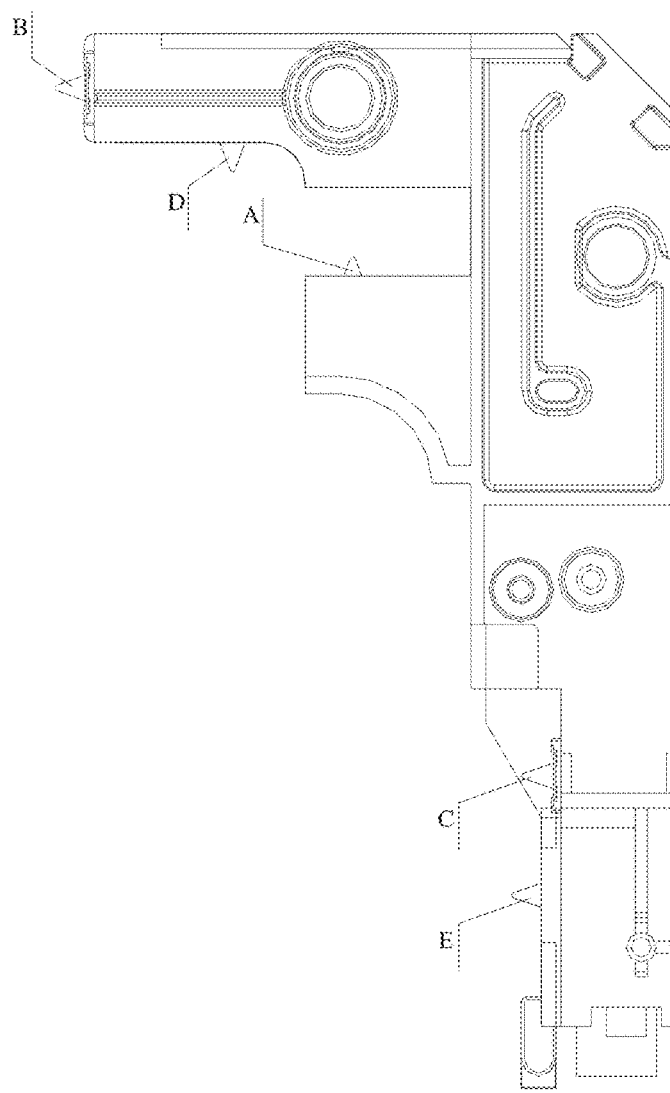
Figure 36:
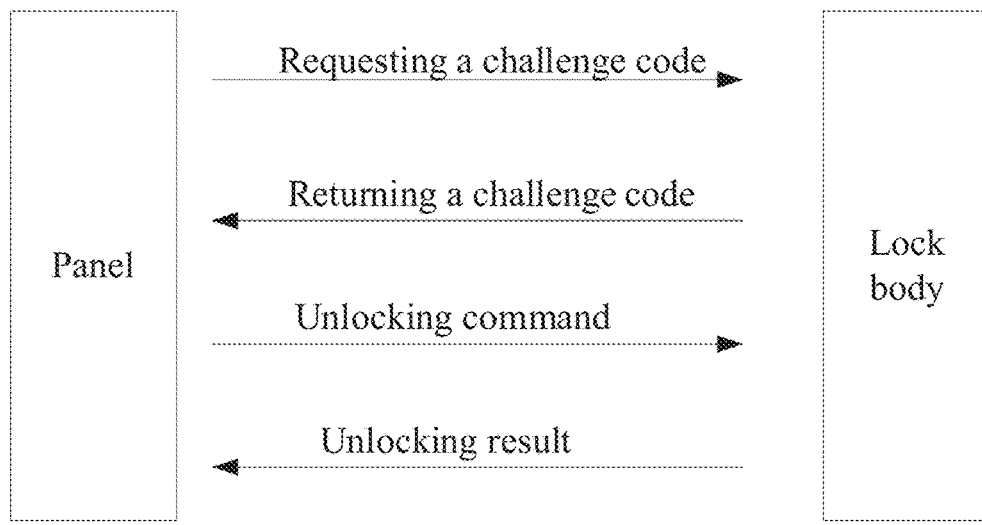
FIG. 36 is an exemplary flowchart of obtaining an unlocking instruction according to some embodiments of the present disclosure.

FIG. 34 is an exemplary flowchart of controlling unlocking of an intelligent lock according to some embodiments of the present disclosure. FIG. 35A and FIG. 35B are schematic structural diagrams of an intelligent lock according to some embodiments of the present disclosure. FIG. 36 is an exemplary flowchart of obtaining an unlocking instruction according to some embodiments of the present disclosure.

Firstly, the process of electric unlocking (automatic unlocking) may be explained in combination with the unlocking flowchart as shown in FIG. 34.

In the closed state, as shown in FIG. 35A and FIG. 35B, the sensing signal of a detection component switch A (e.g., the detection bolt sensor) may be 0 (1 represents that the detection bolt protrudes a certain distance, e.g., the detection bolt protrudes more than 9 mm); the sensing signal of a locking block switch B (the locking block sensor) may be 1 (1 represents that the locking block locks the first bolt, e.g., the scissors bolt); the sensing signal of a locking switch C (the locking sensor) of the second bolt (main bolt) may be 1 (1 represents that the locking block is in the locked operation position, i.e., locked in place); the sensing signal of an unlocking switch D (the unlocking sensor) may be 0 (1 represents that the locking block is in the unlocking operation position, i.e., the unlocking is completed); and the sensing signal of a motor reset switch E (the motor sensor) may be 1 (1 represents that the reset is stopped, and in the original position). Table 1 represents the signals of each switch, and Table 2 represents the signals of each switch detected in the closed state.

TABLE 1

Signals of Switches

| Switch type | Switch code | Open | Close |
|---|---|---|---|
| Detection bolt switch | A | 0 | 1 (Detection bolt protrudes more than 9 mm) |
| Locking block switch | B | 0 | 1 (Locking block locks the scissors bolt) |
| Main bolt locking switch | C | 0 | 1 (Locked) |
| Unlocking switch | D | 0 | 1 (Unlocked) |
| Motor reset switch | E. | 0 | 1 (Reset stop) |

TABLE 2

Door closing signals

| A | B | C | D | E. | determination |
|---|---|---|---|---|---|
| 0 | 1 | 1 | 0 | 1 | OK |

Detecting the sensing signals shown in Table 2 may represent that the intelligent lock is in the closed state. After that, when the user needs to open the door, the user may input a legal electronic key (e.g., a password, etc.) on a panel. At this time, the panel side may request for a challenge code to the lock body. After the lock body generates the challenge code, the lock body may return the challenge code to the panel. The panel may generate an encrypted unlocking instruction (encrypted instruction) based on the received challenge code and password and send the unlocking instruction to the lock body. The lock body may decrypt the unlocking instruction, as shown in FIG. 36. When the decryption fails, the unlocking process may end; and when the unlocking instruction is descripted successfully, the motor may be controlled to slowly start to perform the unlocking operation.

In some embodiments, when the five switches A, B, C, D, and E have any abnormality, the motor may be rotated to unlock, so as to ensure the unlocking operation.

In the process of motor rotation, the lock body may firstly determine whether the unlocking is in place based on the detection of signals of switches A, B, C, D and E. When the unlocking is not in place, whether the unlocking duration exceeds a preset unlocking duration threshold (e.g., 1.5 seconds) may be continuously monitored. When the unlocking duration exceeds the unlocking duration threshold, then when the number of unlocking times is determined to not exceed a threshold of unlocking times (e.g., 3 times), the motor may be controlled to reset and slowly restart to perform the unlocking operation. When the unlocking duration does not exceed the unlocking duration threshold, then whether the motor occurs a stall (i.e., whether the rotation duration of the motor exceeds a preset rotation duration threshold) may be continuously determined. When the motor occurs no stalling, the motor may continuously rotate to perform the unlocking operation; and when the motor occurs a stalling, when the number of unlocking times is determined not exceed the threshold of unlocking times, the motor may be controlled to reset and slowly restart to perform the unlocking operation. When the number of unlocking times exceeds the threshold of unlocking times (e.g., the number of unlocking retry times reaches 3), the unlocking may be determined to fail, and the current unlocking process may end.

It should be noted that when the motor occurs a stalling, the motor should immediately stop rotating and reset to the initial state. The motor may try to rotate to unlock again. When the unlocking fails three times, an alarm may be sent, and the abnormality may be a stall abnormality of the motor during the unlocking process.

The lock body may determine whether the locking is in place based on the signals of switches A, B, C, D and E and relevant abnormal signals may be shown in Table 3.

When the door is not pushed open within the door-opening time threshold, the motor may be controlled to reset. After the motor stops to reset, the lock body may determine whether the door is in the unlatched state through the signals of the 5 switches. When the door is in the unlatched state, prompt information representing the unlatched state may be reported and the process may end; when the door is not in the unlatched state and the user does not push the door, then the lock body may control the motor to rotate to perform the locking operation again to ensure

TABLE 3

| | | | | | | Unlocking signals | | |
|---|---|---|---|---|---|---|---|---|
| A | B | C | D | E | Determination | Operation performed | Inference | Illustration |
| 0 | 0 | 0 | 1 | 0 | OK | When C0, B0, D1, and E0 are detected, the motor stops rotating (delays in milliseconds, and compensates for a switch stroke), at this time the motor freezes (D1 is used as an execution instruction), and the voice prompts: please open the door | Normal | Signal of D1 may be used as the execution determination, and C0, B0, and E0 may only be used for state determination, so when D1 is detected, the system may proceed to the next operation |
| | 1 | | | | NG | When D1 is detected, and signals of C0, B0, and E0 are not completely OK, the motor may stop rotating immediately, the motor may freeze at this time, and the system may prompt a signal abnormality | Switch is damaged | |
| | | 0 | | | NG | D1 is not detected, the motor has no stop rotation instruction, the motor occurs a stall (suggestion: when the motor occurs a stalling, the system may instruct the motor to stop rotating and prompt an abnormality) | Stall Switch is damaged | |

When the lock body determines that the unlocking is in place, i.e., the main bolt retracts in place and the locking block releases the locking of the scissors bolt, at this time, the user may push the door.

After that, the lock body may determine whether the door is pushed open within a preset door-opening time threshold (e.g., 3 seconds). When the door is pushed open, then the scissors bolt may be compressed and then pops out and the popping out state of the detection bolt may be shown in Table 4.

safety. After the locking is completed, a voice prompt of "the door is locked" may be displayed.

Figure 37:
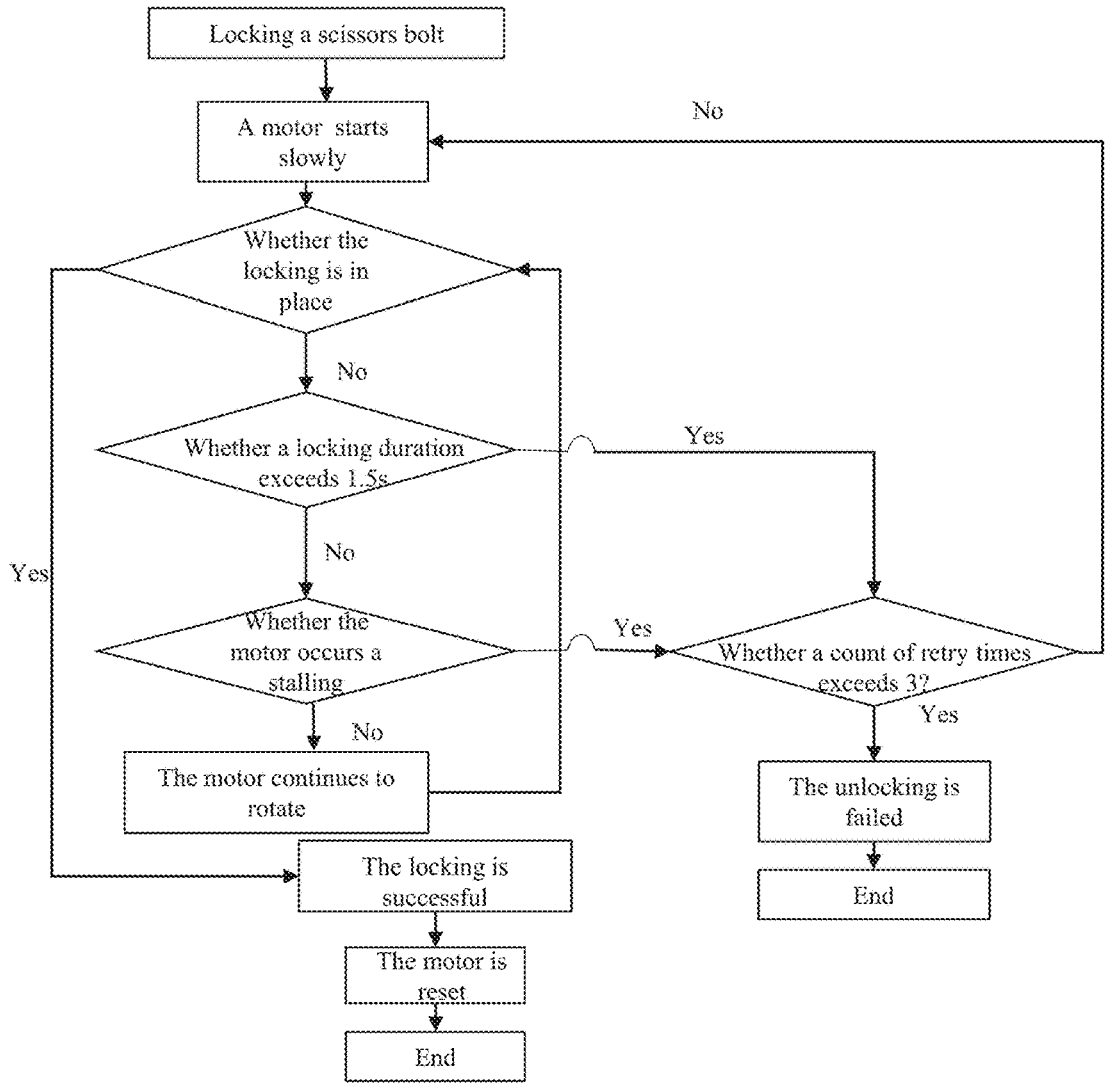
FIG. 37 is an exemplary flowchart of controlling locking of an intelligent lock according to some embodiments of the present disclosure.

FIG. 37 is an exemplary flowchart of controlling locking of an intelligent lock according to some embodiments of the present disclosure. The electric locking (automatic locking) process may be described in combination with a locking flowchart as shown in FIG. 37.

Table 5 is a schematic diagram of signals of 5 switches when the door is opened. When the door is opened, the user may push the door so that the lock body may be pressed into

TABLE 4

| | | | | | | Door push signals | |
|---|---|---|---|---|---|---|---|
| A | B | C | D | E | Determination | Operations performed | Inference |
| 1 | 0 | 0 | 1 | 0 | OK | When A1 is detected, the motor may immediately reset and rotate | Normal |
| 0 | 0 | 0 | 1 | 0 | NG | When A1 is not detected, it means no signal change, and the motor has no reset instruction, which is consistent with the following logic to open the door without pushing the door | A is damaged The detection bolt falsely pops out |

After the door is pushed open, the motor may be controlled to reset, and after the motor stops to reset, the current unlocking process may end, and the door opening may be completed.

the door frame, and the lock body may detect the signals of 5 switches. As shown in Table 6, after the scissors bolt is determined to be locked, the motor may be controlled to slowly start.

TABLE 5

| Door opening signals | | | | | |
|---|---|---|---|---|---|
| A | B | C | D | E | Determination |
| 1 | 0 | 0 | 0 | 1 | OK |

TABLE 6

| | | | | | | Signals before locking | | |
|---|---|---|---|---|---|---|---|---|
| A | B | C | D | E | Determination | Signal feedback | Inference | illustration |
| 0 | 1 | 0 | 0 | 1 | OK | When A0 and B1 are detected, the motor may rotate to lock | Normal | Signal of B1 is used for execution determination, and A0 and A1 are only used for state determination, so when B1 is detected, the system performs the next operation |
| 1 | 1 | 0 | 0 | 1 | NG | When A1 and B1 are detected, the motor may rotate to lock, and a signal abnormality is prompted | A is damaged Door gap is too large | |
| 1 | 0 | 0 | 0 | 1 | NG | The system reports an error, prompting that the door is not closed | A/B are damaged Door gap is too large Door is unlatched | |
| 0 | 0 | 0 | 0 | 1 | NG | The system reports an error, prompting that the door is not closed | B is damaged, Door is, unlatched. | |

When the motor rotates to perform the locking operation, the lock body may detect whether the locking is in place based on the signals of switches A, B, C, D and E. When the locking is not in place, the lock body may continuously detect whether the locking duration exceeds the locking duration threshold. (e.g., 1.5 seconds). When the locking duration exceeds the locking duration threshold, in response to the determination that the number of locking retry times does not exceed the threshold of locking times (e.g., 3 times), the motor may be controlled to reset and slowly restart slowly to perform the locking operation. When the locking duration does not exceed the threshold of locking times, then the lock body may continuously determine whether the motor occurs a stalling. When the motor occurs no stalling, the motor may continue to rotate to perform the locking operation; when the motor occurs the stalling, the motor may be controlled to reset and slowly restart to perform the locking operation when the number of locking retry times is determined to not exceed the threshold of locking times. When the number of locking retry times reaches the threshold of the locking times, it may be determined that the locking has failed, and the current locking process may end.

It should be noted that when the motor occurs the stalling, the motor may immediately stop rotating and reset to the initial state, and the motor may try to rotate to unlock again. After three unsuccessful attempts, an alarm may be sent, and the abnormality may be a motor stall abnormality during the locking process.

The lock body determines whether the main bolt (second bolt) is locked in place based on the signals of switches A, B, C, D and E, and the relevant abnormal signals are shown in Table 7.

TABLE 7

| | | | | | | Locking signals | | |
|---|---|---|---|---|---|---|---|---|
| A | B | C | D | E | Determination | Signal feedback | Inference | Illustration |
| 0 | 1 | 1 | 0 | 0 | OK | When C1 and E0 are detected, the motor may reset and rotate immediately. | normal | C1 signal may be used as the execution instruction, and E0 and E1 may only be used for state determination, so when C1 is detected, the system may perform the next operation. |
| 0 | 1 | 1 | 0 | 1 | NG | When C1 and E1 are detected, the motor may reset and rotate immediately, and E1 may cause reset failure. | E is damaged | |
| 0 | 1 | 0 | 0 | 0 | NG | C1 fails, resulting in no reset instruction for the motor. After the main bolt is locked in place, the motor may keep rotating to form motor stall (suggestion: when the motor occurs the stall here, the system may reset the motor | C is damaged | |
| 0 | 1 | 0 | 0 | 1 | NG | | C and E are damaged | |

TABLE 7-continued

| | | | | | | Locking signals | | |
|---|---|---|---|---|---|---|---|---|
| A | B | C | D | E | Determination | Signal feedback | Inference | Illustration |
| | | | | | | by default and prompt a signal abnormality. This abnormality is a locking stall) | | |

After detecting the sensing signals as shown in Table 7 and determining that the locking is in place, the motor may be controlled to reset, and stop rotating after reset. Specifically, after the main bolt is locked in place, the motor may first pause for a certain time period (e.g., 0.5 second), and then reverse to reset. Based on this, the lock body may first release the load for the motor to avoid damage to the motor module caused by instantaneous reverse rotation.

In some embodiments, the detected signals of switches after the motor reset stops are as shown in Table 8.

TABLE 8

| | | | | | | Reset signals | |
|---|---|---|---|---|---|---|---|
| A | B | C | D | E | Determination | Signal feedback | Inference |
| 0 | 1 | 1 | 0 | 1 | OK | When E1 is detected, the motor may stop resetting immediately | Normal |
| 0 | 1 | 1 | 0 | 0 | NG | E1 detection fails, causing no stop instruction to the motor reset, and the motor constantly rotates to form a stalling (note: when E is damaged, the motor cannot reset to stop normally. There should be a backup countermeasure here to stop the motor from rotating to avoid constant stalling) | E is damaged |

After the locking is completed, a voice prompt of "the door is locked" may be displayed.

In the intelligent lock (also referred to as the fully automatic intelligent lock) of some embodiments of the present disclosure, the unlocking and the locking of the lock body may be implemented by software. The legality verification may be performed after the unlocking instruction is received, and the motor may be driven to perform unlocking after the verification is passed. In some embodiments, the intelligent lock in the present disclosure may prevent trailing to open the door. For example, after the user uses a fingerprint, a password, NFC, or Bluetooth on the panel to open the door, the scissors bolt may enter the frame, i.e., the scissors bolt may be locked, and the door may not be pushed open; after entering and closing the door, there is no need to wait for the main bolt to be locked, and the scissors bolt may be hardened in one jump.

Figure 38:
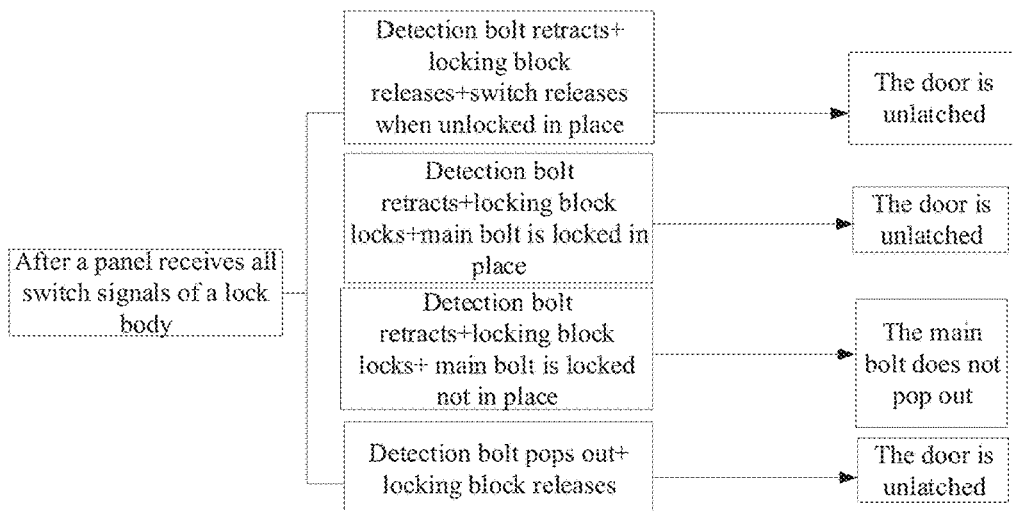
FIG. 38 is a schematic diagram of applying a method for controlling an intelligent lock to a door lock state detection according to some embodiments of the present disclosure is applied to an intelligent door lock.

Furthermore, the intelligent lock in the present disclosure may also detect and prompt the abnormality of the door state. For example, combining five switches to detect the state of the panel door, as shown in FIG. 38, then alarming when the unlatched state is detected after unlocking, and automatic locking of the door after the door is not opened after unlocking, etc., may further ensure safety.

In some embodiments, with the continuous popularization and application of the intelligent lock, functions thereof become more and more comprehensive. The intelligent lock generally includes a panel and a lock body. The lock body is provided with a motor, and generally master chips control a motor drive circuit to drive the motor in the lock body to operate. The master chips and the motor drive circuit are be generally set in the panel. In order to realize the communication between the motor drive circuit and the motor, a communication line between the motor and the motor drive circuit may be set between the panel and the lock body of the intelligent lock. After the panel of the intelligent lock is destroyed, the communication line may be exposed, and other devices may directly control the motor in the lock body through the communication line, such that the door is opened abnormally and the safety is low.

The smart device control system and method (e.g., the control system 200 and the control method 400) provided in some embodiments of the present disclosure may be applied to control the intelligent lock. The intelligent lock in the present disclosure may set both a motor drive circuit and the motor in the lock body, thus making a communication line between the motor drive circuit and the motor not exposed, reducing a possibility that the door is abnormally opened by controlling the communication line between the motor drive circuit and the motor, and improving the safety. The intelligent lock may also include at least one processor (e.g., the processor 320 or the processing module 230) to perform an intelligent lock control method. The at least one processor may include one or more master chips, that is, the intelligent lock control method may be realized by the one or more master chips. To further improve the security, at least one of the one or more master chips may be arranged in the lock body. For example, the one or more master chips may include a first master chip set in the panel and a second master chip set in a lock body cavity. The first master chip and/or the second master chip may be connected through the communication port between the first master chip set in the panel of the intelligent lock and the second master chip set in the cavity of the lock body. Even when the communication port of the second master chip is exposed, since it is more difficult for the master chip to be illegally controlled than for the motor drive circuit, it may be more difficult to achieve illegal door opening by controlling the second master chip, thus the safety may be improved. Furthermore, in order to reduce a possibility of the second master chip being illegally controlled, an identity authentication function of the second master chip may be set. Only devices passing the authentication of the second master chip may control the first master chip, which may further reduce the possibility of the second master chip being illegally controlled and improve the safety. Among them, when the identity authentication function is realized, it may be realized by the second master chip, or a safety chip communicating with the second master chip may be additionally set in the shell cavity of the lock body, and the identity authentication function can be realized by the encryption chip. For the convenience of description, the following is an example of the application of the intelligent lock to a door lock. It can be understood that the intelligent lock may also be applied to other fields (e.g., gates, safes, etc.), and there is no restriction here.

FIG. 39 is a schematic structural diagram of an exemplary intelligent lock according to some embodiments of the present disclosure.

As shown in FIG. 39, the intelligent lock may include a lock panel and a lock body. A first master chip 3901 may be set in the lock panel, and a second master chip 3902 may be set in the lock body. The first master chip 3901 and the second master chip 3902 may be connected through a communication port. In a practical application, the first master chip 3901 and the second master chip 3902 may communicate through a wireless communication. At this time, the communication port may be a wireless communication port, such as a Wi-Fi interface, a Bluetooth interface, an NFC (Near Field Communication) interface and any other short distance communication port. In addition, the first master chip 3901 and the second master chip 3902 may communicate through a wired communication. That is, a communication line may be set between the first master chip 3901 and the second master chip 3902, and a communication port of the communication line may be a UART interface, an IIC interface or an SPI interface.

In some embodiments, an installation position of the first master chip 3901 may be not limited. For example, the first master chip 3901 may be set in a shell cavity (i.e., a cavity of a shell) of the lock panel of the intelligent lock, or in a cavity of a handle of the intelligent lock or on a door body. In addition, the first mater chip 3901 may also be set on a side of the lock panel to contact the lock body more closely.

In some embodiments, the shell cavity of the lock body may be provided with a lock body mechanical structure 3905 and a motor 3904 connected with the lock body mechanical structure 3905. The shell cavity of the lock body may be also provided with a motor drive circuit 3903. The second master chip 3902 may be connected with the motor 3904 through the motor drive circuit 3903, and may control an action of the motor 3904 through the motor drive circuit 3903. In some embodiments, when the first master chip 3901 receives preset unlocking information, the first master chip 3901 may send an unlocking instruction to the second master chip 3902 through the communication port, so that the second master chip 3902 may control the motor 3904 to perform the unlocking operation through the motor drive circuit 3903.

In some embodiments, the motor drive circuit 3903 may receive a control command of the second master chip 3902, and then drive the motor 3904 in the lock body to achieve unlocking, locking and other functions. In some embodiments, the motor 3904 may be controlled by the second master chip 3902 through the motor drive circuit 3903, and may be configured to extend or retract a main bolt (e.g., the second bolt 2303 as shown in FIG. 13) to complete unlocking and locking. In some embodiments, the motor 3904 may push a clutch bolt or directly pull the bolt. In some embodiments, the lock body mechanical structure 3905 may be composed of a plurality of mechanical structural members, which may cooperate with a detection switch/sensor to achieve detecting the state of the lock body by a master chip and achieve locking and unlocking. For more descriptions of the detection switch, refer to the related descriptions of the switch in FIGS. 24, 28, 30 and 34-37.

In some embodiments, the installation position of the first master chip 3901 may also be set inside the lock body. In some embodiments, the first master chip 3901 and the second master chip 3902 may be integrated on a master chip, that is, the master chip may realize functions of the first master chip 3901 and the second master chip 3902.

FIG. 40 is a schematic structural diagram of an exemplary intelligent lock according to some embodiments of the present disclosure.

As shown in FIG. 40, the intelligent lock may include a lock panel and a lock body. The first master chip 3901 may be set in the lock panel, and the second master chip 3902 may be set in the lock body. The first master chip 3901 and the second master chip 3902 may be connected through a communication port. A shell cavity of the lock body may be also provided with a safety chip 3906 that performs an identity verification on the first master chip 3901. The safety chip 3906 may be connected with the second master chip 3902.

In order to prevent other devices from illegally controlling the second master chip 3902, in some embodiments, the safety chip 3906 may be set in the shell cavity of the lock body. The safety chip 3906 may be configured to save a secret key, process encryption and decryption algorithms, and thus achieve an identity authentication of the device. Even when the communication port of the second master chip 3902 is exposed, the safety chip 3906 of the lock body may have an authentication function. Even when there is a device communicating with the second master chip 3902, however, the identity authentication of the device may not be passed, and the second master chip 3902 may not be controlled, which may further improve the safety of unlocking.

In another implementation of the present disclosure, referring to FIG. 40, the lock body maybe provided with at least one sensor (e.g., one or more lock body sensors described in FIG. 23). The at least one sensor may be directly or indirectly connected with the second master chip 3902 and the lock body mechanical structure 3905 respectively.

In some embodiments, the sensor may include but be not limited to a detection switch. The detection switch may be configured to detect a position of the lock body mechanical structure, such as detecting whether a main bolt has been fully extended, and/or detecting whether the bolt is pressed, etc. In some embodiments, a number, type, position, installation manner, etc. of the detection switch may be adjusted according to different mechanical designs. The detection switch may determine a state of a current lock body. The state may be any one or any combination of unlocked/locked/unlatched/forced open/not reset/reset.

In some embodiments, since the second master chip 3902 is set in the lock body, the second master chip 3902 may receive a detection result of the detection switch, and the first master chip 3901 in the lock panel may indirectly control the detection switch through the second master chip 3902, thus avoiding when the detection switch is directly controlled through the first master chip 3901 in the lock panel in the prior art, each detection switch may be connected with the first master chip 3901 by means of communication lines, which may lead to more connecting lines between the first master chip 3901 and the detection switch, and a large number of outgoing lines from the lock body may be connected to the panel, which is not simple enough.

In some embodiments, the master chip may be connected with not only the detection switch and the motor, but also various sensors, such as a gyroscope or an accelerometer.

Figure 41:
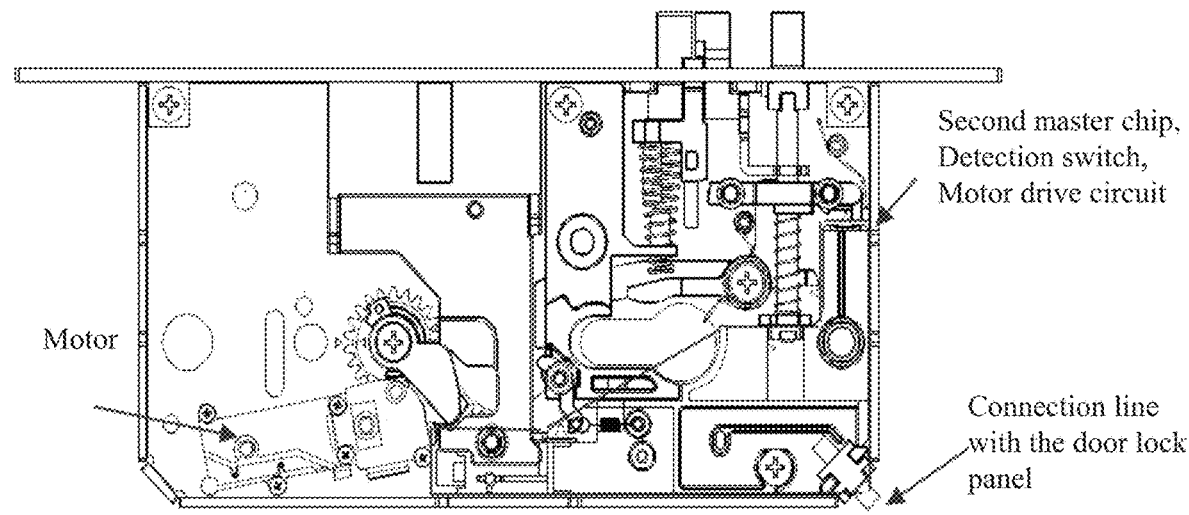
FIG. 41 and FIG. 42 are schematic structural diagrams of exemplary intelligent locks according to some embodiments of the present disclosure.
Figure 42:
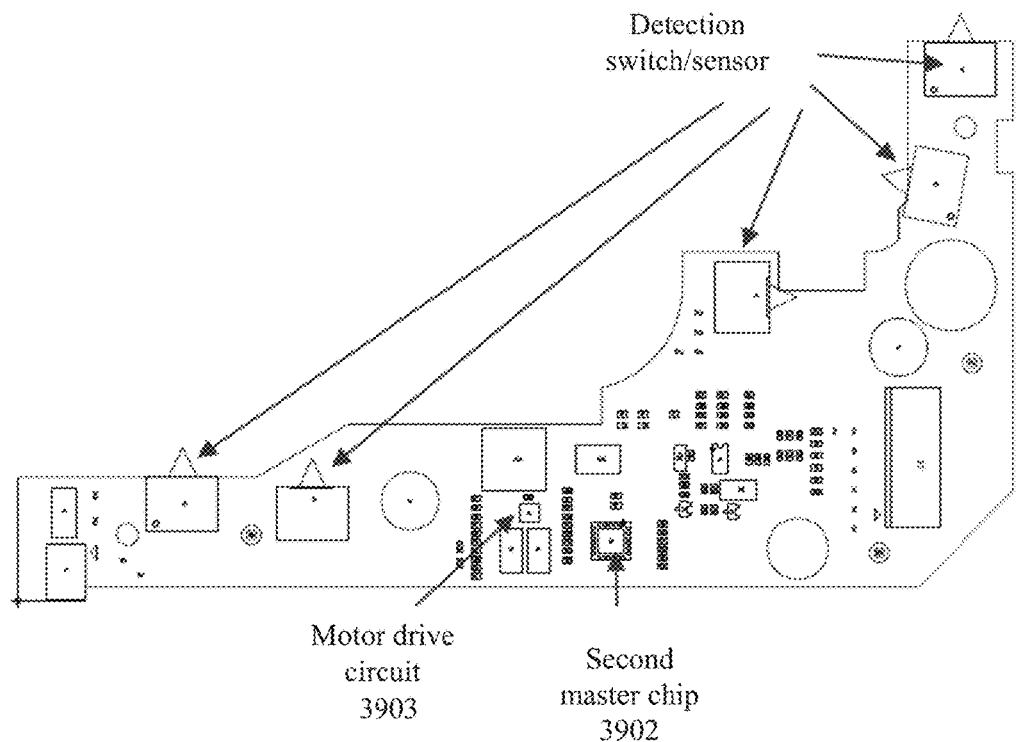

FIGS. 41 and 42 are schematic structural diagrams of an exemplary intelligent lock according to some embodiments of the present disclosure.

In order for those skilled in the art to clearly understand an internal structure of the lock body in the embodiments of the present disclosure, the following is described in combination with FIG. 41 and FIG. 42. In some embodiments, the lock body may include a shell, and a structure in the shell cavity may refer to FIGS. 41 and 42. FIGS. 41 and 42 show an exemplary structure of a motor, a second master chip, a detection switch, and a motor drive circuit. In some embodiments, a control of automatic locking and unlocking function may be realized by the second master chip (e.g., the second master chip 3902), a driving force of the control may be provided by the motor (e.g., the motor 3904), and a power may be transmitted through the motor driving circuit (e.g., the driving circuit 3903). In some embodiments, the detection switch or sensor may include a locking block switch for collecting lock information when the locking block is in a locked working position, and a detection bolt switch for collecting door closing information when the detection bolt is pressed and retracted.

It should be noted that in some embodiments, the first master chip and the second master chip may be connected through a communication line. As shown in FIG. 41, a communication port of the communication line and a connection line connecting the communication port may be set.

According to some embodiments of the present disclosure, both the motor drive circuit and the motor may be arranged in the shell cavity of the lock body, so that the communication line between the motor drive circuit and the motor may not be exposed, reducing a possibility that the door may be abnormally opened by controlling the communication line between the motor drive circuit and the motor, and improving the security. Furthermore, in order to realize the communication between the lock panel and the lock body, the second master chip may be arranged in the shell cavity of the lock body, and the first master chip arranged in the intelligent lock may be connected with the second master chip arranged in the shell cavity of the lock body through the communication port. Even when the communication port of the second master chip is exposed, because a difficulty of an illegal control of the master chip is greater than a difficulty of an illegal control of the motor drive circuit, it may be difficult to open the door illegally by controlling the second master chip, which improves the security.

In addition, the technical solution of the present disclosure may also have following technical advantages: 1) a design architecture may be simplified to make external outgoing lines of the lock body more concise. The external interfaces of the lock body may be fixed, which may be not changed by the internal functions of the lock body. 2) a function scalability may be increased. Functions of the lock body may be different for different product positionings of the lock, e.g., a number of the detection switches may be increased, or a number of the motors may need to be increased for controlling. These functions may be directly implemented inside the lock body without affecting external interfaces. A same design may satisfy different needs, which may greatly reduce a research and development (R&D) cost. 3) For security issues, the whole lock body may cover the transmission part of the bolt, and even when the panel is removed, the door may not be forced to open. In addition, at a software transmission level, using a current mainstream encryption algorithm may also ensure a reliability and security of the transmission. 4) The lock body may add an identity recognition mechanism at the software level, which may ensure that the lock body can only be used when the lock body and the panel authorized and certified by the manufacturer are matched, so as to avoid quality problems caused by the proliferation of low-quality lock bodies in the market.

Figure 43:
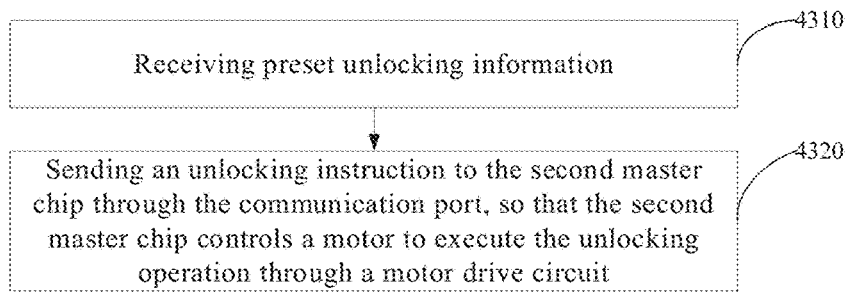
FIG. 43 is a flowchart of an exemplary method for controlling an intelligent lock according to some embodiments of the present disclosure.

FIG. 43 is a flowchart of an exemplary method for controlling an intelligent lock according to some embodiments of the present disclosure.

As shown in FIG. 43, some embodiments of the present disclosure provide a control method applied to an intelligent lock. The control method applied to a first master chip (e.g., the first master chip 3901) in the intelligent lock of any of the above embodiments may include following operations.

In 4310, preset unlocking information may be received.

In a practical application, when a user needs to perform an unlocking operation, the first master chip may obtain the preset unlocking information (e.g., the control key). In some embodiments, the preset unlocking information may include a biological feature (e.g., a fingerprint, a finger vein, a facial feature, etc.), a password (e.g., an NFC password, an offline password value, an online password value, etc.), etc. After the preset unlocking information is received, it may indicate that the user wants to unlock. At this time, the first master chip may be needed to control a second master chip to realize the unlocking operation. In some embodiments, when the user wants to unlock, the unlocking information may be input, but whether the unlocking information is correct may need to be verified by the first master chip. When the unlocking information is correct, the unlocking information may be considered as the preset unlocking information, and the unlocking operation may be performed at this time. When the unlocking information is not correct, the unlocking operation may be prohibited, and prompt information of incorrect password may be output by voice. The process of acquiring the unlocking information may be the same as or similar to the process of acquiring the control command described in FIGS. 24 through 31.

In 4320, an unlocking instruction may be sent to the second master chip through the communication port, so that the second master chip may control a motor to execute the unlocking operation through a motor drive circuit.

In a practical application, the first master chip may send the unlocking instruction to the second master chip through a wireless or wired communication port, and the second master chip may control the action of the motor by controlling a motor drive circuit, thus realizing the unlocking. For more description of controlling the action of the motor to unlock, refer to the related description in FIG. 24 through FIG. 31.

Figure 44:
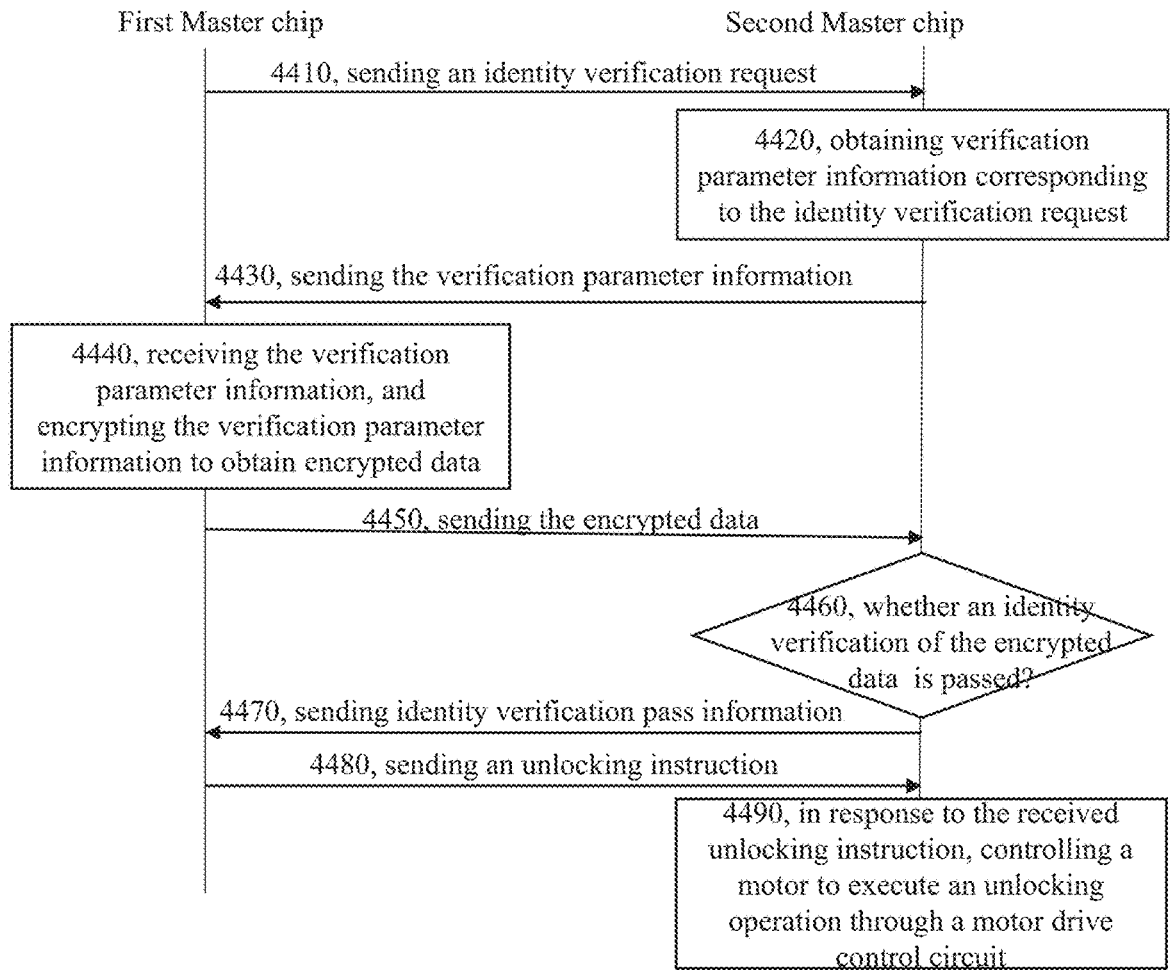
FIG. 44 is a flowchart of an exemplary method for controlling an intelligent lock according to some embodiments of the present disclosure.

FIG. 44 is a flowchart of an exemplary method for controlling an intelligent lock according to other embodiments of the present disclosure.

In order to ensure that a second master chip (e.g., the second master chip 3902) is not illegally controlled, in some embodiments, a first master chip (e.g., the first master chip 3901) may be authenticated to ensure that the first master chip sending an unlocking instruction is a chip verified by the second master chip. For example, referring to FIG. 44, the authentication process and the unlocking process may include the following operations.

In 4410, the first master chip may send an identity verification request to a second master chip.

In some embodiments, the identity verification request may be a request to obtain a challenge code. The first master chip and the second master chip may be preset to be able to perform the authentication by a way of a challenge code+a default key, so at this time the first master chip may send a request of acquiring a challenge code to the second master chip.

In some embodiments, in order to improve a response speed of the second master chip, the first master chip may send a wake-up command to the second master chip before sending the identity verification request, so that the second master chip may exit a sleep state. The wake-up command may be a high level and realized specifically through a specific communication line.

In 4420, the second master chip may obtain verification parameter information corresponding to the identity verification request.

In some embodiments, the verification parameter information may be a challenge code agreed by the first master chip and the second master chip.

In 4430, the second master chip may send the verification parameter information to the first master chip.

In 440, the first master chip may receive the verification parameter information corresponding to the identity verification request fed back by the second master chip and encrypt the verification parameter information to obtain encrypted data.

When the first master chip is encrypting, the first master chip may use a private key stored by the first master chip for encryption. In some embodiments, the first master chip and the second master chip may have agreed on a public key and a private key in advance, and use the corresponding public key and private key for encryption and decryption operations.

In 4450, the first master chip may send the encrypted data to the second master chip.

In 4460, the second master chip may perform the identity verification on the encrypted data, and execute operation 4470 when the verification is passed.

The second master chip may use a private key stored in the second master chip to decrypt and decrypt the challenge code. When the challenge code is agreed between the first master chip and the second master chip, it may indicate that the identity verification is passed. When the challenge code is not agreed between the first master chip and the second master chip, it may indicate that the identity verification is not passed.

In 4470, the second master chip may send identity verification pass information to the first master chip.

In 4480, the first master chip may send the unlocking instruction to the second master chip.

In 4490, in response to the received unlocking instruction, the second master chip may control a motor to execute the unlocking operation through a motor drive control circuit.

In some embodiments, in order to avoid a mis-operation, for example, when a door is already in an unlocked state, it may be unnecessary to perform the unlocking operation again. At this time, the second master chip may detect a current lock body state of a lock body mechanical structure through a detection switch. When the current lock body state is locked, the motor may be controlled to perform the unlocking operation through the motor drive circuit. That is, only when the door is closed and the unlocking instruction is received, the door can be unlocked. When the door is not closed, the door may not be unlocked to avoid the mis-operation.

After the second master chip controls the motor to perform the unlocking operation through the motor drive circuit, when the second master chip successfully controls the motor to perform the unlocking operation, the second master chip may send unlocking success information to the first master chip, and the first master chip may receive the unlocking success information, and store and display the unlocking success information. In addition, the second master chip may push the unlocking success information to a preset terminal device (e.g., the terminal device 140 related to a user), such as a mobile phone, a computer and any other device of the user. In some embodiments, the second master chip successfully controlling the motor to perform the unlocking operation may be the lock body determining that a main bolt of the lock body (e.g., the second bolt 2303) has completed retraction by the detection switch.

In the above embodiments, the identity verification may be performed through the second master chip. In some embodiments, in order to further improve an accuracy and reliability of the identity verification and avoid an occurrence of an identity verification error when the second master chip is attacked, a safety chip may be set in a shell cavity of the lock body, and the safety chip may be configured to verify an identity of the first master chip in a shell cavity of the lock panel. Specifically, the safety chip may communicate with the second master chip through an IIC or SPI interface. The second master chip may receive the identity verification request sent by the first master chip and send the identity verification request to the safety chip, so that the safety chip may obtain the verification parameter information corresponding to the identity verification request, and send the verification parameter information to the first master chip through the second master chip. The second master chip may receive encrypted data after the first master chip encrypts the verification parameter information, and send the encrypted data to the safety chip to enable the safety chip to perform an identity verification on the encrypted data. After the identity verification is passed, the second master chip may send the identity verification pass information to the first master chip.

It should be noted that the safety chip may select a corresponding type according to an actual use scenario. When the challenge code is encrypted and decrypted, the user may use either the second master chip or the safety chip. For more descriptions of encryption, decryption, and identity authentication, please refer to FIGS. 6 to 8 and 24 to 31.

To sum up, the sending the unlocking instructions to the second master chip through the communication port to cause the second master chip to control the motor to perform the unlocking operation through the motor drive circuit may include: sending the identity verification request to the second master chip; receiving the verification parameter information corresponding to the identity verification request fed back by the second master chip; encrypting the verification parameter information to obtain the encrypted data; and sending the encrypted data to the second master chip; after receiving the identity verification pass information fed back after the second master chip passes the identity verification of the encrypted data, sending the unlocking instruction to the second master chip, so that the second master chip can control the motor to perform the unlocking operation through the motor drive circuit.

Further, after the unlocking instruction is sent to the second master chip through the communication port so that the second master chip can control the motor to perform the unlocking operation through the motor drive circuit, the process may also include: receiving the unlocking success information sent by the second master chip after the second master chip successfully controls the motor to perform the unlocking operation.

In some embodiments, the first master chip may not only control the second master chip to unlock, but also control the second master chip to upgrade. Specifically, the control method may also include: 1) acquiring upgrade package data of the second master chip.

In some embodiments, the first master chip maybe connected with a preset terminal device, such as the mobile phone of the user. The mobile phone may be equipped with an APP that communicates with the intelligent lock. The APP may communicate with the first master chip. The user may send the upgrade package data of the second master chip to the first master chip by operating the APP.

2) sending the upgrade package data to the second master chip through the communication port, so that the second master chip can use the upgrade package data for an upgrade operation.

3) receiving successful upgrade information returned by the second master chip after the upgrade operation is completed, and outputting the successful upgrade information to the preset terminal device.

After receiving the upgrade package data, the first master chip may send the upgrade package data to the second master chip through the communication port, and the second master chip may perform the upgrade operation. After the upgrade is completed, the second master chip may return successful upgrade information to the first master chip, and the first master chip may output the successful upgrade information to the preset terminal device.

In some embodiments, in addition to the upgrade of the second master chip, the user may also control the first master chip to be upgraded through the APP. Specifically, the user may send the upgrade package of the first master chip to the first master chip through the APP, and return the successful upgrade information to the APP after the first master chip is upgraded.

Another embodiment of the present disclosure provides a control method applied to an intelligent lock. The control method may be applied to a second master chip in the intelligent lock of any of the above embodiments. The control method may include: receiving the unlocking instruction sent by the first master chip when the first master chip receives the preset unlocking information through the communication port; and controlling the motor to perform the unlocking operation through the motor drive control circuit in response to the received unlocking instruction.

In some embodiments, the receiving the unlocking instruction sent by the first master chip when the first master ship receives the preset unlocking information through the communication port; and the controlling the motor to perform the unlocking operation through the motor drive control circuit in response to the received unlocking instruction, may include: receiving the identity verification request sent by the first master chip when the first master chip receives the preset unlocking information; obtaining the verification parameter information corresponding to the identity verification request; sending the verification parameter information to the first master chip; receiving the encrypted data obtained by the first master chip encrypting the verification parameter information; performing the identity verification on the encrypted data; after the identity verification is passed, sending the identity verification pass information to the first master chip; receiving the unlocking instruction sent by the first master chip; and controlling the motor to execute the unlocking operation through the motor drive control circuit in response to the received unlocking instruction.

Further, after controlling the motor to execute the unlocking operation through the motor drive control circuit, the control method may also include: after successfully controlling the motor to execute the unlocking operation, sending the unlocking success information to the first master chip.

In some embodiments, the shell cavity of the lock body may be also provided with a safety chip to perform the identity verification on the first master chip. The receiving the identity verification request sent by the first master chip when the first master chip receives the preset unlocking information; obtaining the verification parameter information corresponding to the identity verification request; sending the verification parameter information to the first master chip, may include: receiving the identity verification request sent by the first master chip when the first master ship receives the preset unlocking information; and sending the identity verification request to the safety chip, so that the safety chip can obtain the verification parameter information corresponding to the identity verification request, and send the verification parameter information to the first master chip through the second master chip.

In some embodiments, the receiving the encrypted data obtained by the first master chip encrypting the verification parameter information; performing the identity verification on the encrypted data; after the identity verification is passed, sending the identity verification pass information to the first master chip may include: receiving the encrypted data obtained by the first master chip encrypting the verification parameter information; sending the encrypted data to the safety chip to enable the safety chip to perform the identity verification on the encrypted data and send the identity verification pass information through the second master chip to the first master chip after the identity verification is passed.

In some embodiments, the lock body may be also provided with at least one sensor. The at least one sensor may be respectively connected with the second master chip and the lock body mechanical structure. In response to the received unlocking instruction, the controlling the motor to execute the unlocking operation through the motor drive control circuit, may include: in response to the received unlocking instruction, detecting the current lock body state of the lock body mechanical structure through a sensor; when the current lock body state is locked, controlling the motor to perform the unlocking operation through the motor drive circuit.

In the above embodiment, it is introduced to use the second master chip to perform the unlocking operation. In addition, the second master chip may also realize the locking operation.

In some embodiments, the lock body may be provided with a sensor for detecting a state of the bolt. After the unlocking is successful, when the sensor detects that a preset bolt of the lock body is in a pressed state, it may indicate that the user wants to close the door. At this time, the motor may be controlled to perform the locking operation through the motor drive circuit. After the lock body determines that the main bolt of the lock body has been extended through the sensor, successful locking information may be reported to the first master chip in the lock panel. The first master chip may report the above successful locking information to the above preset terminal device.

In some embodiments, it may also be possible to detect an unlatched state through the sensor in the lock body, at which time the second master chip may report the unlatched state of the door to the first master chip. In addition, when the second master chip or the safety chip fails to pass the identity verification, abnormal opening information may be reported to the lock panel. At this time, when the lock body is also provided with an alarm device, the second master chip may also control the alarm device to alarm. For more descriptions of automatic unlocking and locking, please refer to the related descriptions in FIGS. 24 to 31.

In another embodiment of the present disclosure, the second master chip may also realize the upgrade operation. Specifically, the control method may also include: receiving the upgrade package data of the second master chip sent by the first master chip through the communication port; using the upgrade package data to upgrade; after the upgrade operation is completed, returning successful upgrade information to the first master chip, so that the first master chip can output the successful upgrade information to the preset terminal device.

A specific implementation process of each operation of the control method applied to the second master chip may refer to the corresponding description of the control method applied to the first master chip in the above embodiment, which is not repeated herein.

The embodiments of the present disclosure provide a computer-readable medium, on which a computer program may be stored. When the program is executed by a processor, the control method described in the embodiments of the above methods applied to an intelligent lock may be implemented. Specifically, the control method applied to the intelligent lock may include: receiving preset unlocking information; sending the unlocking instruction to the second master chip through the communication port, so that the second master chip can control the motor to perform the unlocking operation through the motor drive circuit.

The embodiments of the present disclosure provide a computer-readable medium on which a computer program is stored. When the program is executed by a processor, the control method described in the above embodiments of the method applied to an intelligent lock may be implemented. Specifically, the control method applied to the intelligent lock may include: receiving the unlocking instruction sent by the first master chip when the first master chip receives the preset unlocking information through the communication port; and controlling the motor to execute the unlocking operation through the motor drive control circuit in response to the received unlocking instructions.

The embodiment of the present disclosure provides a processor, which may be used to run programs. The programs may be run to implement the control method applied to an intelligent lock described in the above embodiments of the method. Specifically, the control method applied to the intelligent lock may include: receiving the preset unlocking information; sending the unlocking instruction to the second master chip through the communication port, so that the second master chip can control the motor to perform the unlocking operation through the motor drive circuit.

The embodiment of the present disclosure provides a processor, which may be configured to run programs. The program may be run to implement the control method applied to an intelligent lock described in the above embodiments of the method. Specifically, the control method applied to the intelligent lock may include: receiving the unlocking instructions sent by the first master chip when the first master chip receives the preset unlocking information through the communication port; and controlling the motor to perform the unlocking operation through the motor drive control circuit in response to the received unlocking instruction.

The present disclosure also provides a computer program product. When the computer program product is executed on a data processing device, the computer program product may enable the data processing device to implement the control method applied to the intelligent lock described in the above embodiments of the method. Specifically, the control method applied to the intelligent lock may include: receiving the preset unlocking information; sending the unlocking instruction to the second master chip through the communication port, so that the second master chip can control the motor to perform the unlocking operation through the motor drive circuit.

The present disclosure also provides a computer program product. When the computer program product is executed on a data processing device, the computer program product may enable the data processing device to implement the control method applied to the intelligent lock described in the above embodiments of the method. Specifically, the control method applied to the intelligent lock may include: receiving the unlocking instruction sent by the first master chip when the first master chip receives the preset unlocking information through the communication port; and controlling the motor to perform the unlocking operation through the motor drive control circuit in response to the received unlocking instruction.

The electronic device, processor, computer-readable medium or computer program product provided by the above embodiments of the present disclosure may all be configured to implement the corresponding methods provided by the present disclosure. Therefore, beneficial effects that may be achieved can refer to the beneficial effects of the corresponding methods provided above, which is not repeated here.

At present, a power supply bus of an intelligent lock system may be controlled by a power management module, including a power supply of a controller controlling the intelligent lock system and a power supply of controlled devices of the intelligent lock system. Due to the large number of the controlled devices, it may be easy to cause an abnormality of the intelligent lock system when one of the controlled devices is abnormal. Therefore, when the power management module detects that the intelligent lock system is abnormal, it may generally control the power supply bus for power off/on processing, so that the controller of the intelligent lock system and the controlled devices may be restarted to initialize the entire intelligent lock system and solve the problem of abnormal controlled devices. In addition, the controller that controls the intelligent lock system may only control the controlled devices to restart after the controller is restarted. This way may lead to a long restart time of the controlled devices, further leading to a long restart time of the entire intelligent lock system, which may affect the use of the intelligent lock.

In order to solve the above problems, some embodiments of the present disclosure provide a smart device control system (e.g., an intelligent lock system). The intelligent lock system may include: a control signal circuit, a system controller and one or more controlled devices. The control signal circuit may have at least one power supply interface to receive a power trigger signal. A level output interface of the control signal circuit may be connected with a first signal input interface of the system controller, and output a restart control signal to the system controller through the first signal input interface. A control signal output interface of the system controller may be connected with a power control interface of the controlled device to control a power state of the controlled device. In some embodiments, the control signal circuit may be connected with the system controller, and the system controller may be connected with a power control interface of the controlled device, so that the system controller may control the power off/on of the corresponding controlled device and provide a basis for a restart operation of the controlled device. In some embodiments of the present disclosure, the system controller may directly realize the power off/on operation of the controlled device without restarting the system controller, reducing the restart time of the entire intelligent lock system and improving the reliability of the intelligent lock.

Figure 45:
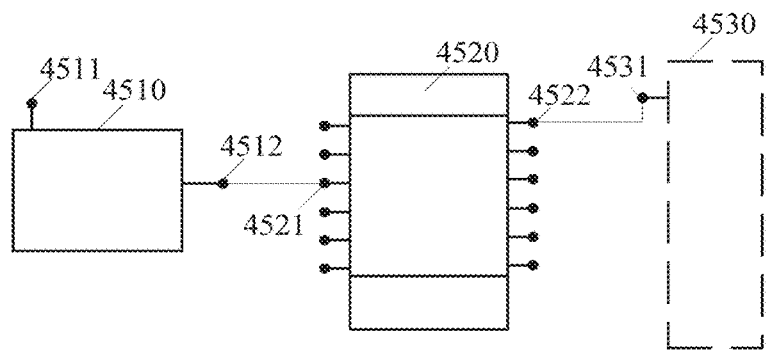
FIG. 45 is a structural diagram of an exemplary intelligent lock system according to some embodiments of the present disclosure.

FIG. 45 is a schematic structural diagram of an exemplary intelligent lock system according to some embodiments of the present disclosure.

As shown in FIG. 45, some embodiments of the present disclosure provide an intelligent lock system, which may include: a control signal circuit 4510, a system controller 4520, and a controlled device 4530. The system controller 4520 may be a processor or a processing module or a master chip of the intelligent lock described elsewhere in the present disclosure (e.g., the processing module 230 in FIG. 2 or the processor 320 in FIG. 3).

The control signal circuit 4510 may be provided with at least one power supply interface 4511 to receive the power trigger signal. The level output interface 4512 of the control signal circuit 4510 may be connected with the first signal input interface 4521 of the system controller 4520, and output a restart control signal to the system controller 4520 through the first signal input interface 4521. The control signal output interface 4522 of the system controller 4520 may be connected with power control interface 4531 of the controlled device 4530 to control the power state of the controlled device 4530.

In some embodiments, the control signal circuit 4510 may be an integrated circuit or a non integrated circuit, which is not limited in the present disclosure.

In some embodiments, the power supply interface 4511 of the control signal circuit 4510 may include a USB interface, such as a Type-C interface. In some embodiments, the power supply interface 4511 of the control signal circuit 4510 may be connected to an external power supply through a USB power cable, for example, it may be connected to a power bank. Of course, the power supply interface 4511 of the control signal circuit 4510 may also be other types of interfaces, which is not limited in the present disclosure.

In some embodiments, after the control signal circuit 4510 is connected to the external power supply, that is, after the power supply interface 4511 is connected to the external power supply, the level output interface 4512 of the control signal circuit 4510 may output a restart control signal, and the restart control signal may be a level signal, such as a high level or a low level, which is not limited in the present disclosure.

In some embodiments, the restart control signal may flow to the system controller 4520 through the first signal input interface 4521. After the system controller 4520 obtains the restart control signal, the system controller 4520 may control the power state of the controlled device 4530. For example, the power state of the controlled device 4530 may be controlled by disconnecting/connecting the power supply of the controlled device 4530.

In some embodiments, the controlled devices 4530 may include a plurality of devices, and each device may supply power through an independent power line and switch. In this case, the system controller 4520 may respectively control opening or closing of switches of the plurality of devices through a plurality of control signal output interfaces 4522, which is not limited in the present disclosure. In some embodiments, each device may also supply power through a power bus and a master switch. In this case, the system controller 4520 may control the master switch to be opened or closed through a control signal output interface 4522.

Figure 46:
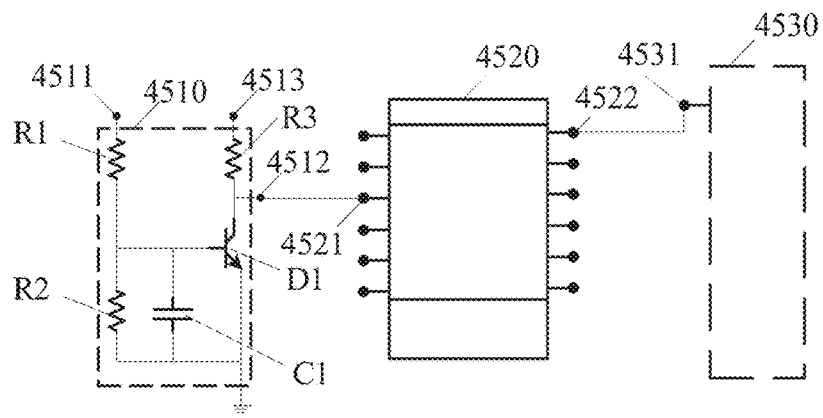
FIG. 46 is a structural diagram of an exemplary intelligent lock system according to some embodiments of the present disclosure.

FIG. 46 is a schematic structural diagram of an exemplary intelligent lock system according to other embodiments of the present disclosure. In some embodiments, the control signal circuit 4510 of the embodiment may be only one of the embodiments of the present disclosure, and the scope of protection of the present disclosure may include but be not limited to the control signal circuit 4510 of this embodiment.

As shown in FIG. 46, in combination with the embodiment shown in FIG. 45, in some embodiments, the control signal circuit 4510 may include: a first resistance R1, a second resistance R2, a third resistance R3, a first capacitor C1, and a first triode D1.

In some embodiments, a first end of the first resistor R1 may be the power supply interface 4511; a first end of the second resistance R2, a first end of the first capacitor C1, and an emitter of the first triode D1 may all be ground interfaces; a second end of the second resistance R2, a second end of the first capacitor C1, and a base of the first triode D1 may all be connected with a second end of the first resistance R1; a collector of the first triode D1 may be connected with a first end of the third resistor R3, and the collector of the first triode D1 may be the level output interface 4512 of the control signal circuit 4510; a second end of the third resistor R3 may be a voltage input interface 4513 of the control signal circuit 4510.

In some embodiments, the control signal circuit 4510 of the embodiment may be only one of the embodiments of the present disclosure, and the protection scope of the present disclosure includes but is not limited to the control signal circuit 4510 of the embodiment.

In some embodiments, when the power supply interface 4511 is connected with an external power supply, the first triode D1 may be turned on, which may change the collector of the first triode D1 from a high level to a low level, and the low level may be used as a restart control signal.

In some embodiments, the voltage input interface 4513 of the control signal circuit 4510 may be kept connected with an external power source. For example, the voltage input interface 4513 of the control signal circuit 4510 may be kept connected with an external power source of 3V voltage, that is, a high level may be continuously applied to the collector of the first triode D1. In some embodiments, when the power supply interface 4511 of the control signal circuit 4510 is also connected with an external power supply, the first triode D1 may be turned on, the collector of the first triode D1 may change from a high level to a low level, and the low level may be input to the system controller 4520 as the restart control signal, which is not limited in the present disclosure.

Figure 47:
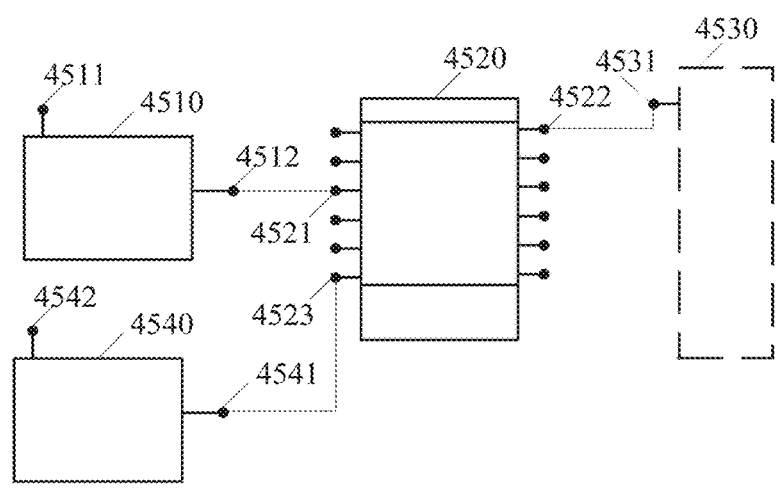
FIG. 47 is a structural diagram of an exemplary intelligent lock system according to some embodiments of the present disclosure.

FIG. 47 is a schematic structural diagram of an exemplary intelligent lock system according to other embodiments of the present disclosure.

As shown in FIG. 47, in combination with the embodiment shown in FIG. 45, in some optional embodiments, the intelligent lock system may also include a reset circuit 4540.

A level output interface 4541 of the reset circuit 4540 maybe connected with a second signal input interface 4523 of the system controller 4520. The reset circuit 4540 may have at least one voltage input interface 4542.

In some embodiments, the level output interface 4541 of the reset circuit 4540 may also output the restart control signal to the system controller 4520.

In some embodiments, the voltage input interface 4542 of the reset circuit 4540 may keep connected with an external power supply. For example, the voltage input interface 4542 may keep connected with an external power supply of 3V voltage, which is not limited in the present disclosure.

Figure 48:
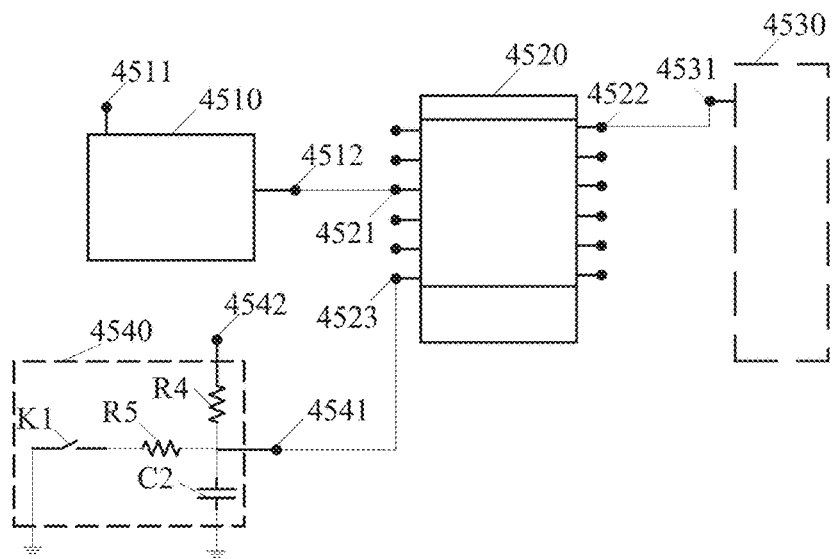
FIG. 48 is a structural diagram of an exemplary intelligent lock system according to some embodiments of the present disclosure.

FIG. 48 is a schematic structural diagram of an exemplary intelligent lock system according to other embodiments of the present disclosure.

As shown in FIG. 48, in combination with the implementation of the intelligent lock system shown in FIG. 47, in some optional embodiments, the reset circuit 4540 may include a fourth resistor R4, a fifth resistor R5, a reset switch K1 and a second capacitor C2.

A first end of the fourth resistor R4 may be the voltage input interface 4542 of the reset circuit 4540, a second end of the fourth resistor R4 may be connected with a first end of the fifth resistor R5, a second end of the fifth resistor R5 may be connected with one end of the reset switch K1, and the other end of the reset switch K1 may be ground interface; a first end of the second capacitor C2 may be connected with a second end of the fourth resistor R4. The first end of the second capacitor C2 may be the level output interface 4541 of the reset circuit 4540, and a second end of the second capacitor C2 may be the ground interface.

In some embodiments, the reset switch K1 of the embodiment may be any type of switch or button, which is not limited in the present disclosure.

In some embodiments, when the reset switch K1 is not closed, an external power supply, the fourth resistor R4, and the second capacitor C2 may form a closed loop. At this time, a level of the level output interface 4541 of the reset circuit 4540 may be low, which may be transmitted to the system controller 4520 as the restart control signal. In some embodiments, when the reset switch K1 is closed, the external power supply, the fourth resistor R4, the fifth resistor R5 and the reset switch K1 may form a closed loop. At this time, the level of the level output interface 4541 of the reset circuit 4540 may be a high level, which may be transmitted to the system controller 4520 as a restart control signal, which is not limited in the present disclosure.

In some embodiments, in some optional embodiments, the power supply interface 4511 may include a USB power supply interface.

Figure 49:
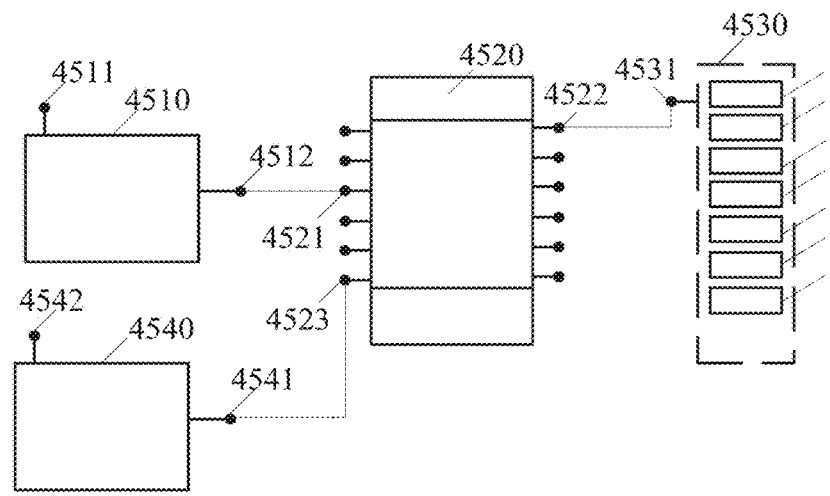
FIG. 49 is a structural diagram of an exemplary intelligent lock system according to some embodiments of the present disclosure.

FIG. 49 is a schematic structural diagram of an exemplary intelligent lock system according to some embodiments of the present disclosure.

As shown in FIG. 49, in combination with the embodiment shown in FIG. 45, in some optional embodiments, the controlled device 4530 may include at least one of the wireless communication module 4531, a touch module 4532, a fingerprint module 4533, a power amplifier module 4534, a frequency identification module 4535, a voice module 4536, and a display module 4537.

In some embodiments, the wireless communication module 4531, the touch module 4532, the fingerprint module 4533, the power amplifier module 4534, the frequency identification module 4535, the voice module 4536 and the display module 4537 may be independent integrated circuit modules and independently connected with the system controller 4520. The connection may be either wired or wireless, which is not limited in the present disclosure.

In some embodiments, the present disclosure does not limit a specific device type of the controlled device 4530. Any device, hardware module, and circuit directly connected with the system controller 4520 or indirectly connected with the system controller 4520 through other devices may be configured as the controlled device 4530 of the present disclosure. For example, the controlled device 4530 may also include a motor of the intelligent lock and/or a motor drive circuit.

In some embodiments, the wireless communication module 4534 may be a Bluetooth communication module, which is not limited in the present disclosure.

In combination with the embodiment shown in FIG. 45, in some optional embodiments, the intelligent lock system may also include a lock body with a wireless communication unit, and the controlled device 4530 may include a wireless communication module (e.g., the wireless communication module 4534). The lock body may communicate with the wireless communication module.

In some embodiments, when the system controller 4520 determines that the lock body needs to be restarted, the lock body may be restarted through the wireless communication module.

In some embodiments, the wireless communication unit may be a Bluetooth communication unit, and the wireless communication module may be a Bluetooth communication module, which is not limited in the present disclosure.

In some embodiments, it is not limited that the lock body is only controlled and restarted through the system controller 4520. The lock body may be controlled and restarted by an independent device or a chip other than the system controller 4520, which is not limited in the present disclosure.

In some embodiments, the lock body of the present disclosure may be a fully automatic lock body or a semi-automatic lock body, which is not limited in the present disclosure. As long as the lock body can communicate directly or indirectly with the controller 200, and achieve direct or indirect control through the controller 200, the lock body may be in the scope of the embodiment.

Figure 50:
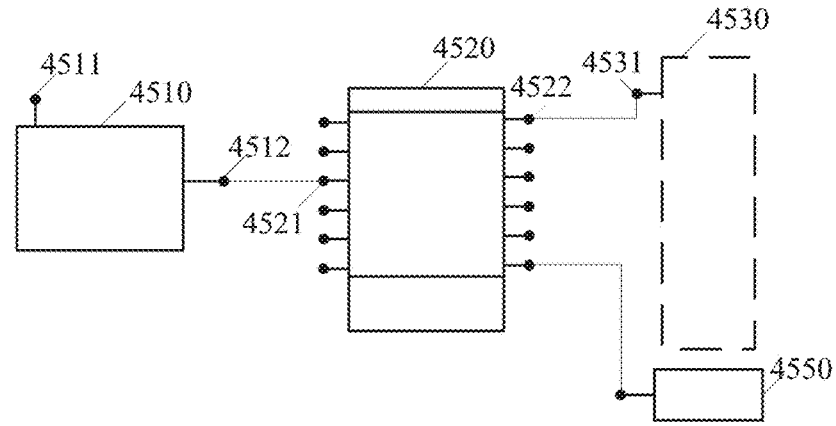
FIG. 50 is a structural diagram of an exemplary intelligent lock system according to some embodiments of the present disclosure.

FIG. 50 is a schematic structural diagram of an exemplary intelligent lock system according to some embodiments of the present disclosure.

As shown in FIG. 50, in combination with the embodiment shown in FIG. 45, in some optional embodiments, the intelligent lock system may also include an alarm module 4550.

The alarm module 4550 may communicate with the system controller 4520 to obtain and respond to an alarm command output by the system controller 4520.

In some embodiments, the alarm module 4550 may be a circuit module with an alarm function. For example, the alarm module 4550 may include at least one of an indicator light, a horn, and a display screen, which is not limited in the present disclosure.

Figure 51:
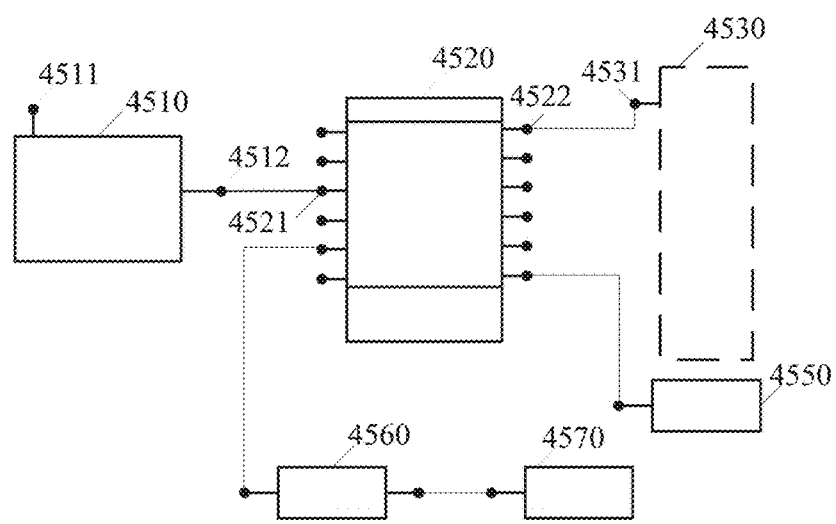
FIG. 51 is a structural diagram of an exemplary intelligent lock system according to other embodiments of the present disclosure.

FIG. 51 is a schematic structural diagram of an exemplary intelligent lock system according to other embodiments of the present disclosure.

As shown in FIG. 51, in combination with the embodiment shown in FIG. 50, in some optional embodiments, the intelligent lock system may also include a detection module 4560 and an anti-pry device 4570.

The detection module 4560 may communicate with the anti-pry device 4570 to obtain state information of the anti-pry device 4570.

The detection module 4560 may communicate with the system controller 4520 to send state information of the anti-pry device 4570 to the system controller 4520, so that the system controller 4520 may output alarm information to the alarm module 4550 according to the state information of the anti-pry device 4570.

In some embodiments, the detection module 4560 may be part of the detection module 290 in the control system 200 shown in FIG. 2.

In some embodiments, the intelligent lock system may also include a monitoring module.

A signal input interface of the monitoring module may be connected with a power state interface of the controlled device 4530 to obtain the power state of the controlled device 4530 in a first time range. The signal output interface of the monitoring module may be connected with the power control interface 4531 of the controlled device 4530 to control the power state of the controlled device 4530.

In some embodiments, the monitoring module may have multiple signal input interfaces and multiple signal output interfaces. The controlled device 4530 may include multiple devices, circuits, or hardware modules. The monitoring module may connect multiple devices, circuits, or hardware modules through the multiple signal input interfaces to obtain power states of the multiple devices, circuits, or hardware modules. The monitoring module may also be connected with the multiple devices, circuits, or hardware modules through the multiple signal output interfaces to control the power states of the multiple devices, circuits or hardware modules, which is not limited in the present disclosure.

In some embodiments, the monitoring module may include a watchdog timing circuit or other circuit that can perform timing, which is not limited in the present disclosure.

In some embodiments, the monitoring module may be part of the control system 200 shown in FIG. 2.

The basic concepts have been described above. Obviously, for those skilled in the art, the above detailed disclosure may be only an example and does not constitute a limitation of the present disclosure. Although it may be not explicitly stated here, those skilled in the art may make various modifications, improvements, and amendments to the present disclosure. Such modifications, improvements and amendments are suggested in the present disclosure, so such modifications, improvements and amendments still belong to the spirit and scope of the exemplary embodiments of the present disclosure.

Meanwhile, the present disclosure uses specific words to describe the embodiments of the present disclosure. For example, "one embodiment," and/or "some embodiments" mean a certain feature or structure related to at least one embodiment of the present disclosure.

Therefore, it should be emphasized and noted that "one embodiment" or "an alternative embodiment" mentioned twice or more in different positions in the present disclosure does not necessarily refer to the same embodiment. In addition, certain features or structures in one or more embodiments of the present disclosure may be appropriately combined.

In addition, unless explicitly stated in the claims, the sequence of processing elements and sequences, the use of numbers and letters, or the use of other names described in the present disclosure are not configured to define the sequence of processes and methods in the present disclosure. Although the above disclosure has discussed some currently considered useful embodiments of the invention through various examples, it should be understood that such details are only for the purpose of explanation, and the additional claims are not limited to the disclosed embodiments. On the contrary, the claims are intended to cover all amendments and equivalent combinations that conform to the essence and scope of the embodiments of the present disclosure. For example, although the system components described above may be implemented by hardware devices, they may also be implemented only by software solutions, such as installing the described system on an existing server or mobile device.

Similarly, it should be noted that, in order to simplify the description disclosed in the present disclosure and thus help the understanding of one or more embodiments of the invention, the foregoing description of the embodiments of the present disclosure sometimes incorporates a variety of features into one embodiment, the drawings or the description thereof. However, this disclosure method does not mean that the object of the present disclosure requires more features than those mentioned in the claims. In fact, the features of the embodiments are less than all the features of the single embodiments disclosed above.

In some embodiments, numbers describing the number of components and attributes are used. It should be understood that such numbers used in the description of embodiments are modified by the modifier "about," "approximate" or "generally" in some examples. Unless otherwise stated, "approximately" or "generally" indicate that a ±20% change in the figure may be allowed. Accordingly, in some embodiments, the numerical parameters used in the description and claims are approximate values, and the approximate values may be changed according to the characteristics required by individual embodiments. In some embodiments, the numerical parameter should consider the specified significant digits and adopt the method of general digit reservation. Although the numerical fields and parameters configured to confirm the range breadth in some embodiments of the present disclosure are approximate values, in specific embodiments, the setting of such values may be as accurate as possible within the feasible range.

For each patent, patent application, patent application disclosure and other materials cited in the present disclosure, such as articles, books, specifications, publications, documents, etc., the entire contents are hereby incorporated into the present disclosure for reference. Except for the present disclosure history documents that are inconsistent with or conflict with the contents of the present disclosure, and the documents that limit the widest range of claims in the present disclosure (currently or later appended to the present disclosure). It should be noted that in case of any inconsistency or conflict between the description, definitions, and/or use of terms in the supplementary materials of the present disclosure and the contents described in the present disclosure, the description, definitions, and/or use of terms in the present disclosure shall prevail.

Finally, it should be understood that the embodiments described in the present disclosure are only configured to illustrate the principles of the embodiments of the present disclosure. Other deformations may also fall within the scope of the present disclosure. Therefore, as an example rather than a limitation, the alternative configuration of the embodiments of the present disclosure may be regarded as being consistent with the teachings of the present disclosure. Accordingly, the embodiments of the present disclosure are not limited to those explicitly introduced and described in the present disclosure.

What is claimed is:
1. A smart device control system, comprising:
at least one storage device for storing instructions;
at least one processor in communicate with the at least one storage device, wherein when executing the instructions, the at least one processor is configured to direct the system to perform operations including:

obtaining a control command, the control command being used for instructing a smart device to perform a target operation;

determining whether the control command satisfies a preset condition; and in response to determining that the control command satisfies the preset condition, controlling the smart device to perform the target operation;

an intelligent lock, wherein, the intelligent lock includes a lock body and one or more lock body sensors arranged in the lock body;

the one or more lock body sensors are configured to acquire sensing signals;

the target operation includes an unlocking operation; and the at least one processor is further configured to direct the system to perform the operations including:

obtaining an unlocking detection result based on the sensing signals, the unlocking detection result at least representing whether the lock body is unlocked successfully;

in response to the unlocking detection result representing that the lock body is unlocked successfully, monitoring a locking signal, the locking signal being used to instruct the lock body to perform a locking operation;

in response to monitoring the locking signal, controlling the lock body to perform the locking operation; and obtaining a locking detection result based on the sensing signals, the locking detection result at least representing whether the lock body is locked successfully;

wherein the intelligent lock includes a motor and a bolt that are arranged in the lock body, wherein the controlling the lock body to perform the unlocking operation includes:

controlling the motor to operate to drive the bolt to move, such that the lock body performs the unlocking operation; and in response to the unlocking detection result representing that the lock body is unlocked successfully, the at least one processor is further configured to direct the system to perform the operations including: controlling the motor to reset; and wherein the locking detection result further represents whether the motor is abnormal, a motor abnormality represented by the locking detection result at least including:

the locking detection result representing that the lock body fails to be locked, a rotation duration of the motor exceeds a rotation duration threshold, and/or a load current of the motor exceeds a current threshold.

2. The system of claim 1, wherein the controlling the lock body to perform the locking operation includes: controlling the motor to operate to drive the bolt to move, such that the lock body performs the locking operation; and in response to the unlocking detection result representing that the lock body is unlocked successfully, the at least one processor is further configured to direct the system to: controlling the motor to reset.

3. The system of claim 1, wherein in response to the unlocking detection result representing that the lock body is unlocked successfully, the at least one processor is further configured to direct the system to perform the operations including:

obtaining an abnormality detection result at least based on the sensing signals, the abnormality detection result representing whether the intelligent lock is in an abnormal state;

in response to the abnormality detection result representing that the intelligent lock is not in the abnormal state, starting to record an unlocking duration; and in response to the unlocking duration exceeding an unlocking duration threshold, generating a locking signal to control the lock body to perform the locking operation.

4. The system of claim 1, wherein the at least one processor is further configured to direct the system to perform the operations including:

in response to the locking detection result representing that the motor is abnormal, controlling the motor to reset; and recontroling the lock body to perform the locking operation until a count of times of the motor abnormity exceeds a threshold of times.

5. The system of claim 1, wherein the at least one processor includes one or more master chips, and at least one master chip of the one or more master chips is arranged in the lock body.

6. The system of claim 1, wherein the obtaining the control command includes:

obtaining an encrypted instruction, the encrypted instruction including an encrypted control key; and decrypting the encrypted instruction to obtain the control command.

7. The system of claim 6, wherein the encrypted instruction is obtained by encrypting the control key and encryption parameters transmitted by the smart device, and the preset condition includes that the control key is a preset key and the encryption parameters are preset encryption parameters.

8. The system of claim 6, wherein the encryption instruction is obtained via a terminal device, and the decrypting the encryption instruction to obtain the control command includes:

obtaining a public key of a public-private key pair generated by the terminal device;

generating a session key based on a private key of a public-private key pair generated by the smart device and the obtained public key; and decrypting the encryption instruction by the session key to obtain the control command.

9. The system of claim 8, wherein before obtaining the encryption instruction, the at least one processor is further configured to direct the system to perform the operations including:

obtaining verification data generated by the terminal device and the public key of the public-private key pair generated by the terminal device;

generating the session key based on the private key of the public-private key pair generated by the smart device and the obtained public key;

decrypting the verification data by the session key to obtain a signature of the terminal device, first data of the terminal device and a certificate of the terminal device;

verifying the signature of the terminal device and the certificate of the terminal device to obtain a verification result;

in response to the verification result indicating that the signature of the terminal device and the certificate of the terminal device are legitimate, generating the control key and encrypting the control key and the first data of the terminal device by the session key to obtain control data; and sending the control data to the terminal device, such that the terminal device is caused to decrypt the control data to obtain the control key.

10. The system of claim 6, wherein the control key includes an offline password value corresponding to a unique password identifier, and the preset condition includes that:
a target password value matches the offline password value exists in a first password pool and the target password value has not been used.

11. The system of claim 10, wherein the first password pool includes multiple offline password values, the offline password value of the control key corresponds to one of the multiple offline password values, and the multiple offline password values are generated through operations including:
obtaining first time information, wherein the first time information is time data information obtained according to a preset rule;
processing at least the first time information to obtain a target character string, the target character string containing multiple characters;
grouping the characters of the target character string to obtain multiple character combinations, each of the multiple character combinations containing at least one character; and
processing characters of each of the multiple character combinations separately to obtain an offline password value corresponding to each of the multiple character combinations.

12. The system of claim 11, wherein each of the multiple offline password values corresponds to a password identifier, the password identifier corresponding to each of the multiple password values is generated through operations including:
obtaining second time information, wherein the second time information is related to the first time information; and
for each of the multiple offline password values, obtaining a password identifier corresponding to the offline password value at least based on a password order corresponding to the offline password value and the second time information.

13. The system of claim 10, wherein the at least one processor is further configured to direct the system to perform the operations including:
in response to determining that the offline password value satisfies the preset condition, transmitting the unique password identifier corresponding to the offline password value to a server when the intelligent lock has established a data connection with the server, such that the server determines, at least based on the unique password identifier, a target user corresponding to a terminal device that obtains the offline password value from the server.

14. The system of claim 1, wherein the smart device includes a control signal circuit and a controlled device, wherein
the control signal circuit has at least one power supply interface to receive a power trigger signal; and
a control signal output interface of the at least one processor is connected with a power control interface of the controlled device to control a power state of the controlled device.

15. The system of claim 14, wherein a level output interface of the control signal circuit is connected with a first signal input interface of the at least one processor and a restart control signal is output to the at least one processor through the first signal input interface.

16. A smart device control method, comprising:
obtaining a control command, wherein the control command is used for instructing a smart device to perform a target operation;
determining whether the control command satisfies a preset condition; and
in response to determining that the control command satisfies the preset condition, controlling the smart device to perform the target operation;
an intelligent lock, wherein, the intelligent lock includes a lock body and one or more lock body sensors arranged in the lock body:
the one or more lock body sensors are configured to acquire sensing signals;
the target operation includes an unlocking operation; and
the at least one processor is further configured to direct the system to perform the operations including:
obtaining an unlocking detection result based on the sensing signals, the unlocking detection result at least representing whether the lock body is unlocked successfully;
in response to the unlocking detection result representing that the lock body is unlocked successfully, monitoring a locking signal, the locking signal being used to instruct the lock body to perform a locking operation;
in response to monitoring the locking signal, controlling the lock body to perform the locking operation; and
obtaining a locking detection result based on the sensing signals, the locking detection result at least representing whether the lock body is locked successfully;
wherein the intelligent lock includes a motor and a bolt that are arranged in the lock body, wherein the controlling the lock body to perform the unlocking operation includes:
controlling the motor to operate to drive the bolt to move, such that the lock body performs the unlocking operation; and
in response to the unlocking detection result representing that the lock body is unlocked successfully, the at least one processor is further configured to direct the system to perform the operations including: controlling the motor to reset; and
wherein the locking detection result further represents whether the motor is abnormal, a motor abnormality represented by the locking detection result at least including:
the locking detection result representing that the lock body fails to be locked, a rotation duration of the motor exceeds a rotation duration threshold, and/or a load current of the motor exceeds a current threshold.

17. A non-transitory computer-readable storage medium, comprising executable instructions, when executed by a computing device, direct the computer device to perform a smart device control method, the smart device control method comprising:
obtaining a control command, wherein the control command is used for instructing a smart device to perform a target operation;
determining whether the control command satisfies a preset condition; and in response to determining that the control command satisfies the preset condition, controlling the smart device to perform a target operation;

an intelligent lock, wherein, the intelligent lock includes a lock body and one or more lock body sensors arranged in the lock body:

the one or more lock body sensors are configured to acquire sensing signals;

the target operation includes an unlocking operation; and the at least one processor is further configured to direct the system to perform the operations including:

obtaining an unlocking detection result based on the sensing signals, the unlocking detection result at least representing whether the lock body is unlocked successfully;

in response to the unlocking detection result representing that the lock body is unlocked successfully, monitoring a locking signal, the locking signal being used to instruct the lock body to perform a locking operation;

in response to monitoring the locking signal, controlling the lock body to perform the locking operation; and obtaining a locking detection result based on the sensing signals, the locking detection result at least representing whether the lock body is locked successfully;

wherein the intelligent lock includes a motor and a bolt that are arranged in the lock body, wherein the controlling the lock body to perform the unlocking operation includes:

controlling the motor to operate to drive the bolt to move, such that the lock body performs the unlocking operation; and in response to the unlocking detection result representing that the lock body is unlocked successfully, the at least one processor is further configured to direct the system to perform the operations including: controlling the motor to reset; and wherein the locking detection result further represents whether the motor is abnormal, a motor abnormality represented by the locking detection result at least including:

the locking detection result representing that the lock body fails to be locked, a rotation duration of the motor exceeds a rotation duration threshold, and/or a load current of the motor exceeds a current threshold.

* * * * *